(12) United States Patent
Merrow

(10) Patent No.: US 7,848,106 B2
(45) Date of Patent: Dec. 7, 2010

(54) TEMPERATURE CONTROL WITHIN DISK DRIVE TESTING SYSTEMS

(75) Inventor: Brian S. Merrow, Harvard, MA (US)

(73) Assignee: Teradyne, Inc., North Reading, MA (US)

( * ) Notice: Subject to any disclaimer, the term of this patent is extended or adjusted under 35 U.S.C. 154(b) by 254 days.

(21) Appl. No.: 12/105,061

(22) Filed: Apr. 17, 2008

(65) Prior Publication Data

US 2009/0262454 A1    Oct. 22, 2009

(51) Int. Cl.
*H05K 7/20* (2006.01)
*G11B 33/14* (2006.01)

(52) U.S. Cl. .................. 361/696; 361/679.53; 361/695; 361/699; 361/724; 361/727; 165/80.2; 165/80.4; 165/80.5; 165/104.33; 165/185; 360/97.01; 360/97.02; 714/25; 714/42; 714/47; 62/3.2; 62/259.2

(58) Field of Classification Search ............ 361/679.46, 361/679.47, 679.48, 679.53, 685, 690–697, 361/698, 699, 715, 716, 721–727, 728, 729; 165/80.2, 80.3, 80.4, 80.5, 104.33, 104.34, 165/185; 360/31, 53, 59, 97.01, 97.02; 714/25, 714/42, 47; 62/3.2, 259.2; 702/115, 182; 454/184; 324/158.1, 212, 760

See application file for complete search history.

(56) References Cited

U.S. PATENT DOCUMENTS

| | | | |
|---|---|---|---|
| 557,186 | A | 3/1896 | Cahill |
| 2,224,407 | A | 12/1940 | Passur |
| 2,380,026 | A | 7/1945 | Clarke |
| 2,631,775 | A | 3/1953 | Gordon |
| 2,635,524 | A | 4/1953 | Jenkins |
| 3,120,166 | A | 2/1964 | Lyman ........................... 98/39 |
| 3,360,032 | A | 12/1967 | Sherwood |
| 3,364,838 | A | 1/1968 | Bradley |
| 3,517,601 | A | 6/1970 | Courchesne |
| 3,845,286 | A | 10/1974 | Aronstein et al. |
| 4,147,299 | A | 4/1979 | Freeman |
| 4,233,644 | A | 11/1980 | Hwang et al. ............... 361/384 |

(Continued)

FOREIGN PATENT DOCUMENTS

AU    583716    5/1989

(Continued)

OTHER PUBLICATIONS

Bakken et al., "Low Cost, Rack Mounted, Direct Access Disk Storage Device", www.ip.com, 4 pages, Mar. 3, 2005.

(Continued)

*Primary Examiner*—Michael V Datskovskiy
(74) *Attorney, Agent, or Firm*—Fish & Richardson P.C.

(57) ABSTRACT

A disk drive testing system cooling circuit includes a plurality of test racks. Each of the test racks include a test slot compartment and a test electronics compartment. Each of the test slot compartments includes multiple test slots, and one or more cooling conduits configured to convey a cooling liquid toward the test slots. Each of the test electronics compartments includes test electronics configured to communicate with the test slots for executing a test algorithm, and a heat exchanger in fluid communication with the one or more cooling conduits. The heat exchanger is configured to cool an air flow directed toward the test electronics.

21 Claims, 75 Drawing Sheets

U.S. PATENT DOCUMENTS

| | | | |
|---|---|---|---|
| 4,336,748 A | 6/1982 | Martin et al. ................... 98/33 |
| 4,379,259 A | 4/1983 | Varadi et al. ................... 324/73 |
| 4,477,127 A | 10/1984 | Kume ............................. 312/8 |
| 4,495,545 A | 1/1985 | Dufresne et al. ............. 361/384 |
| 4,526,318 A | 7/1985 | Fleming et al. ............... 236/49 |
| 4,620,248 A | 10/1986 | Gitzendanner ................ 360/97 |
| 4,648,007 A | 3/1987 | Garner ....................... 361/384 |
| 4,654,732 A | 3/1987 | Mesher |
| 4,665,455 A | 5/1987 | Mesher |
| 4,683,424 A | 7/1987 | Cutright et al. |
| 4,685,303 A | 8/1987 | Branc et al. ...................... 62/3 |
| 4,688,124 A | 8/1987 | Scribner et al. |
| 4,713,714 A | 12/1987 | Gatti et al. ................... 360/137 |
| 4,739,444 A | 4/1988 | Zushi et al. ................... 361/383 |
| 4,754,397 A | 6/1988 | Varaiya et al. ............... 364/200 |
| 4,768,285 A | 9/1988 | Woodman, Jr. |
| 4,778,063 A | 10/1988 | Ueberreiter |
| 4,801,234 A | 1/1989 | Cedrone |
| 4,809,881 A | 3/1989 | Becker |
| 4,817,273 A | 4/1989 | Lape et al. |
| 4,817,934 A | 4/1989 | McCormick et al. |
| 4,851,965 A | 7/1989 | Gabuzda et al. ............. 361/383 |
| 4,881,591 A | 11/1989 | Rignall ....................... 165/26 |
| 4,888,549 A | 12/1989 | Wilson et al. ............. 324/73 R |
| 4,911,281 A | 3/1990 | Jenkner |
| 4,967,155 A * | 10/1990 | Magnuson ................... 324/212 |
| 5,012,187 A | 4/1991 | Littlebury ................... 324/158 |
| 5,045,960 A | 9/1991 | Eding |
| 5,061,630 A | 10/1991 | Knopf et al. ................. 435/290 |
| 5,119,270 A | 6/1992 | Bolton et al. ................ 361/384 |
| 5,122,914 A | 6/1992 | Hanson ..................... 360/98.01 |
| 5,127,684 A | 7/1992 | Klotz et al. ................. 292/113 |
| 5,128,813 A | 7/1992 | Lee |
| 5,136,395 A | 8/1992 | Ishii et al. |
| 5,158,132 A | 10/1992 | Guillemot ..................... 165/30 |
| 5,168,424 A | 12/1992 | Bolton et al. ................ 361/384 |
| 5,171,183 A | 12/1992 | Pollard et al. ............... 454/184 |
| 5,173,819 A | 12/1992 | Takahashi et al. ........ 360/97.03 |
| 5,176,202 A | 1/1993 | Richard ..................... 165/48.1 |
| 5,205,132 A | 4/1993 | Fu |
| 5,206,772 A | 4/1993 | Hirano et al. |
| 5,207,613 A | 5/1993 | Ferchau et al. .............. 454/184 |
| 5,210,680 A | 5/1993 | Scheibler ................... 361/384 |
| 5,237,484 A | 8/1993 | Ferchau et al. .............. 361/689 |
| 5,263,537 A | 11/1993 | Plucinski et al. ............. 165/97 |
| 5,269,698 A | 12/1993 | Singer ....................... 439/157 |
| 5,295,392 A | 3/1994 | Hensel et al. |
| 5,309,323 A | 5/1994 | Gray et al. .................. 361/726 |
| 5,325,263 A | 6/1994 | Singer et al. ............... 361/683 |
| 5,349,486 A | 9/1994 | Sugimoto et al. ........ 360/97.01 |
| 5,368,072 A | 11/1994 | Cote ......................... 137/872 |
| 5,374,395 A | 12/1994 | Robinson et al. |
| 5,379,229 A | 1/1995 | Parsons et al. |
| 5,398,058 A | 3/1995 | Hattori |
| 5,412,534 A | 5/1995 | Cutts et al. ................. 361/695 |
| 5,414,591 A | 5/1995 | Kimura et al. ............. 361/695 |
| 5,426,581 A | 6/1995 | Kishi et al. ............. 364/167.01 |
| 5,469,037 A | 11/1995 | McMurtrey, Sr. et al. ... 318/626 |
| 5,477,416 A | 12/1995 | Schkrohowsky et al. .... 361/695 |
| 5,484,012 A | 1/1996 | Hiratsuka ..................... 165/40 |
| 5,486,681 A | 1/1996 | Dagnac et al. |
| 5,491,610 A | 2/1996 | Mok et al. .................. 361/695 |
| 5,543,727 A | 8/1996 | Bushard et al. |
| 5,546,250 A | 8/1996 | Diel ......................... 360/97.02 |
| 5,557,186 A | 9/1996 | McMurtrey, Sr. et al. ... 318/626 |
| 5,563,768 A | 10/1996 | Perdue ....................... 361/695 |
| 5,570,740 A | 11/1996 | Flores et al. |
| 5,593,380 A | 1/1997 | Bittikofer |
| 5,601,141 A | 2/1997 | Gordon et al. .............. 165/263 |
| 5,604,662 A | 2/1997 | Anderson et al. ........... 361/685 |
| 5,610,893 A | 3/1997 | Soga et al. .................. 369/84 |
| 5,617,430 A | 4/1997 | Angelotti et al. |
| 5,644,705 A | 7/1997 | Stanley .................. 395/183.18 |
| 5,646,918 A | 7/1997 | Dimitri et al. |
| 5,654,846 A | 8/1997 | Wicks et al. ............. 360/97.01 |
| 5,673,029 A | 9/1997 | Behl et al. .................. 340/635 |
| 5,694,290 A | 12/1997 | Chang ....................... 361/685 |
| 5,718,627 A | 2/1998 | Wicks ......................... 454/68 |
| 5,718,628 A | 2/1998 | Nakazato et al. ........... 454/184 |
| 5,731,928 A | 3/1998 | Jabbari et al. |
| 5,751,549 A | 5/1998 | Eberhardt et al. .......... 361/687 |
| 5,754,365 A | 5/1998 | Beck et al. |
| 5,761,032 A | 6/1998 | Jones ........................ 361/685 |
| 5,793,610 A | 8/1998 | Schmitt et al. ............. 361/695 |
| 5,811,678 A | 9/1998 | Hirano ........................ 73/461 |
| 5,812,761 A | 9/1998 | Seki et al. .............. 395/185.07 |
| 5,819,842 A | 10/1998 | Potter et al. ................ 165/206 |
| 5,831,525 A | 11/1998 | Harvey ...................... 340/507 |
| 5,851,143 A | 12/1998 | Hamid ......................... 454/57 |
| 5,859,409 A | 1/1999 | Kim et al. .................. 219/400 |
| 5,859,540 A | 1/1999 | Fukumoto ................... 324/760 |
| 5,862,037 A | 1/1999 | Behl .......................... 361/687 |
| 5,870,630 A | 2/1999 | Reasoner et al. ............ 395/894 |
| 5,886,639 A | 3/1999 | Behl et al. .................. 340/635 |
| 5,890,959 A | 4/1999 | Pettit et al. ................. 454/184 |
| 5,903,163 A * | 5/1999 | Tverdy et al. .............. 324/760 |
| 5,912,799 A | 6/1999 | Grouell et al. .............. 361/685 |
| 5,913,926 A | 6/1999 | Anderson et al. .............. 714/6 |
| 5,914,856 A | 6/1999 | Morton et al. .............. 361/690 |
| 5,927,386 A | 7/1999 | Lin ........................... 165/80.3 |
| 5,956,301 A | 9/1999 | Dimitri et al. |
| 5,959,834 A | 9/1999 | Chang ....................... 361/685 |
| 5,999,356 A | 12/1999 | Dimitri et al. ................. 360/71 |
| 5,999,365 A | 12/1999 | Hasegawa et al. ........ 360/97.02 |
| 6,000,623 A | 12/1999 | Blatti et al. ................ 236/49.3 |
| 6,005,404 A | 12/1999 | Cochran et al. ............. 324/760 |
| 6,005,770 A | 12/1999 | Schmitt ...................... 361/695 |
| 6,008,636 A | 12/1999 | Miller et al. |
| 6,008,984 A | 12/1999 | Cunningham et al. ....... 361/685 |
| 6,011,689 A | 1/2000 | Wrycraft .................... 361/695 |
| 6,031,717 A | 2/2000 | Baddour et al. ............. 361/687 |
| 6,034,870 A | 3/2000 | Osborn et al. ............... 361/690 |
| 6,042,348 A | 3/2000 | Aakalu et al. ............. 417/423.5 |
| 6,045,113 A | 4/2000 | Itakura |
| 6,055,814 A * | 5/2000 | Song ............................ 62/3.2 |
| 6,066,822 A | 5/2000 | Nemoto et al. |
| 6,067,225 A | 5/2000 | Reznikov et al. ............ 361/685 |
| 6,069,792 A | 5/2000 | Nelik .......................... 361/687 |
| 6,084,768 A | 7/2000 | Bolognia .................... 361/685 |
| 6,094,342 A | 7/2000 | Dague et al. ................ 361/685 |
| 6,104,607 A | 8/2000 | Behl .......................... 361/687 |
| 6,115,250 A | 9/2000 | Schmitt ...................... 361/695 |
| 6,122,131 A | 9/2000 | Jeppson |
| 6,122,232 A | 9/2000 | Schell et al. |
| 6,124,707 A | 9/2000 | Kim et al. ................ 324/158.1 |
| 6,130,817 A | 10/2000 | Flotho et al. ................ 361/685 |
| 6,144,553 A | 11/2000 | Hileman et al. ............. 361/687 |
| 6,166,901 A | 12/2000 | Gamble et al. ............. 361/685 |
| 6,169,413 B1 | 1/2001 | Paek et al. .................. 324/760 |
| 6,169,930 B1 | 1/2001 | Blachek et al. |
| 6,177,805 B1 | 1/2001 | Pih ........................... 324/754 |
| 6,178,835 B1 | 1/2001 | Orriss et al. ................ 73/865.9 |
| 6,181,557 B1 | 1/2001 | Gatti ......................... 361/695 |
| 6,718,164 B1 | 1/2001 | Paek et al. |
| 6,185,065 B1 | 2/2001 | Hasegawa et al. ........ 360/97.02 |
| 6,185,097 B1 | 2/2001 | Behl .......................... 361/695 |
| 6,188,191 B1 | 2/2001 | Frees et al. |
| 6,192,282 B1 | 2/2001 | Smith et al. |
| 6,193,339 B1 | 2/2001 | Behl et al. ................ 312/223.2 |
| 6,209,842 B1 | 4/2001 | Anderson et al. ........... 248/560 |
| 6,227,516 B1 | 5/2001 | Webster, Jr. et al. ......... 248/694 |
| 6,229,275 B1 | 5/2001 | Yamamoto |
| 6,231,145 B1 | 5/2001 | Liu ........................... 312/332.1 |
| 6,233,148 B1 | 5/2001 | Shen |

| Patent No. | Kind | Date | Inventor | Class |
|---|---|---|---|---|
| 6,236,563 | B1 | 5/2001 | Buican et al. | 361/685 |
| 6,247,944 | B1 | 6/2001 | Bolognia et al. | 439/157 |
| 6,249,824 | B1 | 6/2001 | Henrichs | |
| 6,252,769 | B1 | 6/2001 | Tullstedt et al. | 361/694 |
| 6,262,863 | B1 | 7/2001 | Ostwald et al. | |
| 6,272,007 | B1 | 8/2001 | Kitlas et al. | |
| 6,272,767 | B1 * | 8/2001 | Botruff et al. | 34/202 |
| 6,281,677 | B1 | 8/2001 | Cosci et al. | 324/212 |
| 6,282,501 | B1 | 8/2001 | Assouad | 702/117 |
| 6,285,524 | B1 | 9/2001 | Boigenzahn et al. | |
| 6,289,678 | B1 | 9/2001 | Pandolfi | 62/3.2 |
| 6,297,950 | B1 | 10/2001 | Erwin | 361/685 |
| 6,298,672 | B1 | 10/2001 | Valicoff, Jr. | |
| 6,302,714 | B1 | 10/2001 | Bologna et al. | 439/157 |
| 6,304,839 | B1 | 10/2001 | Ho et al. | 703/18 |
| 6,307,386 | B1 | 10/2001 | Fowler et al. | |
| 6,327,150 | B1 | 12/2001 | Levy et al. | 361/724 |
| 6,330,154 | B1 | 12/2001 | Fryers et al. | 361/695 |
| 6,351,379 | B1 | 2/2002 | Cheng | 361/685 |
| 6,354,792 | B1 | 3/2002 | Kobayashi et al. | |
| 6,356,409 | B1 | 3/2002 | Price et al. | 360/98.07 |
| 6,356,415 | B1 | 3/2002 | Kabasawa | 360/256.3 |
| 6,384,995 | B1 | 5/2002 | Smith | 360/31 |
| 6,388,437 | B1 | 5/2002 | Wolski et al. | |
| 6,388,875 | B1 | 5/2002 | Chen | 361/685 |
| 6,388,878 | B1 | 5/2002 | Chang | 361/687 |
| 6,389,225 | B1 | 5/2002 | Malinoski et al. | 392/479 |
| 6,411,584 | B2 | 6/2002 | Davis et al. | |
| 6,421,236 | B1 | 7/2002 | Montoya et al. | 361/685 |
| 6,434,000 | B1 | 8/2002 | Pandolfi | 361/685 |
| 6,434,498 | B1 * | 8/2002 | Ulrich et al. | 702/115 |
| 6,434,499 | B1 | 8/2002 | Ulrich et al. | 702/115 |
| 6,464,080 | B1 | 10/2002 | Morris et al. | 306/591 |
| 6,467,153 | B2 | 10/2002 | Butts et al. | 29/603.03 |
| 6,473,297 | B1 | 10/2002 | Behl et al. | 361/685 |
| 6,473,301 | B1 | 10/2002 | Levy et al. | 361/685 |
| 6,476,627 | B1 | 11/2002 | Pelissier et al. | 324/760 |
| 6,477,044 | B2 | 11/2002 | Foley et al. | |
| 6,477,442 | B1 | 11/2002 | Valerino, Sr. | |
| 6,480,380 | B1 * | 11/2002 | French et al. | 361/690 |
| 6,480,382 | B2 | 11/2002 | Cheng | 361/695 |
| 6,487,071 | B1 | 11/2002 | Tata et al. | 361/685 |
| 6,489,793 | B2 | 12/2002 | Jones et al. | 324/760 |
| 6,494,663 | B2 | 12/2002 | Ostwald et al. | |
| 6,525,933 | B2 | 2/2003 | Eland | 361/686 |
| 6,526,841 | B1 * | 3/2003 | Wanek et al. | 73/865.6 |
| 6,535,384 | B2 | 3/2003 | Huang | 361/695 |
| 6,537,013 | B2 | 3/2003 | Emberty et al. | |
| 6,544,309 | B1 | 4/2003 | Hoefer et al. | 55/283 |
| 6,546,445 | B1 | 4/2003 | Hayes | 710/305 |
| 6,553,532 | B2 | 4/2003 | Aoki | |
| 6,560,107 | B1 * | 5/2003 | Beck et al. | 361/699 |
| 6,565,163 | B2 | 5/2003 | Behl et al. | 312/223.1 |
| 6,566,859 | B2 | 5/2003 | Wolski et al. | 324/158.1 |
| 6,567,266 | B2 | 5/2003 | Ives et al. | |
| 6,570,734 | B2 | 5/2003 | Ostwald et al. | |
| 6,577,586 | B1 | 6/2003 | Yang et al. | |
| 6,577,687 | B2 | 6/2003 | Hall et al. | |
| 6,618,254 | B2 | 9/2003 | Ives | |
| 6,626,846 | B2 | 9/2003 | Spencer | |
| 6,628,518 | B2 | 9/2003 | Behl et al. | 361/687 |
| 6,635,115 | B1 | 10/2003 | Fairbairn et al. | |
| 6,640,235 | B1 | 10/2003 | Anderson | 708/100 |
| 6,644,982 | B1 | 11/2003 | Ondricek et al. | |
| 6,651,192 | B1 | 11/2003 | Viglione et al. | 714/47 |
| 6,654,165 | B2 * | 11/2003 | Engelhardt et al. | 359/385 |
| 6,654,240 | B1 | 11/2003 | Tseng et al. | 361/685 |
| 6,679,128 | B2 | 1/2004 | Wanek et al. | 73/865.6 |
| 6,693,757 | B2 | 2/2004 | Hayakawa et al. | 360/69 |
| 6,741,529 | B1 | 5/2004 | Getreuer | |
| 6,746,648 | B1 | 6/2004 | Mattila et al. | |
| 6,751,093 | B1 | 6/2004 | Hsu et al. | 361/685 |
| 6,791,785 | B1 | 9/2004 | Messenger et al. | |
| 6,791,799 | B2 | 9/2004 | Fletcher | 360/255 |
| 6,798,651 | B2 | 9/2004 | Syring et al. | 361/685 |
| 6,798,972 | B1 | 9/2004 | Ito et al. | |
| 6,801,834 | B1 | 10/2004 | Konshak et al. | |
| 6,806,700 | B2 | 10/2004 | Wanek et al. | 324/158.1 |
| 6,811,427 | B2 | 11/2004 | Garrett et al. | 439/378 |
| 6,826,046 | B1 * | 11/2004 | Muncaster et al. | 361/679.33 |
| 6,830,372 | B2 | 12/2004 | Liu et al. | 374/57 |
| 6,832,929 | B2 | 12/2004 | Garrett et al. | 439/378 |
| 6,861,861 | B2 | 3/2005 | Song et al. | |
| 6,862,173 | B1 | 3/2005 | Konshak et al. | |
| 6,867,939 | B2 | 3/2005 | Katahara et al. | 360/53 |
| 6,892,328 | B2 | 5/2005 | Klein et al. | 714/42 |
| 6,904,479 | B2 | 6/2005 | Hall et al. | |
| 6,908,330 | B2 | 6/2005 | Garrett et al. | 439/378 |
| 6,928,336 | B2 | 8/2005 | Peshkin et al. | |
| 6,937,432 | B2 | 8/2005 | Sri-Jayantha et al. | 360/97.01 |
| 6,957,291 | B2 | 10/2005 | Moon et al. | |
| 6,965,811 | B2 | 11/2005 | Dickey et al. | |
| 6,974,017 | B2 | 12/2005 | Oseguera | |
| 6,976,190 | B1 | 12/2005 | Goldstone | 714/42 |
| 6,980,381 | B2 | 12/2005 | Gray et al. | 360/31 |
| 6,982,872 | B2 | 1/2006 | Behl et al. | 361/687 |
| 7,006,325 | B2 | 2/2006 | Emberty et al. | |
| 7,039,924 | B2 | 5/2006 | Goodman et al. | |
| 7,054,150 | B2 | 5/2006 | Orriss et al. | 361/685 |
| 7,070,323 | B2 | 7/2006 | Wanek et al. | 374/45 |
| 7,076,391 | B1 | 7/2006 | Pakzad et al. | 702/118 |
| 7,077,614 | B1 | 7/2006 | Hasper et al. | |
| 7,088,541 | B2 | 8/2006 | Orriss et al. | 360/71 |
| 7,092,251 | B1 | 8/2006 | Henry | 361/685 |
| 7,106,582 | B2 | 9/2006 | Albrecht et al. | 361/685 |
| 7,123,477 | B2 | 10/2006 | Coglitore et al. | |
| 7,126,777 | B2 | 10/2006 | Flechsig et al. | 360/59 |
| 7,130,138 | B2 | 10/2006 | Lum et al. | 360/31 |
| 7,134,553 | B2 | 11/2006 | Stephens | |
| 7,139,145 | B1 | 11/2006 | Archibald et al. | 360/53 |
| 7,164,579 | B2 | 1/2007 | Muncaster et al. | 361/685 |
| 7,167,360 | B2 | 1/2007 | Inoue et al. | |
| 7,181,458 | B1 | 2/2007 | Higashi | |
| 7,203,021 | B1 | 4/2007 | Ryan et al. | |
| 7,203,060 | B2 | 4/2007 | Kay et al. | 361/685 |
| 7,206,201 | B2 | 4/2007 | Behl et al. | |
| 7,216,968 | B2 | 5/2007 | Smith et al. | |
| 7,219,028 | B2 * | 5/2007 | Bae et al. | 702/115 |
| 7,219,273 | B2 | 5/2007 | Fisher et al. | |
| 7,227,746 | B2 | 6/2007 | Tanaka et al. | 361/685 |
| 7,232,101 | B2 | 6/2007 | Wanek et al. | 248/346.06 |
| 7,243,043 | B2 * | 7/2007 | Shin | 702/182 |
| 7,248,467 | B2 | 7/2007 | Sri-Jayantha et al. | 361/685 |
| 7,259,966 | B2 | 8/2007 | Connelly, Jr. et al. | 361/727 |
| 7,273,344 | B2 | 9/2007 | Ostwald et al. | |
| 7,280,353 | B2 | 10/2007 | Wendel et al. | |
| 7,289,885 | B2 | 10/2007 | Basham et al. | |
| 7,304,855 | B1 | 12/2007 | Milligan et al. | 361/724 |
| 7,315,447 | B2 | 1/2008 | Inoue et al. | |
| 7,349,205 | B2 | 3/2008 | Hall et al. | |
| 7,353,524 | B1 | 4/2008 | Lin et al. | |
| 7,385,385 | B2 | 6/2008 | Magliocco et al. | |
| 7,395,133 | B2 | 7/2008 | Lowe | |
| 7,403,451 | B2 | 7/2008 | Goodman et al. | |
| 7,437,212 | B2 | 10/2008 | Farchmin et al. | |
| 7,447,011 | B2 | 11/2008 | Wade et al. | |
| 7,457,112 | B2 * | 11/2008 | Fukuda et al. | 361/679.48 |
| 7,467,024 | B2 | 12/2008 | Flitsch | |
| 7,476,362 | B2 | 1/2009 | Angros | 422/100 |
| 7,483,269 | B1 * | 1/2009 | Marvin et al. | 361/679.31 |
| 7,505,264 | B2 | 3/2009 | Hall et al. | |
| 7,554,811 | B2 | 6/2009 | Scicluna et al. | |
| 7,568,122 | B2 * | 7/2009 | Mechalke et al. | 714/5 |
| 7,570,455 | B2 | 8/2009 | Deguchi et al. | |
| 7,573,715 | B2 * | 8/2009 | Mojaver et al. | 361/716 |
| 7,584,851 | B2 | 9/2009 | Hong et al. | |

| | | | |
|---|---|---|---|
| 7,612,996 B2 | 11/2009 | Atkins et al. | |
| 7,625,027 B2 | 12/2009 | Kiaie et al. | |
| 7,630,196 B2 | 12/2009 | Hall et al. | |
| 7,643,289 B2 | 1/2010 | Ye et al. | |
| 7,646,596 B2 | 1/2010 | Ng | |
| 7,729,107 B2 * | 6/2010 | Atkins et al. | 361/679.02 |
| 2001/0006453 A1 | 7/2001 | Glorioso et al. | 361/685 |
| 2001/0044023 A1 | 11/2001 | Johnson et al. | |
| 2001/0046118 A1 | 11/2001 | Yamanashi et al. | 361/687 |
| 2001/0048590 A1 | 12/2001 | Behl et al. | |
| 2002/0030981 A1 | 3/2002 | Sullivan et al. | |
| 2002/0044416 A1 | 4/2002 | Harmon, III et al. | 361/685 |
| 2002/0051338 A1 | 5/2002 | Jiang et al. | |
| 2002/0071248 A1 | 6/2002 | Huang et al. | 361/685 |
| 2002/0079422 A1 | 6/2002 | Jiang | |
| 2002/0090320 A1 | 7/2002 | Burow et al. | |
| 2002/0116087 A1 | 8/2002 | Brown | |
| 2002/0161971 A1 | 10/2002 | Dimitri et al. | 711/114 |
| 2002/0172004 A1 | 11/2002 | Ives et al. | 361/685 |
| 2003/0035271 A1 | 2/2003 | Lelong et al. | 361/724 |
| 2003/0043550 A1 | 3/2003 | Ives | 361/726 |
| 2003/0150284 A9 * | 8/2003 | Wanek et al. | 73/865.8 |
| 2003/0206397 A1 | 11/2003 | Allgeyer et al. | 361/685 |
| 2004/0165489 A1 | 8/2004 | Goodman et al. | |
| 2004/0230399 A1 | 11/2004 | Shin | 702/182 |
| 2004/0236465 A1 | 11/2004 | Butka et al. | 700/245 |
| 2004/0264121 A1 | 12/2004 | Orriss et al. | 361/685 |
| 2005/0004703 A1 | 1/2005 | Christie | |
| 2005/0010836 A1 | 1/2005 | Bae et al. | 714/25 |
| 2005/0018397 A1 | 1/2005 | Kay et al. | 361/685 |
| 2005/0057849 A1 | 3/2005 | Twogood et al. | |
| 2005/0069400 A1 | 3/2005 | Dickey et al. | |
| 2005/0109131 A1 | 5/2005 | Wanek et al. | 73/865.9 |
| 2005/0116702 A1 * | 6/2005 | Wanek et al. | 324/158.1 |
| 2005/0131578 A1 | 6/2005 | Weaver | |
| 2005/0179457 A1 | 8/2005 | Min et al. | |
| 2005/0207059 A1 | 9/2005 | Cochrane | |
| 2005/0219809 A1 | 10/2005 | Muncaster et al. | 361/685 |
| 2005/0225338 A1 | 10/2005 | Sands et al. | 324/754 |
| 2005/0270737 A1 | 12/2005 | Wilson et al. | 361/685 |
| 2006/0023331 A1 | 2/2006 | Flechsig et al. | |
| 2006/0028802 A1 | 2/2006 | Shaw et al. | 361/728 |
| 2006/0066974 A1 | 3/2006 | Akamatsu et al. | |
| 2006/0130316 A1 | 6/2006 | Takase et al. | 29/603.09 |
| 2006/0190205 A1 | 8/2006 | Klein et al. | |
| 2006/0227517 A1 | 10/2006 | Zayas et al. | 361/748 |
| 2006/0250766 A1 | 11/2006 | Blaalid et al. | 361/685 |
| 2006/0269384 A1 | 11/2006 | Kiaie et al. | 414/222.02 |
| 2007/0034368 A1 | 2/2007 | Atkins et al. | 165/247 |
| 2007/0035874 A1 | 2/2007 | Wendel et al. | |
| 2007/0035875 A1 | 2/2007 | Hall et al. | |
| 2007/0082907 A1 * | 4/2007 | Canada et al. | 514/242 |
| 2007/0127202 A1 | 6/2007 | Scicluna et al. | 361/685 |
| 2007/0127206 A1 | 6/2007 | Wade et al. | 361/687 |
| 2007/0174719 A1 * | 7/2007 | Inoue et al. | 714/42 |
| 2007/0053154 A1 | 8/2007 | Fukuda et al. | |
| 2007/0195497 A1 | 8/2007 | Atkins | 361/685 |
| 2007/0248142 A1 | 10/2007 | Rountree et al. | |
| 2007/0253157 A1 | 11/2007 | Atkins et al. | 361/685 |
| 2007/0286045 A1 | 12/2007 | Onagi et al. | |
| 2008/0007865 A1 | 1/2008 | Orriss et al. | 360/97.01 |
| 2008/0030945 A1 * | 2/2008 | Mojaver et al. | 361/685 |
| 2008/0112075 A1 | 5/2008 | Farquhar et al. | 360/97.02 |
| 2008/0239564 A1 | 10/2008 | Farquhar et al. | 360/97.02 |
| 2008/0282275 A1 | 11/2008 | Zaczek et al. | |
| 2008/0282278 A1 | 11/2008 | Barkley | |
| 2009/0028669 A1 | 1/2009 | Rebstock | |
| 2009/0082907 A1 * | 3/2009 | Stuvel et al. | 700/276 |
| 2009/0122443 A1 | 5/2009 | Farquhar et al. | |
| 2009/0142169 A1 | 6/2009 | Garcia et al. | |
| 2009/0153992 A1 | 6/2009 | Garcia et al. | |
| 2009/0153993 A1 | 6/2009 | Garcia et al. | |
| 2009/0153994 A1 | 6/2009 | Merrow | |
| 2009/0175705 A1 | 7/2009 | Nakao et al. | |
| 2009/0261047 A1 | 10/2009 | Merrow | |
| 2009/0261228 A1 | 10/2009 | Merrow | |
| 2009/0261229 A1 | 10/2009 | Merrow | |
| 2009/0262444 A1 | 10/2009 | Polyakov et al. | |
| 2009/0262445 A1 | 10/2009 | Noble et al. | |
| 2009/0262454 A1 | 10/2009 | Merrow | |
| 2009/0262455 A1 | 10/2009 | Merrow | |
| 2009/0265032 A1 | 10/2009 | Toscano et al. | |
| 2009/0265043 A1 | 10/2009 | Merrow | |
| 2009/0265136 A1 | 10/2009 | Garcia et al. | |
| 2009/0297328 A1 | 12/2009 | Slocum, III | |

FOREIGN PATENT DOCUMENTS

| | | |
|---|---|---|
| CN | 1177187 | 3/1998 |
| CN | 2341188 | 9/1999 |
| CN | 1114109 | 7/2003 |
| CN | 1192544 | 3/2005 |
| DE | 3786944 | 11/1993 |
| DE | 69111634 | 5/1996 |
| DE | 69400145 | 10/1996 |
| DE | 19701548 | 8/1997 |
| DE | 19804813 | 9/1998 |
| DE | 69614460 | 6/2002 |
| DE | 69626584 | 12/2003 |
| DE | 19861388 | 8/2007 |
| EP | 0210497 | 7/1986 |
| EP | 0242970 | 10/1987 |
| EP | 0 277 634 A | 8/1988 |
| EP | 0356977 | 8/1989 |
| EP | 0442642 | 2/1991 |
| EP | 0466073 | 7/1991 |
| EP | 0776009 | 11/1991 |
| EP | 0582017 | 2/1994 |
| EP | 0617570 | 9/1994 |
| EP | 0635836 | 1/1995 |
| EP | 741508 | 11/1996 |
| EP | 0757320 | 2/1997 |
| EP | 0757351 | 2/1997 |
| EP | 0840476 | 5/1998 |
| EP | 1 045 301 A | 10/2000 |
| EP | 1209557 | 5/2002 |
| EP | 1422713 | 5/2004 |
| EP | 1234308 | 5/2006 |
| EP | 1760722 | 3/2007 |
| EP | 1612798 | 11/2007 |
| GB | 2241118 | 8/1991 |
| GB | 2276275 | 9/1994 |
| GB | 2299436 | 10/1996 |
| GB | 2312984 | 11/1997 |
| GB | 2328782 | 3/1999 |
| GB | 2439844 | 7/2008 |
| JP | 61-115279 | 6/1986 |
| JP | 62-177621 | 8/1987 |
| JP | 62-239394 | 10/1987 |
| JP | 62-251915 | 11/1987 |
| JP | 63-002160 | 1/1988 |
| JP | 63-004483 | 1/1988 |
| JP | 63-016482 | 1/1988 |
| JP | 63-062057 | 3/1988 |
| JP | 63-201946 | 8/1988 |
| JP | 63-214972 | 9/1988 |
| JP | 63-269376 | 11/1988 |
| JP | 63-195697 | 12/1988 |
| JP | 64-089034 | 4/1989 |
| JP | 2-091565 | 3/1990 |
| JP | 2-098197 | 4/1990 |
| JP | 2-185784 | 7/1990 |
| JP | 2-199690 | 8/1990 |
| JP | 2-278375 | 11/1990 |
| JP | 2-297770 | 12/1990 |
| JP | 3-008086 | 1/1991 |

| | | |
|---|---|---|
| JP | 3-078160 | 4/1991 |
| JP | 3-105704 | 5/1991 |
| JP | 3-207947 | 9/1991 |
| JP | 3-210662 | 9/1991 |
| JP | 3-212859 | 9/1991 |
| JP | 3-240821 | 10/1991 |
| JP | 3-295071 | 12/1991 |
| JP | 4-017134 | 1/1992 |
| JP | 4-143989 | 5/1992 |
| JP | 4-172658 | 6/1992 |
| JP | 4-214288 | 8/1992 |
| JP | 4-247385 | 9/1992 |
| JP | 4-259956 | 9/1992 |
| JP | 4-307440 | 10/1992 |
| JP | 4-325923 | 11/1992 |
| JP | 5-035053 | 2/1993 |
| JP | 5-035415 | 2/1993 |
| JP | 5-066896 | 3/1993 |
| JP | 5-068257 | 3/1993 |
| JP | 5-073566 | 3/1993 |
| JP | 5-073803 | 3/1993 |
| JP | 5-101603 | 4/1993 |
| JP | 5-173718 | 7/1993 |
| JP | 5-189163 | 7/1993 |
| JP | 5-204725 | 8/1993 |
| JP | 5-223551 | 8/1993 |
| JP | 6-004220 | 1/1994 |
| JP | 6-004981 | 1/1994 |
| JP | 6-162645 | 6/1994 |
| JP | 6-181561 | 6/1994 |
| JP | 6-215515 | 8/1994 |
| JP | 6-274943 | 9/1994 |
| JP | 6-314173 | 11/1994 |
| JP | 7-007321 | 1/1995 |
| JP | 7-029364 | 1/1995 |
| JP | 7-037376 | 2/1995 |
| JP | 7-056654 | 3/1995 |
| JP | 7-111078 | 4/1995 |
| JP | 7-115497 | 5/1995 |
| JP | 7-201082 | 8/1995 |
| JP | 7-226023 | 8/1995 |
| JP | 7-230669 | 8/1995 |
| JP | 7-257525 | 10/1995 |
| JP | 1982246 | 10/1995 |
| JP | 7-307059 | 11/1995 |
| JP | 8007994 | 1/1996 |
| JP | 8-030398 | 2/1996 |
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132704 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 2002-42446 | 2/2002 |
| JP | 2007-87498 | 4/2007 |
| JP | 2007-188615 | 7/2007 |
| JP | 2007-220184 | 8/2007 |
| JP | 2007-293936 | 11/2007 |
| JP | 2007-305206 | 11/2007 |
| JP | 2007-305290 | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| SG | 45223 | 1/1998 |
| WO | WO 89/01682 | 8/1988 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |
| WO | WO 2006/100441 | 9/2006 |
| WO | WO 2006/100445 | 9/2006 |
| WO | WO 2007/031729 | 3/2007 |

OTHER PUBLICATIONS

Biber et al., "Disk Drive Drawer Thermal Management", Advances in Electronic Packaging vol. 1:43-46, 1995.

Chung et al., "Vibration Absorber for Reduction of the In-plane Vibration in an Optical Disk Drive", IEEE Transactions on Consumer Electronics, Vo. 48, May 2004.

FlexStar Technology, 30E/Cascade Users Manual, Doc #98-36387-00 Rev. 1.8, pp. 1-33.

FlexStar Technology, "A World of Storage Testing Solutions," http://www.flexstar.com, 1 page (1999).

FlexStar Technology, "Environment Chamber Products," http://www.flexstar.com, 1 page (1999).

FlexStar Technology, "FlexStar's Family of Products," http://www.flexstar.com, 1 page (1999).

Gurumurthi, "The Need for temperature-Aware Storage Systems", The Tenth Intersociety conference on Thermal and Thermomechanical Phenomena in Electronics, ITHERM pp. 387-394, 2006.

Gurumurthi et al., "Thermal Issues in Disk Drive Design: Challenges and Possible Solutions", ACM Transactions on Storage 2:41-73, Feb. 2006.

Henderson, "HAD High Aerial Densities Require Solid Test Fixtures", Flexstar Technology.

Lindner, "Disk drive mounting", IBM Technical Disclosure Brochure, vol. 16, No. 3, pp. 903-904, Aug. 1973.

Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.

Morris, "Zero Cost Power and Cooling Monitor System", www.delphion.com/tdbs/tdb?order=94A+61950, 3 pages, Jan. 15, 2008.

Notification of Transmittal of the International Search Report and the Written Opinion of the International Searching Authority, or the Declaration, PCT/US2008/086181, 15 pages, Mar. 16, 2009.

Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.

Ruwart et al., "Performance Impact of External Vibration on Consumer-grade and enterprise-class Disk Drives", Proceedings of the $22^{nd}$ IEEE/$13^{th}$ Goddard Conference on Mass Storage Systems and Technologies, 2005.

Seagate Product Marketing, "Seagate's Advanced Multidrive System (SAMS) Rotational Vibration Feature", Publication TP-229D, Feb. 2000.

Schroeder et al., "Disk Failures in the Real World: What does an MTTP of 1,000,000 hours mean to you?", In FAST'07: $5^{th}$ USENIX Conference on File and Storage Technologies, San Jose, CA, Feb. 14-16, 2007.

Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.

Winchester, "Automation Specialists Use Machine Vision as a System Development Tool", IEE Computing & Control Engineering, Jun./Jul. 2003.

Xyratex website "Storage Infrastructure" www.xyratex.com/Products/storage-infrastructure/default.aspx 1995-2008.

Xyratex website "Production Test Systems" www.xyratex.com/Products/production-test-systems/default.aspx 1995-2008.

Xyratex website "Single cell—Production Test Systems" www.xyratex.com/products/production-test-systems/single-cell.aspx 1995-2008.

Xyratex website "Continuous Innovation—Production Test Systems" www.xyratex.com/products/production-test-systems/continuous-innovation.aspx 1995-2008.

Xyratex website "Key Advantages—Production Test Systems" www.xyratex.com/products/production-test-systems/advantages.aspx 1995-2008.

Xyratex website "Testing Drives Colder—Production Test Systems" www.xyratex.com/products/productino-test-systems/colder.aspx 1995-2008.

"Xyratex to Debut its New Automated Test Solution for 2.5-Inch Disk Drives at DISKCON USA 2004" 2004 PR Newswire Europe www.prnewswire.co.uk/cgi/news/release?id=130103.

"Automated Production Test Solutions", Xyratex Product Test brochure, 2006.

Xyratex "Process Challenges in the Hard Drive Industry" slide presentation, 2006 Asian Diskcon.

Suwa et al., "Evaluation System for Residual Vibration from HDD Mounting Mechanism" IEEE Transactions on Magnetics, vol. 35, No. 2, pp. 868-873, Mar. 1999.

Suwa et al., "Rotational Vibration Suppressor" IBM Technical Disclosure Bulletin Oct. 1991.

Abraham et al., "Thermal Proximity Imaging of Hard-Disk Substrates", IEEE Transactions on Mathematics 36:3997-4004, Nov. 2000.

Anderson et al., "High Reliability Variable Load Time Controllable Vibration Free Thermal Processing Environment", Delphion, hhttps://www.delphion.com/tdbs/tdb?order=93A+63418, 3 pages, Mar. 18, 2009.

Asbrand, "Engineers at One Company Share the Pride and the Profits of Successful Product Design", Professional Issues, 4 pages, 1987.

Bair et al., "Measurements of Asperity Temperatures of a Read/Write Head Slider Bearing in Hard Magnetic Recording Disks", Journal of Tribology 113:547-554, Jul. 1991.

Christensen, "How Can Great firms Fail? Insights from the hard Disk Drive Industry", Harvard Business School Press, pp. 1-26, 2006.

Haddad et al., "A new Mounting Adapter for Computer Peripherals with Improved Reliability, Thermal Distribution, Low Noise and Vibration Reduction", ISPS, Advances in Information Storage and Processing Systems, 1:97-108, 1995.

HighBeam Research website "ACT debuts six-zone catalytic gas heater. (American Catalytic Technologies offers new heaters)" www.highbeam.com, 4 pages, 1998.

HighBeam Research website "Asynchronous Testing Increases Throughput." www.highbeam.com, 7 pages, 2000.

HighBeam Research website "Credence announces Production Release of the EPRO AQ Series for Integrated Test and Back-end Processing." www.highbeam.com, 4 pages, 1995.

HighBeam Research website "Test Multiple Parts At Once for Air Leaks. (Brief Article)", www.highbeam.com, 1 page, 1999.

Iwamiya, "Hard Drive Cooling Using a Thermoelectric Cooler", EEP-vol. 19-2, Advances in Electronic Packaging, vol. 2:2203-2208, ASME 1997.

Ku, "Investigation of Hydrodynamic Bearing Friction in Data Storage information System Spindle Motors", ISPSvol. 1, Advances in Information Storage and Processing Systems, pp. 159-165, ASME 1995.

McAuley, "Recursive Time Trapping for Synchronization of Product and CHAMBER Profiles for Stress Test", Delphion, www.delphion.com/tdbs/tdb?order=88A+60957, 3 pages, Mar. 18, 2009.

Prater et al., "Thermal and Heat-Flow Aspects of Actuators for Hard Disk Drives", InterSociety Conference on Thermal Phenomena, pp. 261-268, 1994.

Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.

Tzeng, "Dynamic Torque Charactieristics of Disk-Drive Spindle Bearings", ISPS-vol. 1, Advances in Information Storage and Processing Systems, pp. 57-63, ASME 1995.

Tzeng, "Measurements of Transient Thermal Strains in a Disk-Drive Actuator", InterSociety conference on Thermal Phenomena, pp. 269-274, 1994.

Wilson-7000 disk Drive Analyzer Product Literature, date accessed Jan. 28, 2009, 2 pages.

Annex to Form PCT/ASA/206 Communication Relating to the Results of the Partial International Search, for International Application No. PCT/US2008/086814, dated Apr. 3, 2009, 1 page.

Annex to Form PCT/ASA/206 Communication Relating to the Results of the Partial International Search, for International Application No. PCT/US2008/086809, dated Apr. 3, 2009, 1 page.

Notification of Transmittal of the International Search Report and the Written Opinion of the International Searching Authority, or the Declaration, for International Application No. PCT/US2009/039926, Sep. 1, 2009, 13 pages.

Notification of Transmittal of the International Search Report and the Written Opinion of the International Searching Authority, or the Declaration, for International Application No. PCT/US2008/086814, Sep. 18, 2009, 17 pages.

Notification of Transmittal of the International Search Report and the Written Opinion of the International Searching Authority, or the Declaration, for International Application No. PCT/US2009/039888, Sep. 28, 2009, 13 pages.

Notification of Transmittal of the International Search Report and the Written Opinion of the International Searching Authority, or the Declaration, for International Application No. PCT/US2009/039921, Sep. 25, 2009, 14 pages.

Notification of Transmittal of the International Search Report and the Written Opinion of the International Searching Authority, or the Declaration, for International Application No. PCT/US2009/040058, Sep. 29, 2009, 13 pages.

Notification of Transmittal of the International Search Report and the Written Opinion of the International Searching Authority, or the Declaration, for International Application No. PCT/US2009/040829, Oct. 28, 2009, 13 pages.

Notification of Transmittal of the International Search Report and the Written Opinion of the International Searching Authority, or the Declaration, for International Application No. PCT/US2009/040835, Oct. 30, 2009, 13 pages.

Notification of Transmittal of the International Search Report and the Written Opinion of the International Searching Authority, or the Declaration, for International Application No. PCT/US2009/039591, Aug. 31, 2009, 10 pages.

Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.

Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.

Anderson et al., "Clinical chemistry: concepts and applications", The McGraw-Hill Companies, Inc., pp. 131-132, 2003.

Curtis et al., "InPhase Professional Archive Drive Architecture" Dec. 17, 2007 http://www.science.edu/TechoftheYear/Nominees/InPhase/Holographic%20Storage.pdf.

Findeis et al., "Vibration Isolation Techniques Sutiable for Portable Electronic Speckle Pattern Interferometry", Proc. SPIE vol. 4704, pp. 159-167, 2002 http://www.ndt.uct.ac.za/Papers/spiendt2002.pdf.

Frankovich, "The Basics of Vibration Isolation Using Elastomeric Materials", EARSC 2005 http://www.isoloss.com/pdfs/engineering/BasicsofVibrationIsolation.pdf.

Grochowski et al., "Future Trends in Hard Disk Drives" IEEE Transactions on Magnetics, vol. 32, No. 3, pp. 1850-1854, May 1996, http://svn.tribler.org/abc/branches/leo/dataset/preferences/johan/johan-68.pdf.

Gurumurthi et al., "Disk Drive Roadmap from the Thermal Perspective: A Case for Dynamic Thermal Management", International Symposium on Computer Architecture Proceedings of the $32^{nd}$ Annual International Symposium on Computer Architecture, pp. 38-49, 2005 http://portal.acm.org/citation.cfm?id=1069807.1069975.

Johnson et al., "Performance Measurements of Tertiary Storage Devices", Proceedings of the $24^{th}$ VLDB Conference, New York, pp. 50-61, 1998.

Nagarajan, "Survey of Cleaning and cleanliness Measurement in Disk Drive Manufacture", North Carolina Department of Environment and Natural Resources, Feb. 1997.

Yee Leong Low et al., "Thermal network model for temperature prediction in hard disk drive" Journal Microsystem Technologies, vol. 15, No. 10-11, pp. 1653-1656, Oct. 2009 http://www.springerlink.com/content/20668jn67pk426r5/.

Notification of Transmittal of the International Search Report and the Written Opinion of the International Searching Authority, or the Declaration, for International Application No. PCT/US2009/039590, Oct. 30, 2009, 10 pages.

Notification of Transmittal of the International Search Report and the Written Opinion of the International Searching Authority, or the Declaration, for International Application No. PCT/US2009/040757, Nov. 24, 2009, 12 pages.

Notification of Transmittal of the International Search Report and the Written Opinion of the International Searching Authority, or the Declaration, for International Application No. PCT/US2009/039898, Nov. 24, 2009, 12 pages.

Notification of Transmittal of the International Search Report and the Written Opinion of the International Searching Authority, or the Declaration, for International Application No. PCT/US2009/040795, Nov. 26, 2009, 13 pages.

Notification of Transmittal of the International Search Report and the Written Opinion of the International Searching Authority, or the Declaration, for International Application No. PCT/US2009/045583, Nov. 27, 2009, 13 pages.

Notification of Transmittal of the International Search Report and the Written Opinion of the International Searching Authority, or the Declaration, for International Application No. PCT/US2009/040888, Dec. 29, 2009, 14 pages.

Notification of Transmittal of the International Search Report and the Written Opinion of the International Searching Authority, or the Declaration, for International Application No. PCT/US2009/040894, Dec. 22, 2009, 12 pages.

Notification of Transmittal of the International Search Report and the Written Opinion of the International Searching Authority, or the Declaration, for International Application No. PCT/US2009/039934, Dec. 23, 2009, 12 pages.

Notification of Transmittal of the International Search Report and the Written Opinion of the International Searching Authority, or the Declaration, for International Application No. PCT/US2009/040965, Dec. 23, 2009, 12 pages.

Notification of Transmittal of the International Search Report and the Written Opinion of the International Searching Authority, or the Declaration, for International Application No. PCT/US2009/040973, Jan. 11, 2010, 13 pages.

Cardinal Intellectual Property's search report including the results of a search for the features of the claims included in the U.S. patent application entitled "Vibration Isolation Within Disk Drive Testing Systems", inventors: Brian S. Merrow and having assigned U.S. Appl. No. 12/767,142. The foregoing U.S. patent application is a continuation of U.S. Appl. No. 12/105,105. Revised as of Mar. 30, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/766,680. The foregoing U.S. patent application is a continuation of U.S. Appl. No. 11/959,133. Revised as of Apr. 1, 2010.

Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/767,113. The foregoing U.S. patent application is a continuation of U.S. Appl. No. 11/959,133. Revised as of Apr. 4, 2010.

Cardinal Intellectual Property's search report including the results of a search for the features of the claims included in the U.S. patent application entitled "Transferring Disk Drives Within Disk Drive Testing Systems", inventors: Polyakov et al, and having assigned U.S. Appl. No. 12/727,150. The foregoing U.S. patent application is a continuation of U.S. Appl. No. 12/104,536. Revised as of May 27, 2010.

Cardinal Intellectual Property's search report including the results of a search for the features of the claims included in the U.S. patent application entitled "Transferring Storage Devices Within Storage Device Testing Systems", inventors: John P. Toscano et al., and having assigned U.S. Appl. No. 12/727,201. The foregoing U.S. patent application is a continuation of U.S. Appl. No. 12/424,980. Revised as of Jan. 4, 2010.

Cardinal Intellectual Property's search report including the results of a search for the features of the claims included in the U.S. patent application entitled "Processing Storage Devices", inventors: Richard W. Slocum III., and having assigned U.S. Appl. No. 12/727,619. The foregoing U.S. patent application is a continuation of U.S. Appl. No. 12/474,388. Revised as of Jan. 5, 2009.

Cardinal Intellectual Property's search report including the results of a search for the features of the included in the U.S. patent application entitled "Bulk Feeding Disk Drives to Disk Drive Testing Systems", inventors: Noble et al., and having assigned U.S. Appl. No. 12/726,856. The foregoing U.S. patent application is a continuation of U.S. Appl. No. 12/104,869. Revised as of Jan. 15, 2010.

Cardinal Intellectual Property's search repoh including the results of a search for the features of the claims included in the U.S. patent application entitled "Dependent Temperature Control Within Disk Drive Testing Systems", inventors: Merrow et al., and having assigned U.S. Appl. No. 12/727,207. The foregoing U.S. patent application is a continuation of U.S. Appl. No. 12/105,069. Revised as of Jan. 13, 2010.

Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/727,700. The foregoing U.S. patent application is a continuation of U.S. Appl. No. 12/503,567. Revised as of Jan. 13, 2010.

Cardinal Intellectual Property's search report including the results of a search for the features of the claims included in the U.S. patent application entitled "Storage Device Testing System Cooling", inventors: Brian S. Merrow and having assigned U.S. Appl. No. 12/775,560. The foregoing U.S. patent application is a continuation of U.S. Appl. No. 12/698,575. Revised as of Feb. 17, 2010.

Cardinal Intellectual Property's search report including the results of a search for the features of the claims included in the U.S. patent application entitled " Conductive Heating" inventors: Brian S. Merrow et al., and having assigned U.S. Appl. No. 12/760,164. The foregoing U.S. patent application is a continuation of U.S. Appl. No. 12/ 503,593. Revised as of Jan. 6, 2010.

Cardinal Intellectual Property's search report including the results of a search for the features of the claims included in the U.S. patent application entitled "Conductive Temperature Sensing", inventors: Brian S. Merrow et al., and having assigned U.S. Appl. No. 12/760,305. The foregoing U.S. patent application is a continuation of U.S. Appl. No. 12/503,687. Revised as of Jan. 7, 2010.

Cardinal Intellectual Property's search report including the results of a search for the features of the claims included in the U.S. patent application entitled "Solid State Temperature Control of Hard Drive Tester." Revised as of Jan. 14, 2010.

Cardinal Intellectual Property's search report including the results of a search for the features of the claims included in the U.S. patent application entitled "Single Test Slot for Dynamic Isolation of Hard Drive", inventors: Brian S. Merrow and having assigned U.S. Appl. No. 12/767,142. The foregoing U.S. patent application is a continuation of U.S. Appl. No. 12/105,105. Revised as of Jan. 12, 2010.

Cardinal Intellectual Property'S search report includliig the results of a search for the features of the claims included in the U.S. patent application entitled "Chilled Water Temp Control of Disk Drive Tester", inventors: Brian S. Merrow and having assigned U.S. Appl. No. 12/766,680. The foregoing U.S. patent application is a continuation of U.S. Appl. No. 12/105,061. Revised as of Feb. 18, 2010.

FlexStar Technology, 30E/Cascade Users Manual, Doc #98-36387-00 Rev. 1.8, pp. 1-33, Jun. 1, 2004.

Henderson, "HAD High Aerial Densities Require Solid Test Fixtures", Flexstar Technology, Feb. 26, 2007.

* cited by examiner

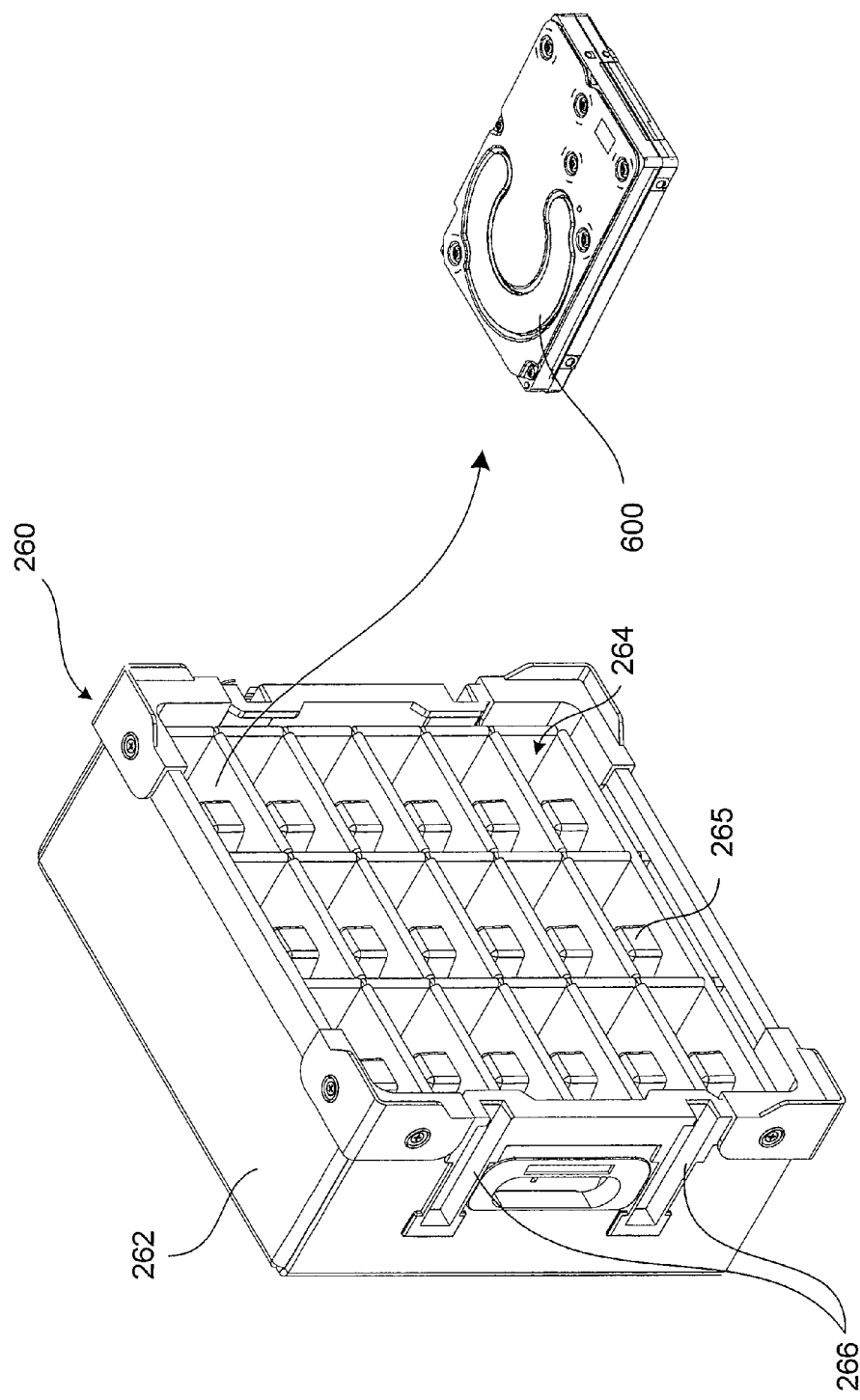

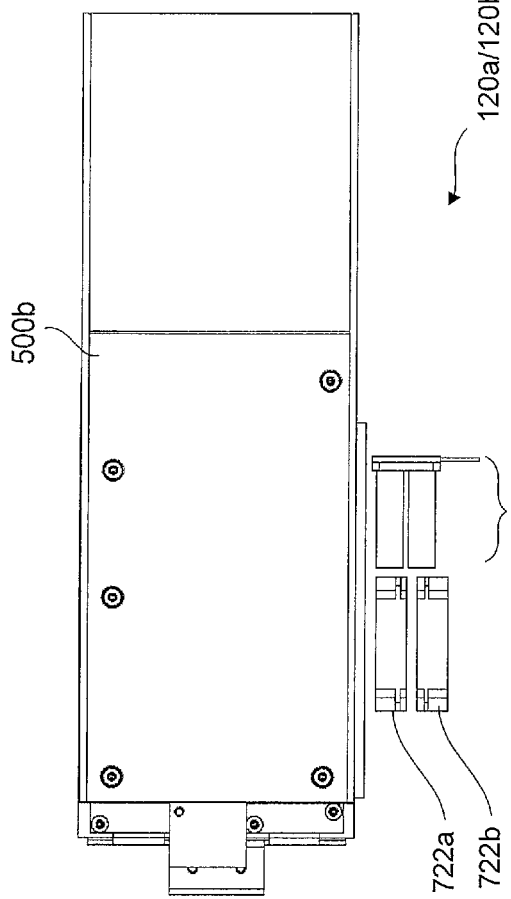
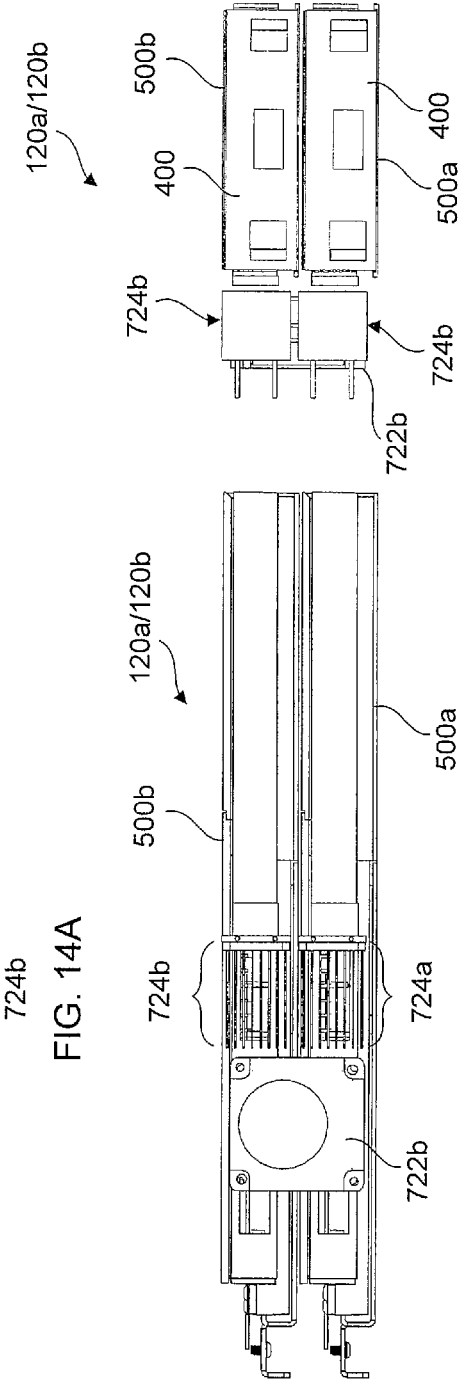
FIG. 14A
FIG. 14B
FIG. 14C

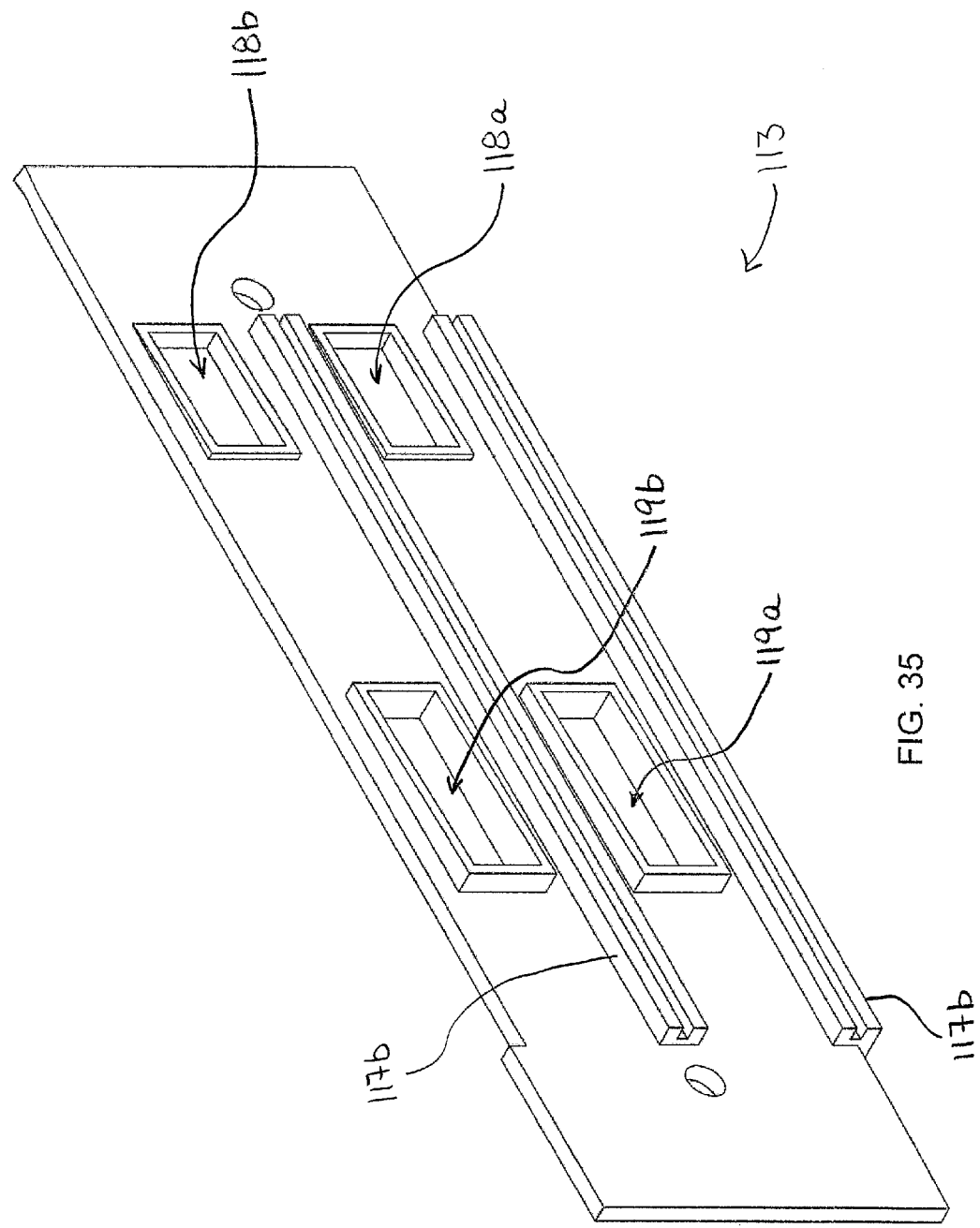

TEMPERATURE CONTROL WITHIN DISK DRIVE TESTING SYSTEMS

TECHNICAL FIELD

This disclosure relates to regulating the temperature of a hard drive testing system.

BACKGROUND

Disk drive manufacturers typically test manufactured disk drives for compliance with a collection of requirements. Test equipment and techniques exist for testing large numbers of disk drives serially or in parallel. Manufacturers tend to test large numbers of disk drives simultaneously in batches. Disk drive testing systems typically include one or more racks having multiple test slots that receive disk drives for testing.

During the manufacture of disk drives, it is common to control the temperature of the disk drives, e.g., to ensure that the disk drives are functional over a predetermined temperature range. For this reason, the testing environment immediately around the disk drive is closely regulated. Minimum temperature fluctuations in the testing environment can be critical for accurate test conditions and for safety of the disk drives.

In some known disk drive testing systems, the temperature of plural disk drive devices is adjusted by using cooling or heating air which is common to all of the disk drive devices.

SUMMARY

In one aspect, a disk drive test slot thermal control system includes a test slot. The test slot includes a housing and an air mover (e.g., a blower or a fan). The housing includes an outer surface, and an internal cavity. The internal cavity includes a test compartment for receiving and supporting a disk drive transporter carrying a disk drive for testing. The housing also includes an inlet aperture extending from the outer surface of the housing to the internal cavity. The air mover can be disposed outside of the internal cavity to provide an air flow towards the test compartment through the inlet aperture.

Embodiments can include one or more of the following features.

In some embodiments, in the absence of a disk drive and a disk drive transporter, the housing carries substantially no moving parts.

In some implementations, the housing defines an outlet aperture extending from the outer surface to the internal cavity. The air mover can include an air outlet in fluid communication with the inlet aperture and an air inlet in fluid communication with the outlet aperture.

In some embodiments, the air mover is mounted in an air mover housing. The air mover housing can be formed of a flexible material. In some cases, the air mover housing can include one or more isolators which connect the air mover to the air mover housing. In some examples, the disk drive test slot thermal control system can also include a test rack. The test rack can include a chassis that defines a slot bank configured to receive and support the test slot. The air mover housing can be mounted to the chassis.

In some implementations, the disk drive test slot thermal control system also includes a thermoelectric device configured to cool or heat an air flow exiting the air mover. The thermoelectric device can include a passive device. The thermoelectric device can include a thermoelectric cooler (e.g., a bulk thermoelectric cooler or a thin film thermoelectric cooler). The air mover can be mounted in an air mover housing that includes an opening configured to direct an air flow from the air mover towards the thermoelectric device. The thermoelectric device can be disposed downstream of the air mover and upstream of the inlet aperture.

In some cases, the disk drive test slot thermal control system can also include a cooling conduit. The thermoelectric device can be mounted to the cooling conduit, and the cooling conduit can be configured to absorb heat dissipated by the thermoelectric device. The cooling conduit can be liquid cooled. The disk drive test slot thermal control system can also include a heatsink connected to the thermoelectric device, and the air mover can be configured to direct an air flow towards the heatsink.

In some examples, the test slot includes a ducting conduit disposed within the internal cavity and configured to convey an air flow from the inlet aperture towards the test compartment. The ducting conduit can be configured to direct an air flow underneath a disk drive disposed within the test compartment. The disk drive test slot thermal control system can also include an electric heating device (e.g., a resistive heater) disposed within the internal cavity and configured to heat an air flow being conveyed through the ducting conduit and/or an air flow exiting the air mover. In some cases, the disk drive test slot thermal control system can also include a heatsink disposed within the ducting conduit and connected to the electric heating device, and the electric heating device can be configured to heat the heatsink.

The disk drive test slot thermal control system can also include test electronics in electrical communication with the thermoelectric device and/or the electric heating device. The test electronics can be configured to control current flows to the thermoelectric device and/or the electric heating device. In some cases, the disk drive test slot thermal control system also includes one or more temperature sensors disposed within the internal cavity. The one or more temperature sensors are electrically connected to the test electronics, and the test electronics are configured to control flows of current to the thermoelectric device and/or the electric heating device based, at least in part, on signals received from the one or more temperature sensors. The test electronics can be disposed outside of the internal cavity.

In some implementations, the electric heating device is disposed downstream of the air mover and downstream of the inlet aperture.

In some embodiments, the disk drive test slot thermal control system can include test electronics that are configured to communicate one or more test routines to a disk drive within the test compartment. A test slot connector can be disposed within the internal cavity. The test slot connector can be configured to engage a mating connector on a disk drive. In some cases, the test slot connector is electrically connected to the test electronics. In some examples, the disk drive test slot thermal control system includes a printed wiring board disposed within the internal cavity of the housing and arranged to be substantially coplanar with a disk drive within the test compartment, and the test slot connector is mounted to the printed wiring board. In some cases, the test electronics are disposed outside of the internal cavity. The disk drive test slot thermal control system can also include a connection interface circuit disposed within the internal cavity. The connection interface circuit can be configured to provide electrical communication between the test slot connector and the test electronics.

In another aspect, a method of adjusting air temperature within a disk drive test slot includes inserting a disk drive transporter carrying a disk drive into a housing of a disk drive test slot, actuating an air mover mounted externally to the housing to deliver an air flow into the housing, and actuating an thermoelectric device thereby cooling an air flow entering the housing.

Implementations of this aspect of the disclosure may include one or more of the following features.

In some implementations, the method includes actuating an electric heating device thereby heating an air flow within the housing.

In some embodiments, the method includes actuating the thermoelectric device and thereby heating an air flow entering the housing.

In some implementations, actuating the thermoelectric device includes causing an electric current to be delivered to the thermoelectric device.

In some embodiments, the method can also include executing a test program that automatically adjusts a current flow to the thermoelectric device.

According to another aspect, a disk drive test slot thermal control system includes a test slot and an air mover. The test slot includes a housing having an outer surface, and an internal cavity. The internal cavity includes a test compartment for receiving and supporting a disk drive transporter carrying a disk drive for testing. The air mover includes a rotating blade and is configured to provide an air flow towards the test compartment. The blade can mounted for out-of-plane rotation relative to a disk drive within the test compartment.

In another aspect, a disk drive test system includes a test slot assembly and an air mover assembly. The test slot assembly includes a plurality of test slots. Each of the test slots includes a housing including an outer surface, an internal cavity defined by the housing and including a test compartment for receiving and supporting a disk drive transporter carrying a disk drive for testing, and an inlet aperture extending from the outer surface to the internal cavity. The air mover assembly is associated with corresponding ones of the plurality of test slots. The air mover assembly is disposed outside of the internal cavities of the associated test slots and is configured to provide corresponding air flows towards the test compartments of each of the associated test slots through the respective inlet apertures.

Embodiments of this aspect of the disclosure may include one or more of the following features.

In some embodiments, the air mover assembly includes a plurality of air movers each associated with a corresponding one of the test slots. The air mover assembly can include an air mover housing, and the plurality of air movers can be mounted in the air mover housing. In some cases, the air mover housing is formed of a flexible material. In some examples, the air mover housing includes a plurality isolators which connect the air movers to the air mover housing. In some cases, the disk drive test system includes a test rack. The test rack includes a chassis defining a slot bank configured to receive and support the plurality of test slots, and the air mover housing is mounted to the chassis.

In some implementations, the disk drive test system includes one or more thermoelectric devices configured to cool or heat air flows exiting the air movers. The one or more thermoelectric coolers can include a passive component, e.g., a thermoelectric cooler, e.g., a bulk thermoelectric cooler or a thin film thermoelectric cooler In some embodiments, the disk drive testing system includes a plurality of thermoelectric devices each associated with a corresponding one of the air movers and each configured to cool or heat an air flow exiting the associated one of the air movers. In some cases, the thermoelectric devices are disposed downstream of the air movers and upstream of the inlet apertures of associated ones of the test slots. The air mover assembly can include an air mover housing, and the plurality of air movers can be mounted in the air mover housing. In some examples, the air mover housing is configured to direct air flows from each of the air movers towards associated ones of the thermoelectric devices. The air mover housing can be formed of a flexible material and/or the air mover housing can include a plurality isolators which connect the air movers to the air mover housing.

The disk drive test system can also include a cooling conduit, and the thermoelectric devices can be mounted to the cooling conduit. In some cases, the cooling conduit is configured to absorb heat dissipated by the thermoelectric devices. The cooling conduit can be liquid cooled.

The disk drive test system can also include a plurality of heatsinks each connected to an associated one of the thermoelectric devices. Each of the air movers can be configured to direct an air flow towards the heatsink of the associated one of the thermoelectric devices.

In some implementations, the disk drive test system includes a plurality of electric heating devices (e.g., resistive heaters) each associated with a corresponding one of the test slots. Each of the electric heating devices is configured to heat an air flow being conveyed through the inlet aperture of the associated test slot. In some cases, each of the electric heating devices is disposed within the internal cavity of the associated test slot.

In some embodiments, the disk drive test system includes test electronics in electrical communication with the thermoelectric devices and/or the electric heating devices. The test electronics can be configured to control current flows to the thermoelectric devices and/or the electric heating devices. The disk drive test system can also include a plurality of temperature sensors each associated with a corresponding one of the test slots. The temperature sensors can be electrically connected to the test electronics, and the test electronics can be configured to control flows of current to the thermoelectric devices and/or the electric heating devices based, at least in part, on signals received from the temperature sensors. The temperature sensors can be disposed within the internal cavity of the associated one of the test slots. The test electronics can be disposed outside of the internal cavities of the test slots.

In some implementations, the disk drive test system includes a plurality of air mover assemblies each associated with a corresponding pair of the test slots. Each of the air mover assemblies is disposed outside of the internal cavities of the associated test slots and is configured to provide corresponding air flows towards the test compartments of the associated test slots through the respective inlet apertures. In some cases, each of the air mover assemblies includes a pair of air movers, and each of the air movers is associated with a corresponding one of the test slots. In some examples, each of the air mover assemblies includes an air mover housing in which the associated air movers are mounted. In some cases, each of the air movers includes a rotating blade that is mounted for out-of-plane rotation relative to a disk drive within the test compartment of the associated one of the test slots.

In another aspect, a disk drive testing system cooling circuit includes a plurality of test racks. Each of the test racks include a test slot compartment and a test electronics compartment. Each of the test slot compartments includes multiple test slots, and one or more cooling conduits configured to convey a cooling liquid toward the test slots. Each of the test electronics compartments includes test electronics configured to communicate with the test slots for executing a test algorithm, and a heat exchanger in fluid communication with the one or more cooling conduits. The heat exchanger is configured to cool an air flow directed toward the test electronics.

Implementations of this aspect of the disclosure may include one or more of the following features.

In some implementations, an inlet conduit is disposed between the cooling conduits and a liquid supply line and configured to convey a liquid flow from the liquid supply line toward the cooling conduits. The inlet conduit can include a strainer configured to remove particulate from the liquid flow. The inlet conduit can also include a forward-pressure regulator configured to control the inlet pressure of the liquid flow to the cooling conduits. The inlet conduit can also include a distribution manifold including a plurality of tee connections each configured to portion the liquid flow to a corresponding one of test racks. In some cases, the inlet conduit includes a shut-off valve configured to isolate the test racks from the liquid supply line. In some examples, the inlet conduit includes a plurality of shut-off valves each configured to isolate a corresponding one of the test racks from the liquid supply line.

In some embodiments, an outlet conduit is disposed between the heat exchangers and a liquid return line and is configured to convey a liquid flow from the heat exchangers toward the liquid return line. The outlet conduit can include a return manifold including a plurality of tee connections each providing a fluid connection between a corresponding one of the heat exchangers and the return manifold. The outlet conduit can also include a shut-off valve configured to isolate the test racks from the liquid return line. In some cases, the outlet conduit includes a plurality of shut-off valves each configured to isolate a corresponding one of the test racks from the liquid return line.

In some implementations, at least one of the test racks includes an air mover disposed within the test electronics compartment and configured to direct an air flow across the heat exchanger and toward the test electronics for cooling the test electronics.

In some embodiments, the test electronics compartments are substantially isolated from the test slot compartments such that air flow between the test electronics compartments and the test slot compartments is substantially inhibited.

According to another aspect, a disk drive testing system cooling circuit includes a test rack including a test slot compartment and a test electronics compartment. The test slot compartment includes a test slot. The test electronics compartment includes test electronics configured to communicate with the test slot for executing a test algorithm. An inlet conduit is configured to convey a liquid to the test rack from an external source. An outlet conduit is in fluid communication with the inlet conduit and is configured to convey a liquid from the test rack to a location remote from the test rack. The disk drive testing system also includes a heat exchanger including an inlet port in fluid communication with the inlet conduit, and an outlet port in fluid communication with the outlet conduit. The disk drive testing system also includes a first air mover that is configured to direct cooled air from the heat exchanger toward the test electronics for cooling the test electronics. A cooling conduit is disposed within the test slot compartment and is configured to convey a cooling liquid towards the test slot. The cooling conduit includes an inlet opening in fluid communication with the inlet conduit, and an outlet opening in fluid communication with the outlet conduit. A thermoelectric device is connected to the cooling conduit and is configured to cool an air flow entering the test slot.

Embodiments of this aspect of the disclosure may include one or more of the following features.

In some embodiments, the thermoelectric device is operable to heat an air flow entering the test slot.

In some implementations, the test slot includes a housing having an outer surface, an internal cavity defined by the housing and including a test compartment for receiving and supporting a disk drive transporter carrying a disk drive for testing, and an inlet aperture extending from the outer surface of the housing to the internal cavity. In some cases, a second air mover is disposed outside of the internal cavity and is configured to direct an air flow towards the test compartment through the inlet aperture. In some examples, the thermoelectric device is disposed downstream of the second air mover and upstream of the inlet aperture.

In some embodiments, the thermoelectric device is in electrical communication with the test electronics, and the test electronics are configured to control operation of the thermoelectric device. In some cases, the test slot includes a temperature sensor in electrical communication with the test electronics, and the test electronics are configured to control operation of the thermoelectric device based, at least in part, on signals received from the temperature sensor. In some examples, the test electronics are configured to control operation of the thermoelectric device based, at least part, on a predetermined test algorithm.

In another aspect, a method of controlling a temperature of a subject test slot in a cluster of test slots includes evaluating a request for a temperature change for the subject test slot to determine if sufficient power is available to achieve the requested temperature change, and inhibiting the requested temperature change unless or until sufficient power is determined to be available to achieve the requested temperature change.

Implementations of this aspect of the disclosure may include one or more of the following features.

In some implementations, inhibiting the requested temperature change includes putting the request for the temperature change in a queue until sufficient power is determined to be available to achieve the requested temperature change.

In some embodiments, the method includes comparing a requested temperature setting to an active temperature setting. The method can also include calculating a change in power draw for the cluster of test slots expected to result from the requested temperature change.

In some implementations, the method also includes determining whether an active power draw of the cluster of test slots will be increased or decreased by the requested temperature change based, at least in part, on the calculated change in power draw.

The method can also include determining whether an active power draw of the cluster of test slots will be increased or decreased by the requested temperature change based, at least in part, on the calculated change in power draw, and upon determining that the active power draw of the cluster of test slots will increase as a result of the requested temperature change, comparing an expected total power draw of the cluster of test slots to a total power available to the cluster.

In some embodiments, the expected total power draw of the cluster of test slots is the sum of the active power draw of the cluster of test slots and the calculated change in power draw.

In some implementations, comparing the expected total power draw to the total power available to the cluster of test slots includes determining whether the expected total power draw exceeds the total power available to the cluster of test slots, and upon determining that the expected total power draw exceeds the total power available to the cluster of test slots, putting the request for the temperature change in a queue until sufficient power is determined to be available to the cluster to achieve the requested temperature change.

In some embodiments, comparing the expected total power draw to the total power available to the cluster of test slots includes determining whether the expected total power draw exceeds the total power available to the cluster of test slots, and upon determining that the expected total power draw does not exceed the total power available to the cluster of test slots, effecting the requested temperature change.

In some implementations, the method also includes determining whether an active power draw of the cluster of test slots will be increased or decreased by the requested temperature change based, at least in part, on the calculated change in power draw, and upon determining that the active power draw of the cluster of test slots will decrease as a result of the requested temperature change, effecting the requested temperature change.

In some embodiments, the method includes determining whether an active power draw of the cluster of test slots will be increased or decreased by the requested temperature change based, at least in part, on the calculated change in power draw, and upon determining that the active power draw of the cluster of test slots will decrease as a result of the requested temperature change, effecting the requested temperature change and retrieving another request for a temperature change from a queue.

According to another aspect, a method of controlling a temperature of a test slot in a disk drive testing system includes regulating temperature changes of a subject test slot based on one or more operating conditions of one or more other test slots neighboring the subject test slot.

Embodiments of this aspect of the disclosure may include one or more of the following features.

In some embodiments, regulating temperature changes of the subject test slot can include comparing a request for a temperature change for the subject test slot with one or more operating temperatures of the one or more other, neighboring test slots, and inhibiting the requested temperature change based, at least in part, on the one or more operating temperatures of the one or more other, neighboring test slots.

In some implementations, the request for the temperature change includes a requested temperature setting. Comparing the request for the temperature change with the one or more operating temperatures of the one or more other, neighboring test slots can include calculating an average operating temperature of two or more test slots neighboring the subject test slot, and determining a difference between the requested temperature setting and the calculated average operating temperature.

In some embodiments, the method can include determining whether the difference between the requested temperature setting and the calculated average operating temperature is greater than a predetermined offset value, and upon determining that the difference is greater than the predetermined offset value, limiting a temperature change of the subject test slot to be equal to the calculated average operating temperature plus the predetermined offset value. The method can also include queuing a request to change a temperature setting of the subject test slot to the requested temperature setting, and/or providing feedback indicating that the temperature change for the subject test slot is limited.

In some implementations, the method can include determining whether the difference between the requested temperature setting and the calculated average operating temperature is greater than a predetermined offset value, and upon determining that the difference is not greater than the predetermined offset value, effecting the requested temperature change. The method can also include determining whether the other, neighboring test slots have a queued request for a temperature change, and upon determining that one of the other, neighboring test slots have a queued request for a temperature change, servicing the queued request.

In another aspect, a disk drive testing system includes a cluster of test slots including multiple test slots, each test slot being configured to receive a disk drive transporter carrying a disk drive for testing. The disk drive testing system also includes test electronics in electrical communication with the cluster of test slots and configured to adjust operating temperatures of the test slots by controlling power supplied to the test slots. The test electronics are configured to limit changes to the operating temperatures of the test slots based, at least in part, on a total power available to the cluster of test slots.

Implementations of this aspect of the disclosure may include one or more of the following features.

In some implementations, the disk drive testing system includes multiple passive components (e.g., thermoelectric coolers and resistive heaters) each associated with a corresponding one of the test slots and each in electrical communication with the test electronics. The test electronics can be configured to regulate the operating temperatures of the test slots by controlling flows of electrical current to the passive components.

In some embodiments, the test slots each include at least one temperature sensor electrically connected to the test electronics, and the test electronics are configured to regulate the operating temperatures of the test slots based, at least in part, on signals received from the temperature sensors.

According to another aspect, a disk drive testing system includes at least one test rack including multiple test slots, each test slot being configured to receive a disk drive transporter carrying a disk drive for testing. The disk drive testing system also includes test electronics in electrical communication with the test slots. The test electronics are configured to adjust operating temperatures of the test slots, and the test electronics are configured to regulate changes to the operating temperature of each test slot in the test rack based, at least in part, on an operating condition of at least one other one of the test slots.

Embodiments of this aspect of the disclosure may include one or more of the following features.

In some embodiments, the test electronics are configured to regulate changes to the operating temperature of each test slot in the test rack based, at least in part, on the operating temperature of at least one neighboring one of the test slots.

In some implementations, the test electronics are configured to regulate changes to the operating temperature of at least one of the test slots based, at least in part, on the operating temperatures of at least two or more neighboring ones of the test slots.

In some embodiments, the test slots each include at least one temperature sensor electrically connected to the test electronics, and the test electronics are configured to regulate the operating temperatures of the test slots based, at least in part, on signals received from the temperature sensors.

In some implementations, the temperature sensors are each operable to measure the operating temperature of the associated one of the test slots.

In some embodiments, the disk drive testing system includes multiple passive components each associated with a corresponding one of the test slots and each in electrical communication with the test electronics. The test electronics can be configured to regulate operating temperatures of the test slots by controlling flows of electrical current to the passive components.

In some implementations, the test electronics are configured to regulate the operating temperatures of the test slots based, at least in part, on a computer executable test routine.

In another aspect, a method of controlling a temperature of one or more test slots in a cluster of test slots includes calculating an active power draw of the cluster of test slots, calculating an active cooling liquid power load of the cluster of test slots, and adjusting a flow of power for heating or cooling one or more test slots of the cluster of test slots based, at least in part, on at least one of the calculated active power draw and the calculated active cooling liquid power load.

Implementations of this aspect of the disclosure may include one or more of the following features.

In some implementations, the method can include comparing the calculated active power draw of the cluster of test slots to a total power available to the cluster of test slots, and limiting the adjustment of the flow of power if the calculated active power draw of the cluster of test slots exceeds the total power available to the cluster of test slots.

In some embodiments, the method can include comparing the calculated active cooling liquid power load of the cluster of test slots to a predetermined maximum cooling liquid power load for the cluster of test slots, and limiting the adjustment of the flow of power if the calculated active cooling liquid power load exceeds the predetermined maximum cooling liquid power load.

In some implementations, adjusting the flow of power for heating or cooling the one or more test slots in the cluster of test slots includes regulating the flow of electrical current to one or more passive devices associated with the one or more test slots.

According to another aspect, a disk drive testing system includes one or more test racks, and one or more test slots housed by the one or more test racks, each test slot being configured to receive and support a disk drive transporter carrying a disk drive for testing. The disk drive testing system also includes a transfer station for supplying disk drives to be tested. The one or more test racks and the transfer station at least partially define an operating area. The disk drive testing system can also include automated machinery that is disposed within the operating area and is configured to transfer disk drives between the transfer station and the one or more test slots, and a cover at least partially enclosing the operating area, thereby at least partially inhibiting air exchange between the operating area and an environment surrounding the test racks.

Embodiments of this aspect of the disclosure may include one or more of the following features.

In some embodiments, the cover substantially encloses the operating area, thereby substantially inhibiting air exchange between the operating area and an environment surrounding the test racks.

In some implementations, the cover is connected to the test racks.

In some embodiments, the cover is connected to the transfer station.

In some implementations, the disk drive testing system includes a seal disposed between the cover and the test racks. The seal can be arranged to inhibit air exchange between the operating area and an environment surrounding the test racks.

In some embodiments, the disk drive testing system includes a seal disposed between adjacent ones of the test racks. The seal can be arranged to inhibit air exchange between the operating area and an environment surrounding the test racks.

In some implementations, a seal is disposed between the transfer station and an adjacent one of the test racks. The seal can be arranged to inhibit air exchange between the operating area and an environment surrounding the test racks.

In some embodiments, a seal is disposed between the cover and the transfer station. The seal can be arranged to inhibit air exchange between the operating area and an environment surrounding the test racks.

In some implementations, at least one of the test racks includes a test slot compartment including at least one of the test slots, a test electronics compartment including test electronics configured to communicate with at least one of the test slots for executing a test algorithm, and an air mover arranged to move an air flow between the operating area and the test electronics compartment for cooling the test electronics. In some cases, the air mover is disposed within the test electronics compartment. The disk drive testing system can also include a heat exchanger disposed within the test electronics compartment. The air mover can be configured to direct an air flow across the heat exchanger, and the heat exchanger can be configured to cool the air flow. In some cases, a drip pan is disposed within the test electronics compartment and arranged to collect condensed moisture from the heat exchanger. In some examples, a float sensor is disposed within the drip pan and is configured to detect a liquid level in the drip pan.

In some embodiments, the disk drive testing system includes at least one computer in communication with the test electronics and the float sensor, and the computer can be configured to control operation of the test rack based, at least in part, on signals received from the float sensor.

In some implementations, the test electronics compartment is substantially isolated from the test slot compartment such that air flow between the test electronics compartment and the test slot compartment is substantially inhibited.

In some embodiments, the disk drive testing system includes an air filter disposed within the test slot compartment and arranged to filter air flow passing between the operating area and the test electronics compartment.

In some implementations, the automated machinery includes at least one robotic arm.

In some embodiments, the one or more test racks and the transfer station are supported on a floor surface, and the cover, the test racks, the transfer station, and the floor surface substantially enclose the operating area such that air exchange between the operating area and an environment surrounding the test racks is substantially inhibited.

In some implementations, the test racks and the transfer station are arranged in at least a partially closed polygon about the automated machinery.

In another aspect, a disk drive test slot thermal control system includes a test slot including a housing having an outer surface, an internal cavity defined by the housing and including a test compartment for receiving and supporting a disk drive transporter carrying a disk drive for testing, and an inlet aperture extending from the outer surface of the housing to the internal cavity. The disk drive test slot thermal control system also includes a cooling conduit, and a thermoelectric device mounted to the cooling conduit. The thermoelectric device is configured to cool or heat an air flow entering the internal cavity through the inlet aperture.

Implementations of this aspect of the disclosure may include one or more of the following features.

In some implementations, the cooling conduit is configured to absorb heat dissipated by the thermoelectric device.

In some embodiments, the cooling conduit is liquid cooled.

In some implementations, the thermoelectric device includes a passive device.

In some embodiments, the thermoelectric device includes a thermoelectric cooler (e.g., a bulk thermoelectric cooler or a thin film thermoelectric cooler).

In some implementations, the disk drive test slot thermal control system includes a heatsink connected to the thermoelectric device.

In some embodiments, the test slot includes a ducting conduit disposed within the internal cavity and configured to convey an air flow from the inlet aperture towards the test compartment. The ducting conduit can be configured to direct an air flow underneath a disk drive disposed within the test compartment.

In some implementations the disk drive test slot thermal control system can include an electric heating device (e.g., a resistive heater). The electric heating device can be configured to heat an air flow within the internal cavity. In some cases, the electric heating device is disposed within the internal cavity and is configured to heat the air flow being conveyed through the ducting conduit. In some examples, a heatsink is disposed within the ducting conduit and is connected to the electric heating device, and the electric heating device is configured to heat the heatsink.

In some implementations, the disk drive test slot thermal control system can also include test electronics in electrical communication with the thermoelectric device and/or the electric heating device. The test electronics can be configured to control current flows to the thermoelectric device and/or the electric heating device. One or more temperature sensors can be disposed within the internal cavity. The one or more temperature sensors can be electrically connected to the test electronics, and the test electronics can be configured to control flows of current to the thermoelectric device and/or the electric heating device based, at least in part, on signals received from the one or more temperature sensors. The test electronics can be disposed outside of the internal cavity.

In some embodiments, the disk drive test slot thermal control system can include test electronics configured to communicate one or more test routines to a disk drive within the test compartment. In some cases, a test slot connector is disposed within the internal cavity. The test slot connector can be configured to engage a mating connected on a disk drive, and the test slot connector can be electrically connected to the test electronics. The test electronics can be disposed outside of the internal cavity. In some examples, a connection interface circuit is disposed within the internal cavity, and the connection interface circuit is configured to provide electrical communication between the test slot connector and the test electronics.

In another aspect, a disk drive test rack includes multiple test slots, a cooling conduit configured to convey a liquid toward the test slots, and multiple thermoelectric devices each mounted to the cooling conduit and each associated with a corresponding one of the test slots. The thermoelectric devices are each configured to cool or heat an air flow entering the associate one of the test slots.

Embodiments of this aspect of the disclosure may include one or more of the following features.

In some embodiments, the disk drive test rack includes a test slot compartment including the test slots, the cooling conduit, and the thermoelectric devices. The disk drive test rack can also include a test electronics compartment including test electronics configured to communicate with the test slots for executing a test algorithm.

In some implementations, the disk drive test rack includes a heat exchanger disposed within the test electronics compartment and in fluid communication with the cooling conduit. The heat exchanger can be configured to cool an air flow within the test electronics compartment, thereby to the cool the test electronics.

In some embodiments, the disk drive test rack includes an air mover disposed within the test electronics compartment and configured to direct an air flow across the heat exchanger and toward the test electronics for cooling the test electronics.

In some implementations, an air filter is disposed between the air mover and the heat exchanger. The air filter can be configured to filter an air flow within the test electronics compartment.

In some embodiments, an air filter is disposed at an inlet of the air mover and is configured to filter an air flow directed toward the test electronics compartment.

In some implementations, the thermoelectric devices are in electrical communication with the test electronics, and the test electronics are configured to control operation of the thermoelectric devices.

In some embodiments, each of the test slots includes one or more temperature sensors in electrical communication with the test electronics. The test electronics can be configured to control operation of the thermoelectric devices based, at least in part, on signals received from the one or more temperature sensors.

In some implementations, the test electronics compartment is substantially isolated from the test slot compartment such that air flow between the test electronics compartment and the test slot compartment is substantially inhibited.

In some embodiments, the cooling conduit is configured to absorb heat dissipated by the thermoelectric devices.

In some implementations, the thermoelectric devices are operable to remove heat energy from the cooling conduit.

In some embodiments, the thermoelectric devices are operable to remove heat energy from a liquid flowing in the cooling conduit.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a perspective view of a tote and disk drive.

FIGS. 14A-C are top, side and front orthogonal views of a pair of test slot assemblies.

FIG. 35 is a perspective view of a second side wall section from the slot bank of FIGS. 30A and 30B.

Like reference symbols in the various drawings indicate like elements.

DETAILED DESCRIPTION

System Overview

Figure 1:
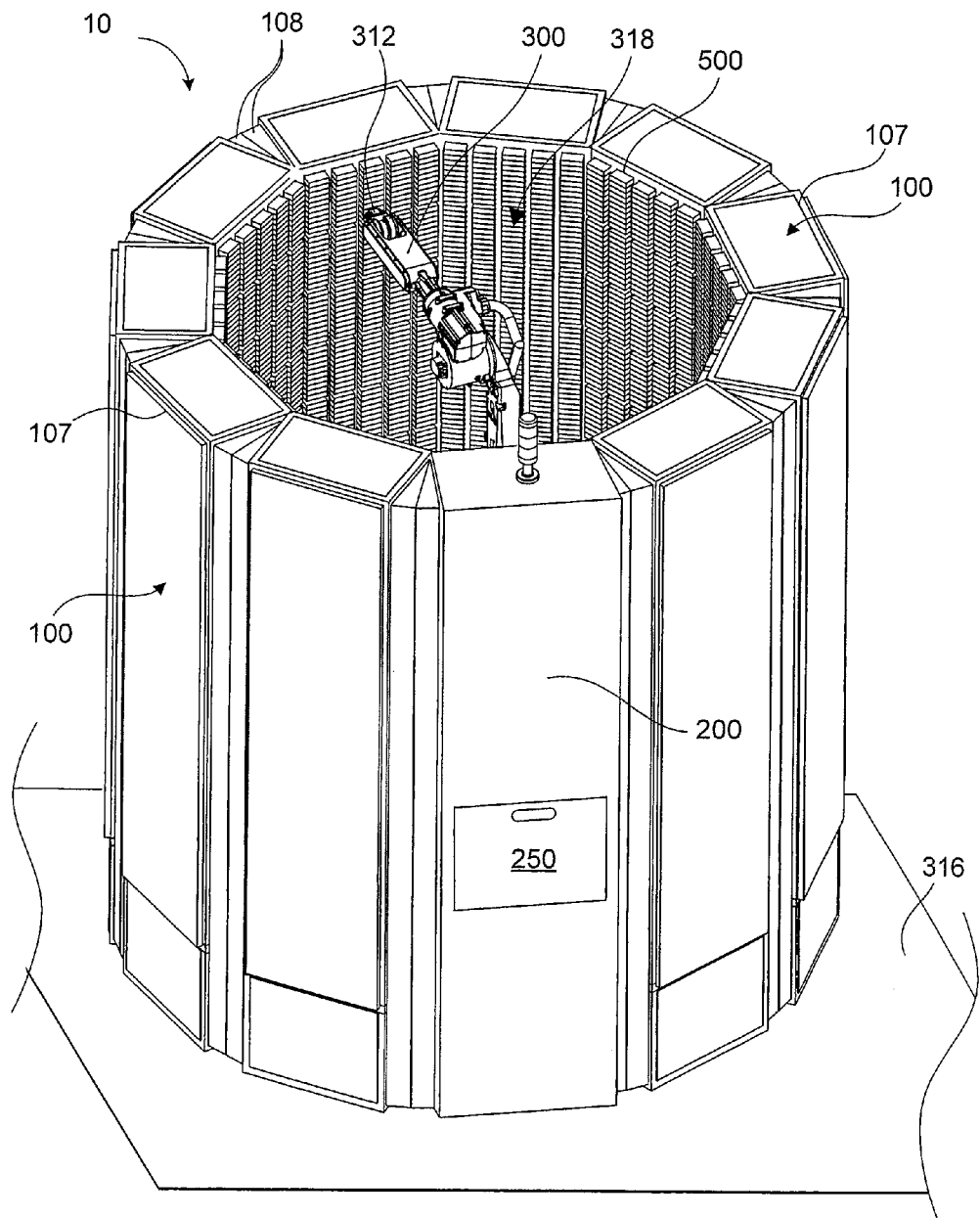
FIG. 1 is a is a perspective view of a disk drive testing system.
Figure 2B:
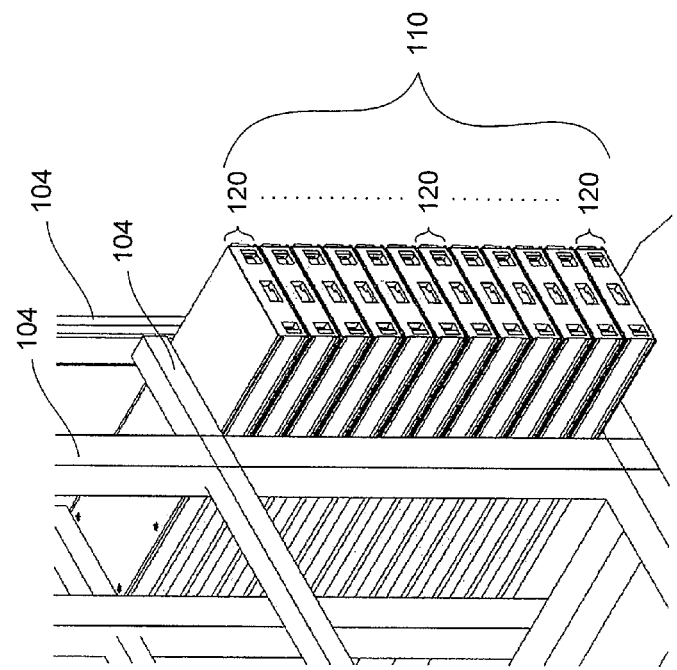
FIG. 2B is a detailed perspective view of a slot bank from the test rack of FIG. 2A.
Figure 2A:
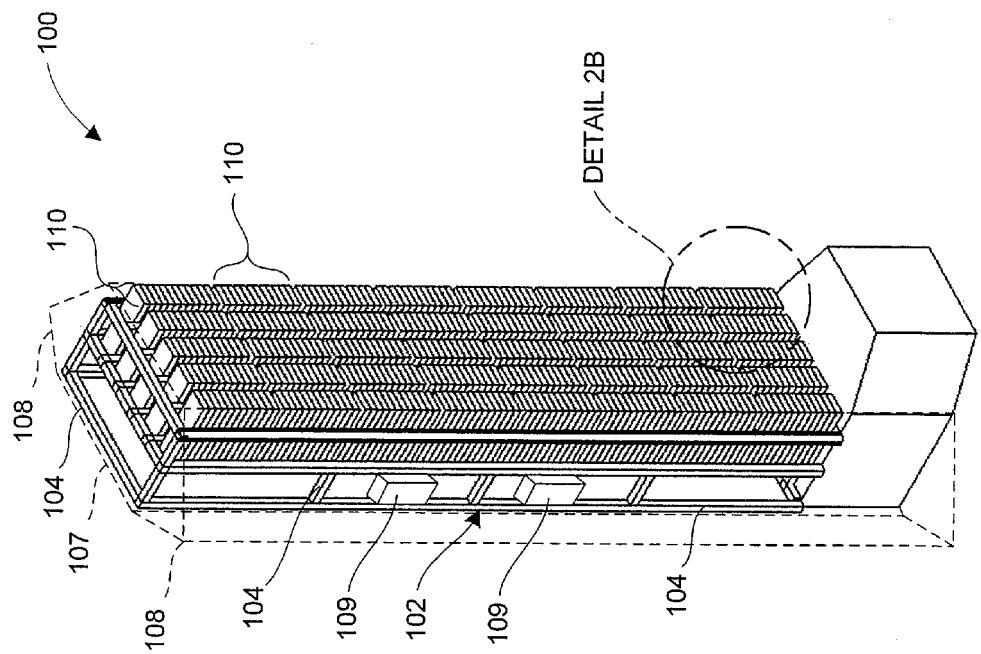
FIG. 2A is perspective view of a test rack.
Figure 3:
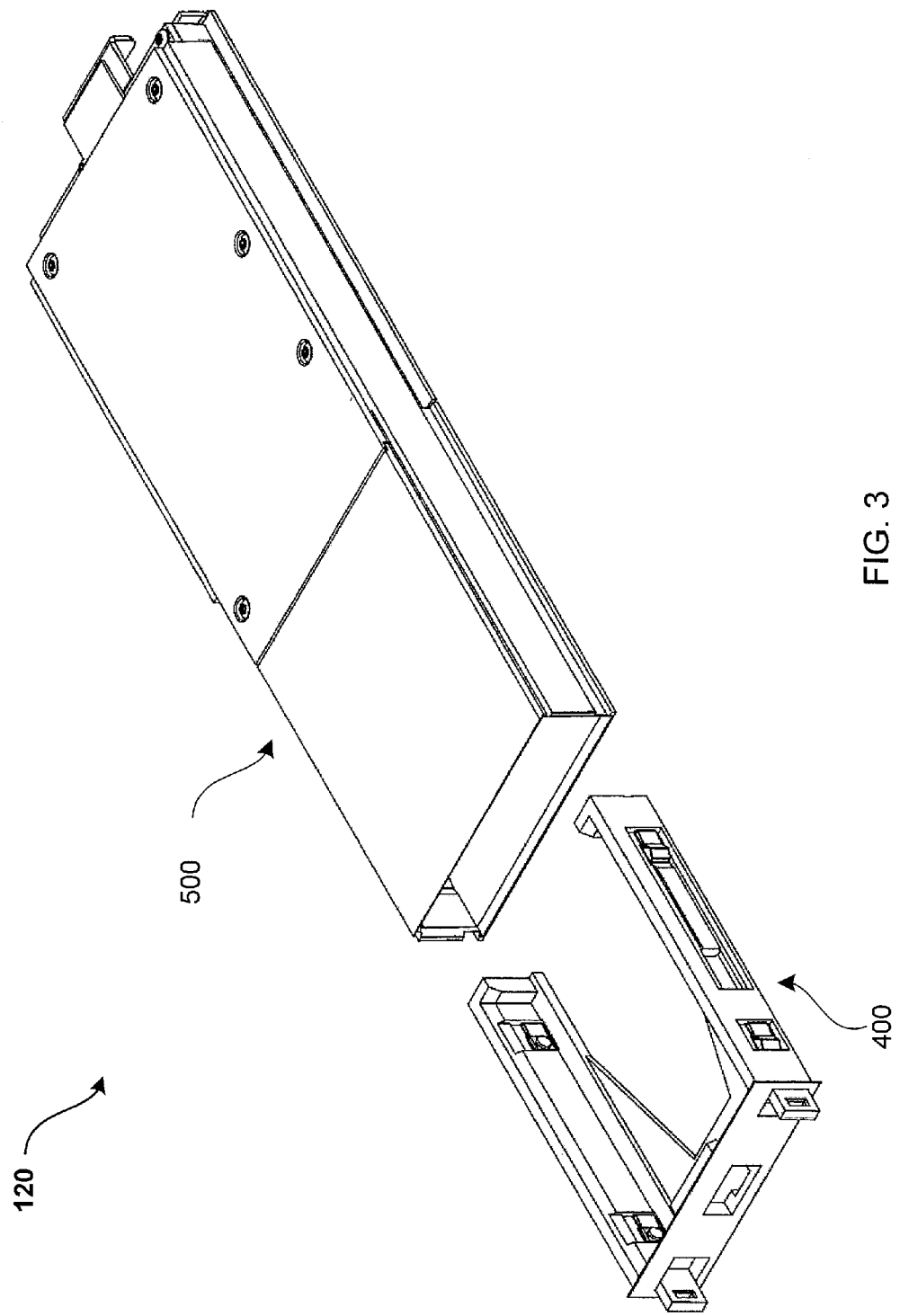
FIG. 3 is a perspective view of a test slot assembly.

As shown in FIG. 1, a disk drive testing system 10 includes a plurality of test racks 100 (e.g., 10 test racks shown), a transfer station 200, and a robot 300. As shown in FIGS. 2A and 2B, each test rack 100 generally includes a chassis 102. The chassis 102 can be constructed from a plurality of structural members 104 (e.g., extruded aluminum, steel tubing and/or composite members) which are fastened together and together define a plurality of slot banks 110. Each slot bank 110 can support a plurality of test slot assemblies 120. Referring to FIG. 2A, the test racks 100 can also include a body 107 (e.g., formed of one or more sheet metal and/or molded plastic parts, see also, e.g., FIG. 1), which at least partially encloses the chassis 102. The body 107 can include wedge sections 108 that can be used to compartmentalize power electronics 109 (e.g., AC to DC power supplies). As shown in FIG. 3, each test slot assembly 120 includes a disk drive transporter 400 and a test slot 500. The disk drive transporter 400 is used for capturing disk drives 600 (e.g., from the transfer station 200) and for transporting the disk drive 600 (see, e.g., FIG. 8A) to one of the test slots 500 for testing.

Figure 4:
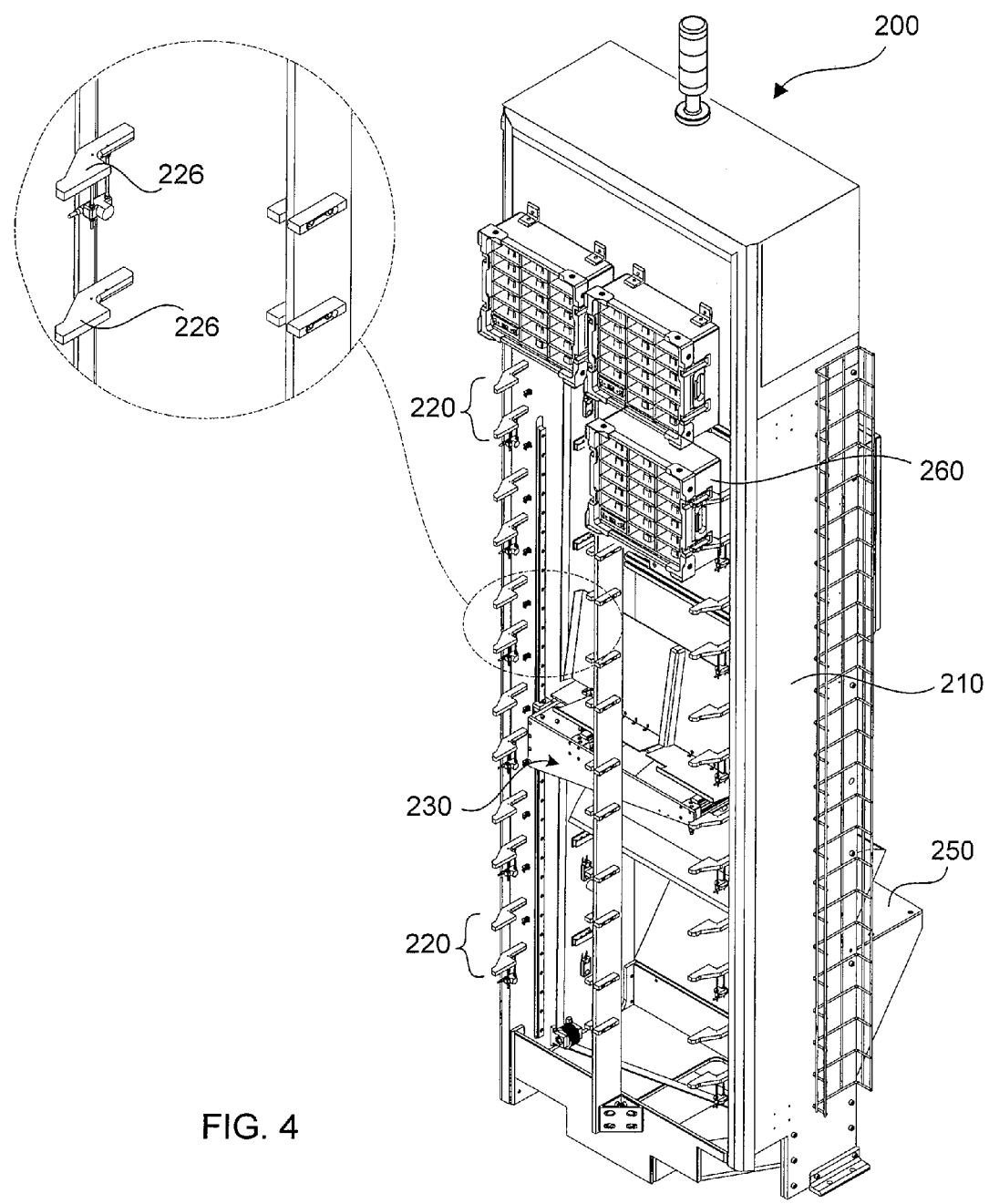
FIG. 4 is a perspective view of a transfer station.

Referring to FIG. 4, in some implementations, the transfer station 200 includes a transfer station housing 210 and multiple tote presentation support systems 220 disposed on the transfer station housing 210. Each tote presentation support system 220 is configured to receive and support a disk drive tote 260 in a presentation position for servicing by the disk drive testing system 10.

In some implementations, the tote presentation support systems 220 are each disposed on the same side of the transfer station housing 210 and arranged vertically with respect to each other. Each tote presentation support system 220 has a different elevation with respect to the others. In some examples, as shown in FIG. 4, the tote presentation support system 220 includes tote support arms 226 configured to be received by respective arm grooves 266 (FIG. 5) defined by the disk drive tote 260.

A tote mover 230 is disposed on the transfer station housing 210 and is configured to move relative thereto. The tote mover 230 is configured to transfer the totes 260 between the tote presentation support systems 220 for servicing by the disk drive testing system 10 (e.g. by the robot 300 (FIG. 1)) and a staging area 250 where the totes 260 can be loaded into and unloaded from the transfer station 200 (e.g., by an operator).

Figure 6A:
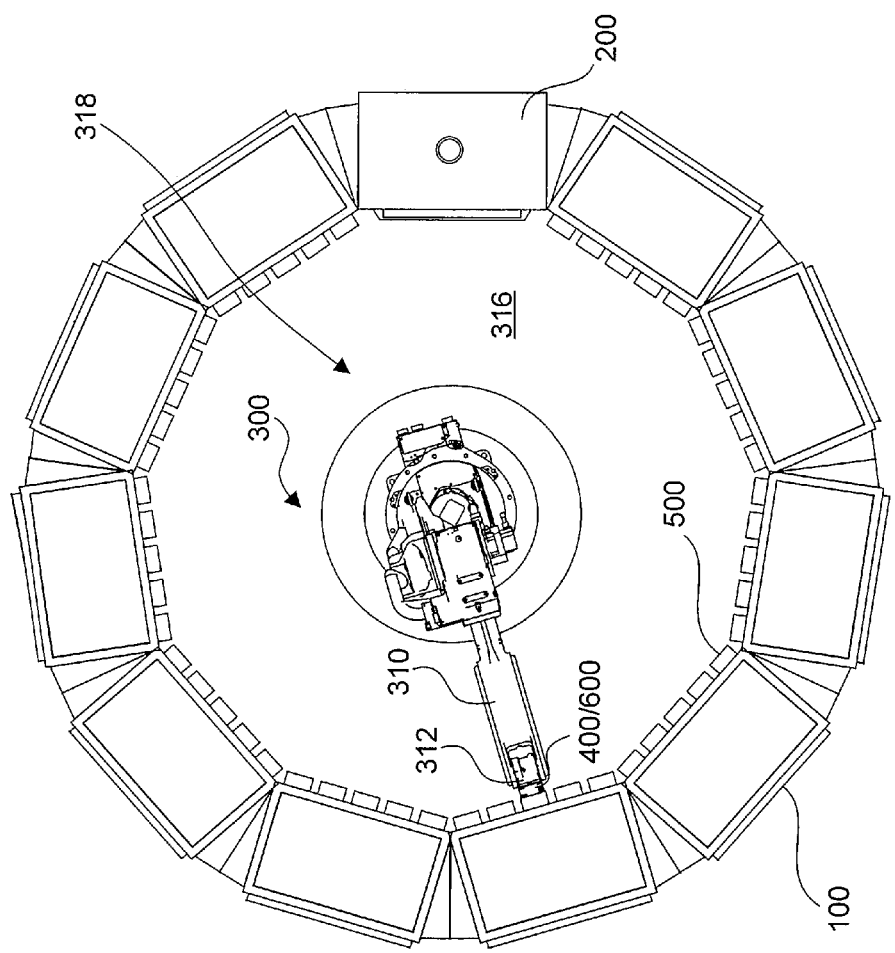
FIG. 6A is a top view of a disk drive testing system.
Figure 6B:
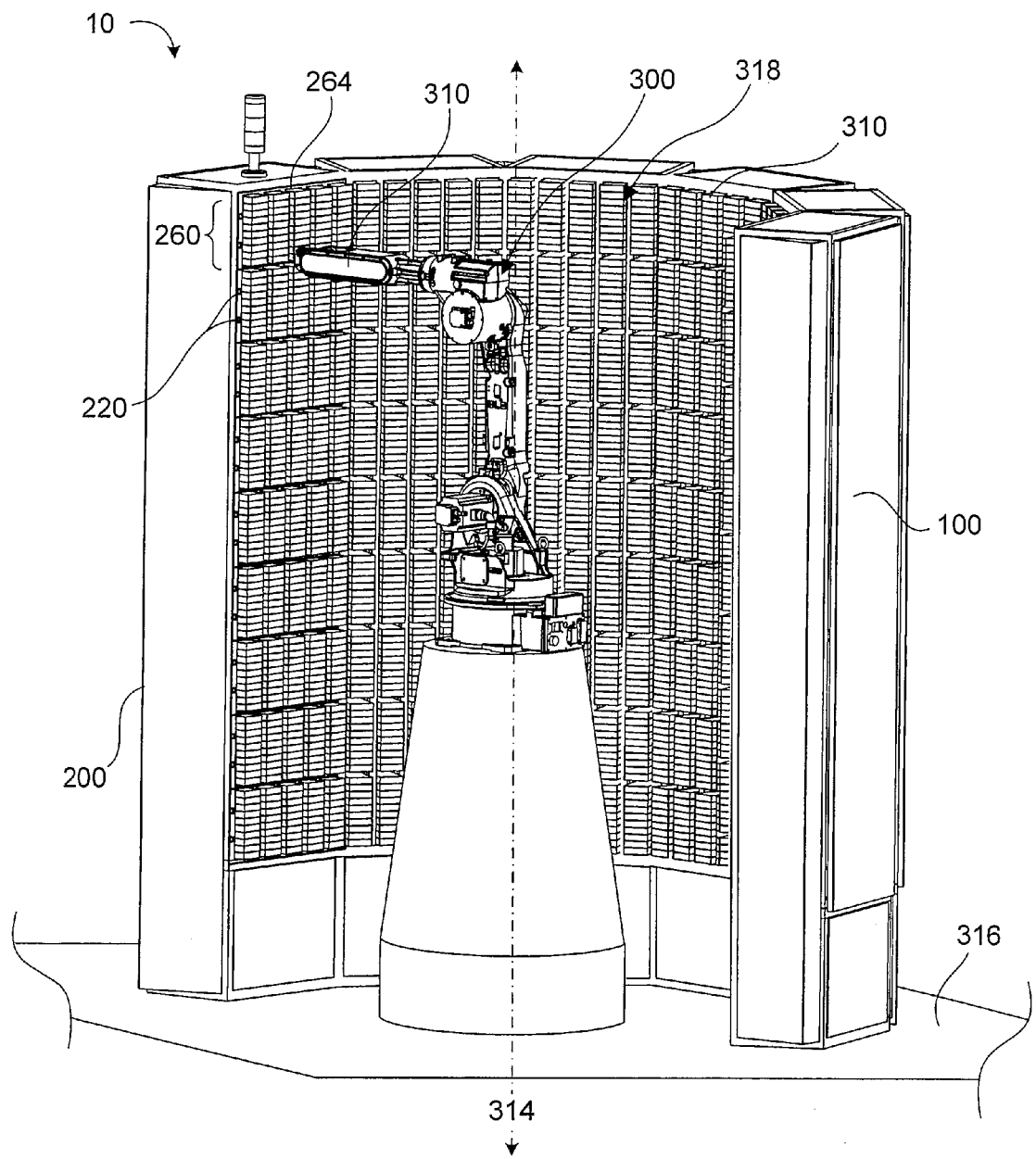
FIG. 6B is a perspective view of a disk drive testing system.

As illustrated in FIG. 5, the totes 260 include a tote body 262 which defines multiple disk drive receptacles 264 (e.g., 18 shown) that are each configured to house a disk drive 600. Each of the disk drive receptacles 264 includes a disk drive support 265 configured to support a central portion of a received disk drive 600 to allow manipulation of the disk drive 600 along non-central portions (e.g., along side, front and/or back edges of the disk drive). The tote body 262 also defines arm grooves 266 that are configured to engage the tote support arms 226 (FIG. 4) of the transfer station housing 210 thereby to support the tote 260 (e.g., for servicing by the robot 300 (FIG. 1)). As shown in FIGS. 6A and 6B, the robot 300 includes a robotic arm 310 and a manipulator 312 (FIG. 6A) disposed at a distal end of the robotic arm 310. The robotic arm 310 defines a first axis 314 (FIG. 6B) normal to a floor surface 316 and is operable to rotate through a predetermined arc about and extends radially from the first axis 314 within a robot operating area 318. The robotic arm 310 is configured to independently service each test slot 500 by transferring disk drives 600 between the totes 260 at the transfer station 200 and the test racks 100. In particular, the robotic arm 310 is configured to remove a disk drive transporter 400 from one of the test slots 500 with the manipulator 312, then pick up a disk drive 600 from one the disk drive receptacles 264 at the transfer station 200 with the disk drive transporter 400, and then return the disk drive transporter 400, with a disk drive 600 therein, to the test slot 500 for testing of the disk drive 600. After testing, the robotic arm 310 retrieves the disk drive transporter 400, along with the supported disk drive 600, from one of the test slots 500 and returns it to one of the disk drive receptacles 264 at the transfer station 200 (or moves it to another one of the test slots 500) by manipulation of the disk drive transporter 400 (i.e., with the manipulator 312).

Figure 7A:
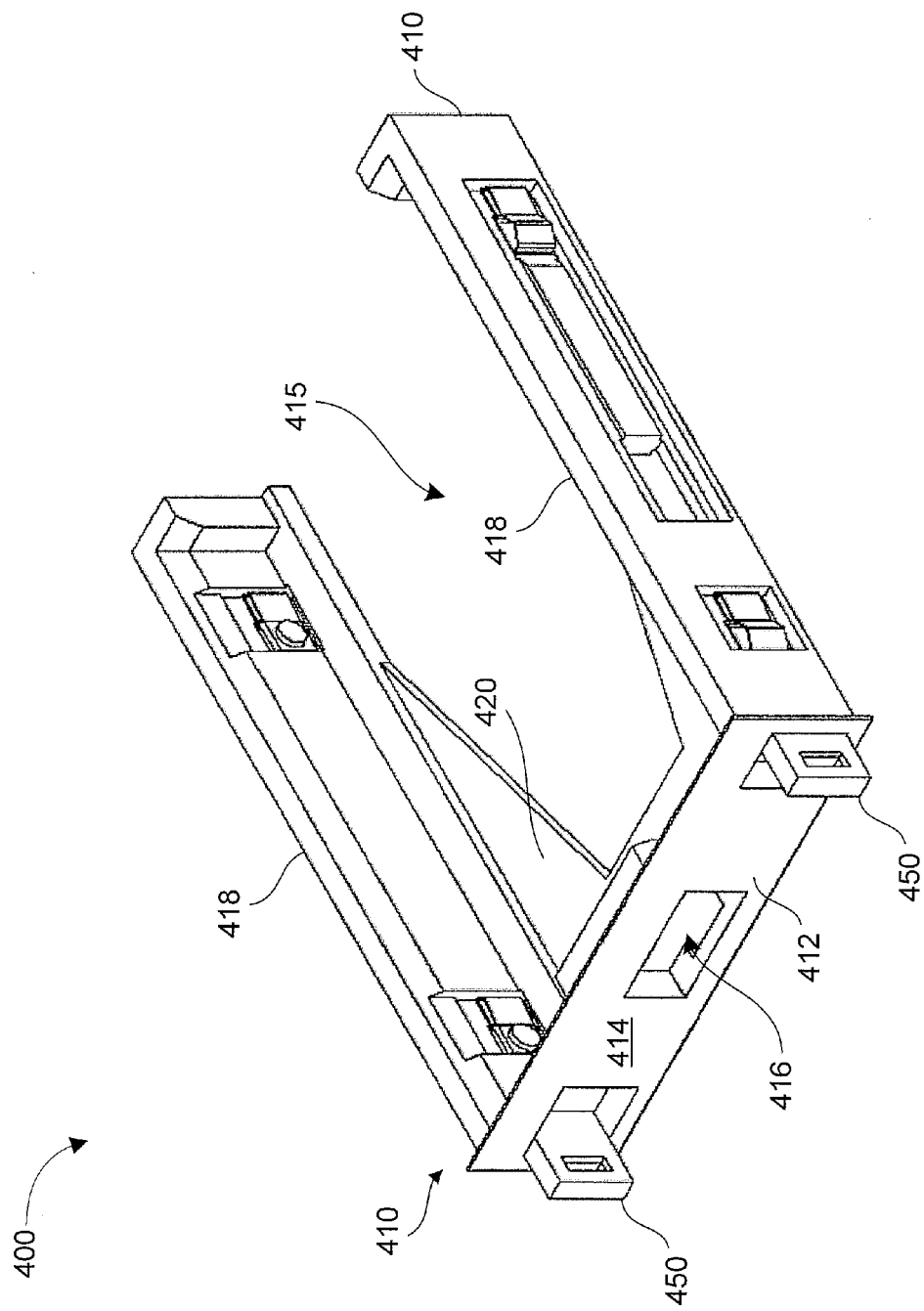
FIGS. 7A and 7B are perspective views of a disk drive transporter.
Figure 7B:
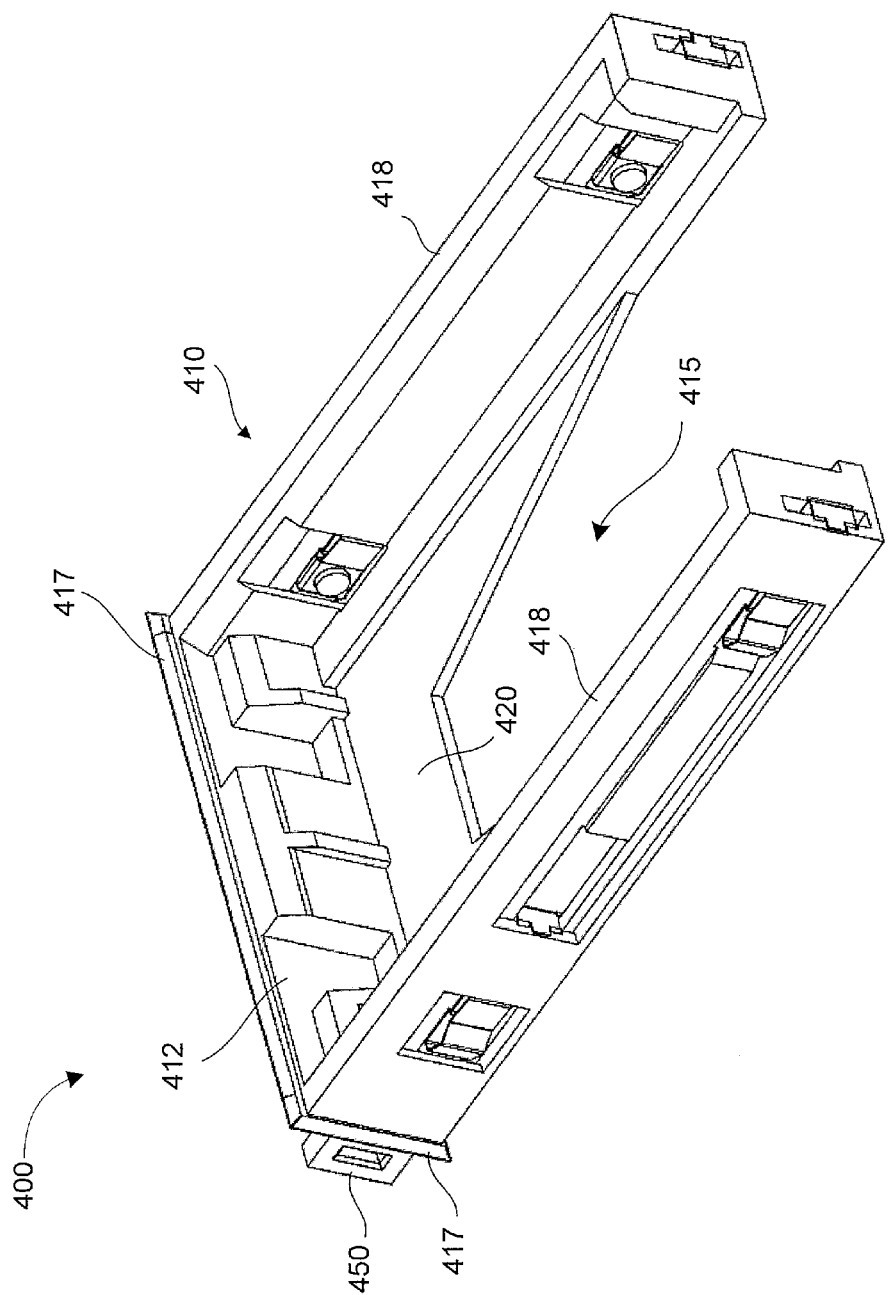

Referring to FIGS. 7A and 7B, the disk drive transporter 400 includes a frame 410 and a clamping mechanism 450. The frame 410 includes a face plate 412. As shown in FIG. 7A, along a first surface 414, the face plate 412 defines an indentation 416. The indentation 416 can be releaseably engaged by the manipulator 312 (FIG. 6A) of the robotic arm 310, which allows the robotic arm 310 to grab and move the transporter 400. As shown in FIG. 7B, the face plate 412 also includes beveled edges 417. When the frame 410 is inserted into one of the test slots 500, the beveled edges 417 of the face plate 412 abut complimentary beveled edges 515 (FIG. 15A) of the test slot 500 (FIG. 15A) to form a seal, which, as described below, helps to inhibit the flow of air into and out of the of the test slot 500. In use, one of the disk drive transporters 400 is removed from one of the test slots 500 with the robot 300 (e.g., by grabbing, or otherwise engaging, the indentation 416 of the transporter 400 with the manipulator 312 of the robot 300). The frame 410 defines a substantially U-shaped opening 415 formed by sidewalls 418 and a base plate 420 that collectively allow the frame 410 to fit around the disk drive support 265 (FIG. 5) in the tote 260 (FIG. 5) so that the disk drive transporter 400 can be moved (e.g., via the robotic arm 300) into a position beneath one of the disk drives 600 housed in one of the disk drive receptacles 264 of the tote 260. The disk drive transporter 400 can then be raised (e.g., by the robotic arm 310) into a position engaging the disk drive 600 for removal off of the disk drive support 265 in the tote 260.

Figure 8A:
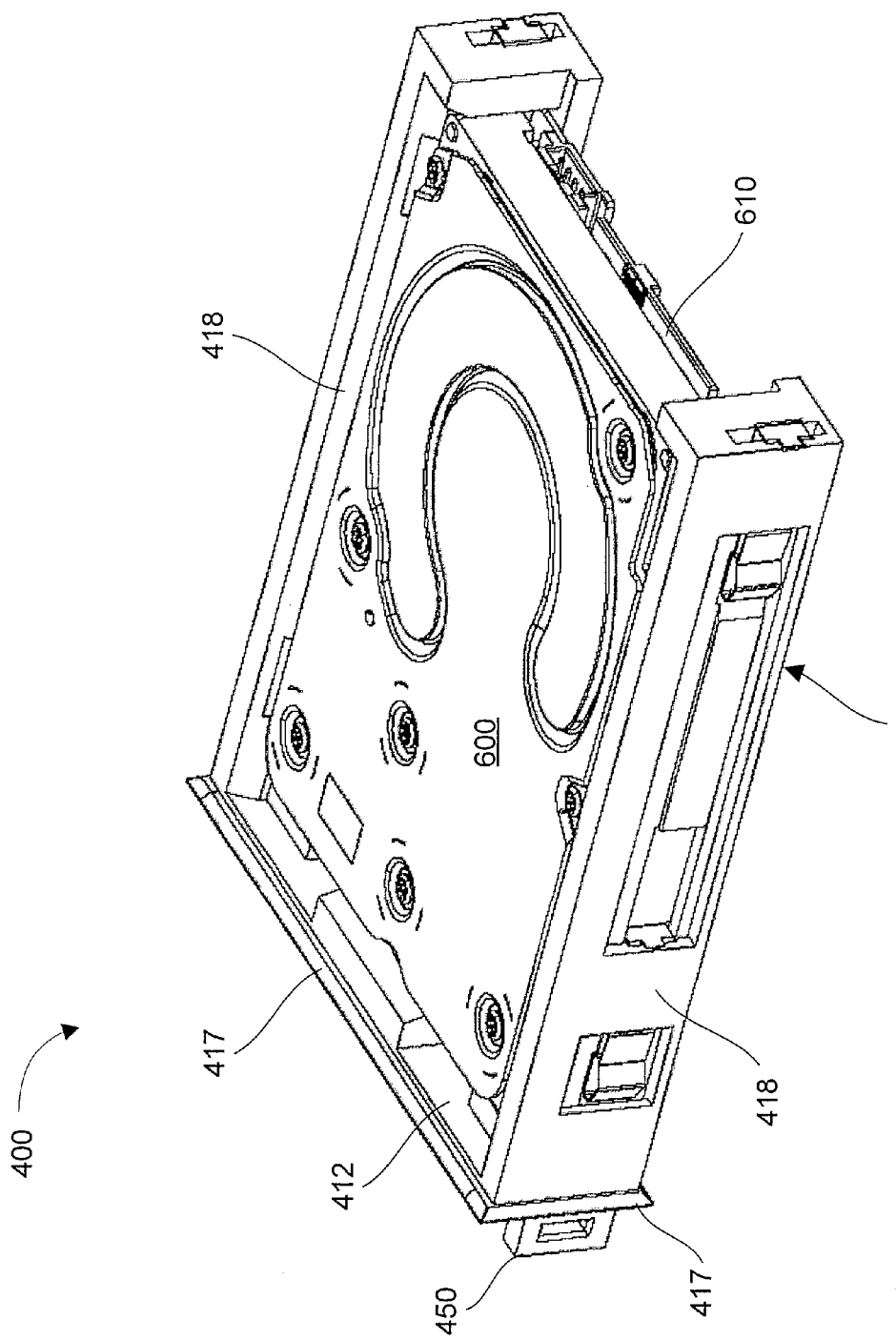
FIG. 8A is a perspective view of a disk drive transporter supporting a disk drive.
Figure 8B:
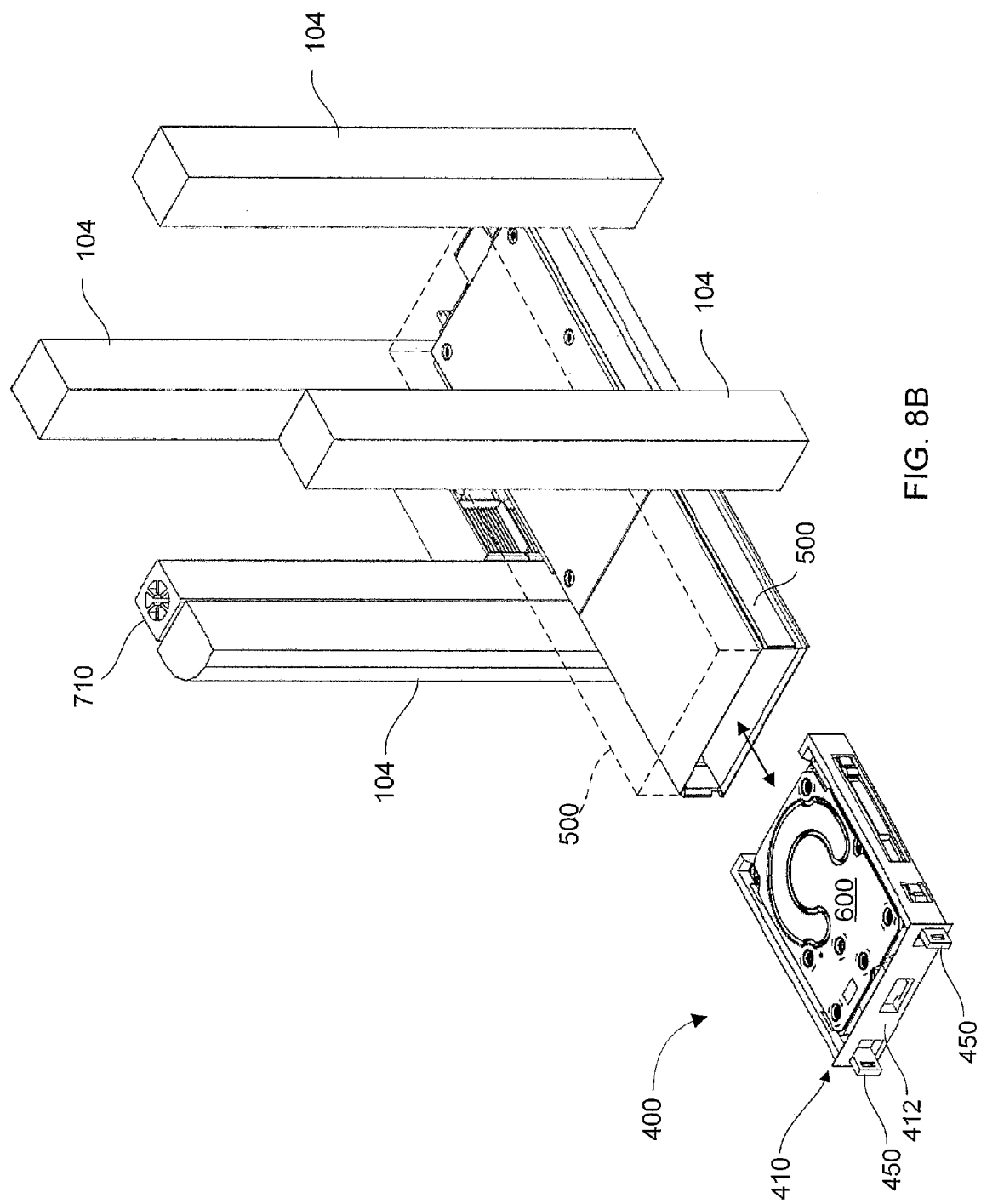
FIG. 8B is a perspective view of a disk drive transporter carrying a disk drive aligned for insertion into a test slot.
Figure 19:
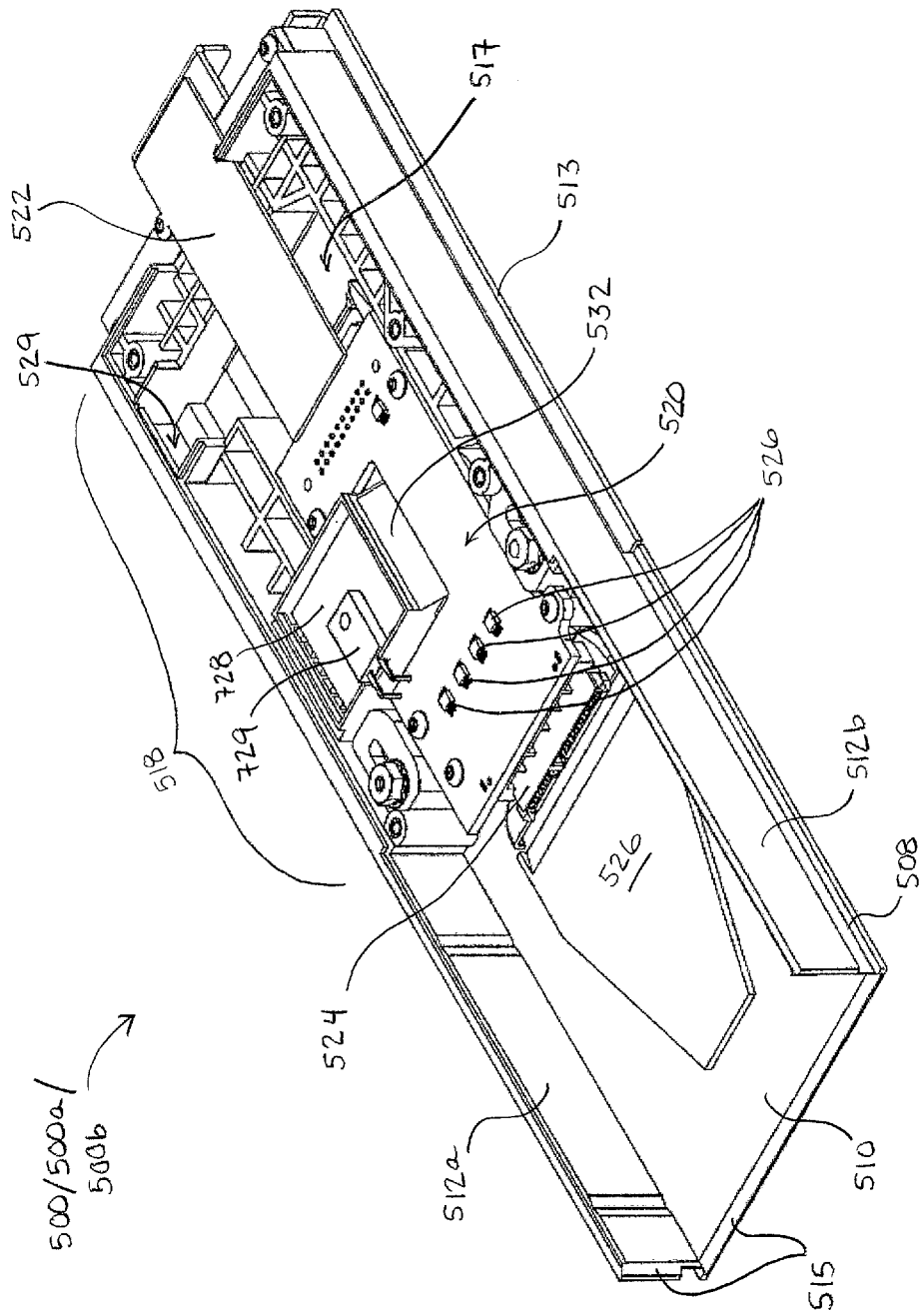
FIG. 19 is a perspective view of the test slot of FIGS. 16-18 including a connection interface board.

As illustrated in FIGS. 8A and 8B, with the disk drive 600 in place within the frame 410 of the disk drive transporter 400, the disk drive transporter 400 and the disk drive 600 together can be moved by the robotic arm 310 (FIG. 6A) for placement within one of the test slots 500. The manipulator 312 (FIG. 6A) is also configured to initiate actuation of a clamping mechanism 450 disposed in the disk drive transporter 400. A detailed description of the manipulator and other details and features combinable with those described herein may be found in the following U.S. patent application filed concurrently herewith, entitled "Transferring Disk Drives Within Disk Drive Testing Systems", with inventors: Evgeny Polyakov et al., and having assigned Ser. No. 12/104,536, the entire contents of the aforementioned applications are hereby incorporated by reference. This allows actuation of the clamping mechanism 450 before the transporter 400 is moved from the tote 220 to the test slot 500 to inhibit movement of the disk drive 600 relative to the disk drive transporter 400 during the move. Prior to insertion in the test slot 500, the manipulator 312 can again actuate the clamping mechanism 450 to release the disk drive 600 within the frame 410. This allows for insertion of the disk drive transporter 400 into one of the test slots 500, until the disk drive 600 is in a test position with a disk drive connector 610 engaged with a test slot connector 524 (FIG. 19). The clamping mechanism 450 may also be configured to engage the test slot 500, once received therein, to inhibit movement of the disk drive transporter 400 relative to the test slot 500. In such implementations, once the disk drive 600 is in the test position, the clamping mechanism 450 is engaged again (e.g., by the manipulator 312) to inhibit movement of the disk drive transporter 400 relative to the test slot 500. The clamping of the transporter 400 in this manner can help to reduce vibrations during testing. A detailed description of the clamping mechanism 450 and other details and features combinable with those described herein may be found in the following U.S. patent application filed Dec. 18, 2007, entitled "DISK DRIVE TRANSPORT, CLAMPING AND TESTING", inventors: Brian Merrow et al., and having assigned Ser. No. 11/959,133, the entire contents of the which are hereby incorporated by reference.

Figure 9:
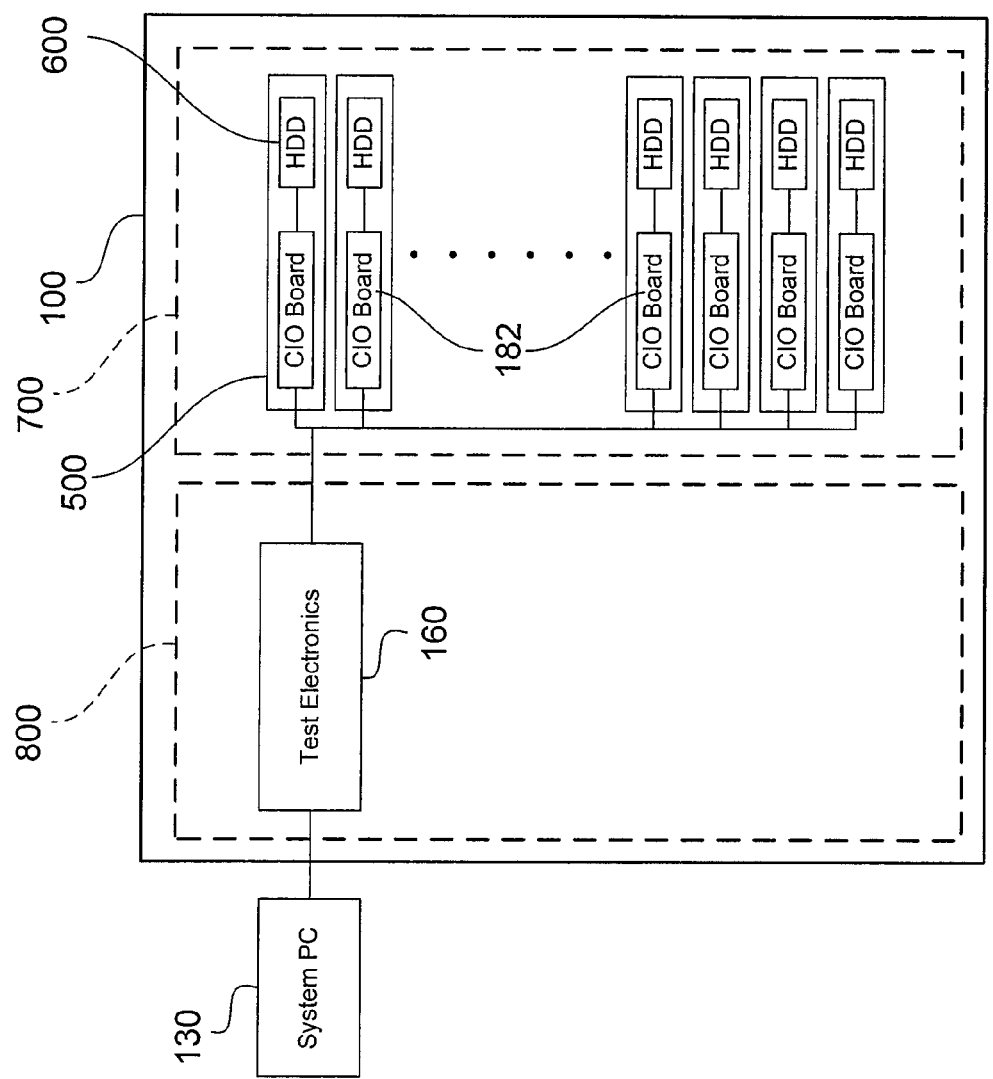
FIGS. 9 and 10 are schematic views of self-test and functional test circuitry.

Referring to FIG. 9, in some implementations, the disk drive testing system 10 also includes at least one computer 130 in communication with the test slots 500. The computer 130 may be configured to provide inventory control of the disk drives 600 and/or an automation interface to control the disk drive testing system 10. Within each of the test racks 100, test electronics 160 are in communication with each test slot 500. The test electronics 160 are configured to communicate with a disk dive 600 received within the test slot 500.

Figure 10:
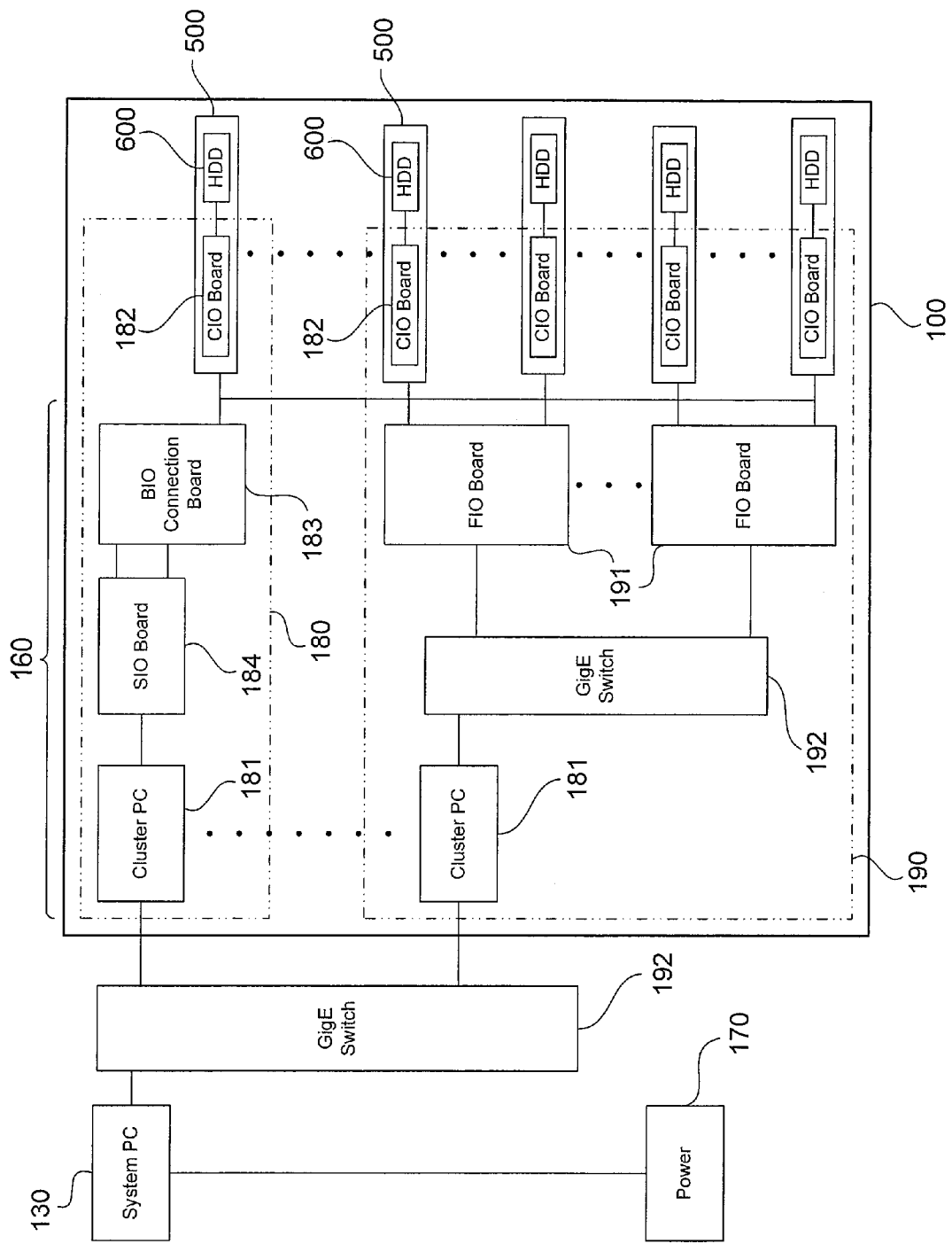

Referring to FIG. 10, a power system 170 (which includes the power electronics 109, FIG. 2A) supplies power to the disk drive testing system 10. The power system 170 may monitor and/or regulate power to the received disk drive 600 in the test slot 500. In the example illustrated in FIG. 10, the test electronics 160 within each test rack 100 include at least one self-testing system 180 in communication with at least one test slot 500. The self-testing system 180 tests whether the test rack 100 and/or specific sub-systems, such as the test slot 500, are functioning properly. The self-testing system 180 includes a cluster controller 181, one or more connection interface circuits 182 each in electrical communication with a disk drive 600 received within the test slot 500, and one or more block interface circuits 183 in electrical communication with the connection interface circuit 182. The cluster controller 181, in some examples, is configured to run one or more testing programs with a capacity of approximately 120 self-tests and/or 60 functionality test of disk drives 600. The connection interface circuits 182 and the block interface circuit(s) 183 are configured to self-test. However, the self-testing system 180 may include a self-test circuit 184 configured to execute and control a self-testing routine on one or more components of the disk drive testing system 10. The cluster controller 181 may communicate with the self-test circuit 184 via Ethernet (e.g. Gigabit Ethernet), which may communicate with the block interface circuit(s) 183 and onto the connection interface circuit(s) 182 and disk drive(s) 600 via universal asynchronous receiver/transmitter (UART) serial links. A UART is usually an individual (or part of an) integrated circuit used for serial communications over a computer or peripheral device serial port. The block interface circuit(s) 183 is/are configured to control power to and temperature of the test slots 500, and each block interface circuit 183 may control one or more test slots 500 and/or disk drives 600.

In some examples, the test electronics 160 can also include at least one functional testing system 190 in communication with at least one test slot 500. The functional testing system 190 tests whether a received disk drive 600, held and/or supported in the test slot 500 by the disk drive transporter 400, is functioning properly. A functionality test may include testing the amount of power received by the disk drive 600, the operating temperature, the ability to read and write data, and the ability to read and write data at different temperatures (e.g. read while hot and write while cold, or vice versa). The functionality test may test every memory sector of the disk drive 600 or only random samplings. The functionality test may test an operating temperature of air around the disk drive 600 and also the data integrity of communications with the disk drive 600. The functional testing system 190 includes a cluster controller 181 and at least one functional interface circuit 191 in electrical communication with the cluster controller 181. A connection interface circuit 182 is in electrical communication with a disk drive 600 received within the test slot 500 and the functional interface circuit 191. The functional interface circuit 191 is configured to communicate a functional test routine to the disk drive 600. The functional testing system 190 may include a communication switch 192 (e.g. Gigabit Ethernet) to provide electrical communication between the cluster controller 181 and the one or more functional interface circuits 191. Preferably, the computer 130, communication switch 192, cluster controller 181, and functional interface circuit 191 communicate on an Ethernet network. However, other forms of communication may be used. The functional interface circuit 191 may communicate to the connection interface circuit 182 via Parallel AT Attachment (a hard disk interface also known as IDE, ATA, ATAPI, UDMA and PATA), SATA, or SAS (Serial Attached SCSI).

Temperature Control

Figure 11A:
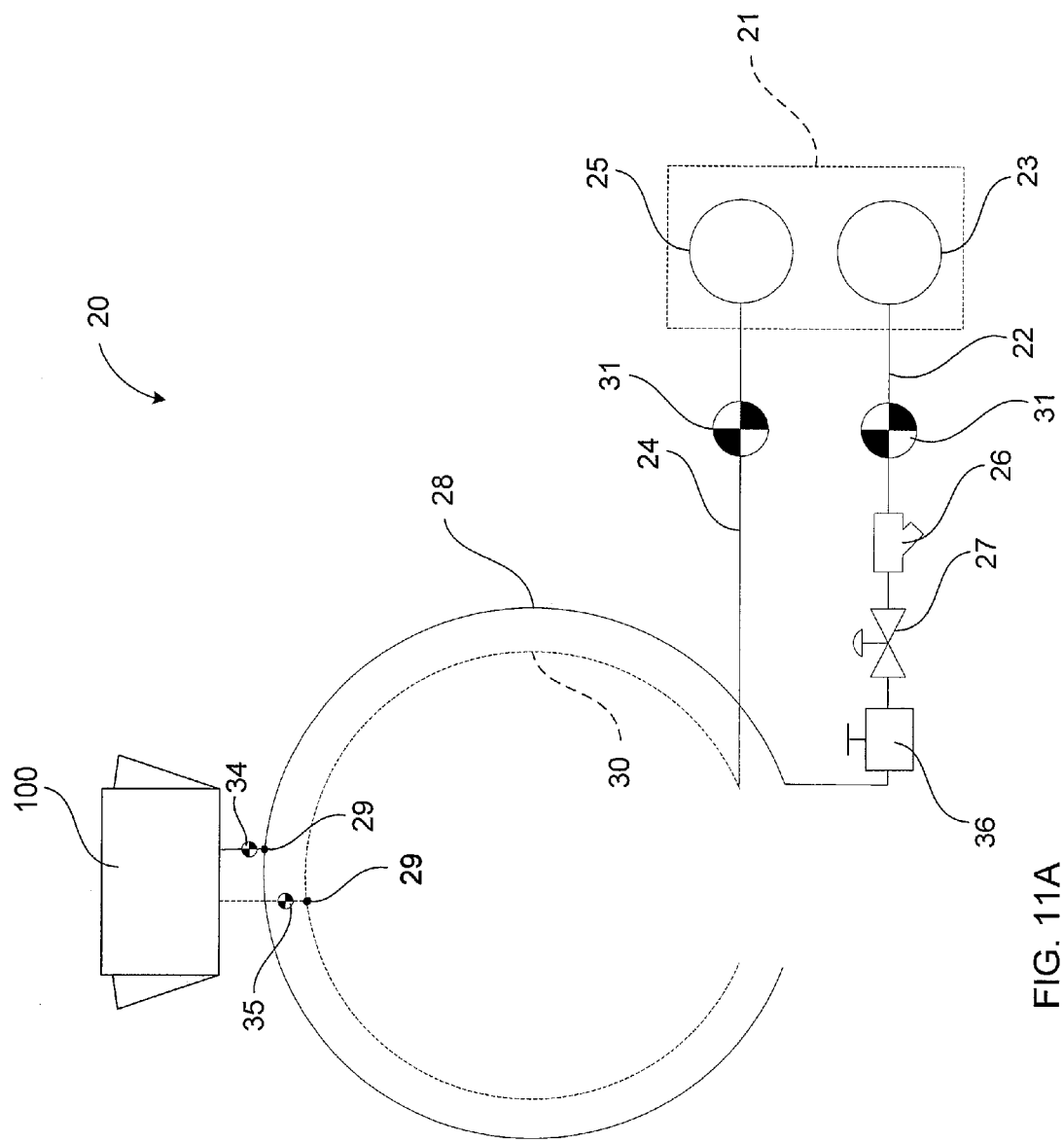
FIG. 11A is a schematic view a liquid cooling circuit for a disk drive testing system.

FIG. 11A illustrates a liquid cooling circuit 20 for the distribution of a cooling liquid (e.g., chilled water) to each of the test racks 100 (only one shown in FIG. 11A) in the disk drive testing system 10. The liquid cooling circuit 20 includes an inlet conduit 22, which delivers a cooling liquid (e.g., a facilities chilled water flow, e.g., a flow of water at about 8° C.) from a liquid supply line (e.g., a facilities chilled water supply line 23 of a facilities chilled water system 21) to the test racks 100 (one shown for simplicity), and an outlet conduit 24, which allows for a return flow of water from the test racks 100 to a liquid return line (e.g., a facilities chilled water return line 25 of the facilities chilled water system 21). The inlet conduit 22 may include a strainer 26 (e.g., a 60-mesh strainer), to remove particulate from the water, and a forward-pressure regulator 27 to control the inlet pressure of the water to the test racks 100. The inlet conduit 22 also includes a distribution manifold 28 (e.g., a large diameter polymeric hose or welded polyvinylchloride (PVC)) where tee connections 29 are provided for apportioning the water to each of the test racks 100. The inlet conduit 22 may also include a flow control valve 36 to control the volume flow rate to the test racks 100. The outlet conduit 24 includes a return manifold 30 (e.g., a large diameter hose) that is piped to the chilled water return line 25. Shut-off valves 31 can be provided in both the inlet and outlet conduits 22, 24 to allow the disk drive testing system 10 to be isolated from the chilled water system 21. The components (e.g., the inlet conduit 22, outlet conduit 24, distribution manifold 28, return manifold 30, etc) which carry the cooling liquid to and from the test racks 100 can also be insulated to inhibit the transfer of thermal energy between the liquid (e.g., water) and the surrounding environment.

Figure 11B:
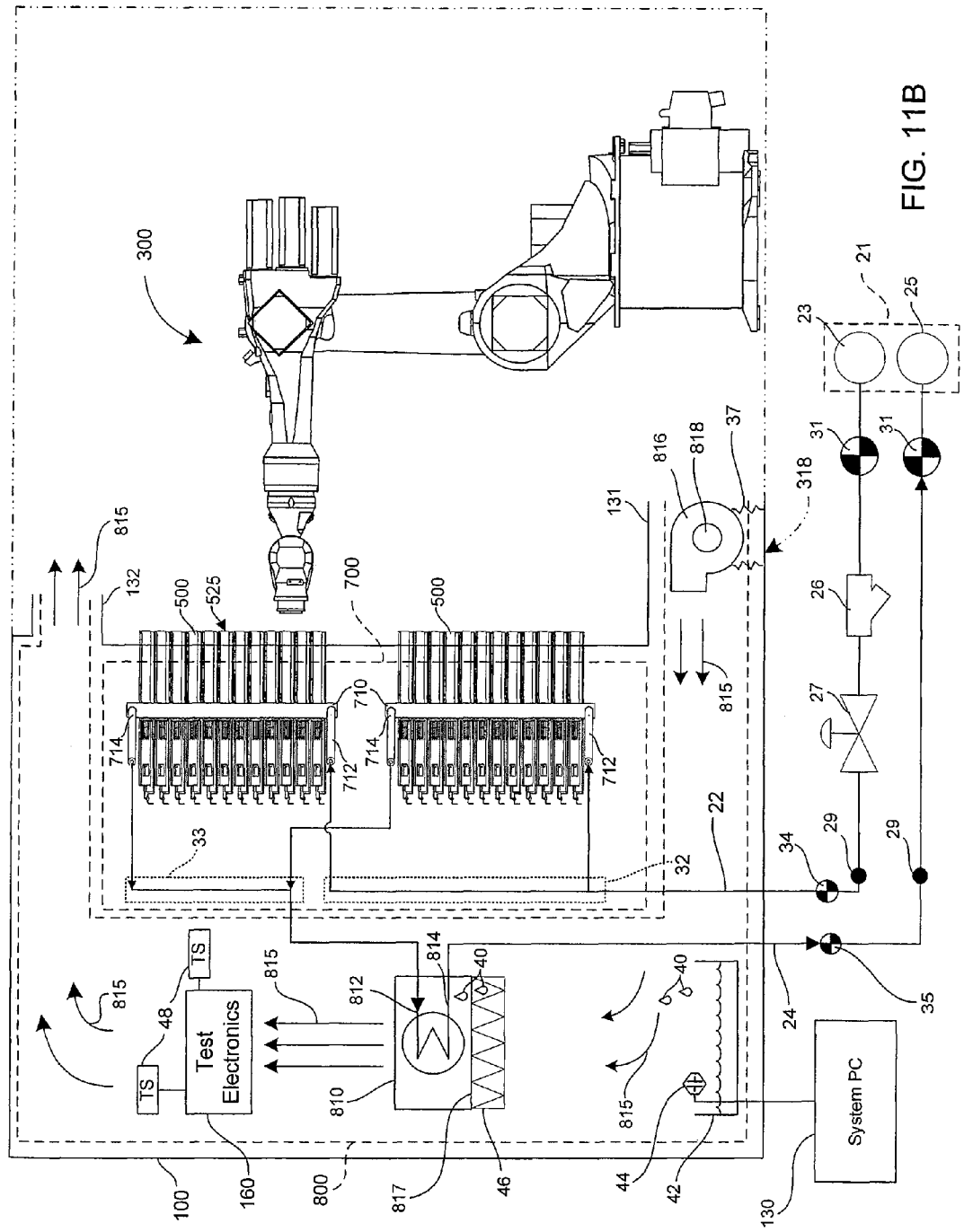
FIG. 11B is a schematic view of a cooling circuit for a test rack.
Figure 11C:
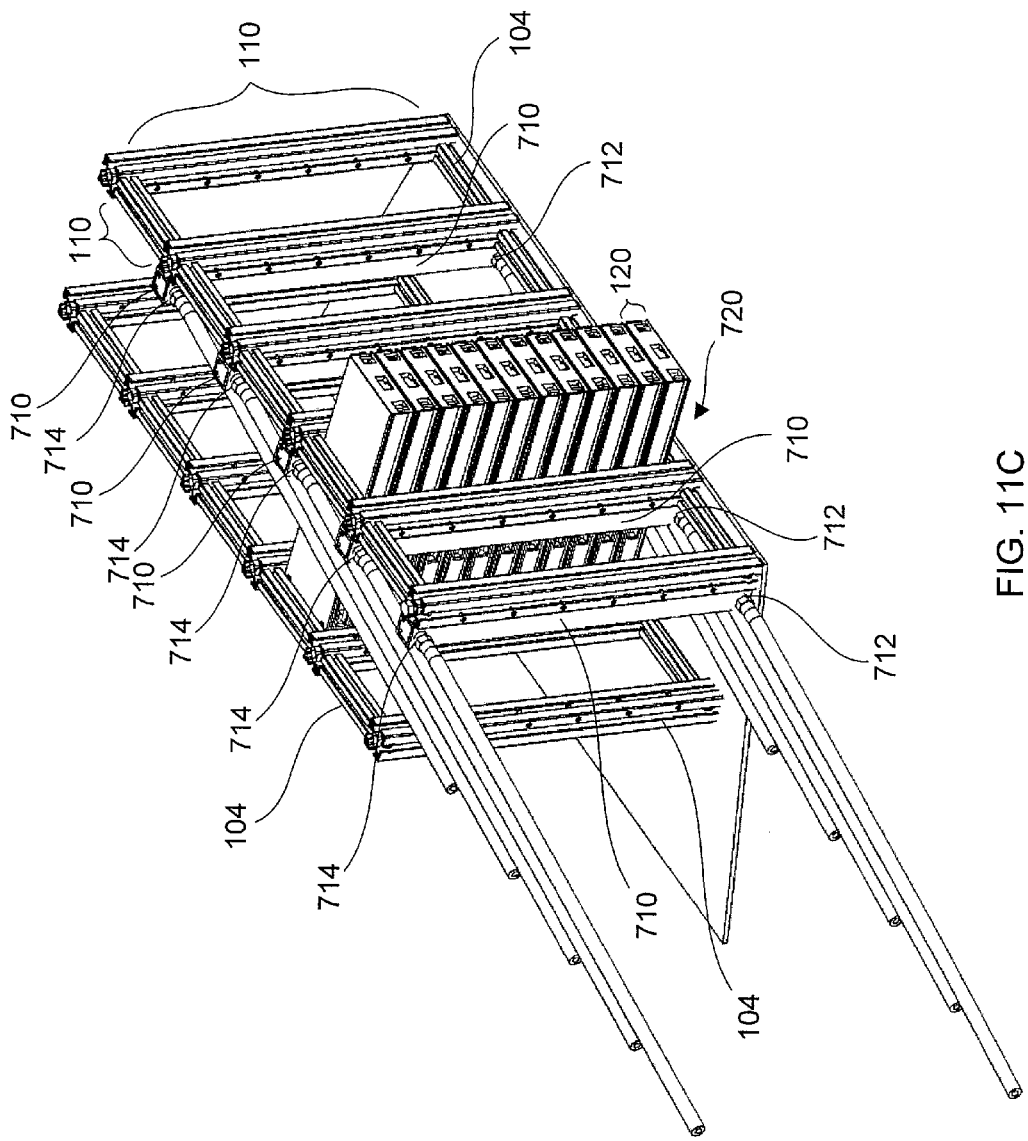
FIG. 11C is a perspective view of one row of slot banks from a test rack.

As shown in FIG. 11B, within each test rack 100, the test slots 500 and the test electronics 160 are arranged in separate compartments and are each provided with temperature control. The test slots 500 are arranged in a test slot compartment 700 and the test electronics 160 are arranged in a test electronics compartment 800. The test electronics 160 are in electrical communication with the power electronics 109 (FIG. 2A) in the wedge sections 108 (FIG. 1) of the test rack 100 such that the power entering the test electronics compartment 800 is all DC. The test slot compartment 700 and the test electronics compartment 800 are both serviced by the liquid cooling circuit 20. The inlet conduit 22 delivers the facilities chilled water to the test slot compartment 700. Within the test slot compartment 700, the inlet conduit 22 is in fluid communication with a lower manifold 32 that distributes the water to one or more cooling conduits 710. FIG. 11C illustrates one embodiment in which each slot bank 110 has its own dedicated cooling conduit 710. However, in some cases, each of the cooling conduits 710 can extend along the height of the test rack 100 and service a full column of test slots 500. The cooling conduits 710 may include pipes and/or tubes (e.g., copper or aluminum piping or tubing). Referring again to FIG. 11B, the chilled water is circulated through the cooling conduits 710, which, in turn, form part of a test slot thermal control system, as discussed in greater detail below. Each of the cooling conduits 710 includes an inlet 712 in fluid communication with the inlet conduit 22 and an outlet 714 in fluid communication with an upper manifold 33. The lower and upper manifolds 32, 33, can, for example, be made of copper or polyvinylchloride (PVC) pipe. For the purpose of even flow distribution each of the inlet conduits 22 can be equipped with an orifice that will provide added flow resistance needed for proper distribution. After passing through the cooling conduits 710, the water is later collected in the upper manifold 33. From the upper manifold 33 the water is piped to an inlet port 812 of an air-to-liquid heat exchanger 810 that is disposed within the test electronics compartment 800. The heat exchanger 810 also includes an outlet port 814 that is in fluid communication with the outlet conduit 24. The chilled water exiting the cooling conduits 710 is circulated through the heat exchanger 810 for cooling and dehumidifying an air flow 815 within the test electronics compartment 800 and the robot operating area 318 so as to control the humidity of the air that is allowed to enter the test slots 500. The water then leaves the racks 100 and is returned to the chilled water system 21 via the return manifold 30 (FIG. 11A) that connects the water return of all test racks 100. Polymeric hoses can be used to connect these water flow components within the test racks 100. The use of hoses between the components can help to attenuate vibration throughout the liquid cooling circuit 20.

A shut-off valve 34 is located in the inlet conduit 22 and a combination shut-off and balancing valve 35 is located in the outlet conduit 24. The combination shut-off and balancing valve 35 sets the flow distribution between the test racks 100 and the valves 34, 35 can also be used to isolate the test racks 100 from the chilled water system 26.

As shown in FIG. 11B, each of the test racks 100 can also include an air mover (e.g., a blower 816) which draws the air flow 815 into the test electronics compartment 800 from the robot operating area 318 through an inlet port 131 in the test rack 100. The blower 816 is mounted on vibration mounts 37 to isolate vibrations originating at the blower 816 from the test rack 100, and, as a result, from disk drives being tested in the test rack 100. The blower 816 directs the air flow 815 across the heat exchanger 810, where the air is cooled and dehumidified, and towards the test electronics 160 for cooling the test electronics 160. The test electronics 160 are cooled by this air-over flow. After passing over the test electronics 160 the air flow 815 is exhausted into the robot operating area 318 through an exhaust port 132 in the test rack 100. The air flow 815 within the robot operating area 318 supplies cooling for the robot 300. The test electronics compartment 800 is substantially isolated from the test slot compartment 700 such that air flow between the test electronics compartment 800 and the test slot compartment 700 is substantially inhibited from the rear. Air flowing within the robot operating area 318, e.g., from the test electronics compartment 800, is then allowed to pass over the first open ends 525 of the test slots 500, which face into the robot operating area 318, but the test slot compartment 700 is substantially isolated from the robot operating area 318 while the transporters 400 are in place within the test slots 500. The isolation of the test slot compartment 700 and the test electronics compartment 800 provides for distinct and separate air circulation systems for allowing separate air flows to regulate temperatures of the test slots 500 in the test slot compartment 700 and the test electronics 160 in the test electronics compartment 700. As discussed above, the test slot compartment 700 includes one air circulation system that includes air moving from the robot operating area 318, across the heat exchanger 810 and the test electronics 160 via the blower 816, and back to the robot operating area 318. And, as discussed in greater detail below, the test slot compartment 700 can also include one or more separate and distinct (i.e., separate and distinct from the test electronics compartment 800) air circulation systems each including air circulating through a corresponding one of the individual test slots 500, e.g., to aid in regulating an air temperature within the corresponding one of the test slots 500. The liquid cooled heat exchanger 810 condenses moisture 40 out of the air flow 815, which helps to keep the racks 100 free of humidity. Moisture 40 accumulates on the heat exchanger 810 and then drips off into drip pan 42 provided at the bottom of the test electronics compartment 800. As shown in FIG. 11B, a float sensor 44 may be installed in the drip pan 42 to provide signal information regarding the quantity of fluid in the drip pan 42 to the system controller (computer 130). When signals from the float sensor 44 indicate that a fluid level in the drip pan 42 exceeds a predetermined maximum, the computer 130 can sound an alarm and/or stop operation of the associated test rack 100. The test electronics compartment 800 may include one or more temperature sensors 48 for measuring the temperature within the test electronics compartment 800. The one or more temperatures can be in electrical communication with the system controller (computer 130), e.g., via the test electronics 160.

Figure 12:
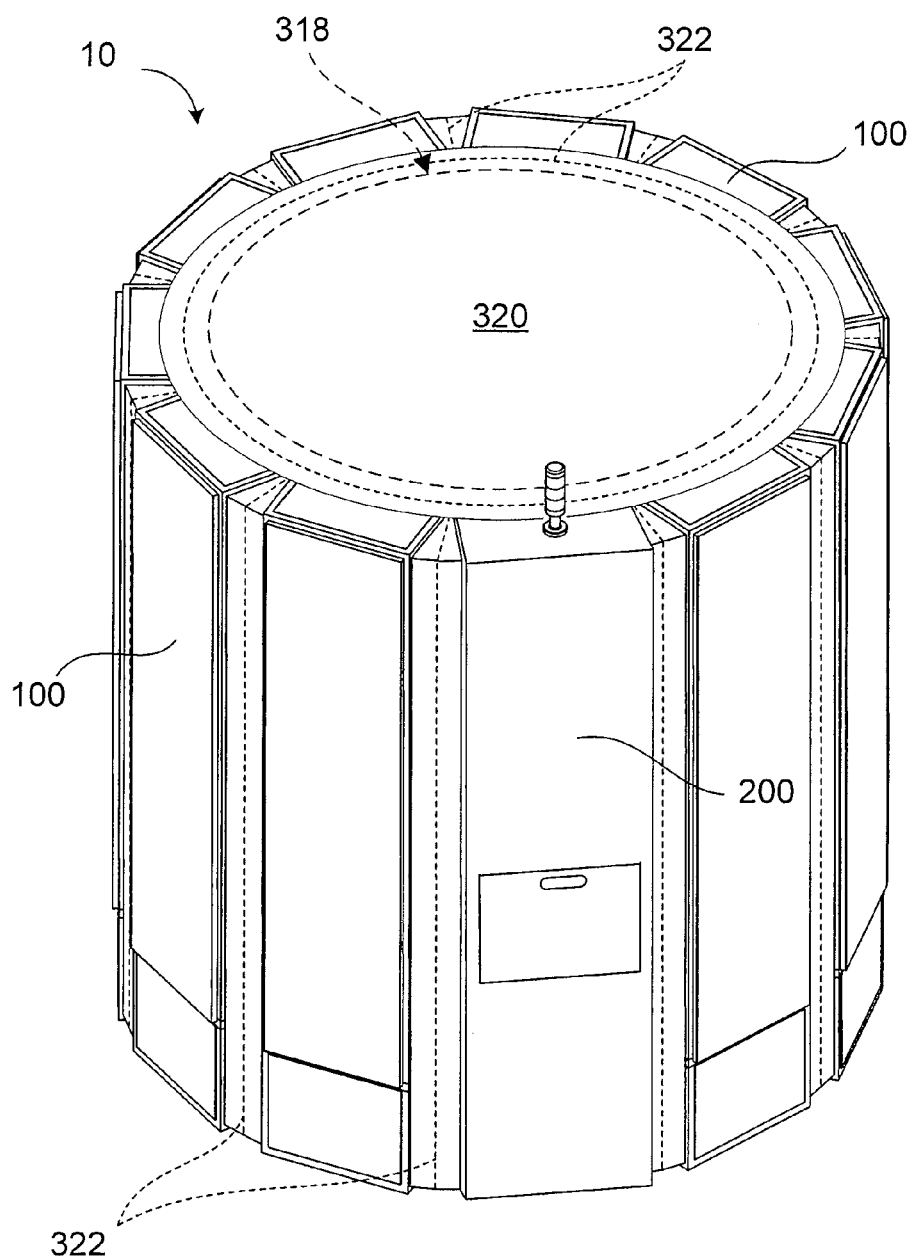
FIG. 12 is a perspective view of a disk drive testing system with an enclosed robot operating area.

As shown in FIG. 12, in some cases, the robot operating area 318 can be enclosed with a cover 320 to limit air exchange between the test electronics compartments 800 of the racks 100 and the environment. The cover 320 can be, e.g., a sheet metal part that is fastened (e.g., with screws) to the test racks 100. A seal or gasket material 322 (shown in dashed lines) can be provided between the cover 320 and the test racks 100 and/or between adjacent ones of the test racks 100 to limit air exchange between the robot operating area 318 and the external environment. The enclosed structure can help to further reduce humidity within the robot operating area 318 and the test electronics compartments 800. The enclosing structure can also reduce the amount of dust within the robot operating area 318 and the test electronics compartments 800. The cover 320 also contributes to the overall structural stability of the disk drive testing system 10 as a whole. Each test rack 100 can also be provided with an air filter 46 (FIG. 11B) to aid in reducing dust within the racks 100. Within each rack 100, the air filter 46 can be mounted either at the inlet face 817 of the heat exchanger 810 or at the inlet 818 of the blower 816.

Test Slot Thermal Control System

Figure 13:
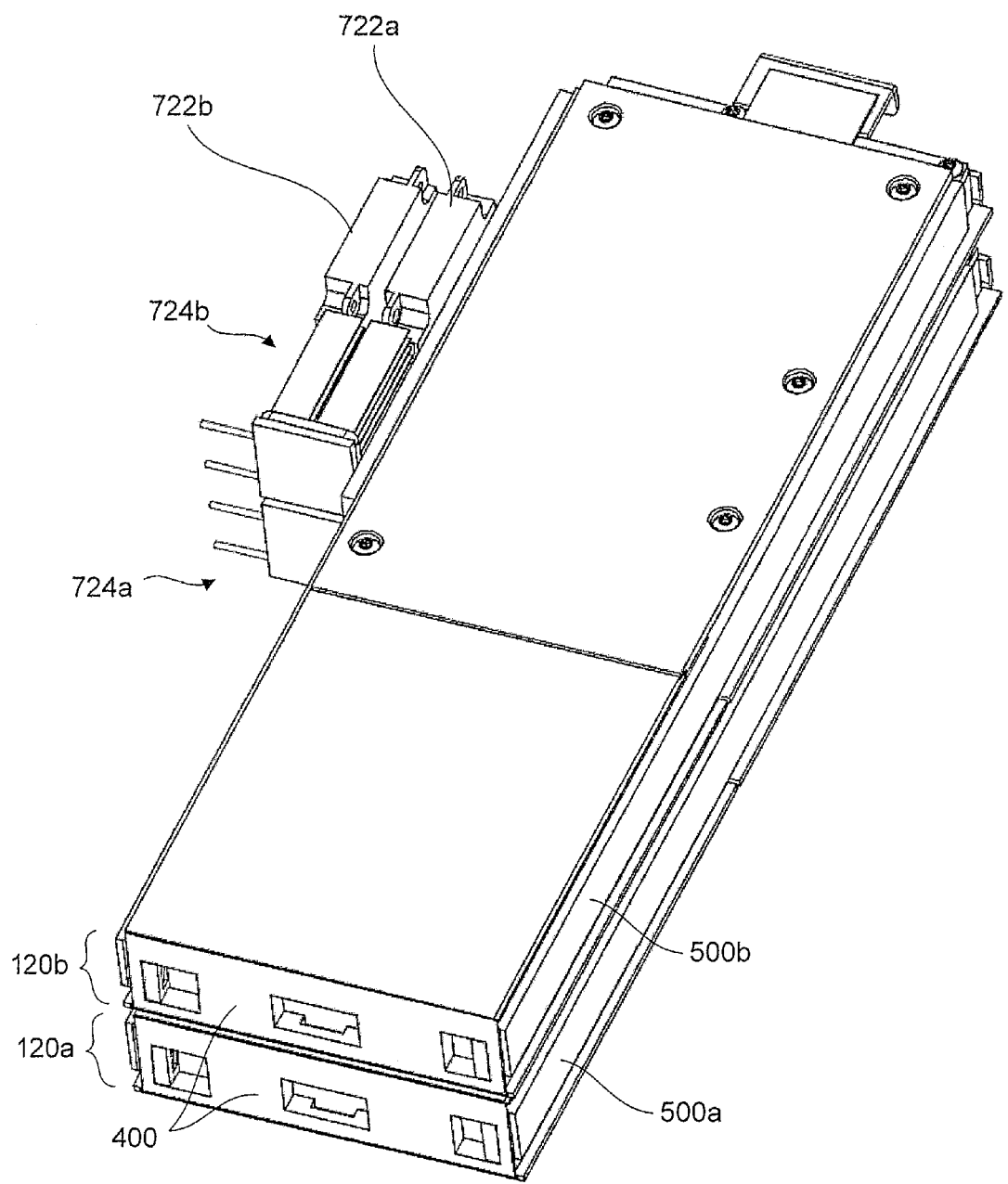
FIG. 13 is a perspective view of a pair of test slot assemblies.

Within each slot bank 110 the test slot assemblies 120 are arranged in pairs. As shown in FIG. 13, each pair of test slot assemblies 120 includes a lower test slot assembly 120a and an upper test slot assembly 120b. Referring to FIGS. 13 and 14A-14C, for each pair of test slot assemblies, the lower test slot assembly 120a includes a first test slot 500a, one of the disk drive transporters 400, a first air mover (e.g., a first blower 722a), and a first electric heatpump assembly 724a. Similarly, the upper test slot assemblies 120b each include a second test slot 500b, one of the disk drive transporters 400, a second air mover (e.g., a second blower 722b), and a second electric heatpump assembly 724b.

Figure 15A:
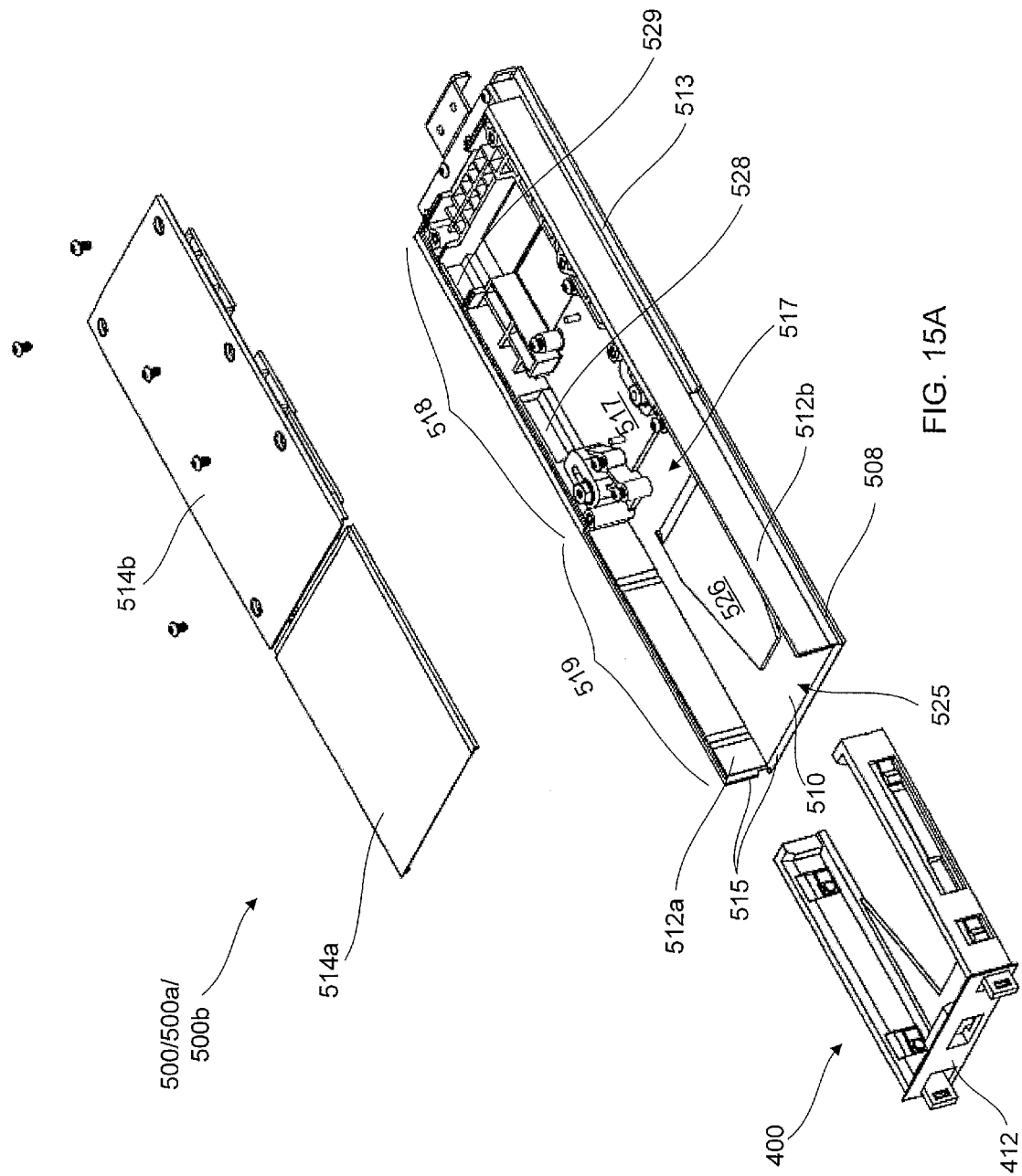
FIGS. 15A and 15B are exploded perspective views of a test slot assembly.
Figure 15B:
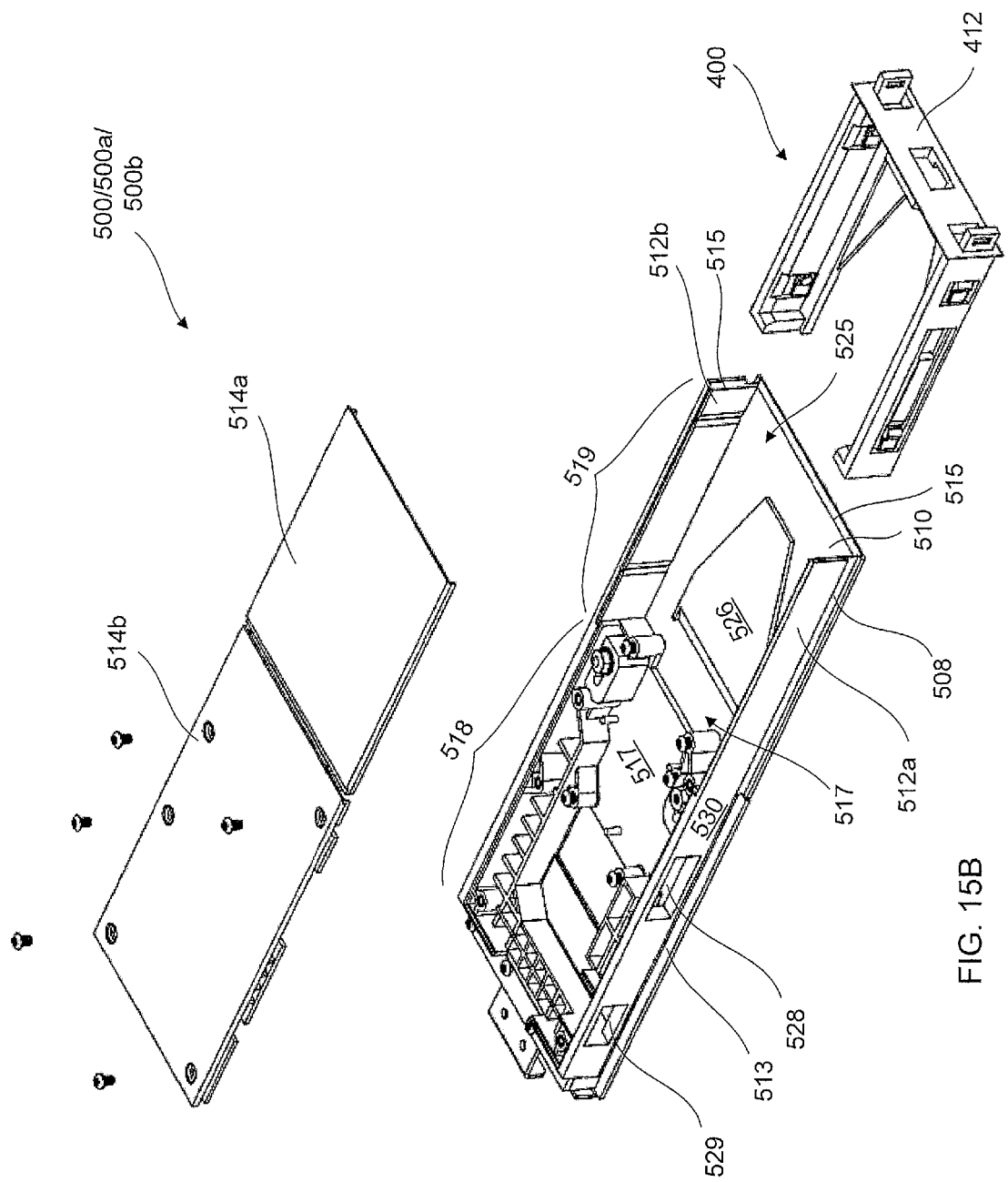

As shown in FIGS. 15A and 15B, each of the first and second test slots 500a, 500b includes a housing 508 having a base 510, first and second upstanding walls 512a, 512b and first and second covers 514a, 514b. The housing 508 is supported on a mounting plate 513. The housing 508 defines an internal cavity 517 which includes a rear portion 518 and a front portion 519. The front portion 519 defines a test compartment 526 for receiving and supporting one of the disk drive transporters 400. The base 510, upstanding walls 512a, 512b, and the first cover 514a together define a first open end 525, which provides access to the test compartment 526 (e.g., for inserting and removing the disk drive transporter 400), and the beveled edges 515, which abut the complementary beveled edges 417 of the face plate 412 of a disk drive transporter 400 inserted in the test slot 500a, 500b to provide a seal that inhibits the flow of air into and out of the test slot 500a, 500b via the first open end 525. In some cases, for example, the beveled edge 515 of the test slot 500a, 500b and/or the beveled edges 417 of the transporter 400 may include a seal or gasket material (e.g., foam insulation) to help to further inhibit the flow of air into and out of the test slot 500a, 500b via the first open end 525. The first upstanding wall 512a defines an inlet aperture 528 and an outlet aperture 529. The inlet and outlet apertures 528, 529 extend between an outer surface 530 (FIG. 15B) of the housing 508 and the internal cavity 517.

Figure 16:
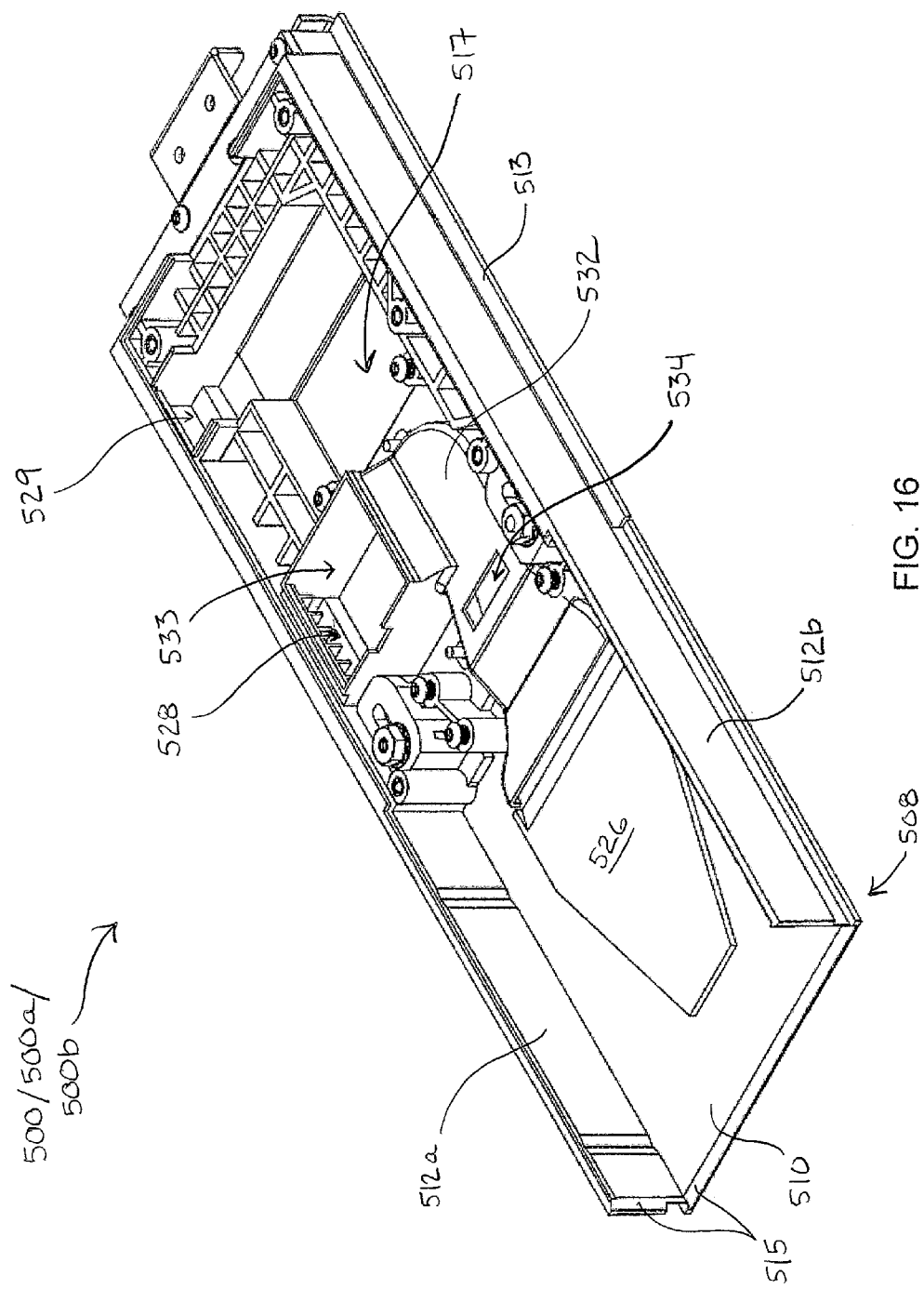
FIG. 16 is an perspective view of a test slot including a ducting conduit.
Figure 17:
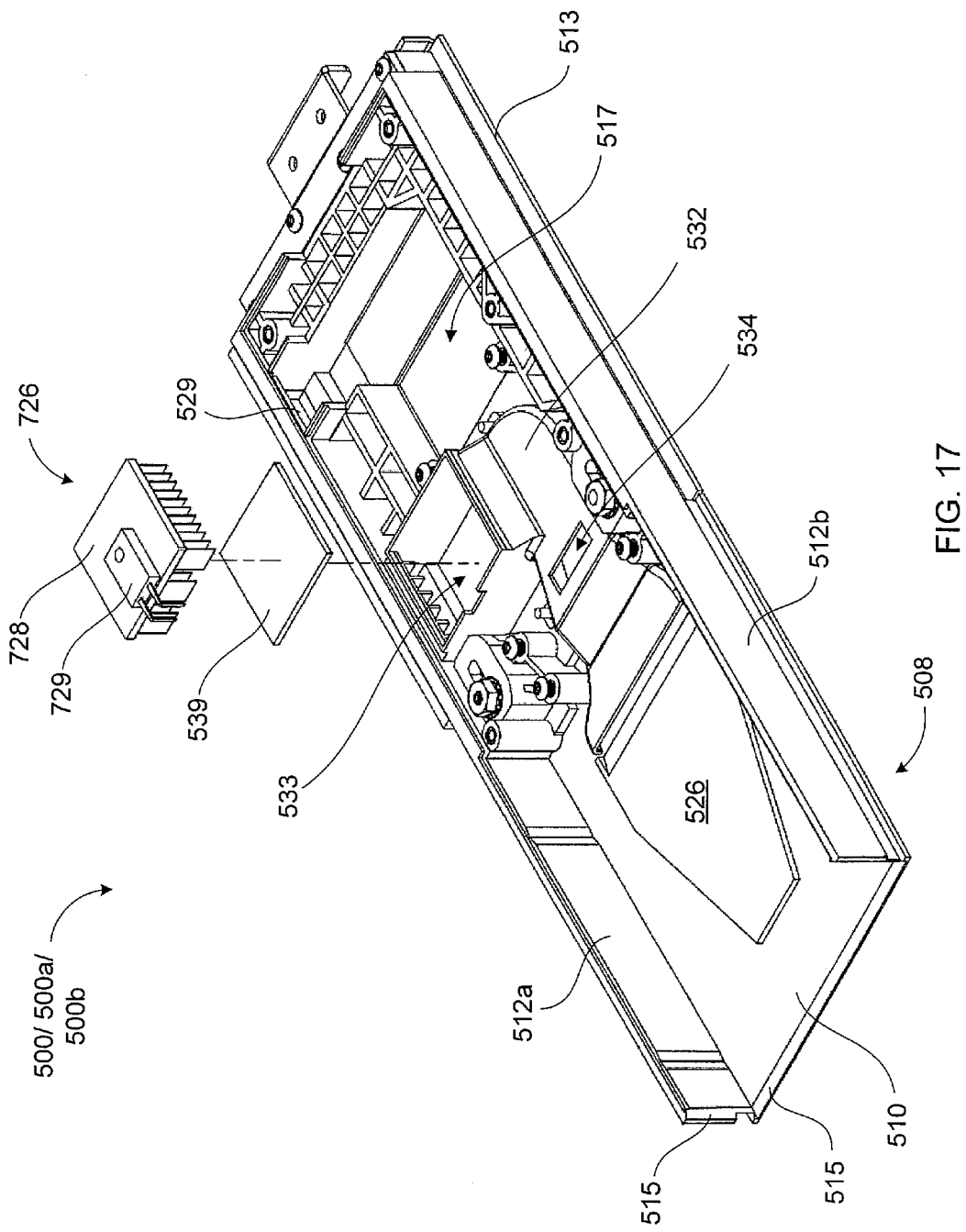
FIGS. 17 and 18 are perspective views of the test slot of FIG. 16 including an electric heating assembly.
Figure 18:
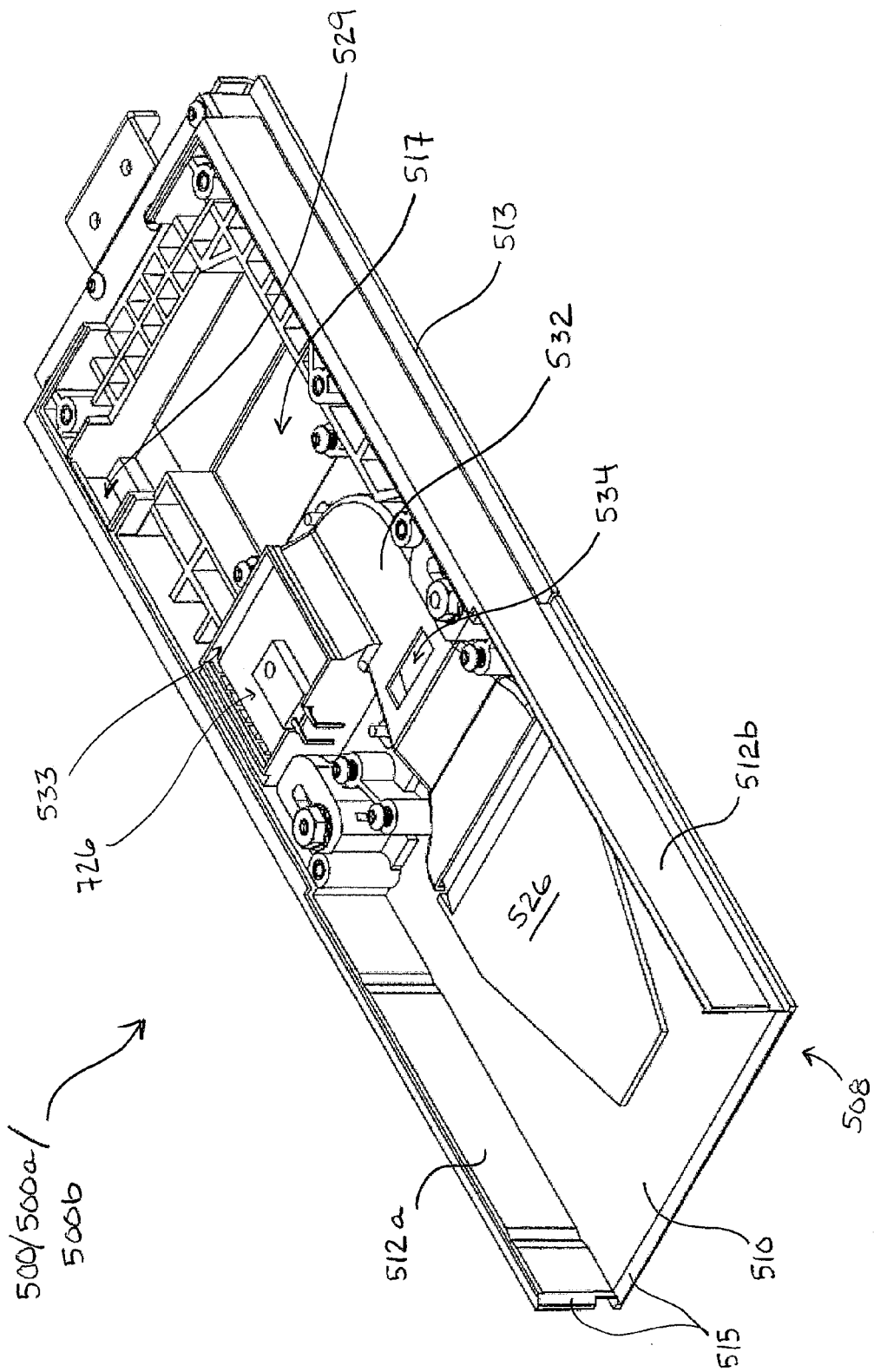

As shown in FIG. 16, the test slot 500a, 500b also includes a ducting conduit 532 disposed within the internal cavity 517. The ducting conduit 532 is configured to convey an air flow from the inlet aperture 528 towards the test compartment 526. The ducting conduit 532 is configured to direct an air flow underneath a disk drive 600 disposed within the test compartment 526, with a return air flow to flow over the disk drive 600 and back towards the outlet aperture 529. As illustrated in FIG. 17, an electric heating assembly 726 is disposed within the internal cavity 517 and is configured to heat an air flow being conveyed through the ducting conduit 532. The electric heating assembly 726 includes a heater heatsink 728 and an electric heating device (e.g., a resistive heater 729). The resistive heaters can have an operating temperature in the range of between about 150° C. and about 175° C. As shown in FIG. 18, the electric heating assembly 726 is disposed within a first opening 533 in the ducting conduit 532. In some cases, a heatsink isolator 539 (e.g., foam insulation) can be provided to aid in isolating the transmission of vibrations between the heater heatsink 728 and the housing 508.

As shown in FIG. 19, the rear portion 518 of the internal cavity 517 houses a connection interface board 520, which carries the connection interface circuit 182 (FIGS. 9 and 10). The connection interface board 520 includes a ribbon cable 522 (e.g., a flexible circuit or cable), which provides for electrical communication between the connection interface circuit 182 and the test electronics 160 (e.g., self test system 180 and/or functional test system 190) in the associated test rack 100. The connection interface board 520 also includes a test slot connector 524, which provides for electrical communication between the connection interface circuit 182 and a disk drive 600 in the test slot 500a, 500b. As shown in FIG. 19, the test slot connector 524 can be a right angle connector and the connection interface board 520 can be mounted, within the housing 508, to be substantially coplanar with a disk drive 600 (FIG. 5) in the test compartment 526. The resistive heater 729 is electrically connected to the connection interface board 520, and is configured for electrical communication with the test electronics 160 (e.g., via the connection interface circuit 182). The resistive heater 729 is operable to convert an electric current (e.g., provided by the test electronics 160) into heat energy, which is used for heating the heater heatsink 728, which, in turn, is used to heat an air flow passing through the ducting conduit 532.

Figure 20A:
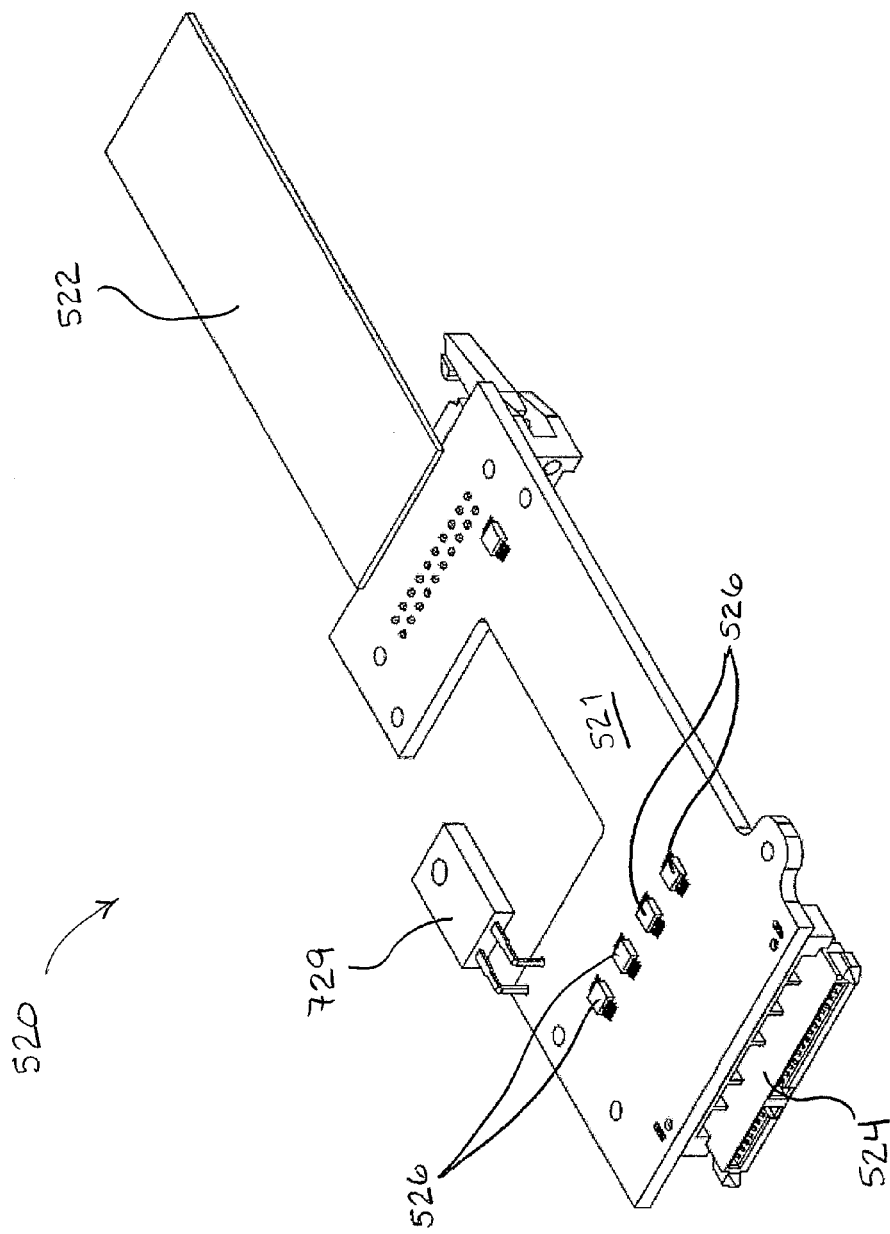
FIGS. 20A and 20B are perspective views of a connection interface board.
Figure 20B:
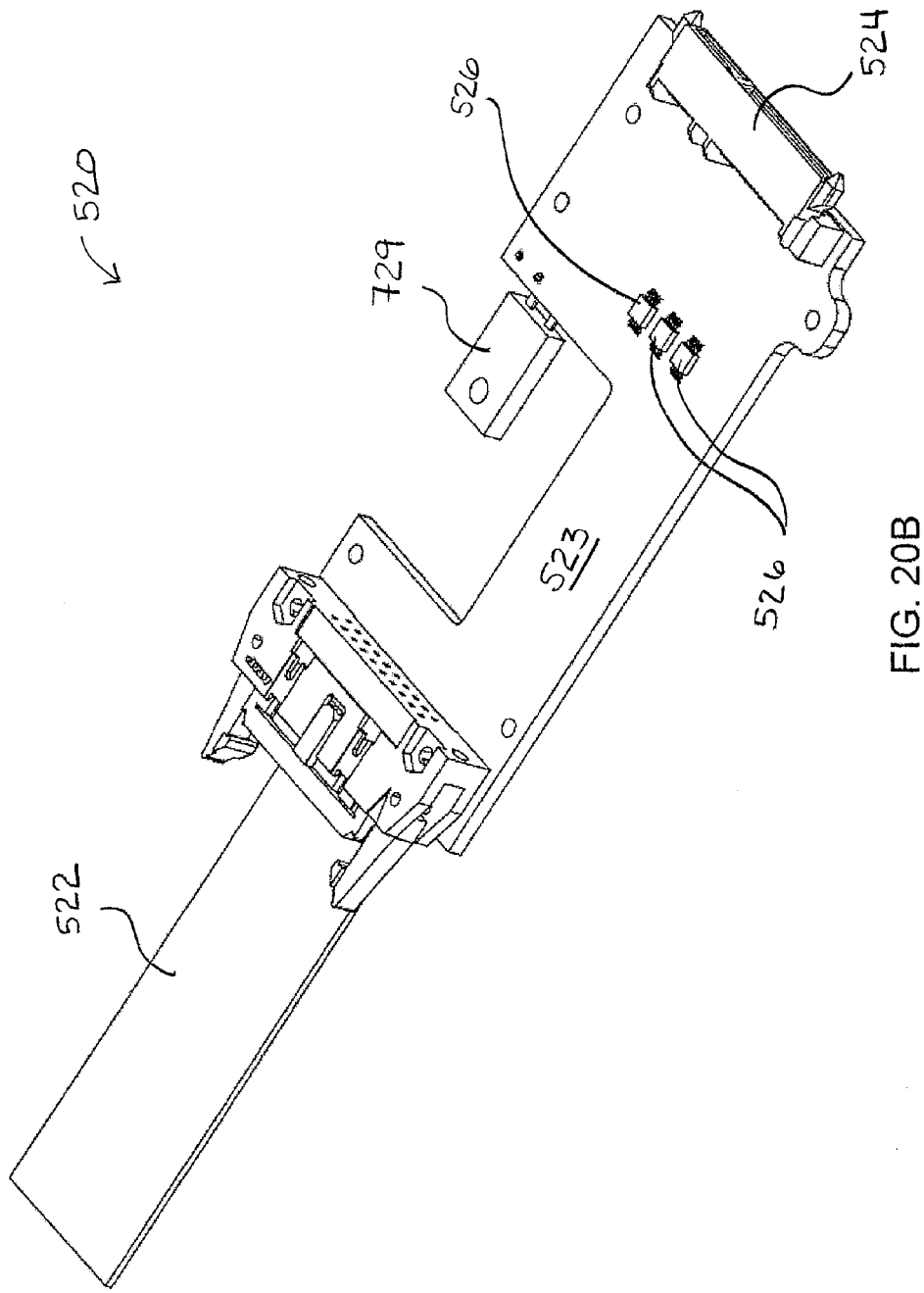

As shown in FIGS. 20A and 20B, the connection interface board 520 can also include one or more temperature sensors 526 (e.g., surface mount temperature sensors). The temperature sensors 526 are electrically connected to the connection interface board 520 and are configured for communication with the test electronics 160 via the connection interface circuit 182. The test electronics 160 can be configured to control flows of electrical current to the resistive heaters 729 and/or the electric heatpump assemblies 724a, 724b based, at least in part, on signals received from the temperature sensors 526. As shown in FIG. 20A, one or more of the temperature sensors 526 are mounted to a top surface 521 of the connection interface board 520 and are configured to measure temperature of an air flow within the rear portion 518 (FIG. 15A) of the internal cavity 517 (FIG. 15A) after having passed over a disk drive 600 (see, e.g., FIG. 8B) in the test compartment 526. As shown in FIG. 20B, one or more of the temperature sensors 526 are mounted to a bottom surface 523 of the connection interface board 520. Following assembly, the temperature sensors 526 mounted on the bottom surface 523 of the connection interface board 520 are disposed within a second opening 534 (FIG. 16) of the ducting conduit 532 and are configured to measure a temperature of an air flow within the ducting conduit 532 before the air flow reaches a disk drive 600 (see, e.g., FIG. 8B) in the test compartment 526 (FIG. 15A).

Figure 21A:
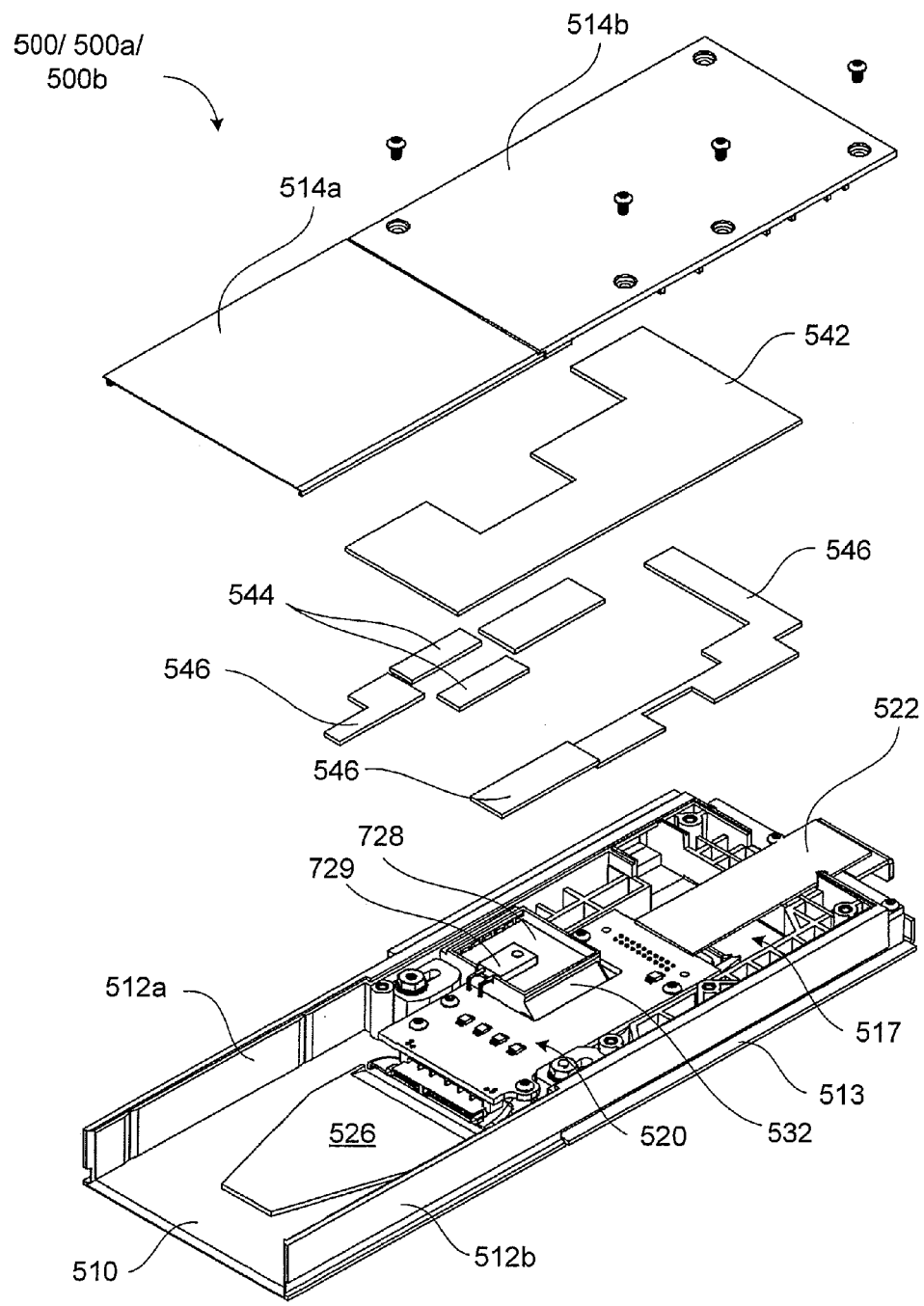
FIGS. 21A and 21B are perspective views of a test slot with insulating materials.
Figure 21B:
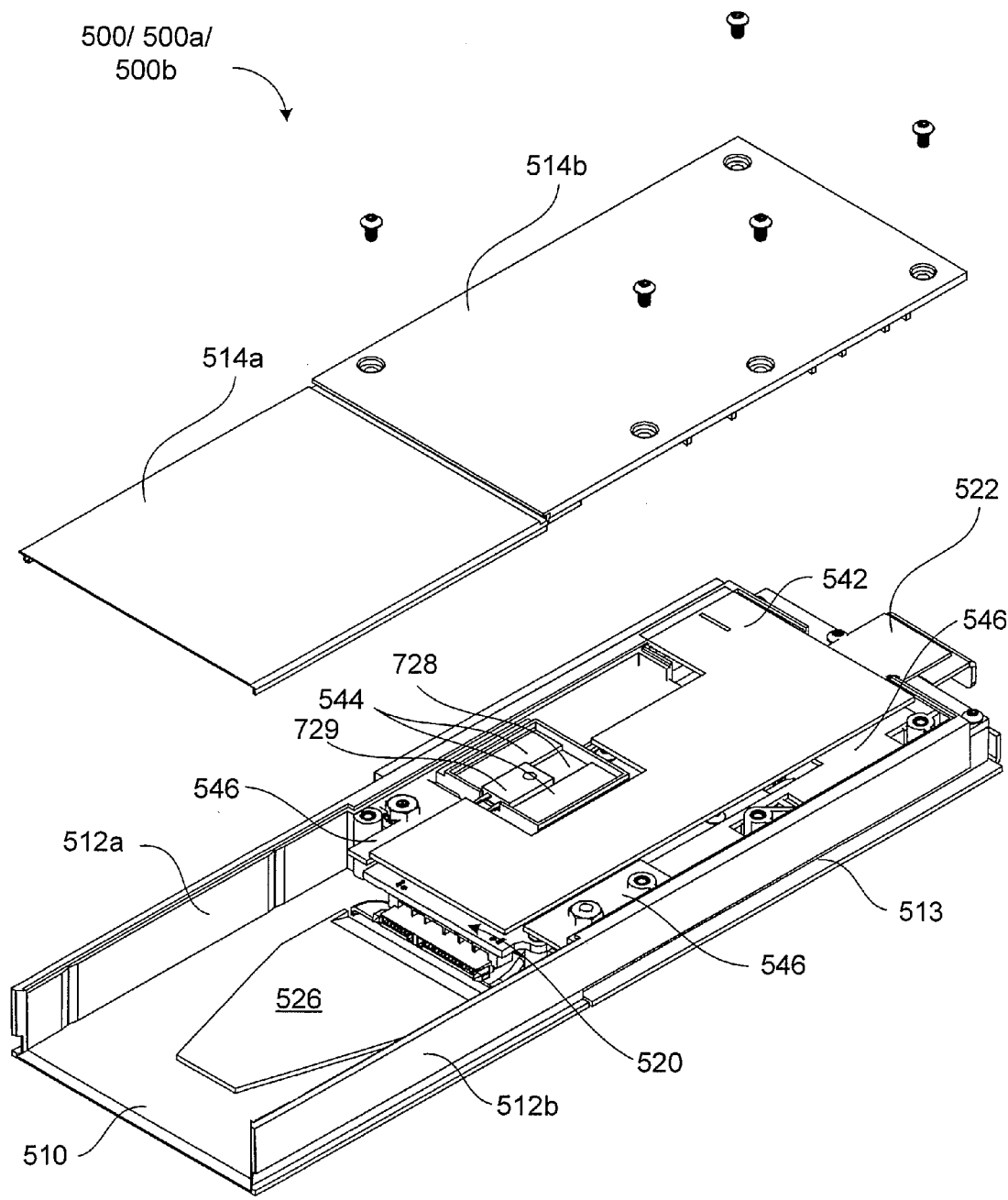
Figure 21C:
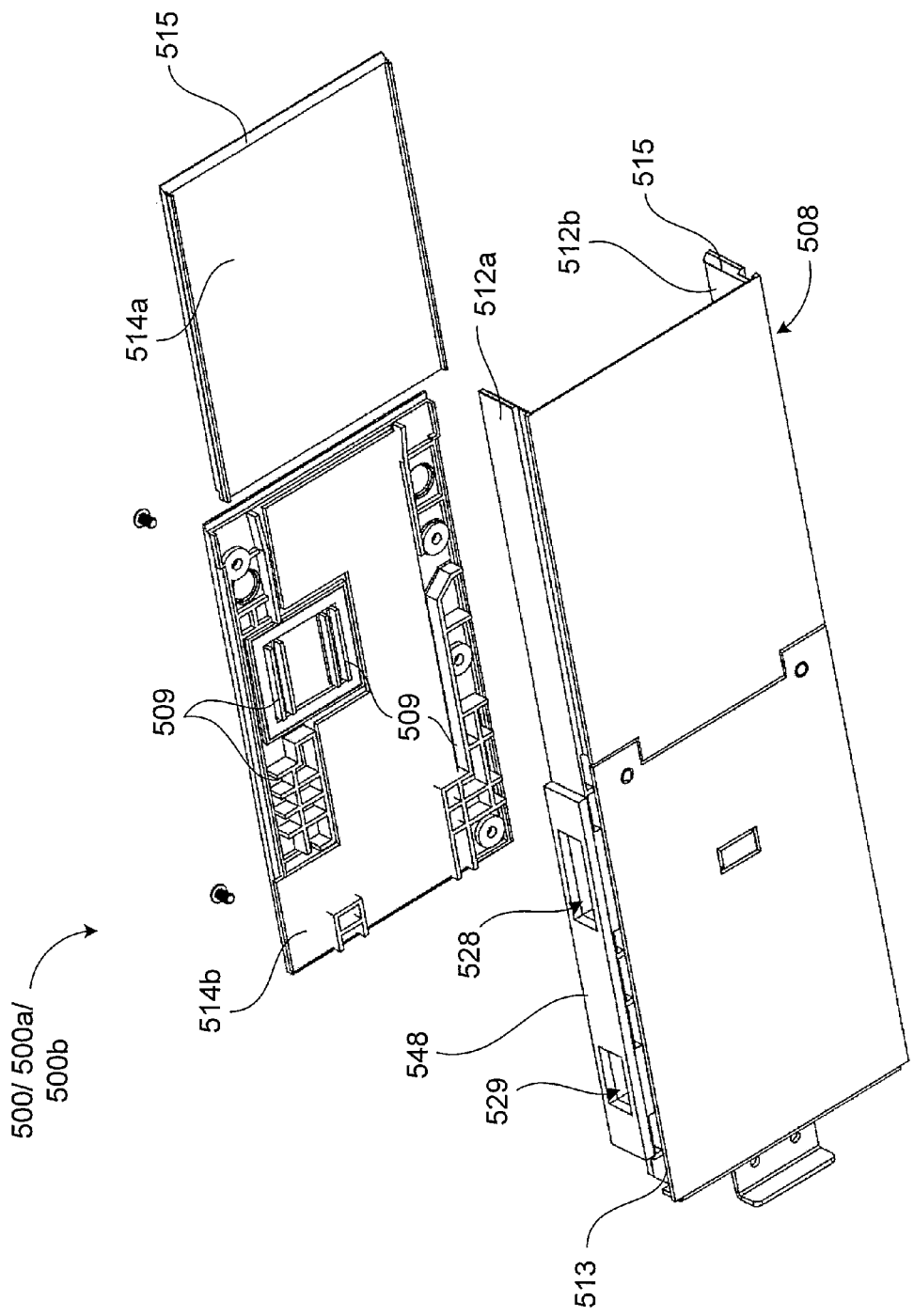
FIG. 21C is a perspective view a test slot including a second cover with protrusions for engaging insulating materials

The test slot 500a, 500b may also include insulating material(s) (e.g., foam insulation) to inhibit the exchange of thermal energy from the internal cavity 517 to the surrounding environment (e.g., through the second cover 514b). For example, as shown in FIGS. 21A and 21B, the test slot 500a, 500b, can include a first insulating member 542 disposed between the second cover 514b and the connection interface board 520. The first insulating member 542 inhibits the transfer of thermal energy between the internal cavity 517 and the environment surrounding the test slot 500a, 500b (e.g., other, neighboring test slots 500a, 500b). The first insulating member 542 can be attached to the surface of the second cover 514b that faces into the internal cavity 517. Second insulating members 544 are disposed between the heater heatsink 728 and the second cover 514b and inhibit the transfer of thermal energy therebetween and act as a spring to secure the heater heatsink 728 so that it does not vibrate. The test slot 500a, 500b may also include third insulating members 546 disposed between the internal cavity 517 along the first and second upstanding walls 512a, 512b. The third insulating members 546 help to further inhibit the transfer of thermal energy between the internal cavity 517 and the environment surrounding the test slot 500a, 500b. As shown in FIG. 21C, the second cover 514b can include protrusions 509 to compress the second and third insulating members 544 and 546 and help to secure the heater heatsink 728.

Figure 22A:
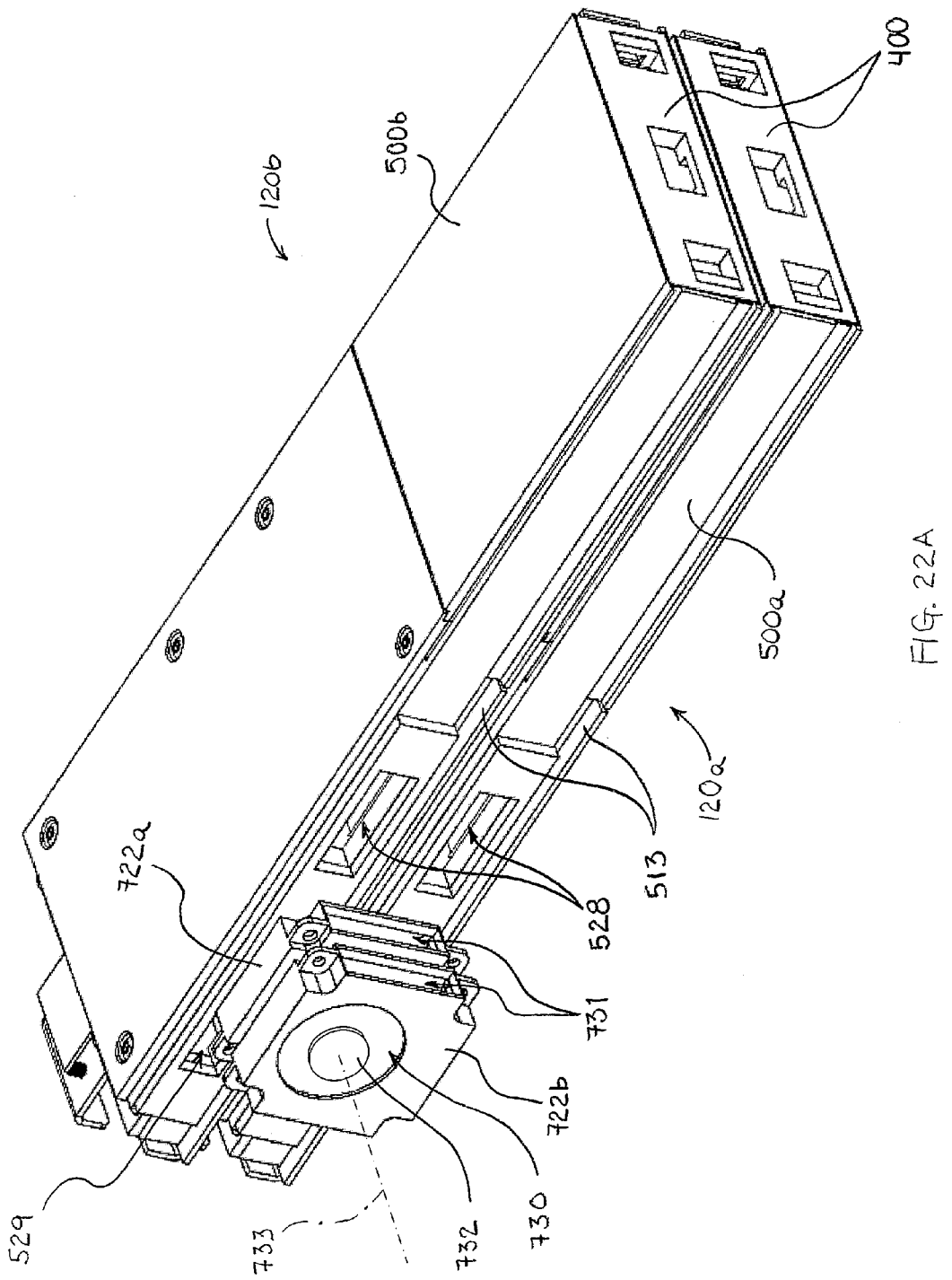
FIGS. 22A and 22B are perspective views of a pair of test slot assemblies including externally mounted air movers.
Figure 22B:
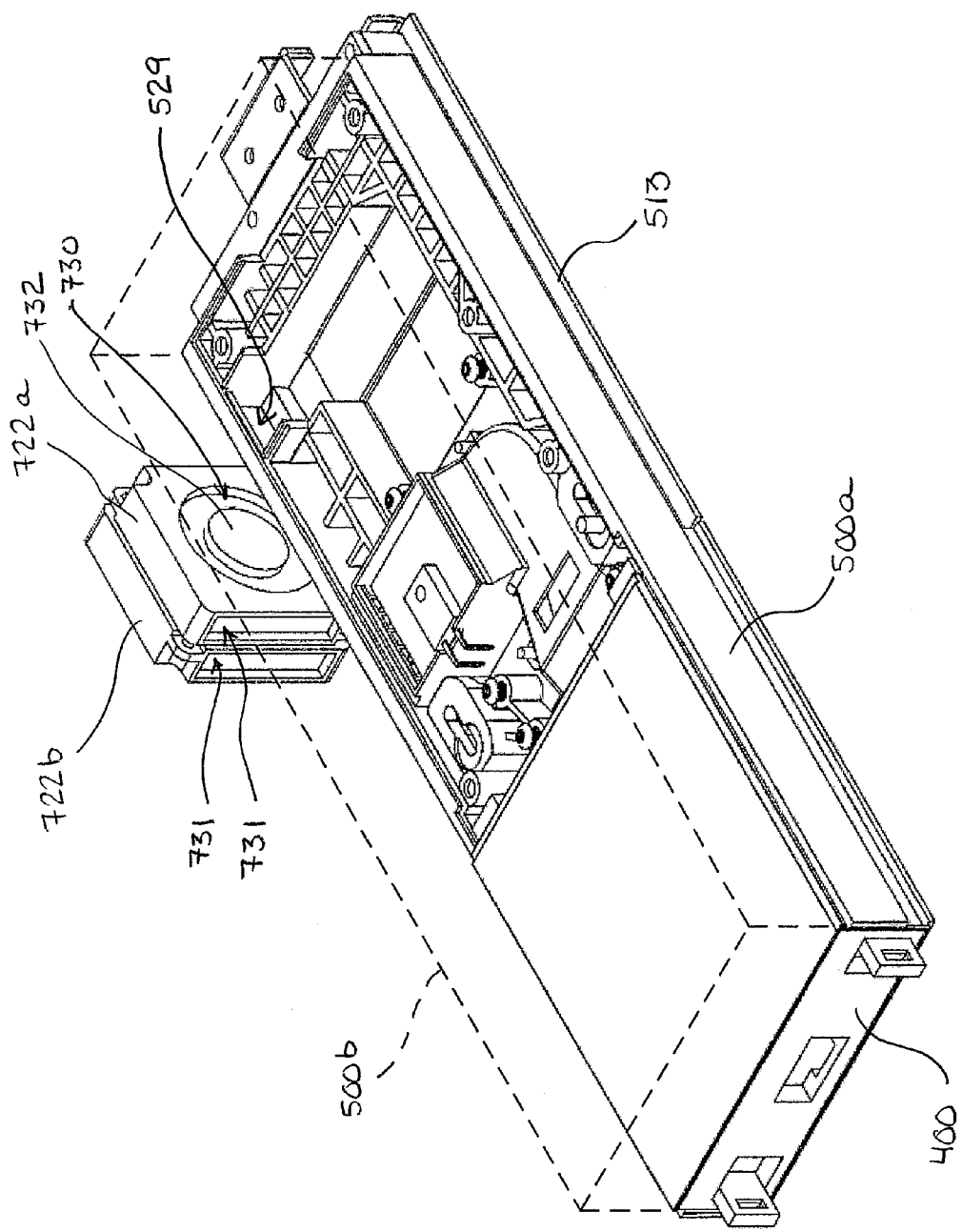

As shown in FIG. 22A, for each pair of test slot assemblies 120a, 120b, the first and second blowers 722a, 722b are disposed adjacent to and outside of their associated test slots 500a, 500b. Each of the blowers 722a, 722b has an operating speed of between about 3500 and about 7100 RPM and can provide an air flow of between about 1.66 CFM and about 3.88 CFM. Each of the blowers 722a, 722b includes an air inlet 730 and an air outlet 731. Each of the blowers 722a, 722b also includes a rotating blade 732 configured to rotate about an axis 733. The air outlet 731 of the first blower 722a is arranged in fluid communication with the inlet aperture 528 of the first test slot 500a, e.g., for providing an air flow towards the test compartment 526 of the first test slot 500a through the inlet aperture 528. As shown in FIG. 22B, the air inlet 730 of the first blower is in fluid communication with the outlet aperture 529 of the first test slot 500a, e.g., for creating a low pressure region adjacent the outlet aperture 529 in order to draw an air flow out of the internal cavity 517 through the outlet aperture 529. Similarly, referring again to FIG. 22A, the air outlet 731 of the second blower 722b is arranged in fluid communication with the inlet aperture 528 of the second test slot 500b, e.g., for providing an air flow towards the test compartment 526 of the second test slot 500b. The air inlet 730 of the second blower 722b is in fluid communication with the outlet aperture 729 of the second test slot 500b, e.g., for creating a low pressure region adjacent the outlet aperture 729 in order to draw an air flow out of the internal cavity 517 of the second test slot 500b.

Figure 23A:
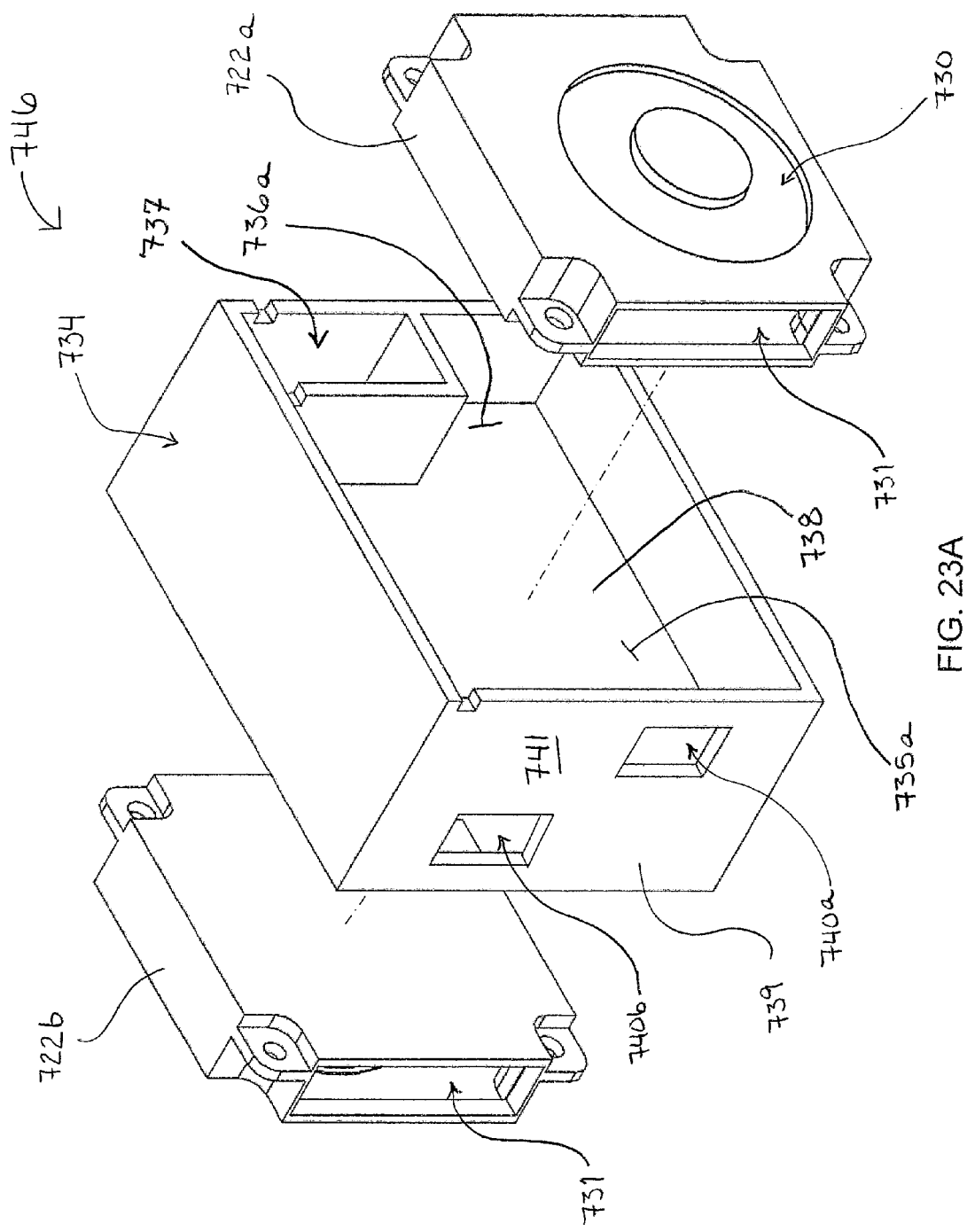
FIGS. 23A-23C are perspective views of an air mover assembly.
Figure 23B:
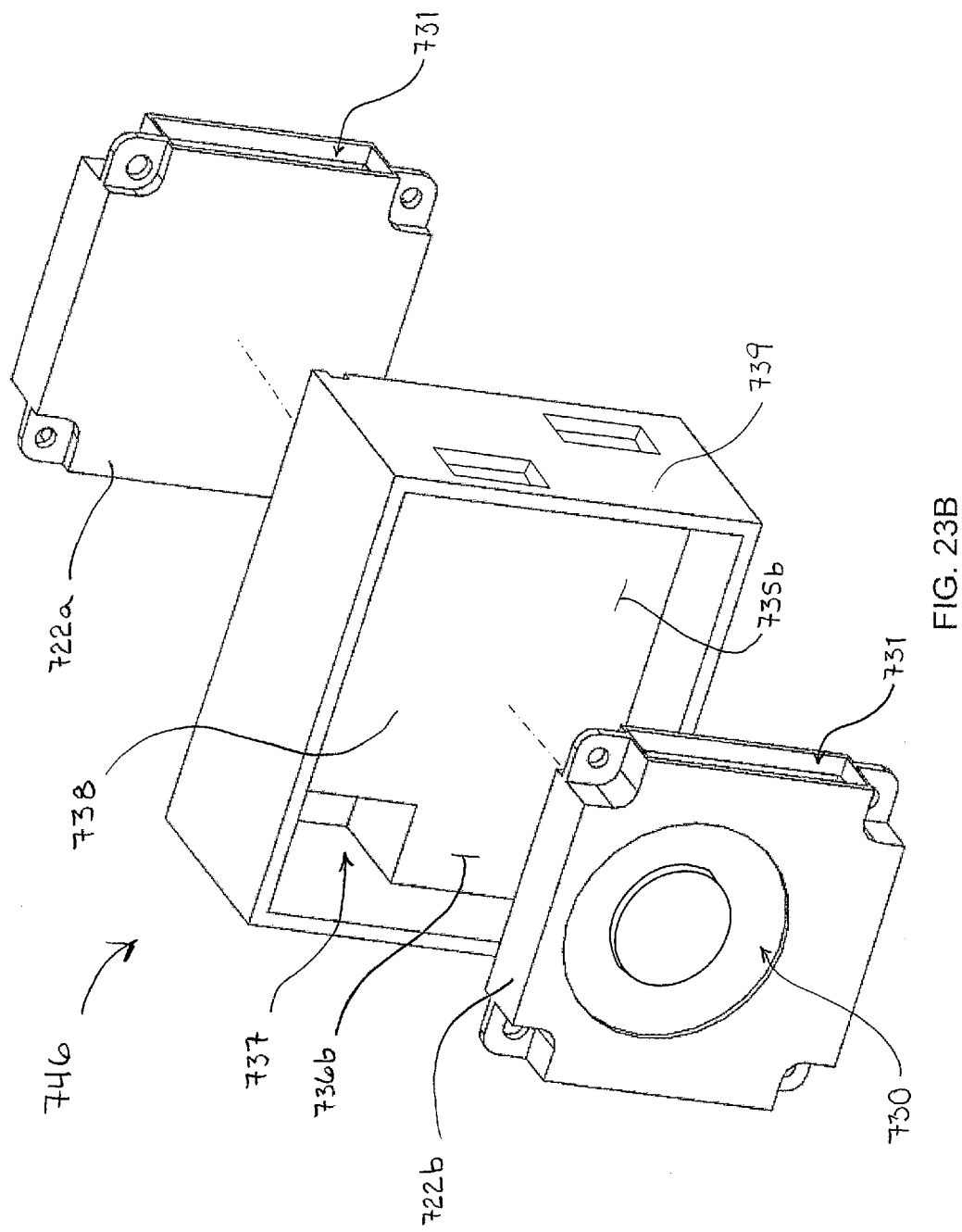
Figure 23C:
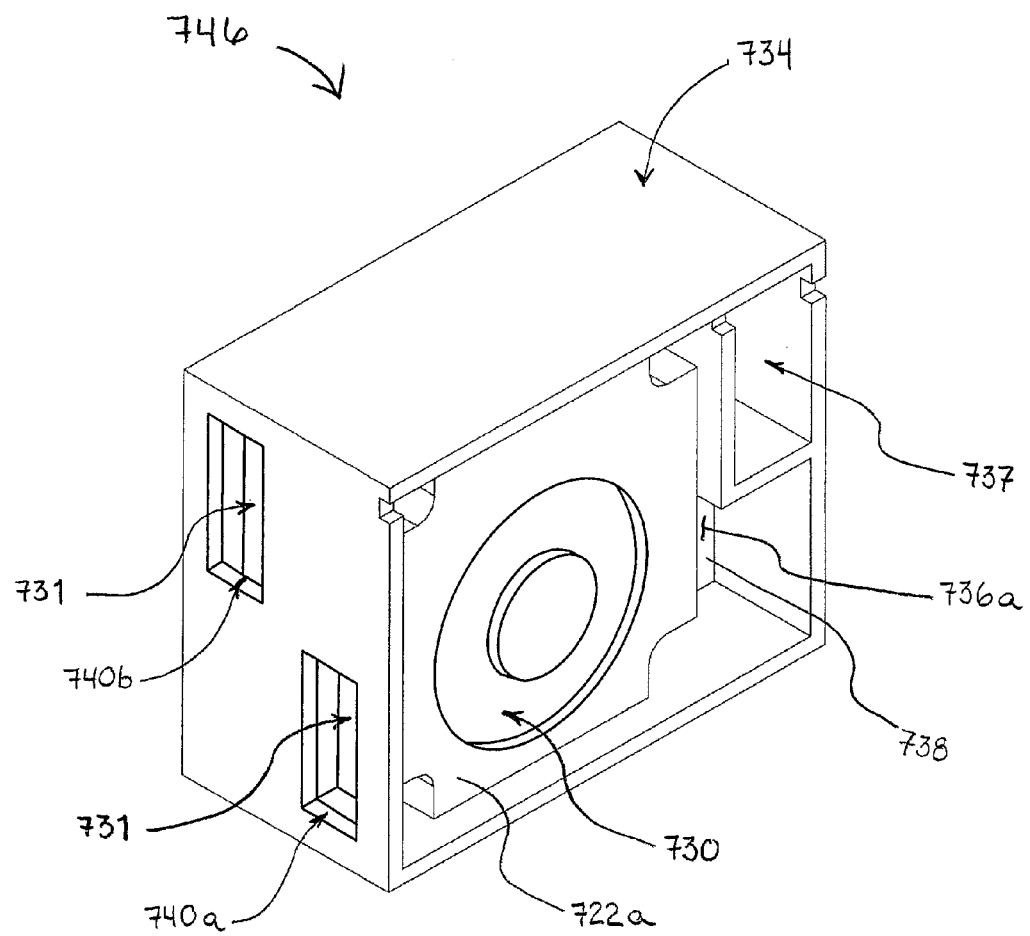
Figure 24:
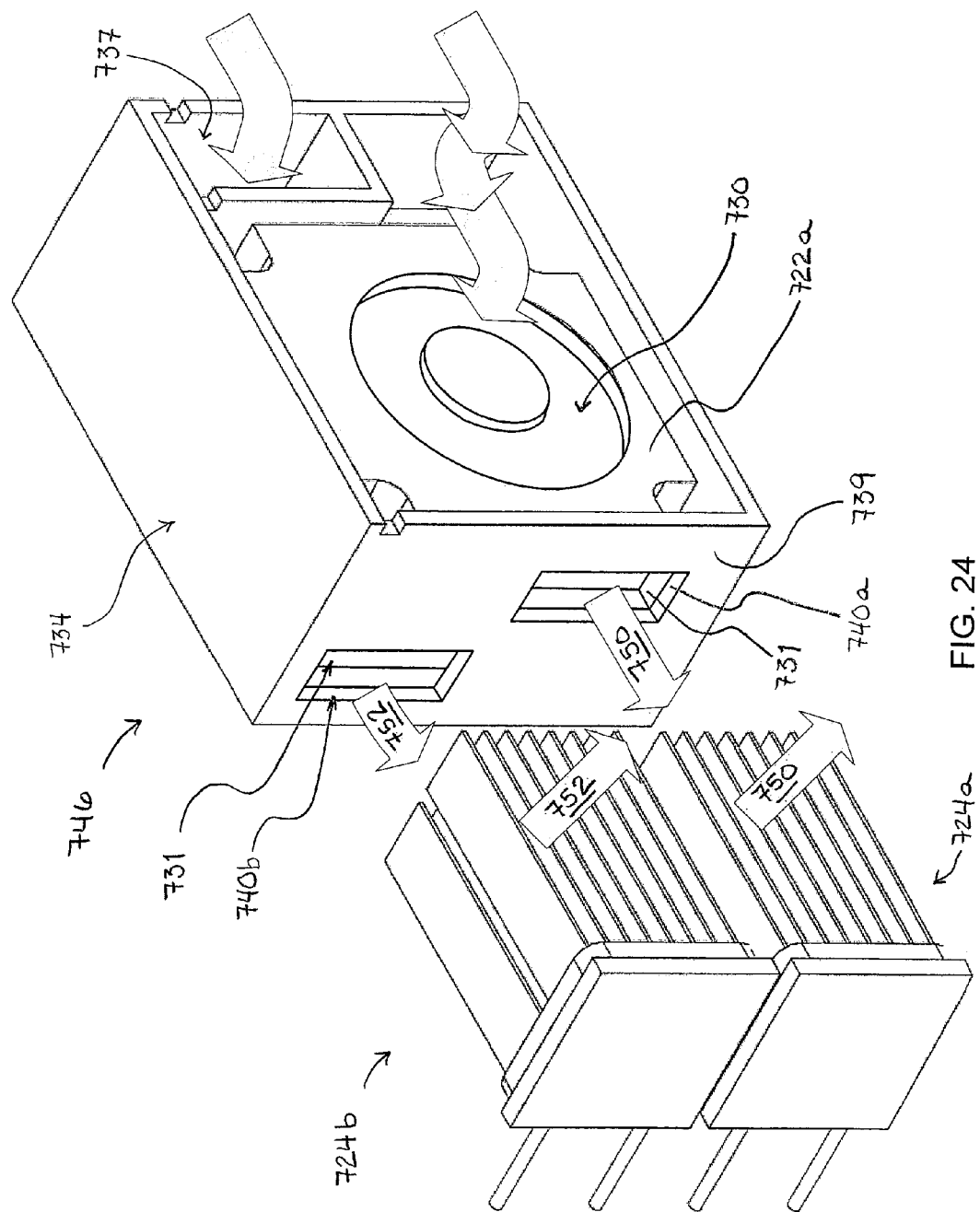
FIG. 24 is a perspective view of the air mover assembly of FIGS. 23A-23C and a pair of electric heatpump assemblies.

As illustrated in FIGS. 23A-23C, the first and second blowers 722a, 722b form part of an air mover assembly 746, which also includes an air mover housing 734. For each pair of test slot assemblies 120a, 120b (see, e.g., FIG. 13), the first and second blowers 722a, 722b can be mounted in the air mover housing 734. The air mover housing 734 can be formed (e.g., molded) from a flexible, isolating material, such as urethane, which aids in damping vibrations produced by the blowers 722a, 722b. As discussed in greater detail below, the air mover housing 734 is then mounted to the test rack chassis 102. Referring to FIGS. 23A and 23B, the air mover housing 734 defines a first pocket 735a for receiving the first blower 722a and a second pocket 735b for receiving the second blower 722b. The air mover housing 734 also defines a first ducting region 736a. Following assembly, the first ducting region 736a is substantially aligned with the outlet aperture 529 (FIG. 15A) of the first test slot 500a (FIG. 13) and acts as a duct providing for the flow of air between the outlet aperture 529 of the first test slot 500a and the air inlet 730 of the first blower 722a. The air mover housing 734 also defines a second ducting region 736b including a through-hole 737. Following assembly, the second ducting region 736b is substantially aligned with the outlet aperture 529 of the second test slot 500b and acts as a duct providing for the flow of air between the outlet aperture 529 of the second test slot 500b and the air inlet 730 of the second blower 722b. Within the air mover housing 734, the first and second blowers 722 are mounted in back-to-back relation and are separated by a dividing wall 738 of the air mover housing 734. The air mover housing 734 also includes a first sidewall 739 that defines first and second ducting apertures 740a, 740b. The first ducting aperture 740a extends from an outer surface 741 of the first sidewall 739 into the first pocket 735a, and the second ducting aperture 740b extends from an outer surface 741 of the first sidewall 739 into the second pocket 735b. As illustrated in FIG. 24, following assembly, the first ducting aperture 740a operates as a duct to direct an air flow 750 exiting the air outlet 731 of the first blower 722a towards the first electric heatpump assembly 724a, and, similarly, the second ducting aperture 740b operates as a duct to direct an air flow 752 exiting the air outlet 731 of the second blower 722b towards the second electric heatpump assembly 724b.

Figure 25:
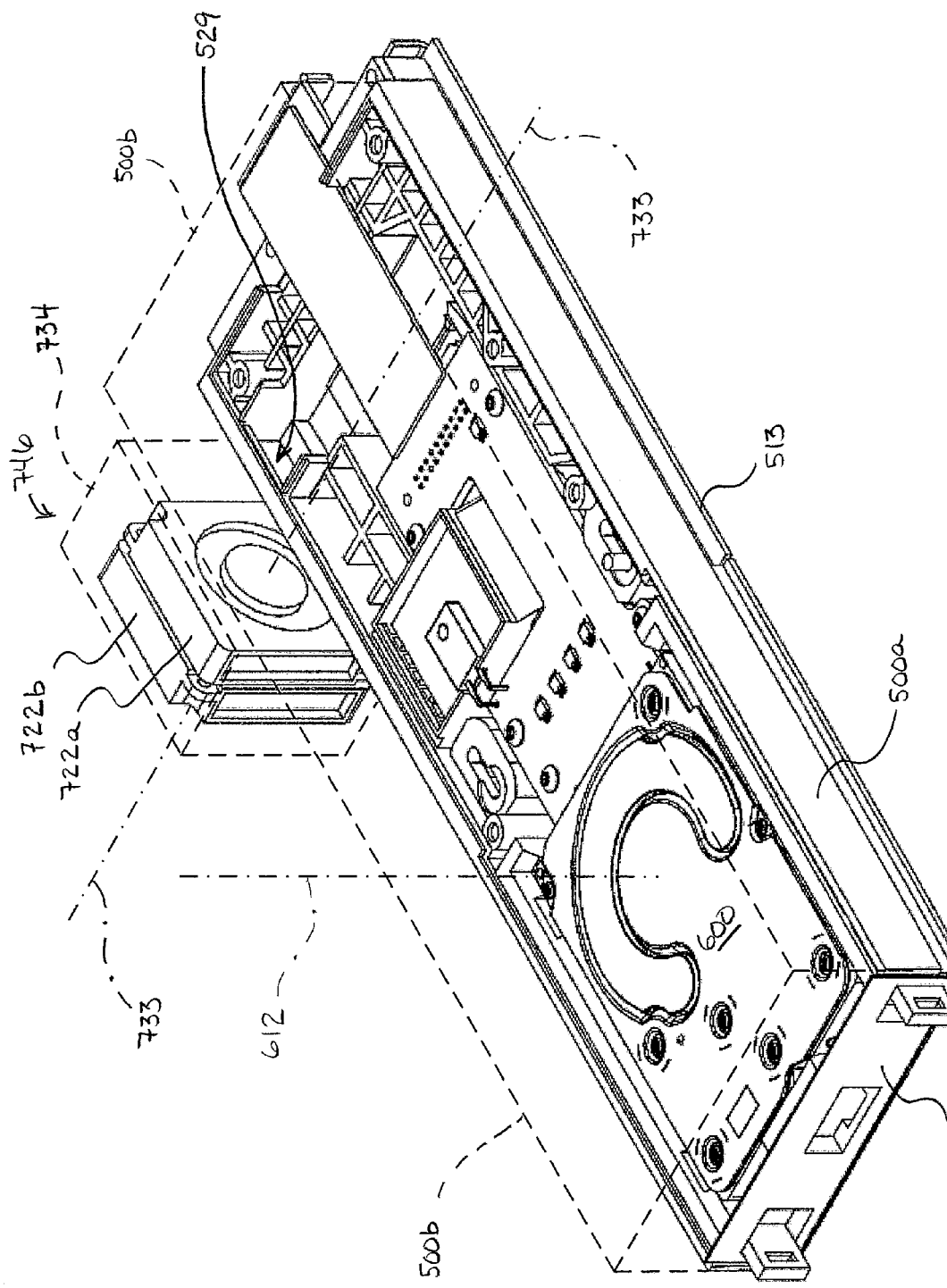
FIG. 25 is a perspective view of a pair of test slot assemblies including the air mover assembly of FIGS. 23A-23C.

As illustrated in FIG. 25, following assembly, the first and second blowers 722a, 722b are mounted such that their rotational axes 733 are substantially out-of-plane (e.g., substantially perpendicular) relative to an axis of rotation 612 of a disk drive 600 (or disk drives) in the first and/or second test slots 500a, 500b. This can aid in further isolating the disk drive(s) being tested from vibrations produced by the blowers 724a, 724b.

Figure 26:
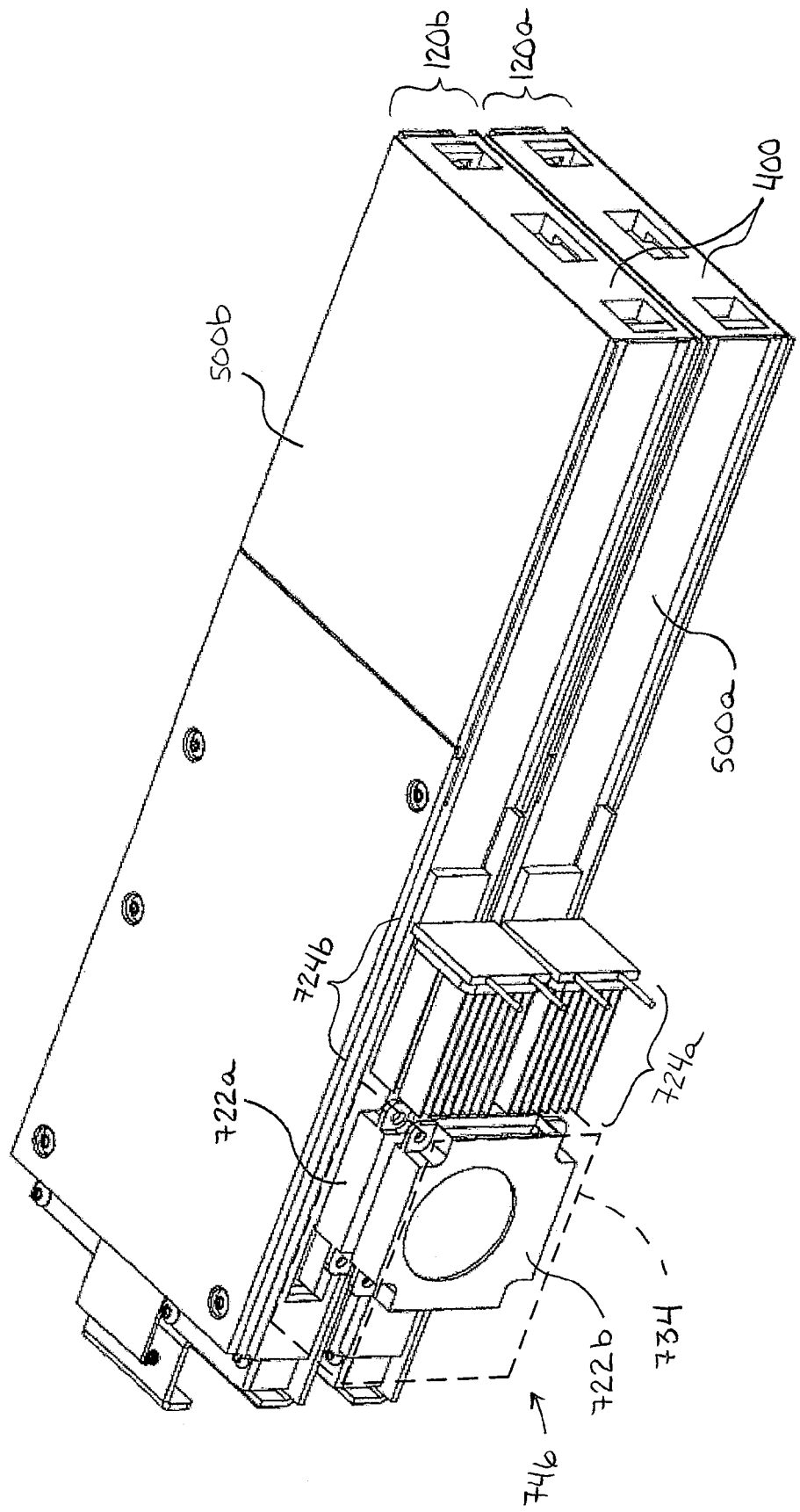
FIG. 26 is a perspective view of a pair of test slot assemblies including an associated pair of electric heatpump assemblies.
Figure 27:
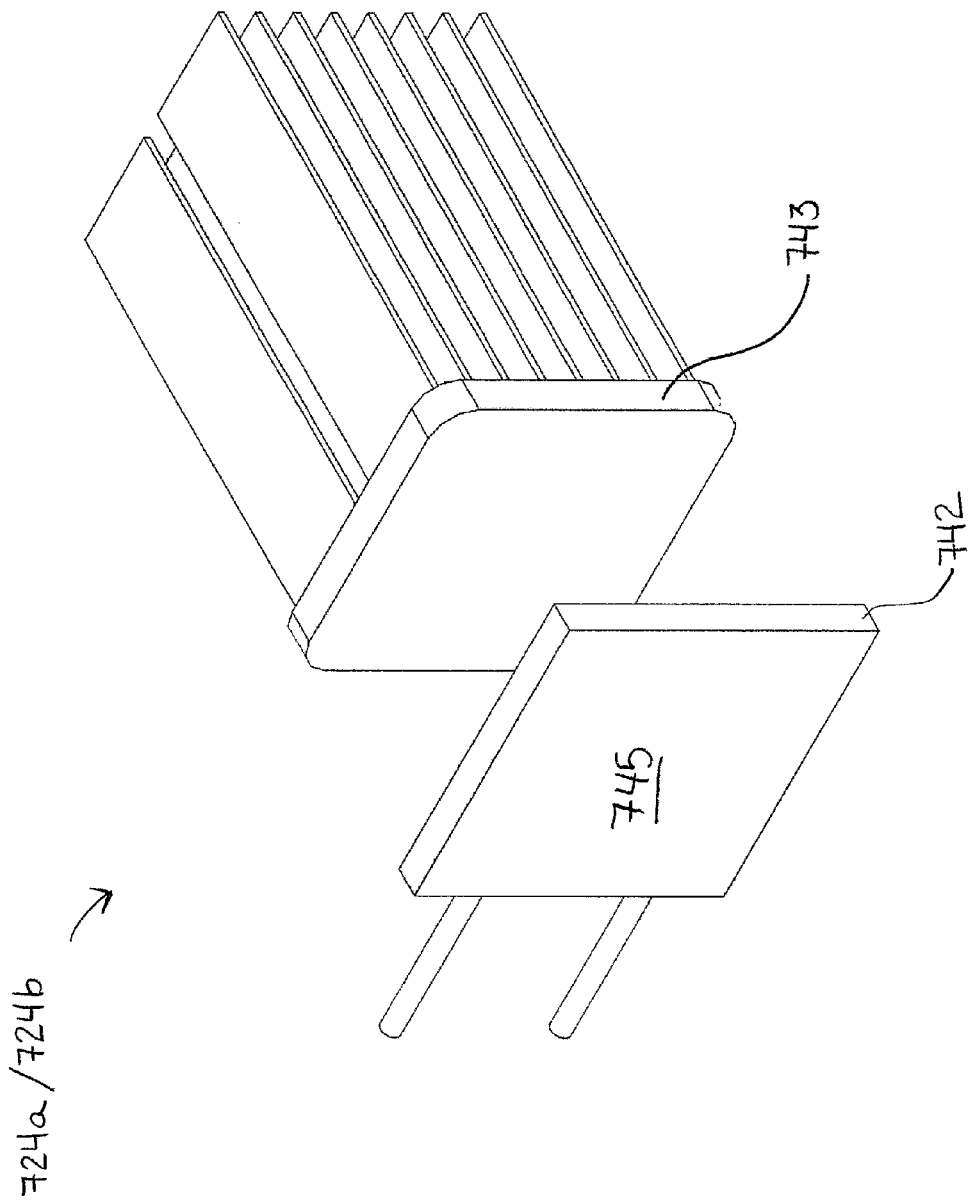
FIG. 27 is an exploded perspective view of an electric heatpump assembly.
Figure 28A:
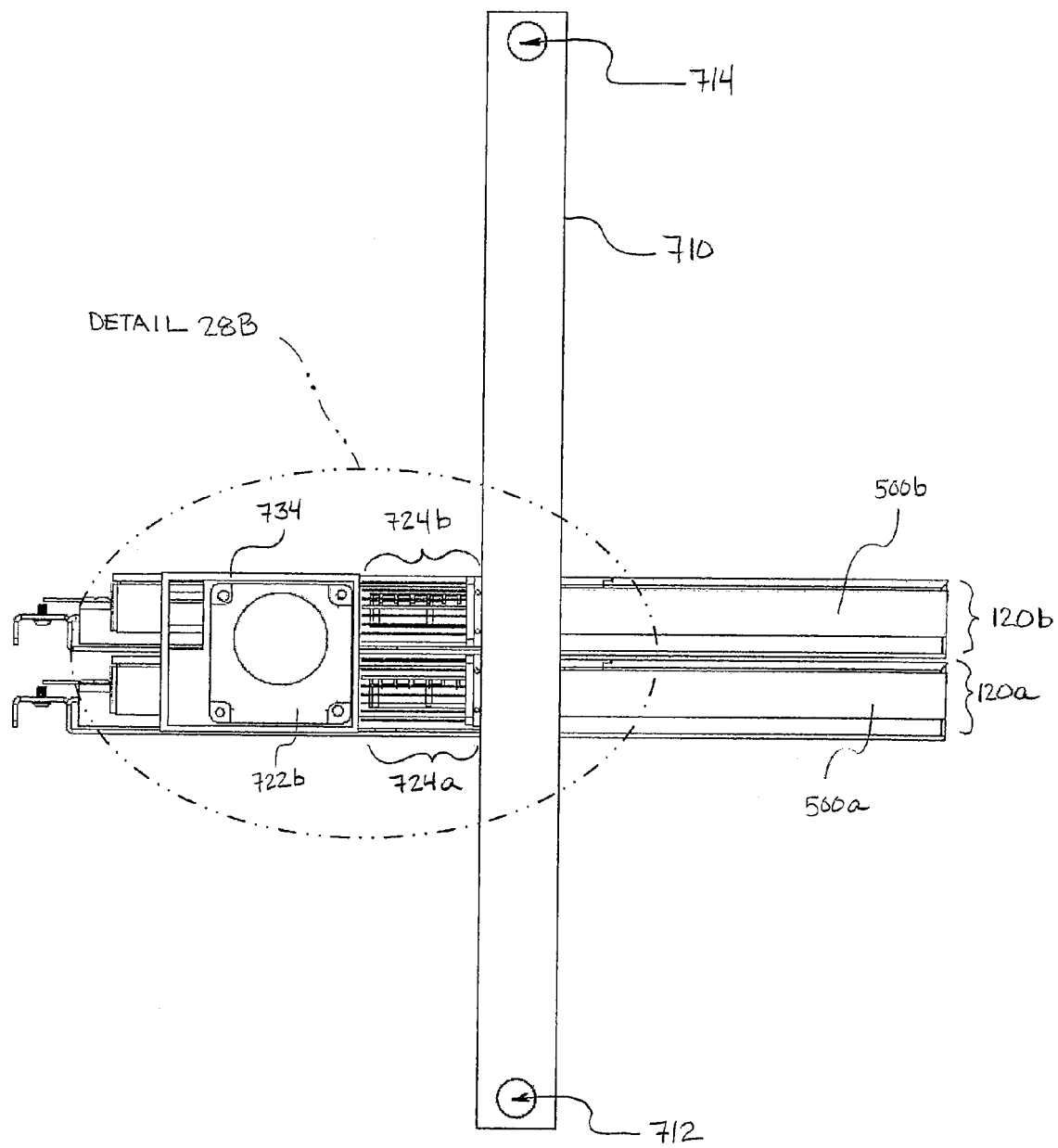
FIG. 28A is a side view showing a pair of test slot assemblies interfacing with a cooling conduit.
Figure 28B:
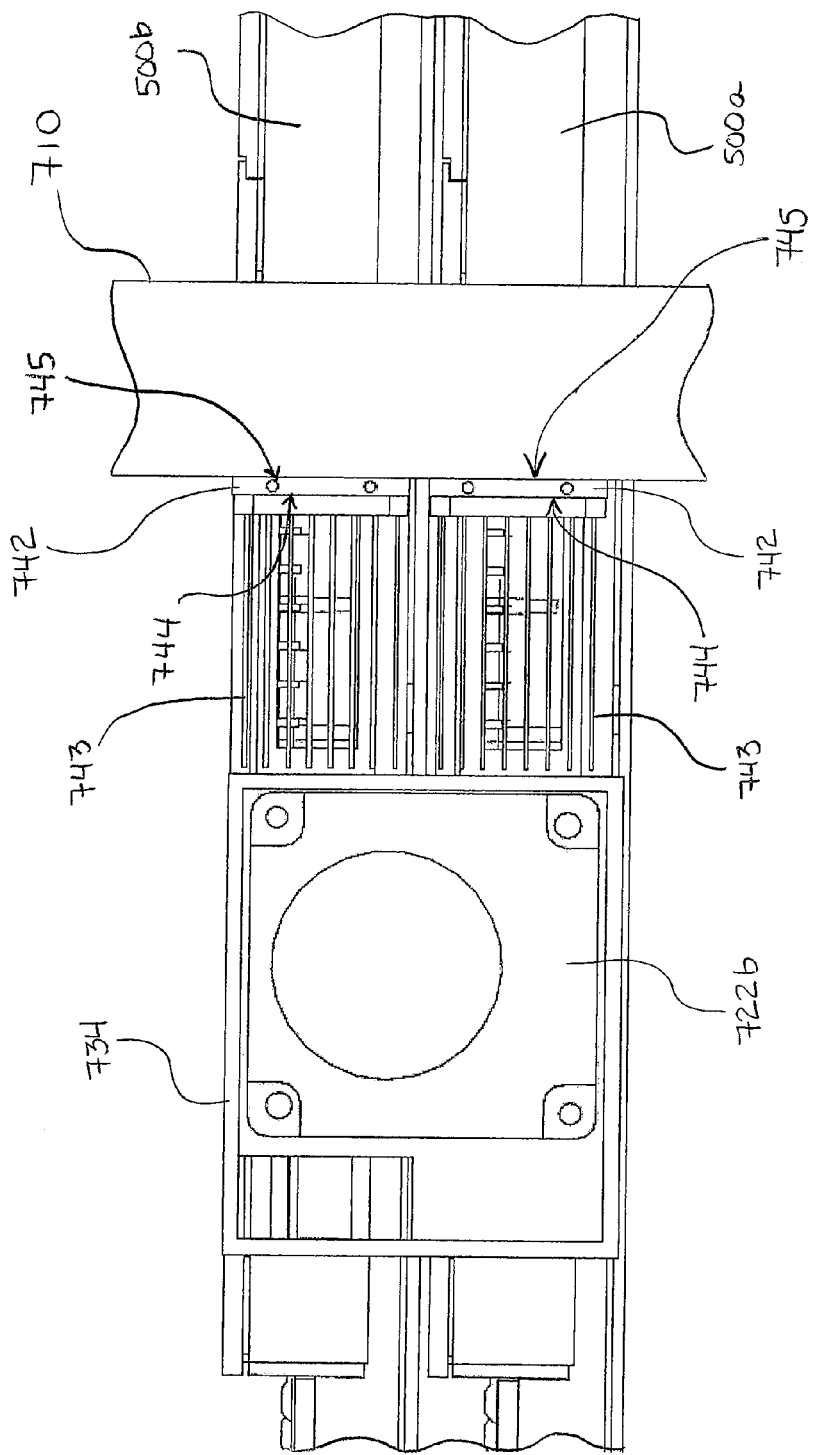
FIG. 28B is a detailed view from FIG. 28A.

As shown in FIG. 26, the first and second electric heatpump assemblies 724a, 724b are disposed adjacent to and outside of their associated test slots 500a, 500b. As shown in FIG. 27, each of the first and second electric heatpump assemblies 724a, 724b includes a thermoelectric device (e.g., a thermoelectric cooler 742, e.g., a thin film or bulk thermoelectric cooler) and a heatpump heatsink 743. As show in FIGS. 28A and 28B, a first surface 744 of the thermoelectric cooler 742 is connected to the heatpump heatsink 743 and a second surface 745 of the thermoelectric cooler 742 can be connected directly to an associated one of the cooling conduits 710. For example, the thermoelectric cooler 742 can be connected to the cooling conduit 710, e.g., with a thermally conductive epoxy, or mounted with clips. In some cases, such as when clips are used for mounting the thermoelectric coolers 742, a thermally conductive grease can be disposed between the cooling conduit 710 and the thermoelectric cooler 742 to improve heat transfer between the cooling conduit 710 and the thermoelectric cooler 742. The thermoelectric cooler 742 operates as a solid-state heatpump which transfers heat from the first surface 744 of the device to the second surface 745 as a response to the application of electrical energy. The direction of heat transfer is dependent upon the direction of current flow. For example, in the embodiment shown, the thermoelectric cooler 742 can be used for both cooling the heatpump heat sink 743 (i.e., transferring heat energy away from the heatpump heatsink 743 and towards the cooling conduit 710), and also for heating the heatsink 743 (i.e., transferring heat energy away from the cooling conduit 710 and towards the heatsink 743, e.g., for heating an air flow 750, 752 being directed towards the test compartment 526 of one of the test slots 500). The thermoelectric cooler 742 is in electrical communication with the test electronics 160, which control a current flow (i.e., a flow of electrical current) to the thermoelectric cooler 742 (e.g., based on a predetermined test algorithm and/or based on feedback from the connection interface circuit 182). The cooling conduit 710, in turn, cools the thermoelectric cooler 742 (e.g., by transferring heat from the second surface 745 of the thermoelectric cooler 742 to the chilled water flow (FIG. 11)).

Figure 29:
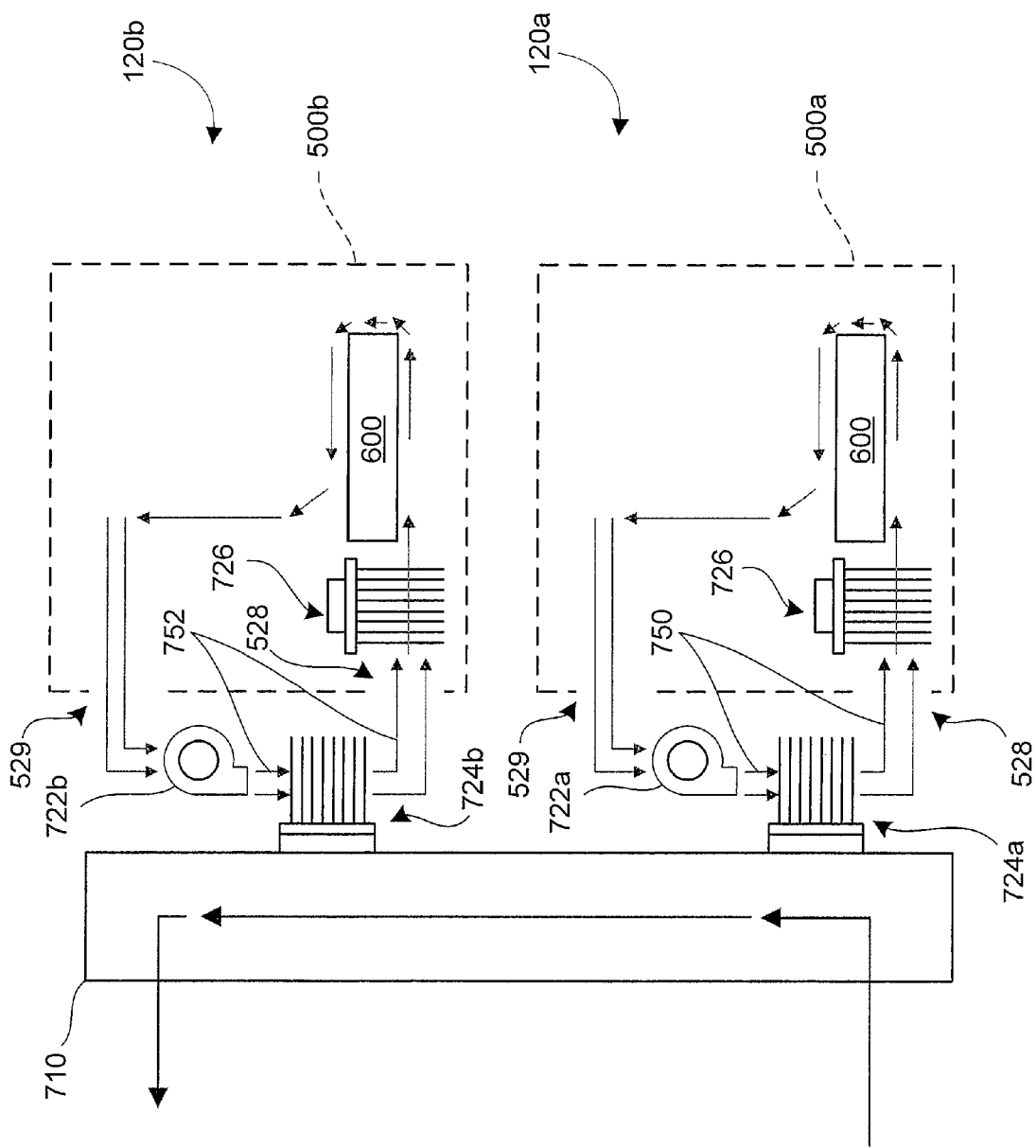
FIG. 29 is a schematic view illustrating temperature regulated air flows through a pair of test slot assemblies.

As shown schematically in FIG. 29, the first electric heatpump assembly 724a is disposed downstream of the first blower 722a and upstream of the inlet aperture 528 of the first test slot 500a. In this position, the first electric heatpump assembly 724a is arranged to cool and/or heat an air flow exiting the first blower 724a before it enters the first test slot 500a. Similarly, referring still to FIG. 29, the second electric heatpump assembly 724b is disposed downstream of the second blower 722b and upstream of the inlet aperture 528 of the second test slot 500b. In this position, the second electric heatpump assembly 724b is arranged to cool and/or heat an air flow exiting the second blower 722b before it enters the second test slot 500b.

Figure 30A:
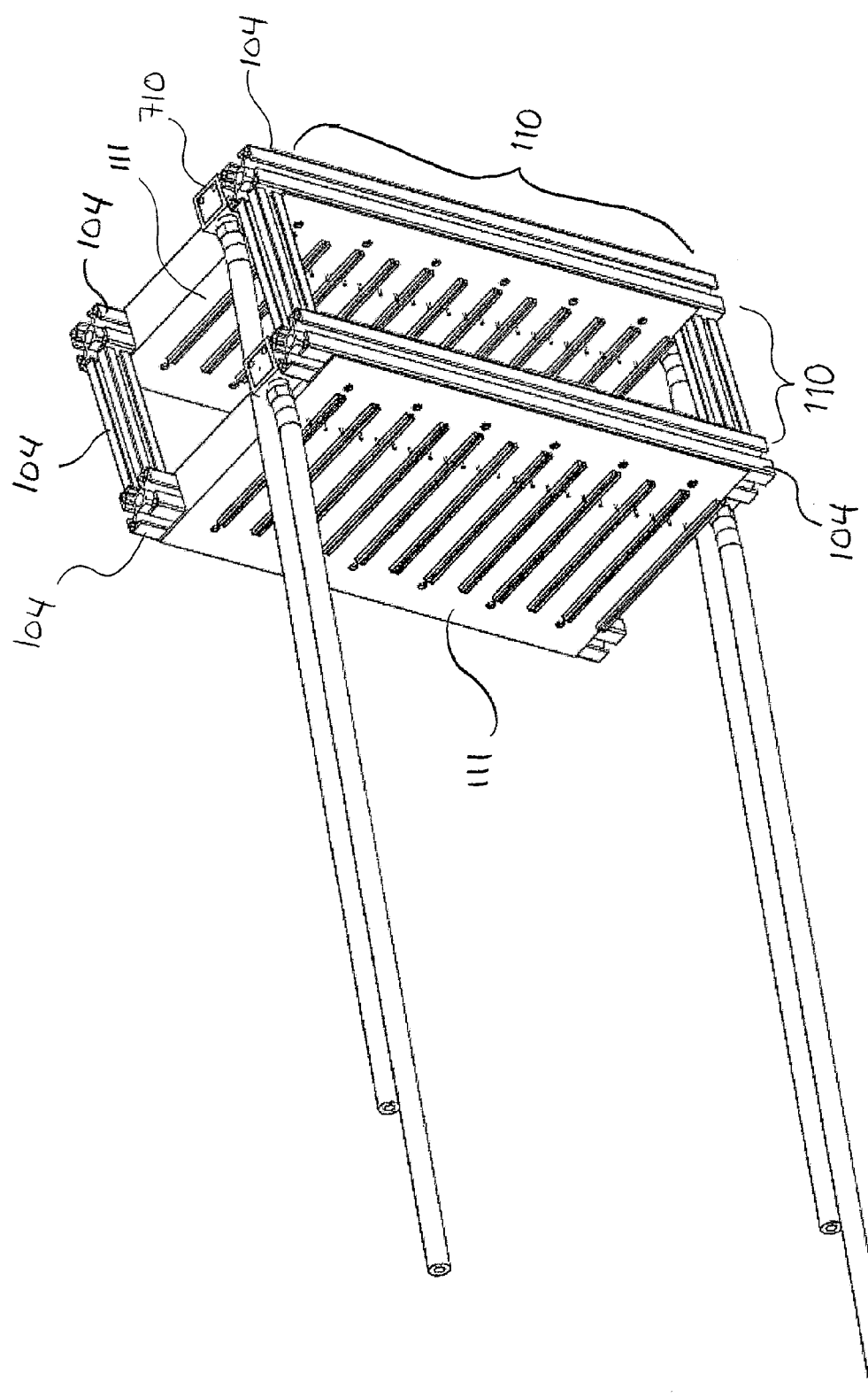
FIGS. 30A and 30B are perspective views of a single slot bank from a test rack.
Figure 30B:
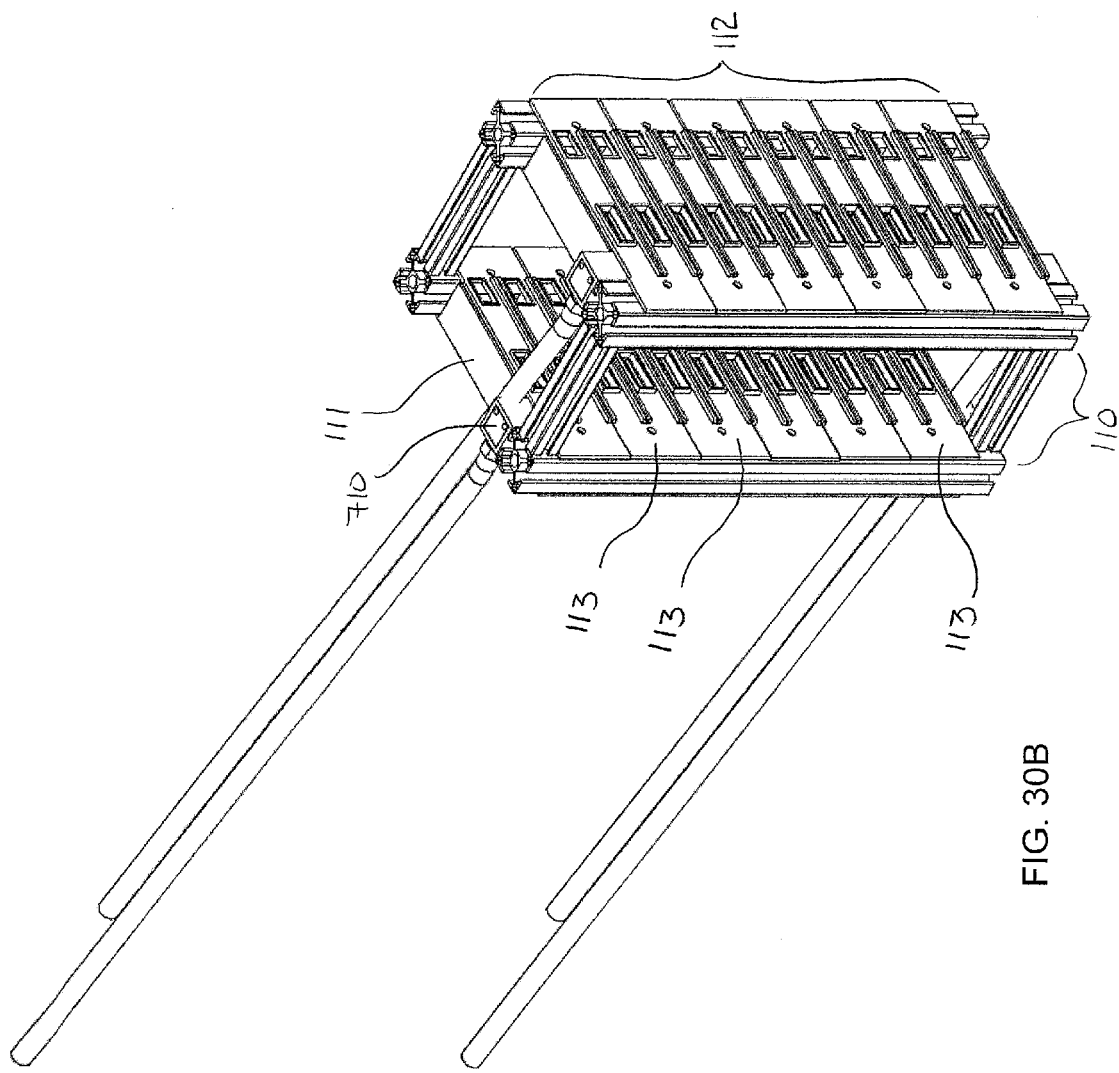
Figure 31:
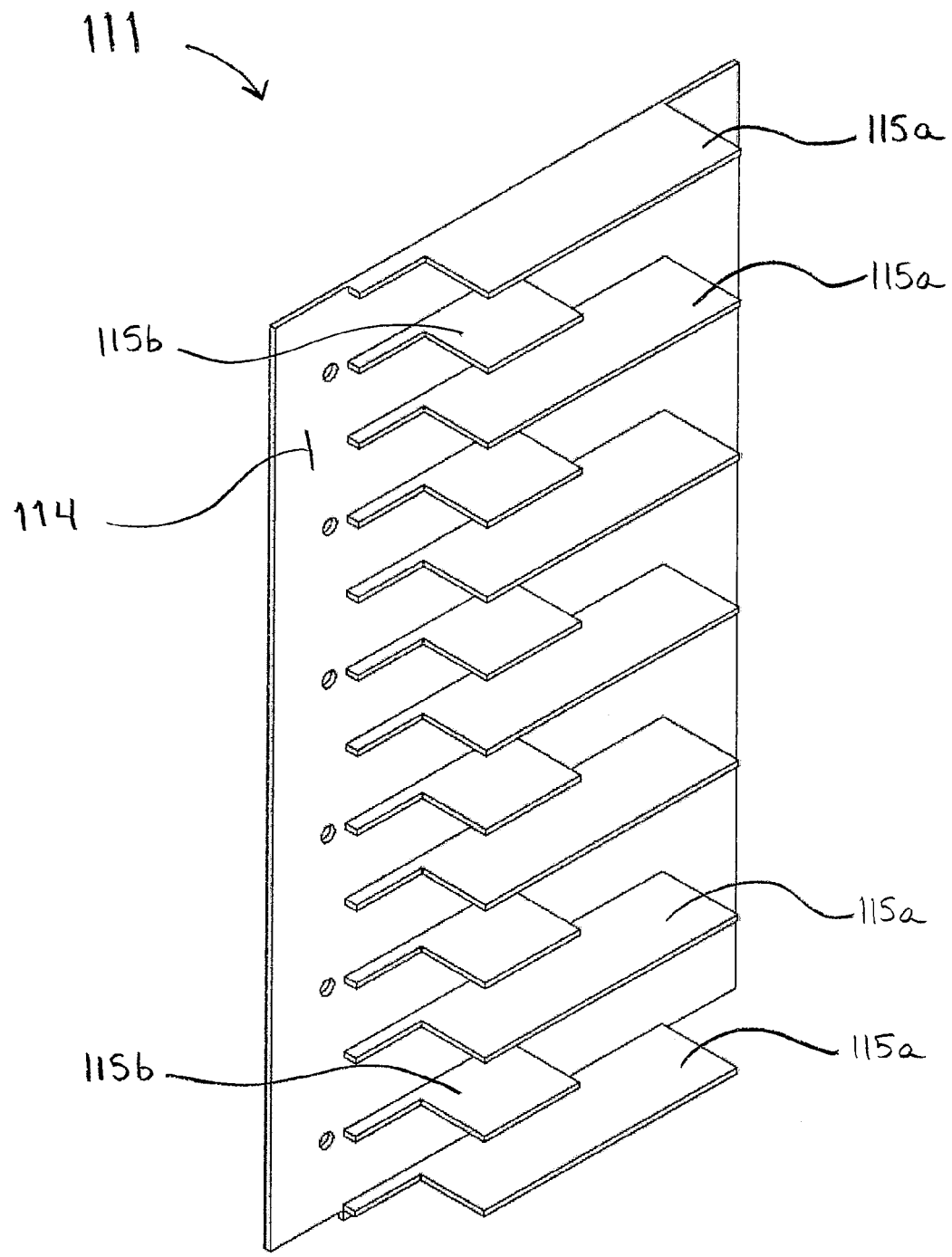
FIG. 31 is a perspective view of a first side wall from the slot bank of FIGS. 30A and 30B.
Figure 32:
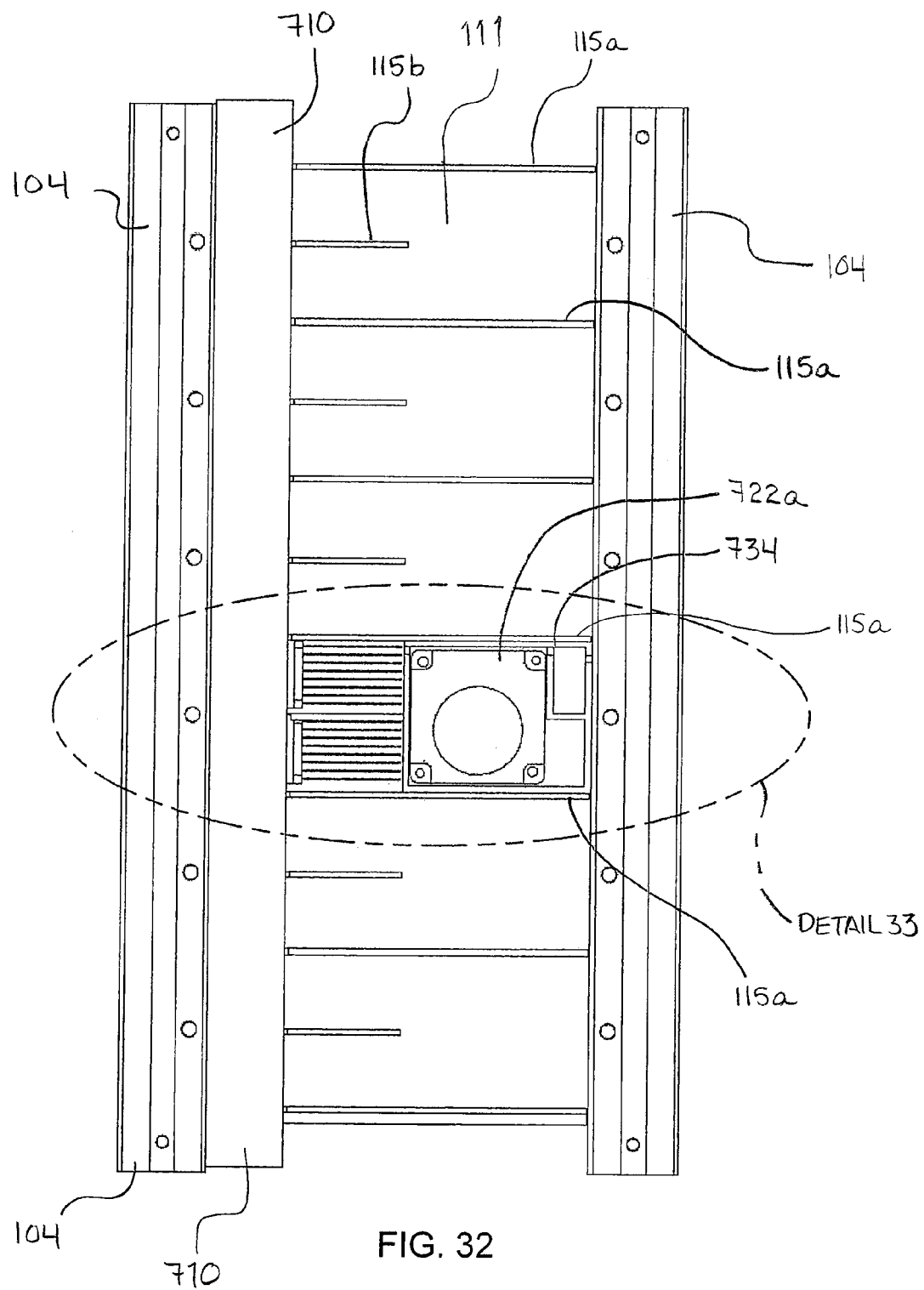
FIG. 32 is a side view showing an air mover assembly and an associated pair of electric heatpump assemblies disposed within a first side wall of the slot bank of FIGS. 30A and 30B.
Figure 33:
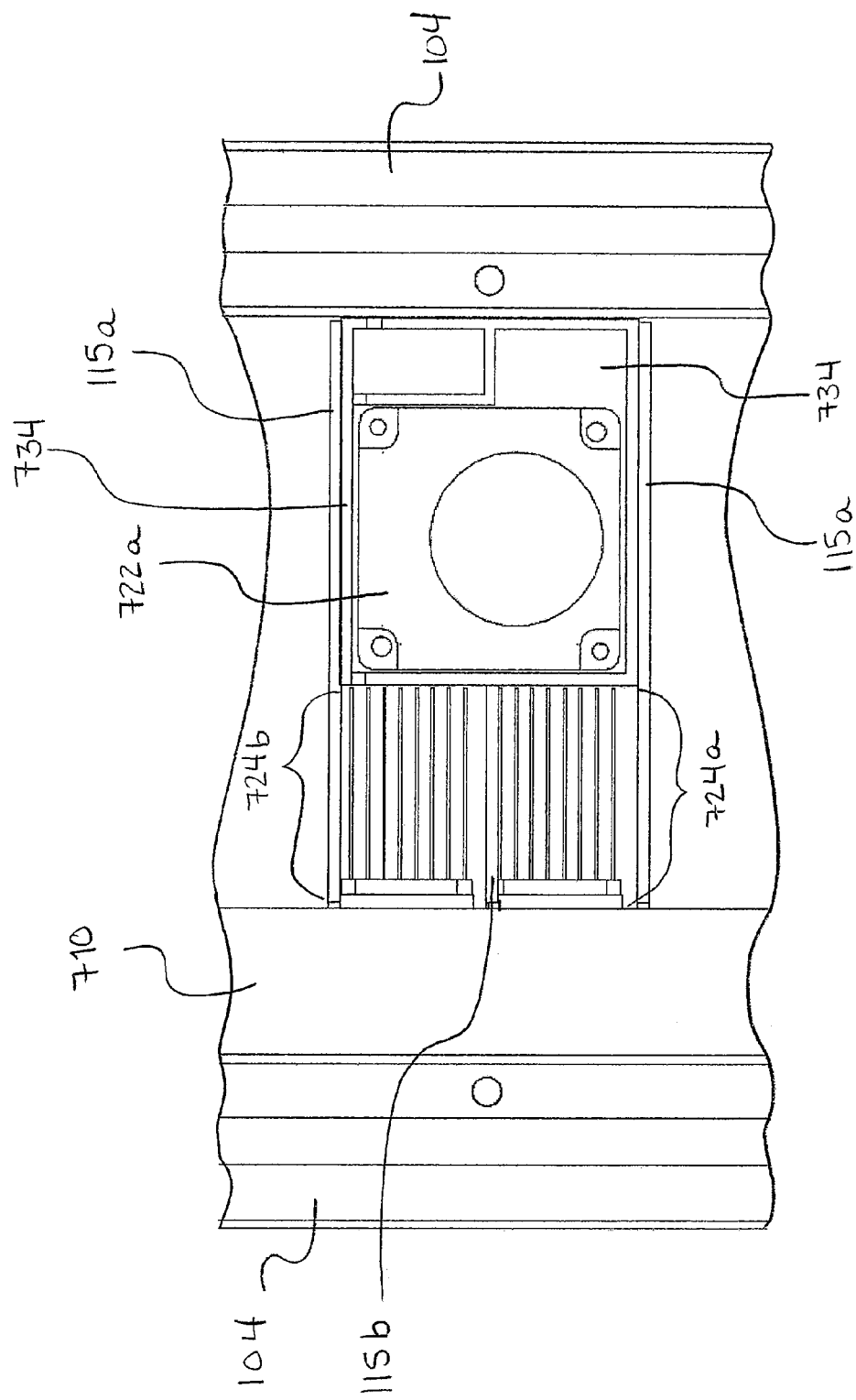
FIG. 33 is a detailed view from FIG. 32.
Figure 34:
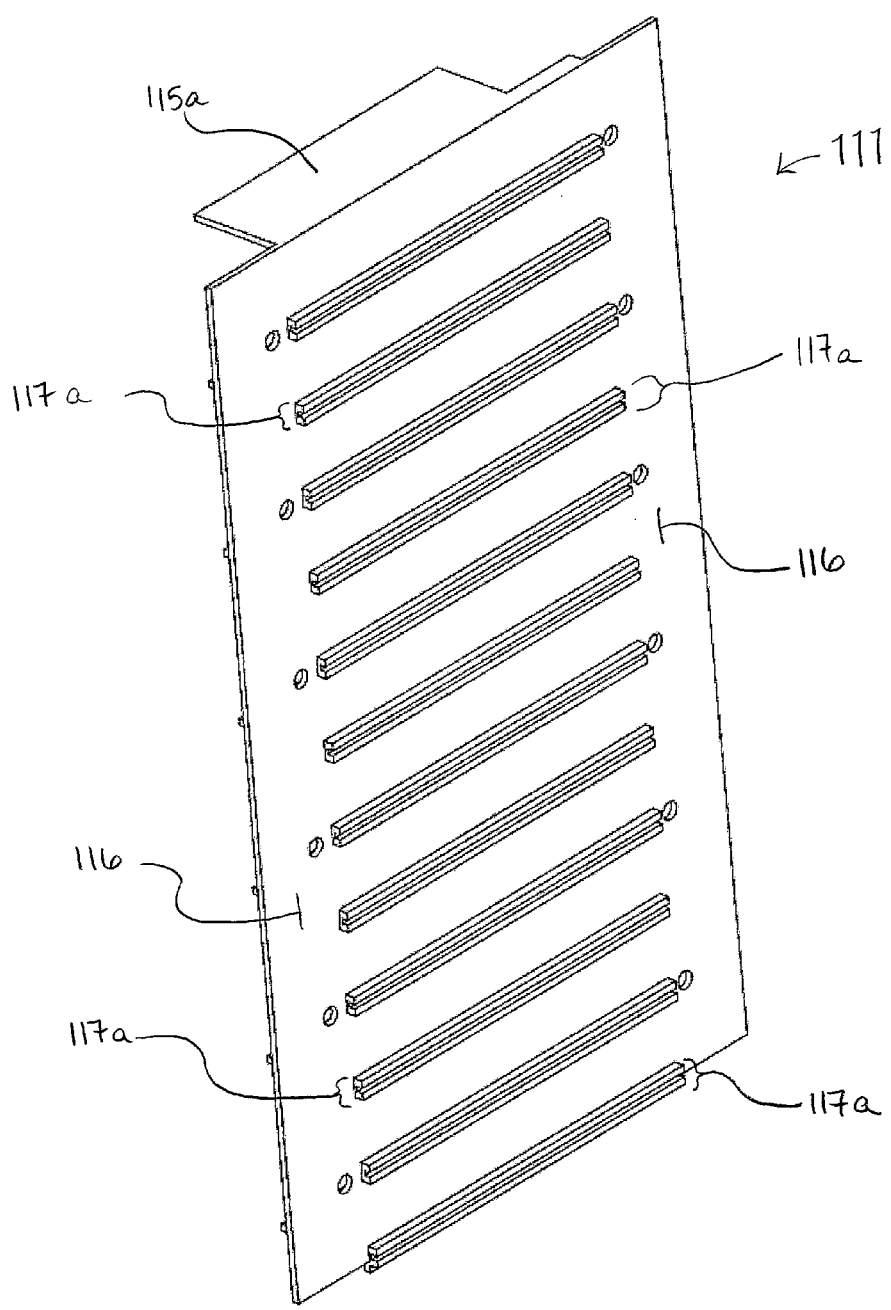
FIG. 34 is a perspective view of the first side wall from the slot bank of FIGS. 30A and 30B.

As shown in FIGS. 30A and 30B, each slot bank 110 includes a first side wall 111 and a second side wall 112 formed from a plurality of second side wall sections 113. As shown in FIG. 30A, the first side wall 111 is mounted between adjacent chassis members 104. As shown in FIG. 31, along a first surface 114 the first side wall 111 defines first and second ducting features 115a, 115b. As shown in FIG. 32, each pair of blowers 722a, 722b (shown mounted within the air mover housing 734) are received between adjacent ones of the first ducting features 115a. The first ducting features 115a, as well as the first surface 114, acts as a duct which aids in isolating the air flows of adjacent pairs of test slot assemblies 120a, 120b from each other. Also disposed between adjacent ones of the first ducting features 115a are the second ducting features 115b. As shown in FIG. 33, following assembly, the second ducting features 115b are disposed adjacent the first sidewall 739 of the air mover housing 734. The second ducting features 115b, together with the first ducting features 115a and the first surface 114, acts as a duct which aids in isolating the air flows of adjacent test slot assemblies 120a, 120b (FIG. 13) of an associated pair. In particular, the second ducting features 115b operate to isolate air flows exiting the first and second blowers 722a, 722b en route to the first and second heatpump assemblies 724a, 724b. As shown in FIG. 34, along a second surface 116 the first side wall 111 includes a plurality of first card guide assemblies 117a each configured to receive and support a first side of one of the test slot mounting plates 513 (FIG. 15A).

Figure 36A:
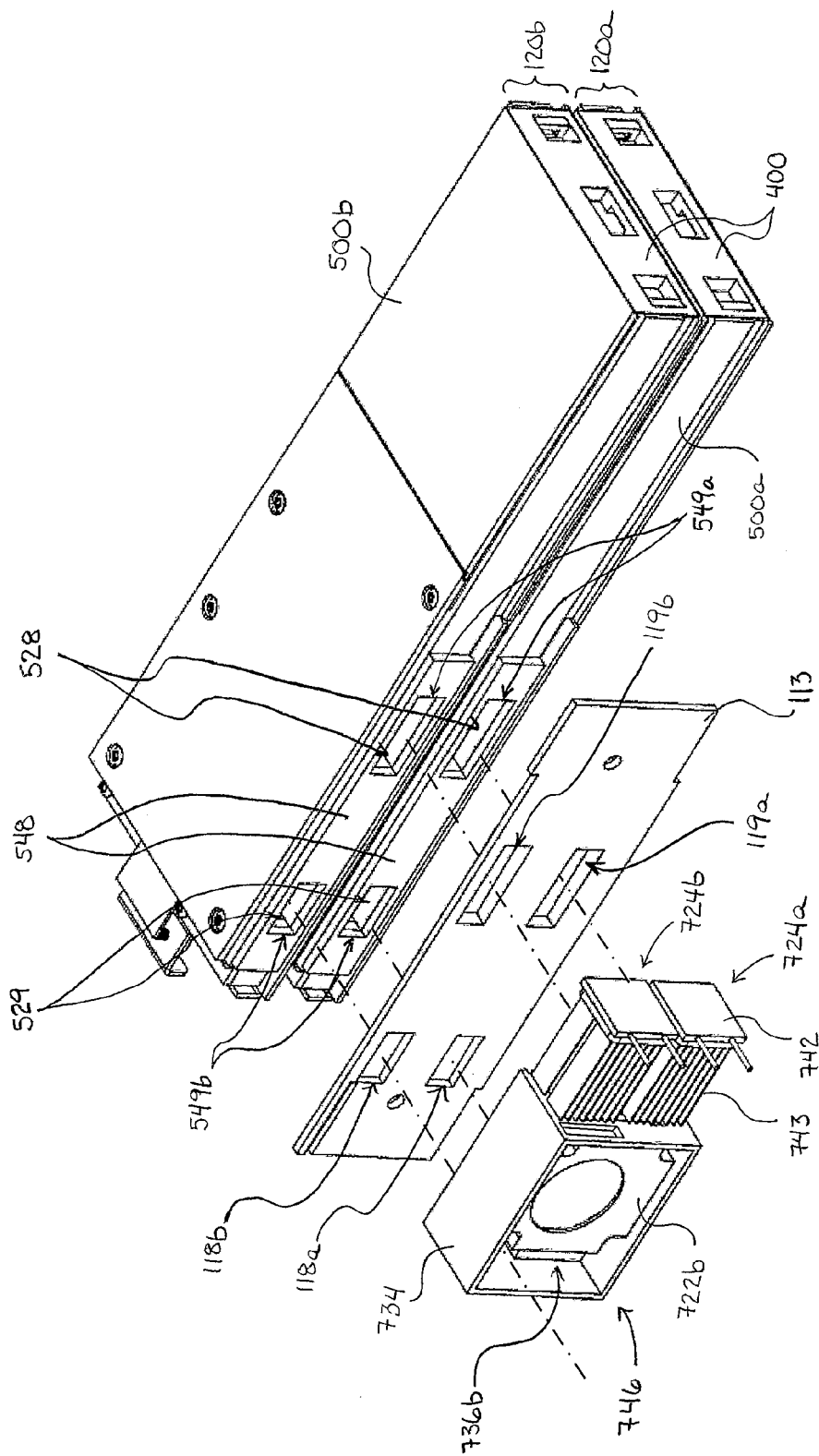
FIGS. 36A and 36B are perspective views illustrating the alignment of a second sidewall section with an associated pair of test slot assemblies.
Figure 36B:
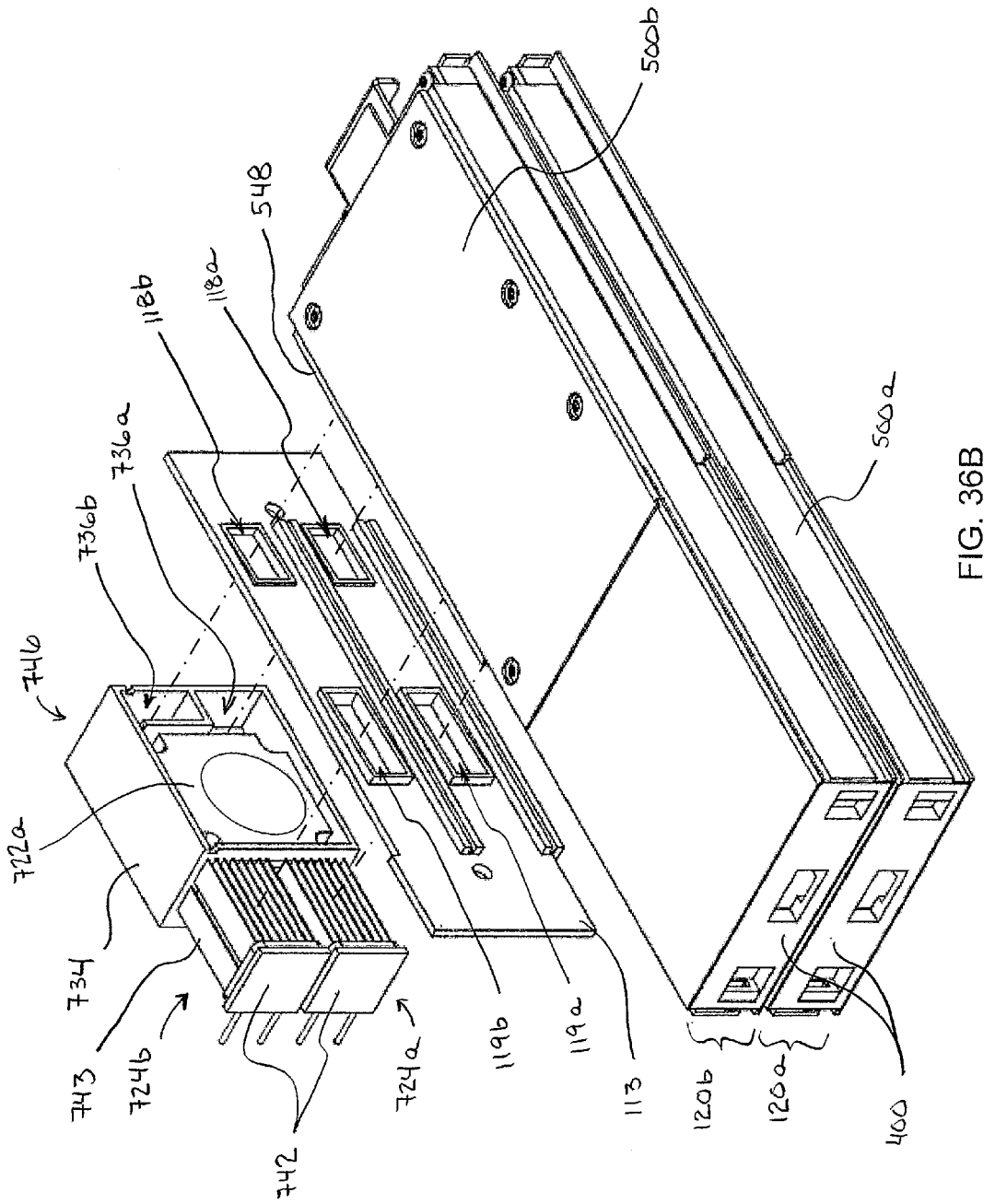

As mentioned above, each slot bank 110 also includes a plurality of second side wall sections 113. Each of the second side walls sections 113 is mounted between adjacent chassis members 104 opposite one of the first side walls 111. As shown in FIG. 35, each of the second side wall sections 113 defines a pair of intake apertures (i.e., first and second intake apertures 118a, 118b) and a pair of exhaust apertures (i.e., first and second exhaust apertures 119a, 119b). As illustrated in FIGS. 36A and 36B (exploded views), following assembly, the first intake aperture 118a is substantially aligned with the outlet aperture 529 of a corresponding one of the first test slots 500a and with the first ducting region 736a of the air mover housing 734, thereby allowing for the passage of an air flow from the first test slot 500a towards the first blower 722a. At the same time, the first exhaust aperture 119a is substantially aligned with the first electric heatpump assembly 724a and the inlet aperture 528 of the corresponding one of the first test slots 500a, thereby allowing for the passage of an air flow from the first blower 722a into the first test slot 500a. Similarly, following assembly, the second intake aperture 118b is substantially aligned with the outlet aperture 529 of a corresponding one of the second test slots 500b and with the second ducting region 736b of the air mover housing 734, thereby allowing for the passage of an air flow from the second test slot 500b towards the second blower 722b. And, the second exhaust aperture 119b is substantially aligned with the second electric heatpump assembly 724b and the inlet aperture 528 of the corresponding one of the second test slots 500b, thereby allowing for the passage of an air flow from the second blower 722b into the second test slot 500b. Referring still to FIGS. 36A and 36B, insulators 548 (e.g., foam insulators) can be disposed between the test slots 500a, 500b and the associated second side wall section 113. As shown in FIG. 36A, the insulators 548 include first and second openings 549a, 549b which align with the inlet and outlet apertures 528, 529 allowing for the passage of the air flows between the first and second blowers 722a, 722b and the first and second test slots 500a, 500b, respectively. The insulators 548 can be connected to the test slots 500a, 500b, e.g., with an adhesive. The insulators 548 can be connected, e.g., to the outer surface 530 of the housing 508 and/or to the surface of the mounting plate 513. The insulators 548 are configured to abut the second side wall sections 113 when the test slots 500a, 500b are mounted within the test rack 100 to aid in inhibiting the loss of the air flows to the surrounding environment within the test slot compartment 700 (see, e.g., FIG. 11B). Thus, the air flows between the first and second blowers 722a, 722b and the first and second test slots 500a, 500b remain substantially isolated from each other and substantially isolated from the surrounding environment within the test slot compartment 700 (FIG. 11B).

Figure 37A:
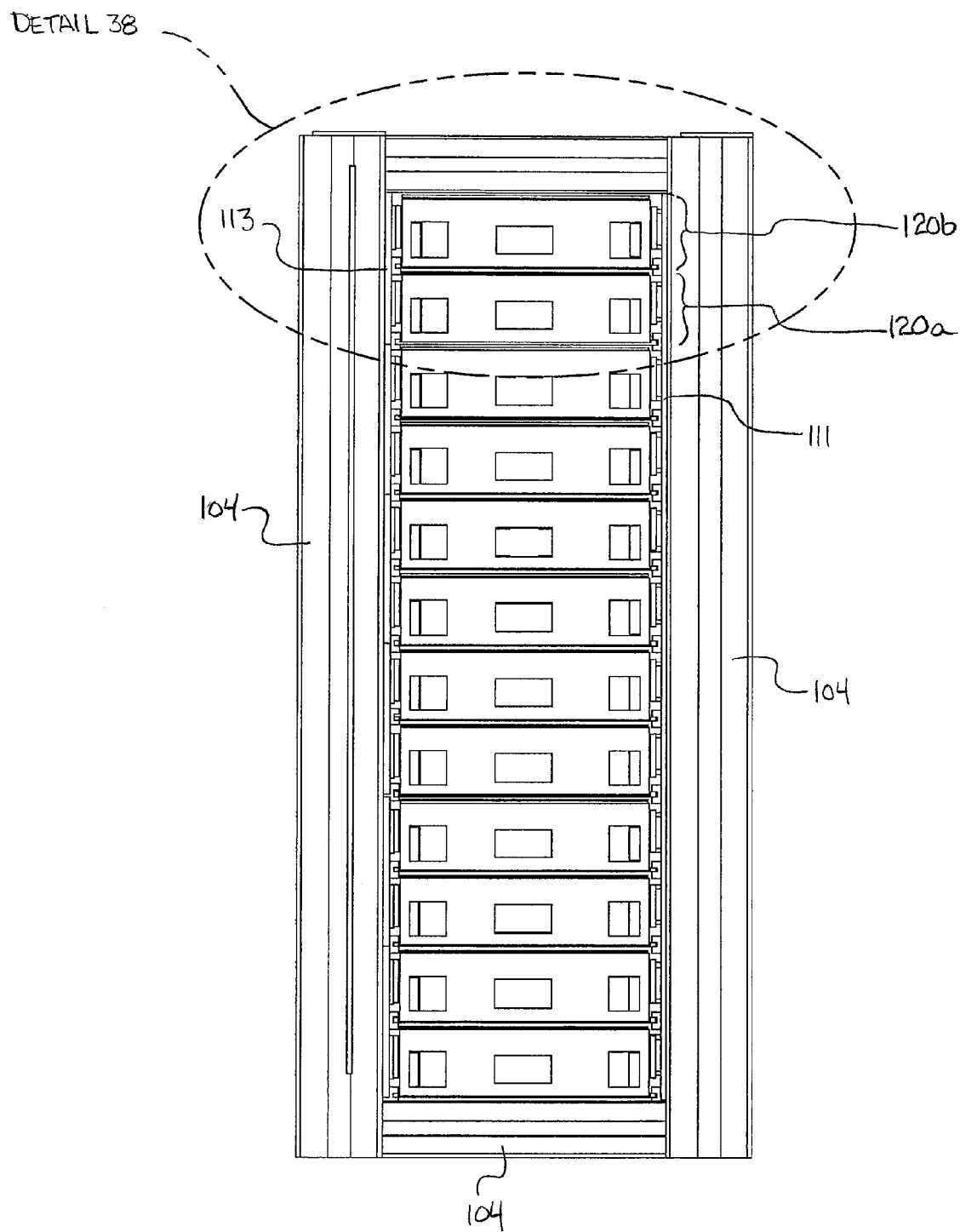
FIG. 37A is a front orthogonal view of a slot bank supporting a plurality of test slots.
Figure 37B:
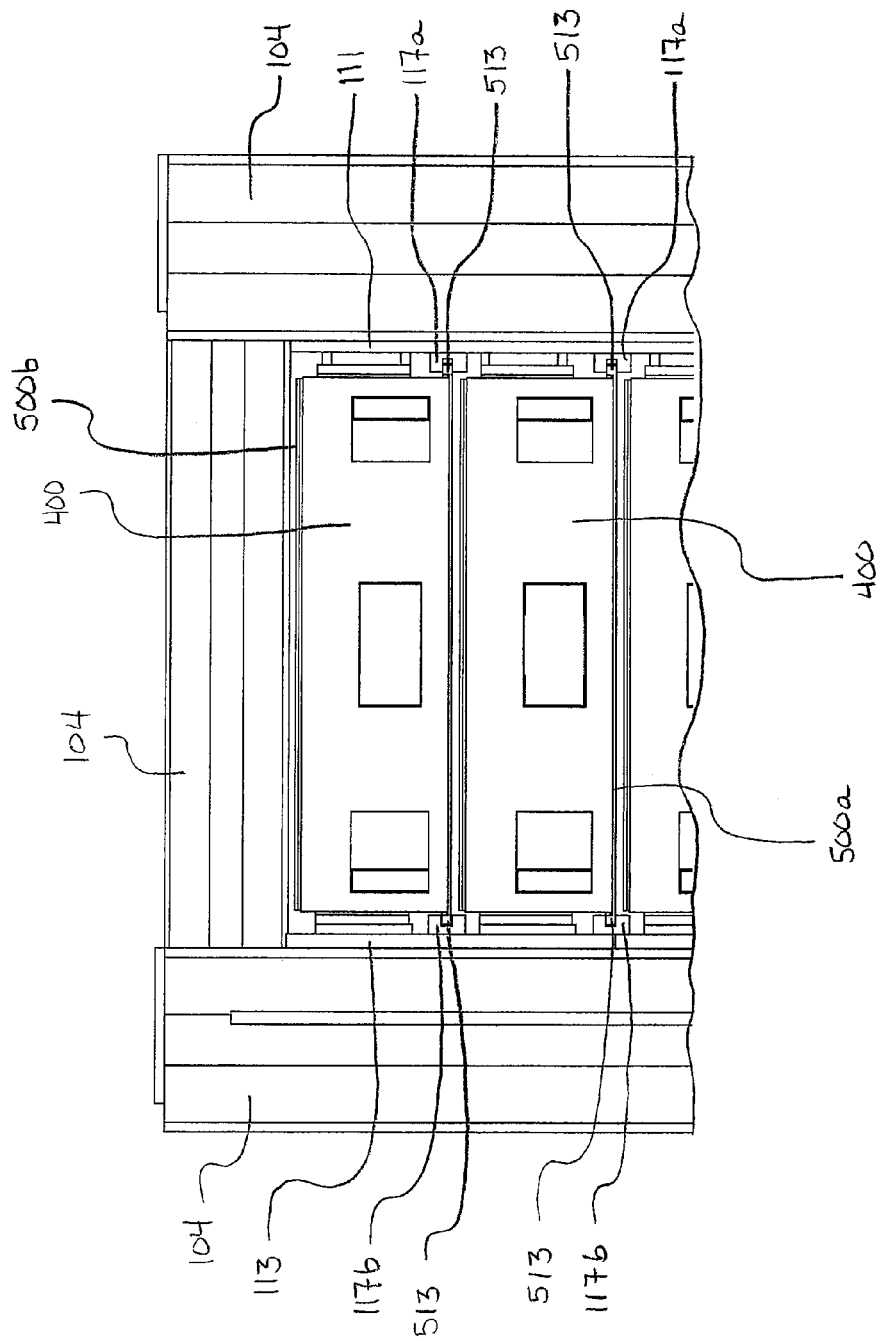
FIG. 37B is a detailed view from FIG. 37A.

Referring again to FIG. 35, the second side wall sections 113 also include a plurality of second card guide assemblies 117b each configured to receive and support a second side of one of the test slot mounting plates 513. As shown in FIGS. 37A and 37B the test slots 500a, 500b are each supported between adjacent ones of the first and second card guide assemblies 117a, 117b.

Dependent Temperature Control

As discussed above, within each test rack 100 the test electronics 160 control the operating temperatures of the test slots 500, e.g., by controlling the flow of electrical power to the resistive heaters (FIG. 17) and the thermoelectric coolers 742 (FIG. 27). However, the sharing of system resources, such as thermal insulation (e.g., between test slots), available power, and cooling liquid (e.g., chilled water), may limit the flexibility of temperature control. This limited flexibility may be accommodated by enforcing certain dependencies between the test slots 500.

Figure 38A:
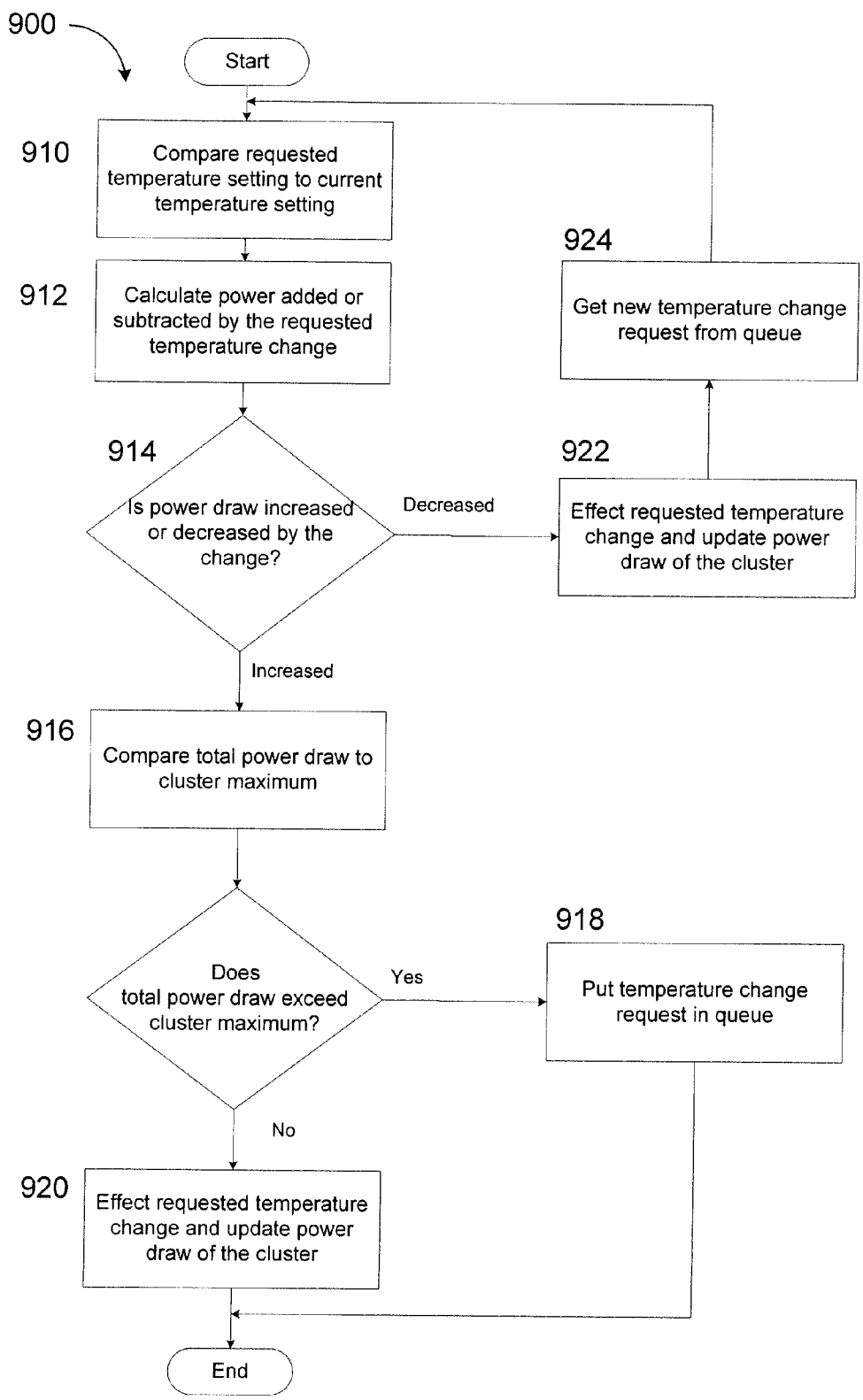
FIG. 38A is an algorithm for controlling temperature changes within the test slots based on a total power available to a cluster of the test slots.

In some cases, the test racks 100 can be configured to control temperatures of the associated test slots 500 in such a way as to enhance the use of system resources. For example, FIG. 38A shows an algorithm 900 for controlling temperature changes within a cluster of the test slots 500 based on the total power available to the cluster (cluster maximum) of test slots. The cluster of test slots 500 can include any predetermined number of test slots 500, e.g., two or more test slots 500, a full slot bank 110 (FIG. 2B) of test slots 500, a full test rack 100 (FIG. 2A) of test slots 500, multiple test racks 100 of test slots 500, etc. A disk drive testing system 10 (FIG. 1) can, for example, include one or more clusters of test slots 500. Each request for a temperature change within one of the test slots 500 of the cluster is first evaluated to assess the impact that the requested temperature change will have on the current, active power draw of the cluster of test slots. The requested temperature change is the difference between a current, active temperature setting and a new, requested temperature setting. In this regard, a requested temperature setting is compared 100 to a current, active temperature setting of the subject test slot 500 and an expected change in power draw for the cluster that is expected to be effected by the requested temperature change is calculated 912. The algorithm 900 then determines 914 whether the active power draw of the cluster of test slots 500 will be increased or decreased by the requested temperature change.

If it is determined that the active power draw of the cluster of test slots 500 will increase as a result of the requested temperature change, then the expected total power draw for the cluster (i.e., the active power draw of the cluster of test slots 500 plus the expected increase in power draw resulting from the requested temperature change) is compared 916 to the total power available to the cluster. If the expected total power draw exceeds the total power available (i.e., if sufficient power is not available to achieve the requested temperature change), then the temperature change request is placed in queue 918 until additional power becomes available to the cluster. If the expected total power draw does not exceed the total power available (i.e., if sufficient power is available to achieve the temperature change), then the temperature change is effected 920 and the power draw is updated.

If, instead, it is determined that the active power draw will decrease as a result of the requested temperature change (i.e., overall power consumption will be reduced), then the temperature change is effected 922 and the active power draw is updated. A temperature change request that reduces the active power draw also presents an opportunity to service 924 a temperature request from the queue. In this manner, temperature control of each test slot 500 in the cluster is made dependent on the total power available to the cluster.

Figure 38B:
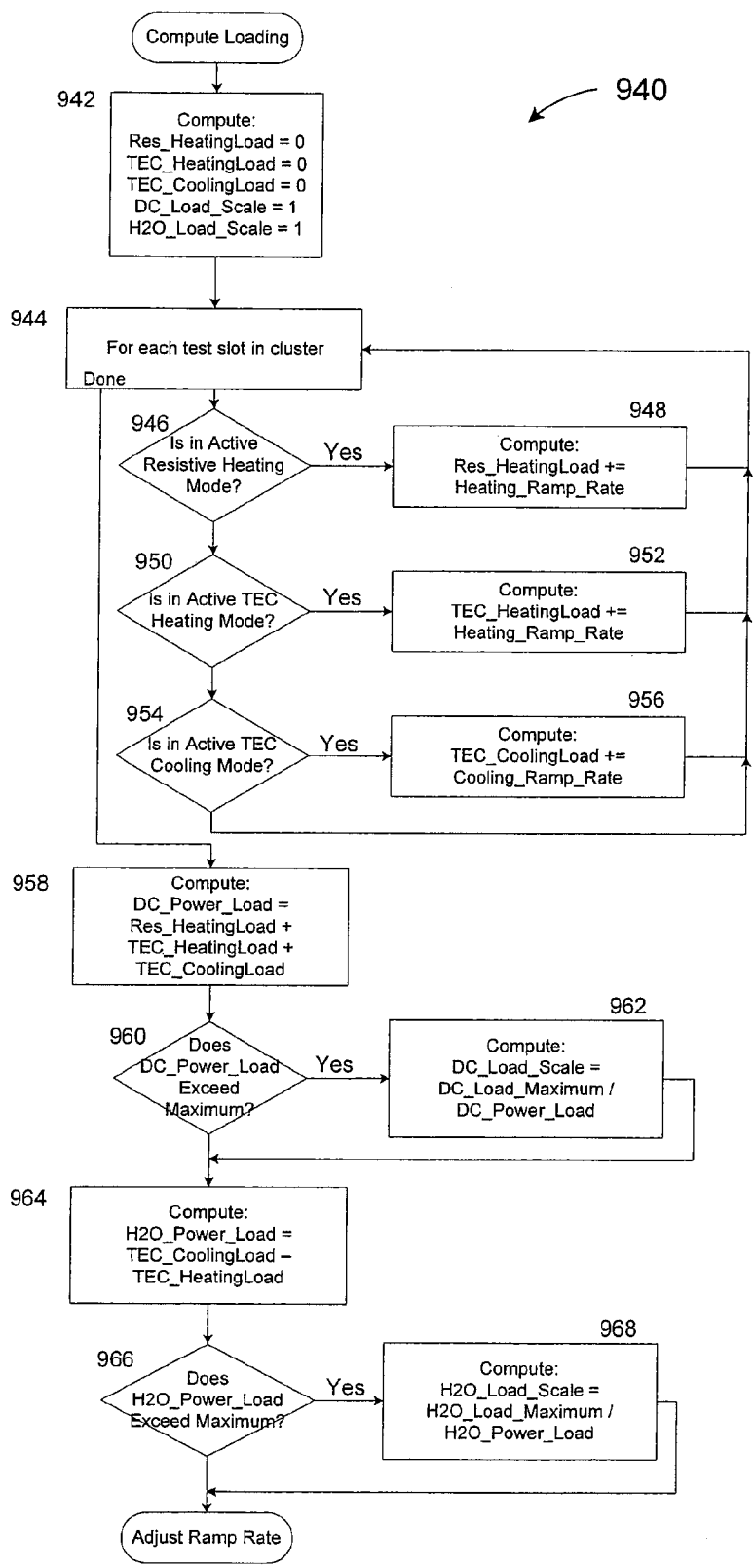
FIGS. 38B and 38C illustrate an algorithm for controlling temperature ramp rates within the test slots based on a total power available to a cluster of the test slots.
Figure 38C:
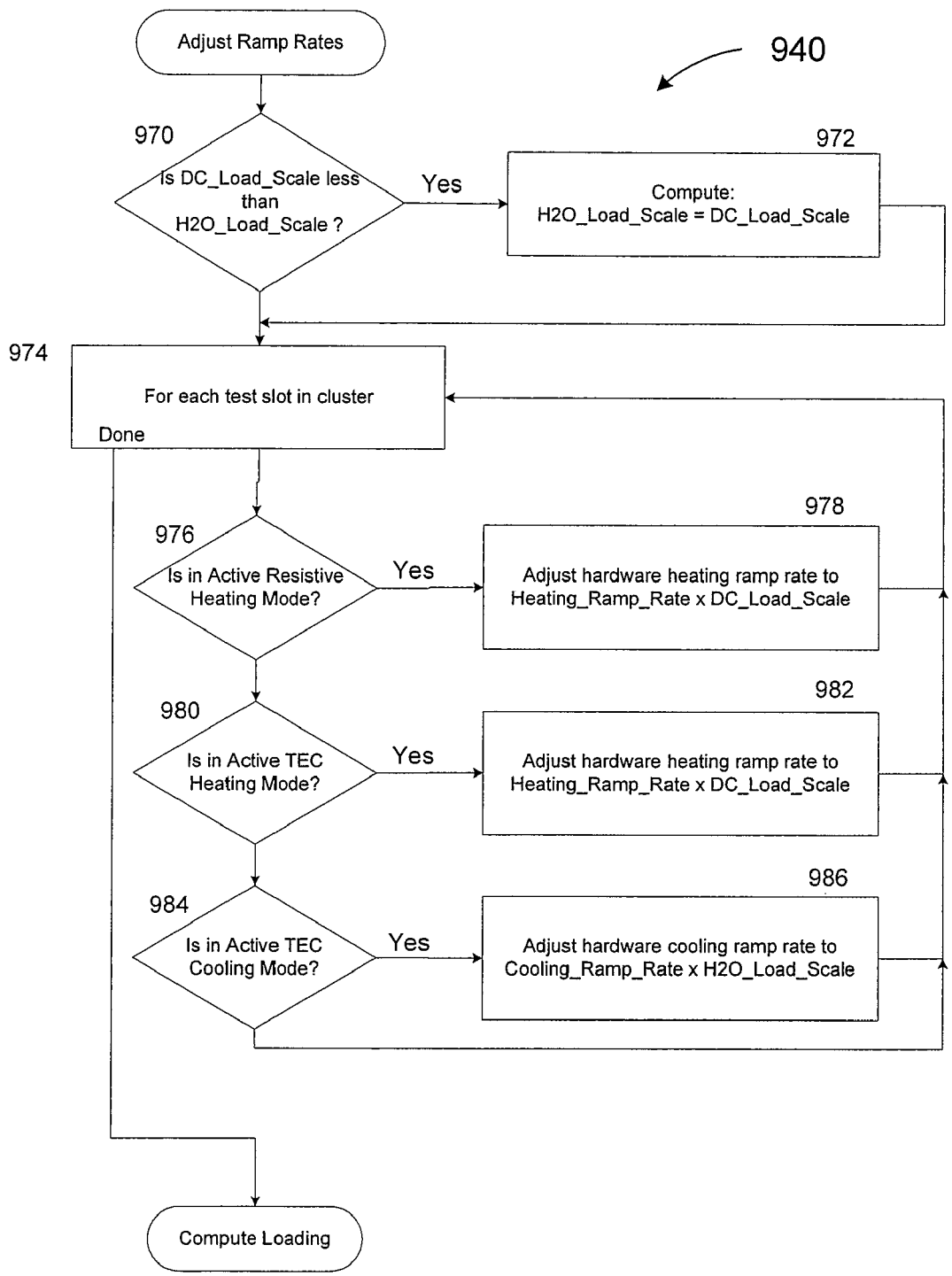

Additional limitations can be placed on the ramp rate of the temperature, i.e., the rate of change of the temperature within a test slot, e.g., to achieve a desired temperature. For example, FIGS. 38B and 38C shows an algorithm 940 for controlling ramp rate of the temperature within the test slots 500 of a cluster of test slots 500, based on the total power available to the cluster of test slots 500. As shown in FIG. 38B, for each test slot 500 in a cluster the algorithm 940 determines 944 the associated power draw for that test slot 500. The algorithm 940 does this by checking to see whether the test slot 500 being assessed is operating in an active resistive heating mode (i.e., heating an air flow within the test slot via the resistive heater 729 (FIG. 17)), an active TEC heating mode (i.e., heating an air flow entering the test slot via the thermoelectric cooler 742 (FIG. 27)), or an active TEC cooling mode (i.e., cooling an air flow entering the test slot via the thermoelectric cooler 742 (FIG. 27)). Each test slot 500 in the cluster that is operating in one of the aforementioned modes contributes to the active power draw of the cluster. Three variable values are adjusted based on the operating modes of the test slots in order to monitor how much of the active power draw is associated with each in the cluster. The variable values include a resistive heating load (Res_HeatingLoad), a thermoelectric cooler heating load (TEC_HeatingLoad), and a thermoelectric cooler cooling load (TEC_CoolingLoad).

If it is determined 946 that the test slot 500 is operating in an active resistive heating mode, then the algorithm 940 calculates 948 and resets the value of the resistive heating load (Res_HeatingLoad) to be equal to the sum of the current value for the resistive heating load (initially set 942 at zero) plus a heating ramp rate (Heating_Ramp_Rate). The heating ramp rate can be constant value, e.g., set by an operator or preprogrammed into test software, that corresponds to the power draw associated with heating one of the test slots at a particular rate (e.g., in degrees per unit of time). Otherwise, if it is determined 950 that the test slot 500 is operating in an active TEC heating mode, then the algorithm 940 calculates 952 the TEC heating load (TEC_HeatingLoad) to be equal to the sum of the current value for the TEC heating load (initially set 942 at zero) plus the heating ramp rate. Or, if it is determined 954 that the test slot 500 is operating in an active TEC cooling mode, then the algorithm 940 calculates 956 the TEC cooling load (TEC_CoolingLoad) to be equal to the sum of the current value for the TEC cooling load (initially set 942 at zero) plus a cooling ramp rate (Cooling_Ramp_Rate). The cooling ramp rate can be constant value, e.g., set by an operator or preprogrammed into test software, that corresponds to the power draw associated with cooling one of the test slots 500 at a particular rate (e.g., in degrees per unit of time). After each of the associated test slots 500 of the cluster has been assessed, the value of the resistive heating load will reflect the total amount of the active power draw that is associated with resistive heating (i.e., heating via the resistive heaters in the test slots) within the cluster, the value of the TEC heating load will reflect the total amount of the active power draw that is associated with TEC heating (i.e., heating via the thermoelectric coolers) within the cluster, and the value of the TEC cooling load will reflect the total amount of the active power draw that is associated with TEC cooling (i.e., cooling via the thermoelectric coolers) within the cluster.

Once the algorithm 940 has assessed 944 each of the test slots 500 in the cluster and determined how much each test slot contributes to either the resistive heating load, the TEC heating load, or the TEC cooling load, the algorithm 940 calculates 958 the active power draw (DC_Power_Load) of the cluster by summing the values of the resistive heating load, the TEC heating load, and the TEC cooling load, and then determines 960 whether the calculated value for the active power draw exceeds the total power available (DC_Load_Maximum). If it is determined that the calculated value for active power draw exceeds the total power available, the algorithm 940 calculates 962 the value for a power load scale (DC_Load_Scale), resetting the power load scale (initially set 942 to 1) to be equal to the total power available divided by the current value (i.e., previously calculated value) for the active power draw, and then computes 964 the active cooling liquid power load (H2O_Power_Load) of the cluster. Otherwise, if it is determined that the calculated value for the active power draw does not exceed the total power available, the value for the power load scale is left at 1 and the algorithm 960 computes 964 the active cooling liquid power load of the cluster.

The algorithm 940 computes 964 the active cooling liquid power load of the cluster by setting the value for the active cooling liquid power load equal to the value of the TEC cooling load less the value of the TEC heating load. Thermoelectric coolers 745 (FIG. 27) operating in the cooling mode are delivering thermal, heat energy into the cooling liquid, while thermoelectric coolers operating in the heating mode are removing thermal, heat energy from the cooling liquid. Thus, the active cooling liquid power load is calculated as the total amount of power (thermal power) delivered into the cooling liquid via the thermoelectric coolers (operating in the cooling mode) less the total amount of power drawn out of the cooling liquid via the thermoelectric coolers (operating in the heating mode). Then, the algorithm 940 determines 966 whether the active cooling liquid power load exceeds a predetermined maximum cooling liquid power load for the cluster (i.e., a predetermined value based on the cooling capacity of the liquid).

If it is determined that the calculated value for the active cooling liquid power load of the cluster of test slots 500 exceeds the value for the maximum cooling liquid power load for the cluster of test slots 500, then the algorithm 940 calculates 968 the value for a cooling liquid load scale (H20_Load_Scale), resetting the cooling liquid load scale (initially set 942 to 1) to be equal to the maximum cooling liquid power load divided by the current value (i.e., previously calculated value) for the active cooling liquid power load. Then, referring to FIG. 38C, the algorithm 940 determines 970 whether the value for the power load scale is less than the value for the cooling liquid load scale. If it is determined that the value for the power load scale is less than the value for the cooling liquid load scale, then the algorithm 940 resets 972 the value of the cooling liquid load scale to be equal to the value of the power load scale, otherwise the cooling liquid load scale is left at the previously calculated value.

Then, the power delivered to the resistive heaters and/or the thermoelectric coolers is adjusted based on the calculated value for the power load scale or the cooling liquid load scale in order to adjust the temperature ramp rate of the associated test slot, thereby to effect temperature changes for the test slots 500. More specifically, each test slot 500 in the cluster is again assessed 974 to determine whether it is in a resistive heating mode, a TEC heating mode, or a TEC cooling mode. If it is determined 976 that the test slot 500 being assessed is in a resistive heating mode, the power delivered to the associated resistive heater 729 is adjusted 978 to be equal to the product of the heating ramp rate and the power load scale. If it is determined 980 that the test slot 500 is in a TEC heating mode, then the power provided to the associated thermoelectric cooler 745 is adjusted 982 to be equal to the product of the heating ramp rate and the power load scale. If it is determined that the test slot is in a TEC cooling mode the power provided to the associated thermoelectric cooler 745 is adjusted to be equal to the product of the cooling ramp rate and the cooling liquid load scale. In this manner, the power distributed to each of the test slots 500 in the cluster is adjusted incrementally to achieve the respective desired temperatures.

Figure 38D:
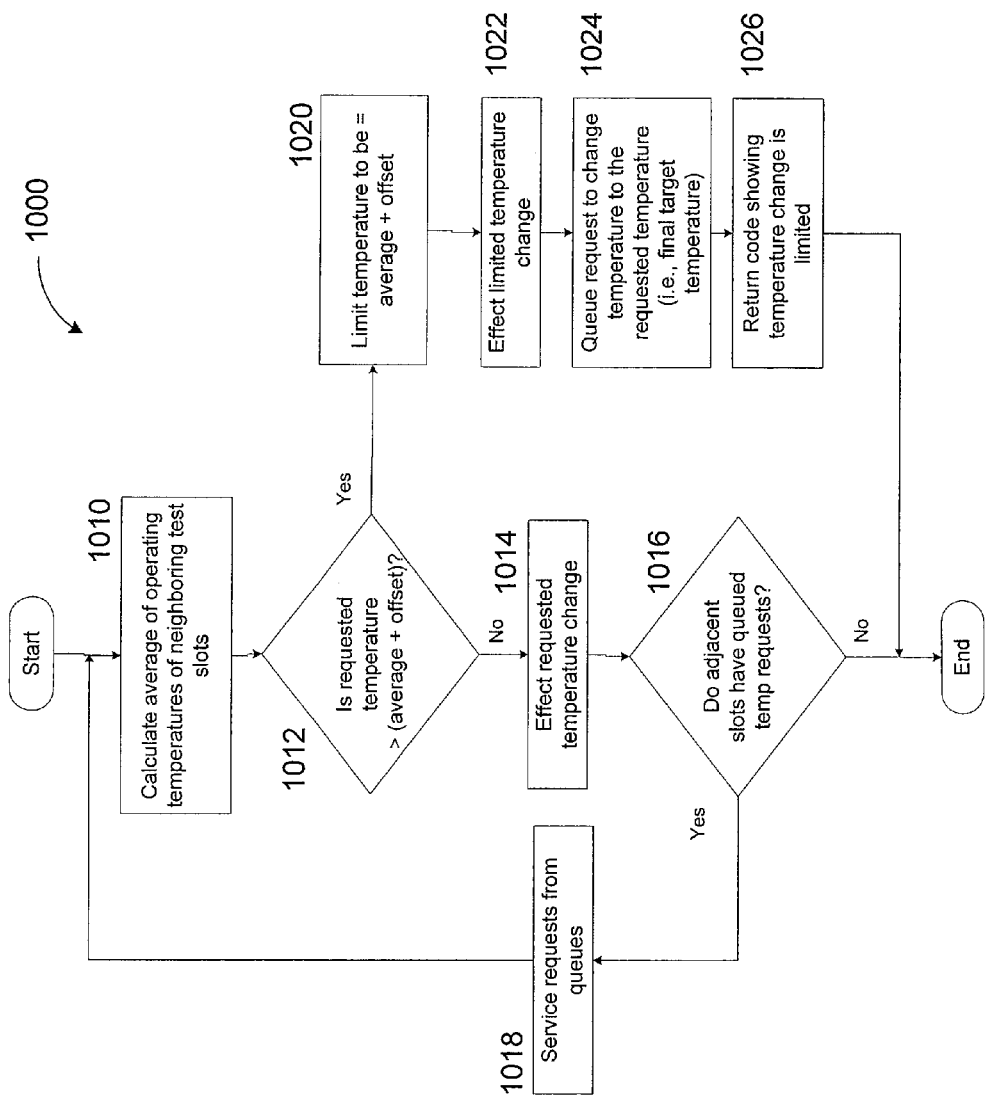
FIGS. 38D and 38E illustrate algorithms for controlling temperature changes within one of the test slots based on neighboring test slots.

In some cases, the thermal performance of the test slots 500 may be influenced by the operation of other neighboring test slots 500. For example, depending upon how much thermal insulation is provided between the test slots 500, the temperature that one test slot 500 can reach may be limited by the operating temperature(s) of one or more other, surrounding test slots 500. To account for such limitations, the temperature control of each test slot 500 can be made to be dependent on neighboring test slots 500. For example, FIG. 38D illustrates an algorithm 1000 for controlling temperature changes within one of the test slots 500 based on the neighboring test slots 500. When a temperature change within one of the test slots 500 (e.g., a subject test slot 500) is requested, the average of the operating temperatures for the nearest neighboring test slots 500 (e.g., the test slots 500 above, below and to the sides of the subject test slot 500) is calculated 1010. These operating temperatures may be measured values (e.g., as detected by temperature sensors 526 (FIG. 20A) disposed within the neighboring test slots 500), or may be target values that are set, e.g., according to a test routine. The algorithm 1000 then determines 1012 whether the requested temperature for the subject test slot 500 is greater than the sum of the calculated average of the operating temperatures of the neighboring test slots 500 plus a predetermined offset value. In some cases, the predetermined offset value is a fixed value that corresponds to maximum temperature difference between adjacent test slots 500, which is dependent upon the thermal insulation between the test slots 500. For temperature differences less than the offset value, the insulation between the subject test slot 500 and its neighbors is sufficient to achieve the desired temperature.

If the requested temperature for the subject test slot 500 is not greater than the sum of the calculated average of the operating temperatures of the neighboring test slots 500 plus the predetermined offset value, then the temperature change is effected 1014 to set the subject test slot 500 to the requested temperature. Then, after the temperature change is effected for the subject test slot 500, the algorithm 1000 determines 1016 whether the adjacent test slots 500 have any queued temperature requests, and, if so, then considers 1018 the queued requests in turn.

If the requested temperature for the subject test slot 500 is greater than the sum of the calculated average of the operating temperatures of the neighboring test slots 500 plus the predetermined offset value, then the temperature of the subject test slot 500 is limited 1020 to be the sum of the calculated average of the operating temperatures of the neighboring test slots 500 plus the predetermined offset value. A temperature change is effected 1022 to set the subject test slot 500 to that limited temperature, a request to change the temperature of the subject test slot 500 (e.g., from the limited temperature) to the requested temperature is queued 1024, and feedback is provided 1026 indicating that the temperature is limited.

Figure 38E:
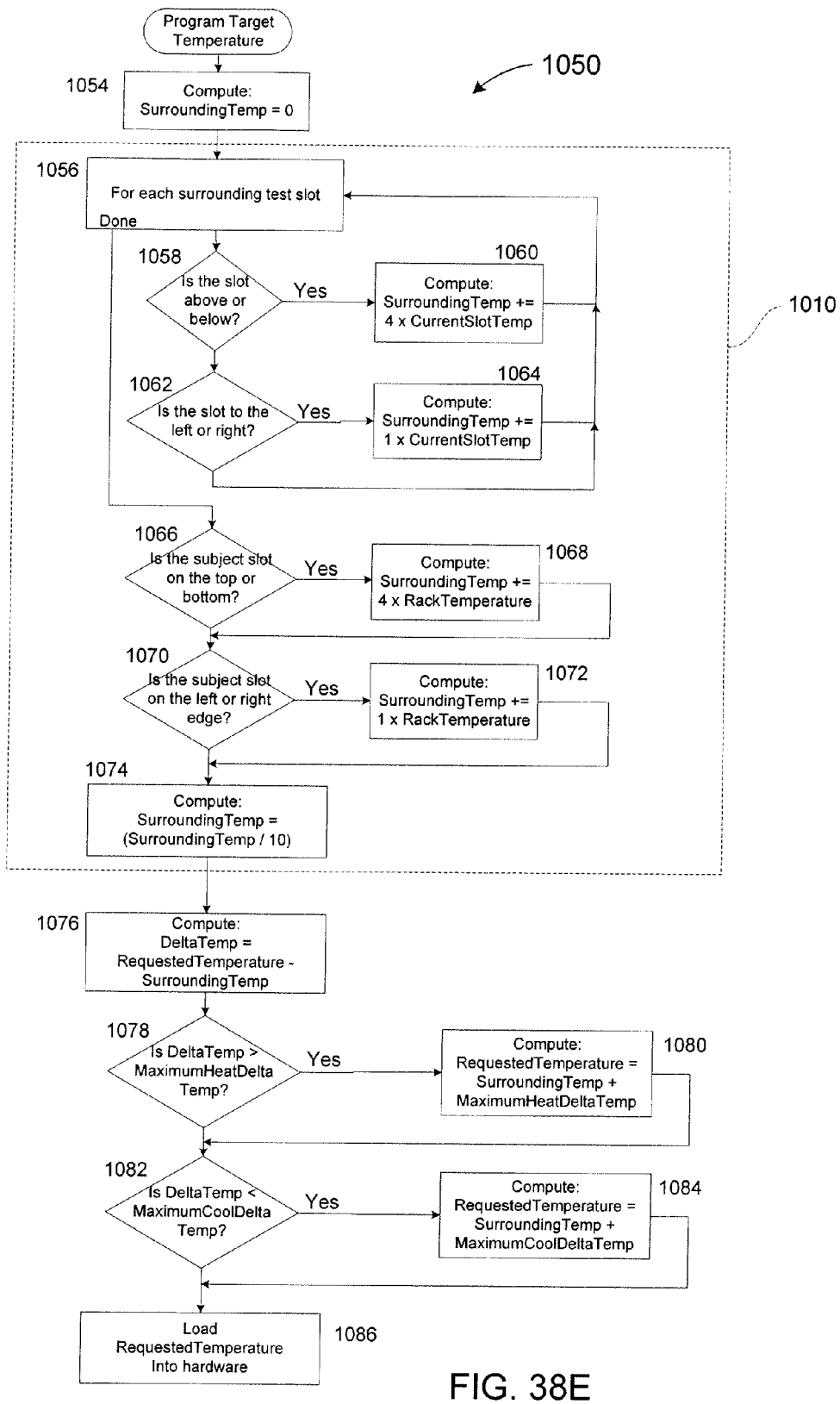

FIG. 38E illustrates another example of an algorithm 1050 for controlling temperature changes within one of the test slots 500 (i.e., a subject test slot 500) based on other, neighboring test slots 500. In the example shown in FIG. 38E, the target temperature (i.e., requested temperature) for the subject test slot 500 is programmed 1052, e.g., input by an operator or preprogrammed into test software, and a variable (SurroundingTemp), corresponding to the temperature of the environment surrounding the subject test slot (e.g., temperature of the test rack and/or neighboring ones of the test slots), is initially set 1054 to a zero value. Then, the average of the operating temperatures for the nearest neighboring test slots 500 is calculated 1010 by assessing 1056 each of the surrounding test slots 500 (i.e., test slots surrounding the subject test slot) to determine 1058 whether that surrounding test slot 500 is immediately above or below the subject test slot 500.

If the neighboring test slot 500 under assessment is above or below the subject test slot 500, then the SurroundingTemp variable is reset (i.e., computed 1060) to be equal to the sum of the current value (i.e., previously set or previously calculated value) for the SurroundingTemp plus the product of a first constant (4 in this example) multiplied by the measured temperature (CurrentSlotTemp) of the neighboring test slot 500, as provided by the temperature sensors 526 (FIG. 19) of that test slot 500.

If the neighboring test slot 500 under assessment is not above or below the subject test slot 500, then the algorithm 1050 determines 1062 whether the neighboring test slot is disposed immediately to the side (i.e., left or right) of the subject test slot 500. If the neighboring test slot 500 under assessment is disposed immediately to the side the subject test slot 500 then the SurroundingTemp variable is reset 1064 to be equal to the sum of the current value for the SurroundingTemp plus the product of a second constant (1 in this example) multiplied by the measured temperature (CurrentSlotTemp) of the neighboring test slot 500, as provided by the temperature sensors 526 (FIG. 19) of that test slot 500.

The first and second constants are predetermined values and correspond generally to the thermal resistance between the subject test slot 500 and the neighboring test slots 500 immediately above and below compared to the thermal resistance between the subject test slot 500 and the neighboring test slots 500 immediately to sides. In this example, the first constant, 4, and the second constant, 1, were selected to reflect a thermal resistance between the subject test slot and the neighboring test slots immediately above and below that is one quarter than that of the thermal resistance between the subject test slot and the neighboring test slots immediately to the sides. The first and second constants may be different depending, e.g., on the amount of insulation provided between the test slots 500.

After the neighboring test slots 500 are assessed, the algorithm 1050 determines 1066 whether the subject test slot 500 is at the top or bottom of the associated test rack 100, i.e., first or last in a column of test slots 500. If the subject test slot 500 is at the top or bottom of the associated test rack 100, then the SurroundingTemp variable is reset 1068 to be equal to the sum of the current value for the SurroundingTemp plus the product of the first constant multiplied by the measured temperature (RackTemperature) of the test rack 100, as provided by the temperature sensors 48 (FIG. 11B) within the test rack 100.

Then, the algorithm 1050 determines 1070 whether the subject test slot 500 is disposed along the left or right edge (i.e., first or last in a row of test slots 500) of the associate test rack 100. If the subject test slot is disposed along the left or right edge of the associated test rack 100, then the SurroundingTemp variable is reset 1072 to be equal to the sum of the current value for the SurroundingTemp plus the product of the second constant multiplied by the measured temperature (RackTemperature) of the test rack 100.

Next, the algorithm 1050 averages the SurroundingTemp over the sum of twice the value of the first constant plus twice the value of the second constant, in the example shown (2×4)+(2×1)=10, and resets 1074 the value of the SurroundingTemp to equal this calculated average. Then, the algorithm 1050 calculates 1076 a temperature difference (DeltaTemp) equal to difference between the requested temperature (RequestedTemperature) and the value for the SurroundingTemp. Then, the calculated temperature difference is compared 1078 to a predetermined maximum heating temperature difference (MaxHeatDeltaTemp). If the calculated temperature difference is greater than the predetermined maximum heating temperature difference, then the value for the RequestedTemperature is reset 1080 to equal the sum of the SurroundingTemp plus the predetermined maximum temperature difference.

Then, the calculated temperature difference is compared 1082 to a predetermined maximum cooling temperature difference (MaxCoolDeltaTemp). If the calculated temperature difference is less than the predetermined maximum cooling temperature difference, then the value for the RequestedTemperature is reset 1084 to equal the sum of the SurroundingTemp plus the predetermined maximum cooling temperature difference.

Then a temperature change is effected 1086 for the subject test slot 500 based on the current value for the RequestedTemperature.

Methods of Operation

In use, the robotic arm 310 removes a disk drive transporter 400 from one of the test slots 500 with the manipulator 312, then picks up a disk drive 600 from one the disk drive receptacles 264 at the transfer station 200 with the disk drive transporter 400, and then returns the disk drive transporter 400, with a disk drive 600 therein, to the associated test slot 500 for testing of the disk drive 600. During testing, the test electronics 160 execute a test algorithm that includes, inter alia, adjusting the temperature of air flowing to the disk drive 600 under test. For example, during testing the disk drives 600 are each tested over a temperature range from about 20° C. to about 70° C. The blowers (i.e., the first and second blowers 722a, 722b of each pair of test slot assemblies 120a, 120b) each provide an isolated air flow past the associated electric heatpump assembly 724a, 724b and into the associated test slot 500a, 500b. After the air flow enters the test slot 500a, 500b it is directed underneath the disk drive 600 being tested by the ducting conduit 532. A return air flow passes over the disk drive 600 and is exhausted out of the outlet aperture 529 of the test slot 500a, 500b at least part of which is directed back towards the blower 722a, 722b for recirculation. The test electronics 160 can monitor the temperature of the air flow in each of the test slots 500a, 500b based on feedback received from the temperature sensors 526. The test electronics 160 can also adjust the temperature of the air flow (e.g., based on a predetermined test algorithm and/or based on feedback from the temperature sensors 526) by controlling the flow of electrical current to the associated thermoelectric cooler 742 and resistive heater 729. During testing, the blower 722a, 722b can be maintained at a constant velocity, which may help to minimize vibrations associated with the rotation of the blades 732 (particularly vibrations associated with acceleration of the blades 732). Thus, temperature of the air flow in each test slot assembly 120a, 120b can be adjusted using primarily only passive components (e.g., the thermoelectric coolers 742 and resistive heaters 729), thereby limiting the need for moving parts. Furthermore, since the blowers 722a, 722b are mounted external to the test slot, nothing is vibrating in the test slots 500a, 500b except the disk drive being tested. After testing, the robotic arm 310 retrieves the disk drive transporter 400, along with the supported disk drive 600, from the test slot 500 and returns it to one of the disk drive receptacles 224 at the transfer station 200 (or moves it to another one of the test slots 500) by manipulation of the disk drive transporter 400 (i.e., with the manipulator 312).

Other Embodiments

Other details and features combinable with those described herein may be found in the following U.S. patent applications entitled "DISK DRIVE TESTING", inventors: Edward Garcia et al., and having assigned Ser. No. 11/958,817; and "DISK DRIVE TESTING", inventors: Edward Garcia et al., and having assigned Ser. No. 11/958,788. Other details and features combinable with those described herein may also be found in the following U.S. patent applications filed concurrently herewith, entitled "Disk Drive Emulator And Method Of Use Thereof", inventors: Edward Garcia, and having assigned Ser. No. 12/104,594; "Transferring Disk Drives Within Disk Drive Testing Systems", inventors: Evgeny Polyakov et al., and having assigned Ser. No. 12/104,536; "Bulk Feeding Disk Drives To Disk Drive Testing Systems", inventors: Scott Noble et al., and having assigned Ser. No. 12/104,869; and "Vibration Isolation within Disk Drive Testing Systems", with inventor: Brian Merrow, and having assigned Ser. No. 12/105,105. The entire contents of the aforementioned applications are hereby incorporated by reference.

Figure 39A:
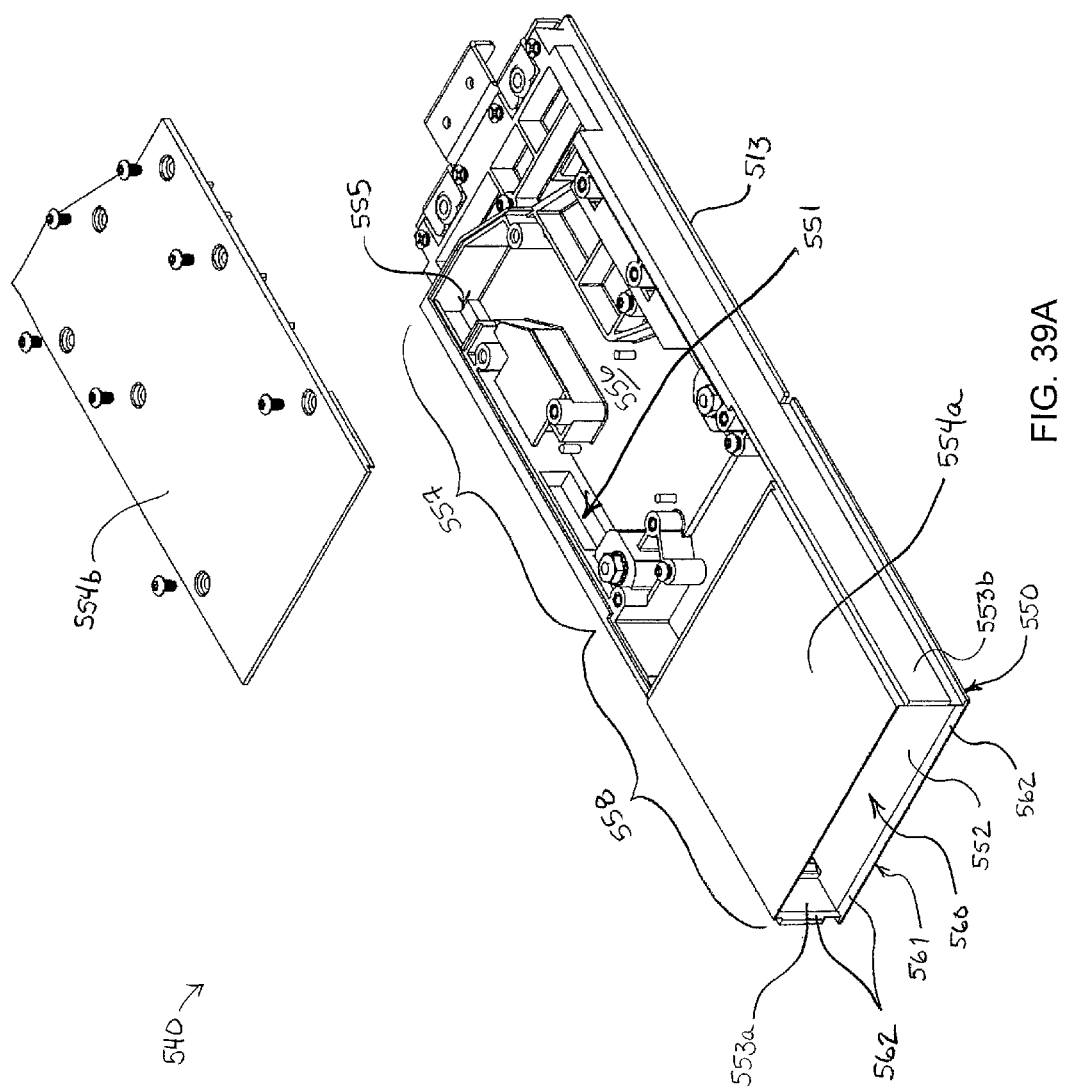
FIGS. 39A and 39B are perspective views of a test slot housing.
Figure 39B:
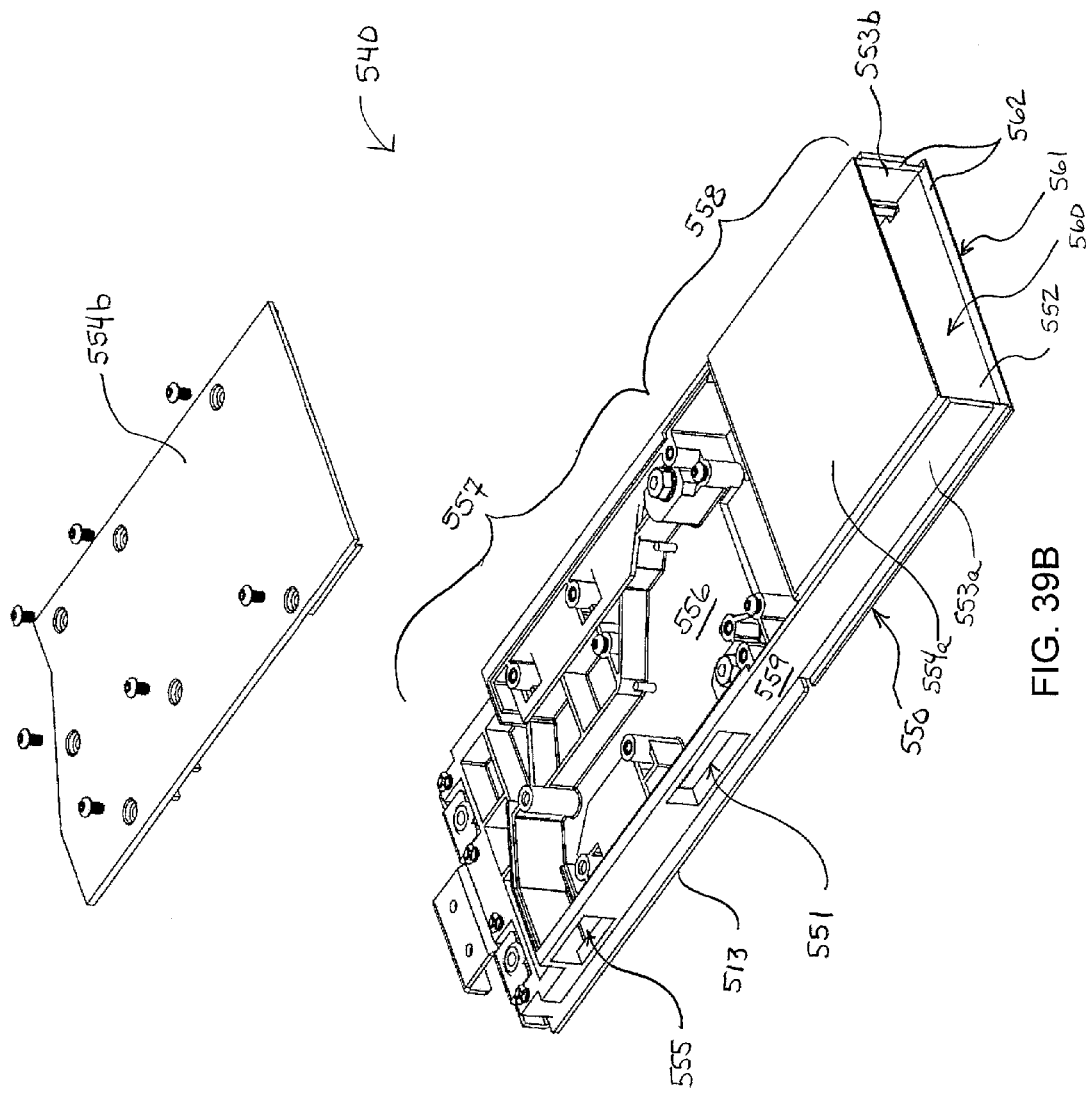

A number of implementations have been described. Nevertheless, it will be understood that various modifications may be made without departing from the spirit and scope of the disclosure. For example, FIGS. 39A and 39B illustrate another embodiment of a test slot 540. The test slot 540 includes a housing 550 having a base 552, first and second upstanding walls 553a, 553b and first and second covers 554a, 554b. In the embodiment illustrated in FIG. 39, the first cover 554a is integrally molded with the base 552 and the upstanding walls 553a, 553b. The housing 550 defines an internal cavity 556 which includes a rear portion 557 and a front portion 558. The front portion 558 defines a test compartment 560 for receiving and supporting one of the disk drive transporters 400 (FIG. 7A). The base 552, upstanding walls 553a, 553b, and the first cover 554a together define a first open end 561, which provides access to the test compartment 560 (e.g., for inserting and removing the disk drive transporter 400), and the beveled edges 562, which abut the face plate 412 of a disk drive transporter 400 inserted in the test slot 500 to provide a seal that inhibits the flow of air into and out of the test slot 500 via the first open end 561. The first upstanding wall 553a defines an inlet aperture 551 and an outlet aperture 555. The inlet and outlet apertures 551, 555 extend between an outer surface 559 (FIG. 39B) of the housing 550 and the internal cavity 556.

Figure 40A:
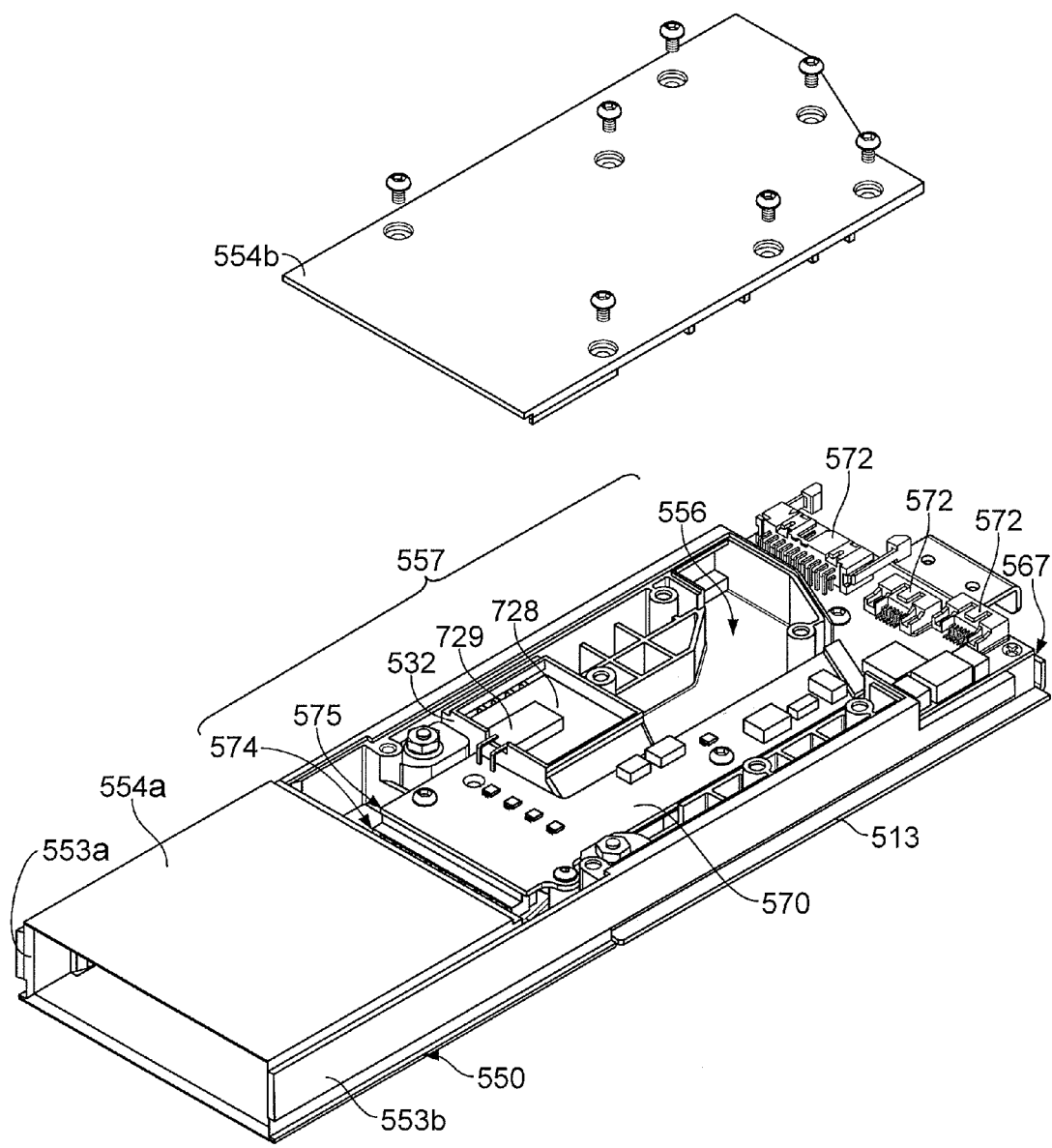
FIGS. 40A-40E are perspective views of a test slot.
Figure 40B:
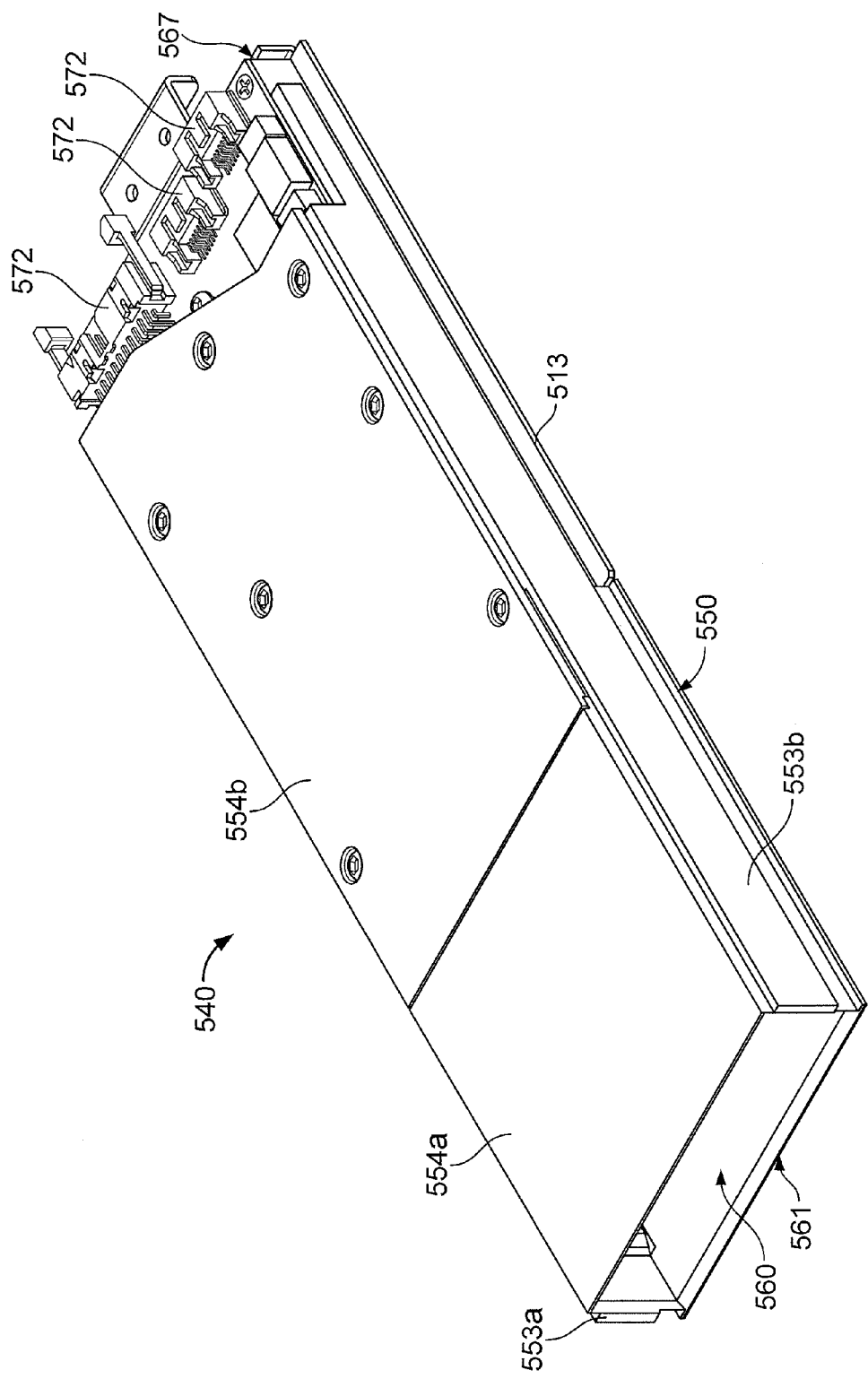

As shown in FIGS. 40A and 40B, the rear portion 557 of the internal cavity 556 houses a connection interface board 570, which carries the connection interface circuit 182 (FIGS. 9 and 10). In the embodiment shown in FIGS. 40A and 40B, the connection interface board 570 extends between the test compartment 560 and a second end 567 of the housing 550. This embodiment eliminates the ribbon cable 522 described above with regard to FIG. 19. A plurality of electrical connectors 572 are disposed along a distal end 573 of the connection interface board 570. The electrical connectors 572 provide for electrical communication between the connection interface circuit 182 and the test electronics 160 (e.g., self test system 180 and/or functional test system 190) in the associated test rack 100. The connection interface board 570 also includes a test slot connector 574, arranged at a proximal end 575 of the connection interface board 570, which provides for electrical communication between the connection interface circuit 182 and a disk drive 600 in the test slot 500.

Figure 40C:
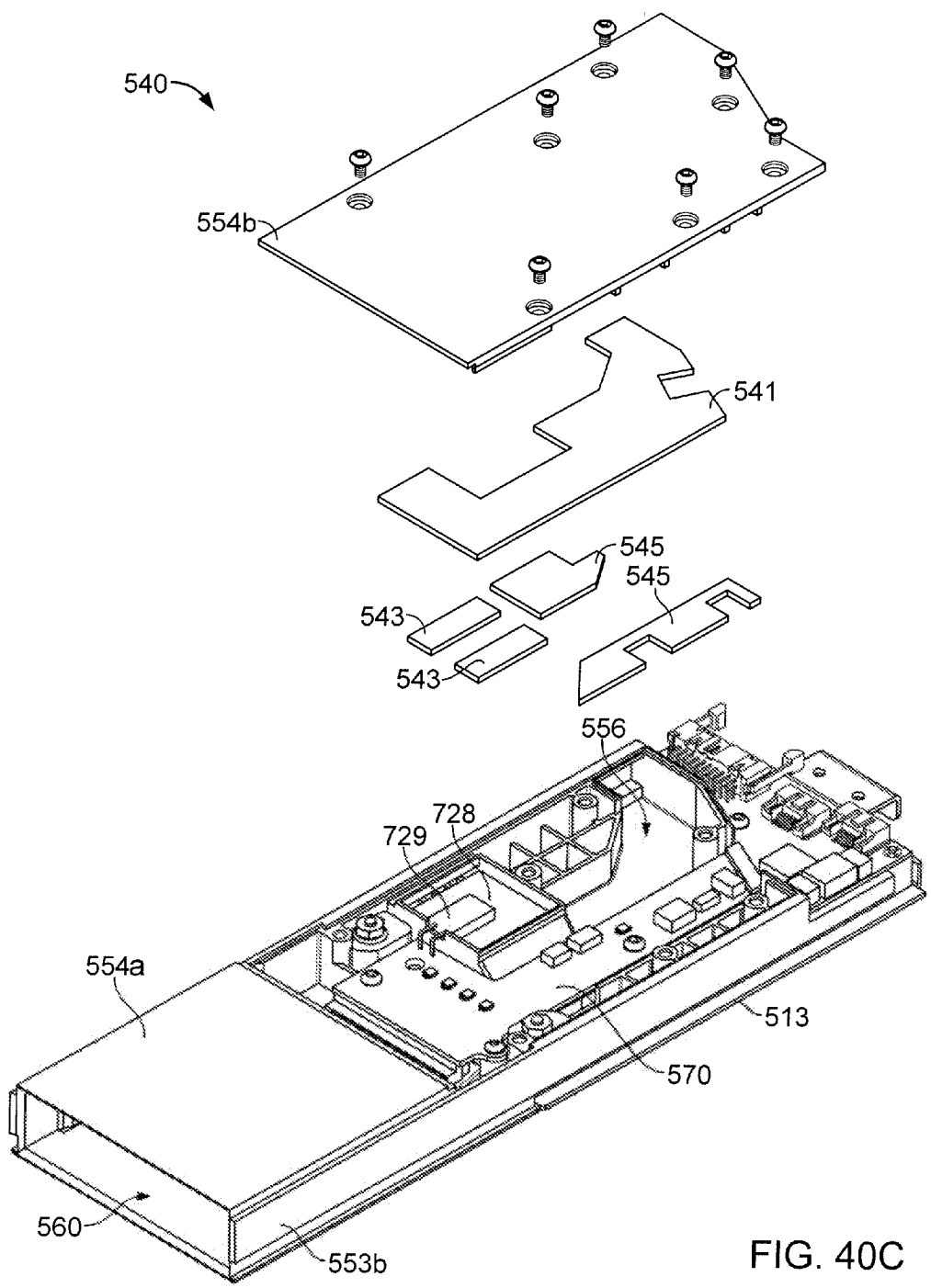
Figure 40D:
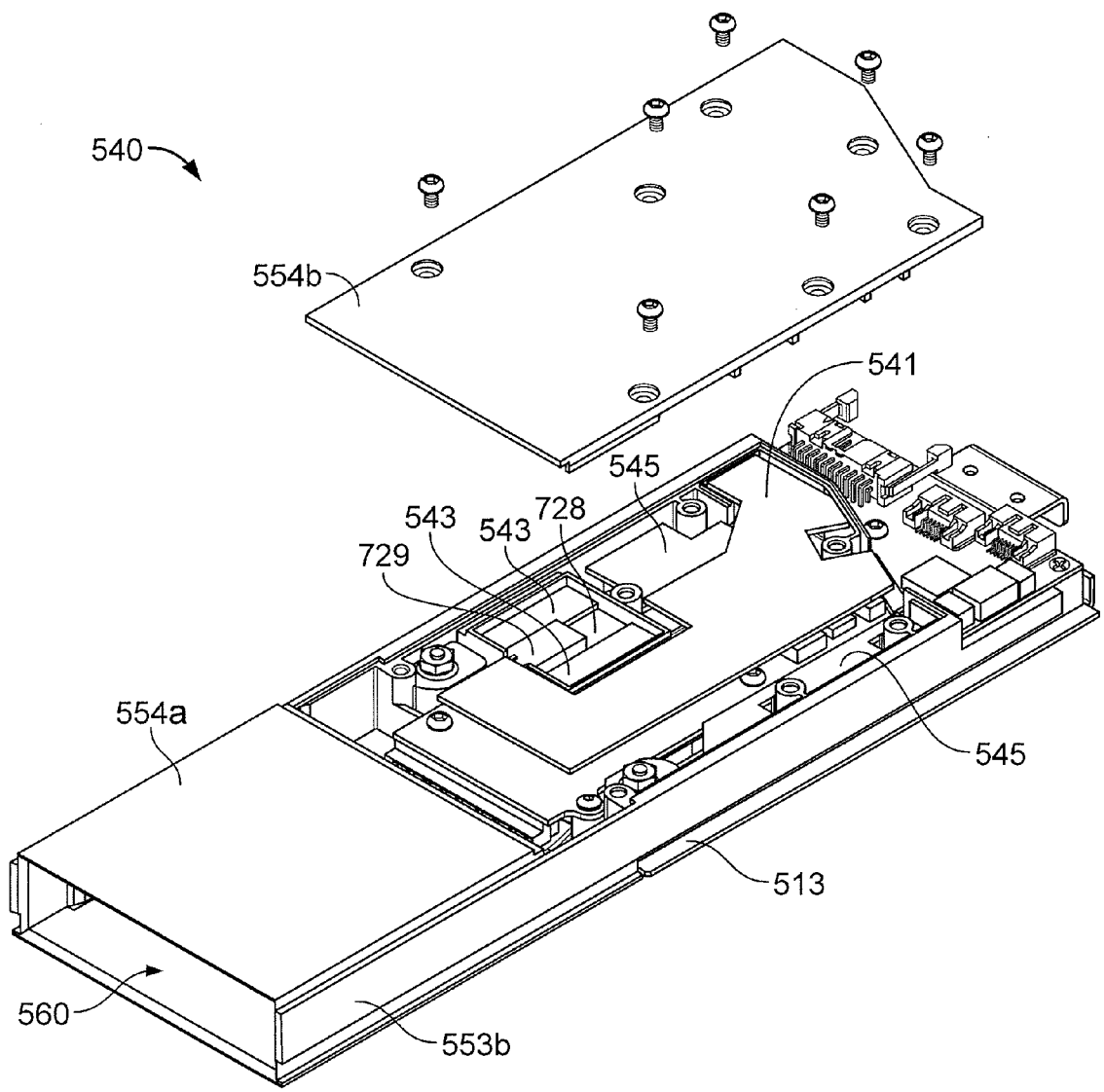

As shown in FIGS. 40C and 40D, the test slot 540, can include a first insulating member 541 disposed between the second cover 554b and the connection interface board 570. The first insulating member 541 inhibits the transfer of thermal energy between the internal cavity 556 and the environment surrounding the test slot 540. Second insulating members 543 are disposed between the heater heatsink 728 and the second cover 554b and inhibit the transfer of thermal energy therebetween. The test slot 540 may also include third insulating members 545 disposed between the internal cavity 556 along the first and second upstanding walls 553a, 553b. The third insulating members 545 help to further inhibit the transfer of thermal energy between the internal cavity 556 and the second cover 554b, and may also help to inhibit the exchange of air between the internal cavity 556 and the environment surrounding the test slot 540 at the interface between the first and second upstanding walls 553a, 553b and the second cover 554b.

Figure 40E:
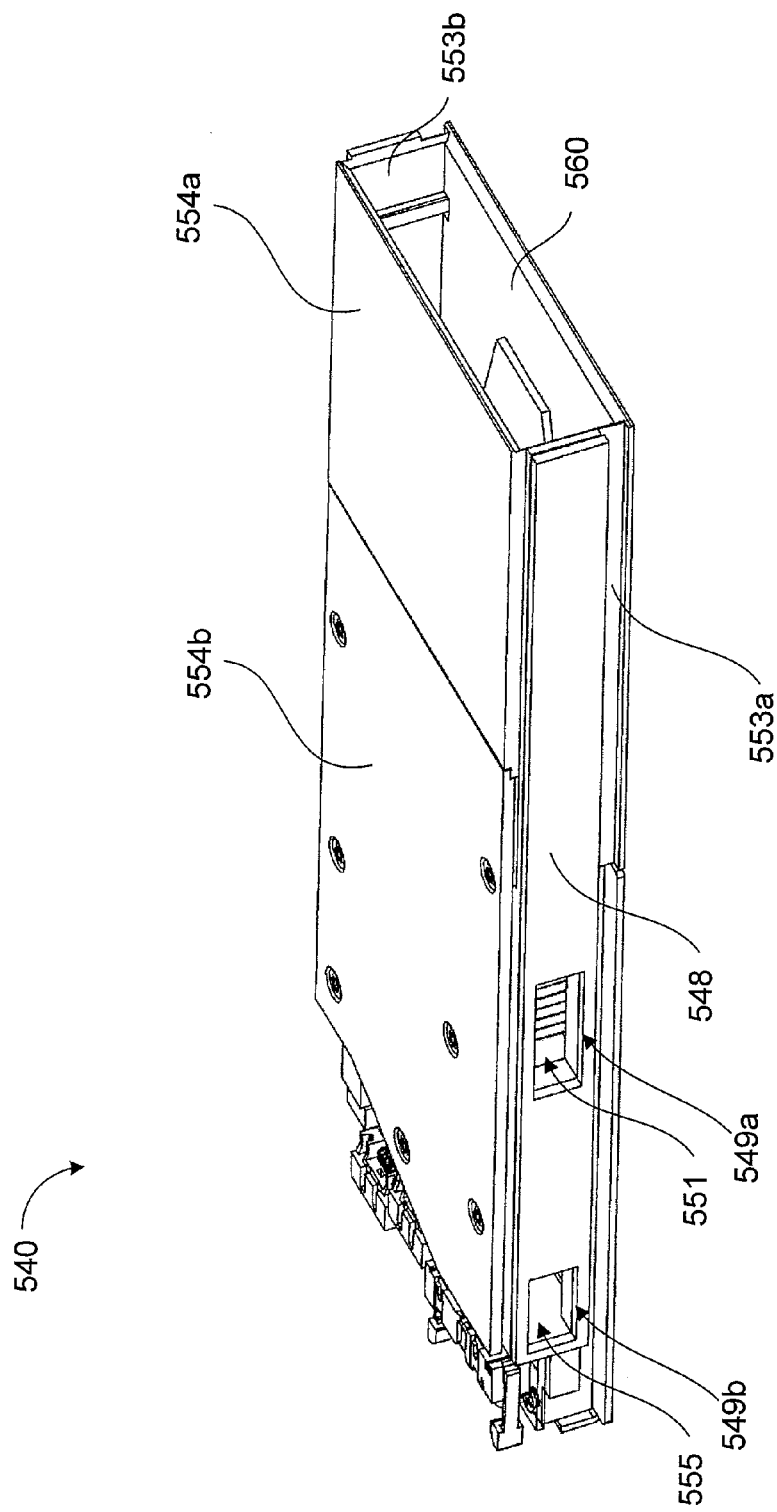

As shown in FIG. 40E, the test slot 540 can also include an insulator 548 (e.g., a foam insulator) connected (e.g., with an adhesive) to the outer surface 559 of the housing 550. The insulator 548 includes first and second openings 549a, 549b which align with the inlet and outlet apertures 551, 555. As discussed above, e.g., with regard to FIGS. 36A and 36B, the insulator 548 allows for communication with corresponding ones of the air mover assemblies while, at the same time, helps to inhibit the loss of the air flows to the surrounding environment within the test slot compartment 700 (see, e.g., FIG. 11B).

Figure 41A:
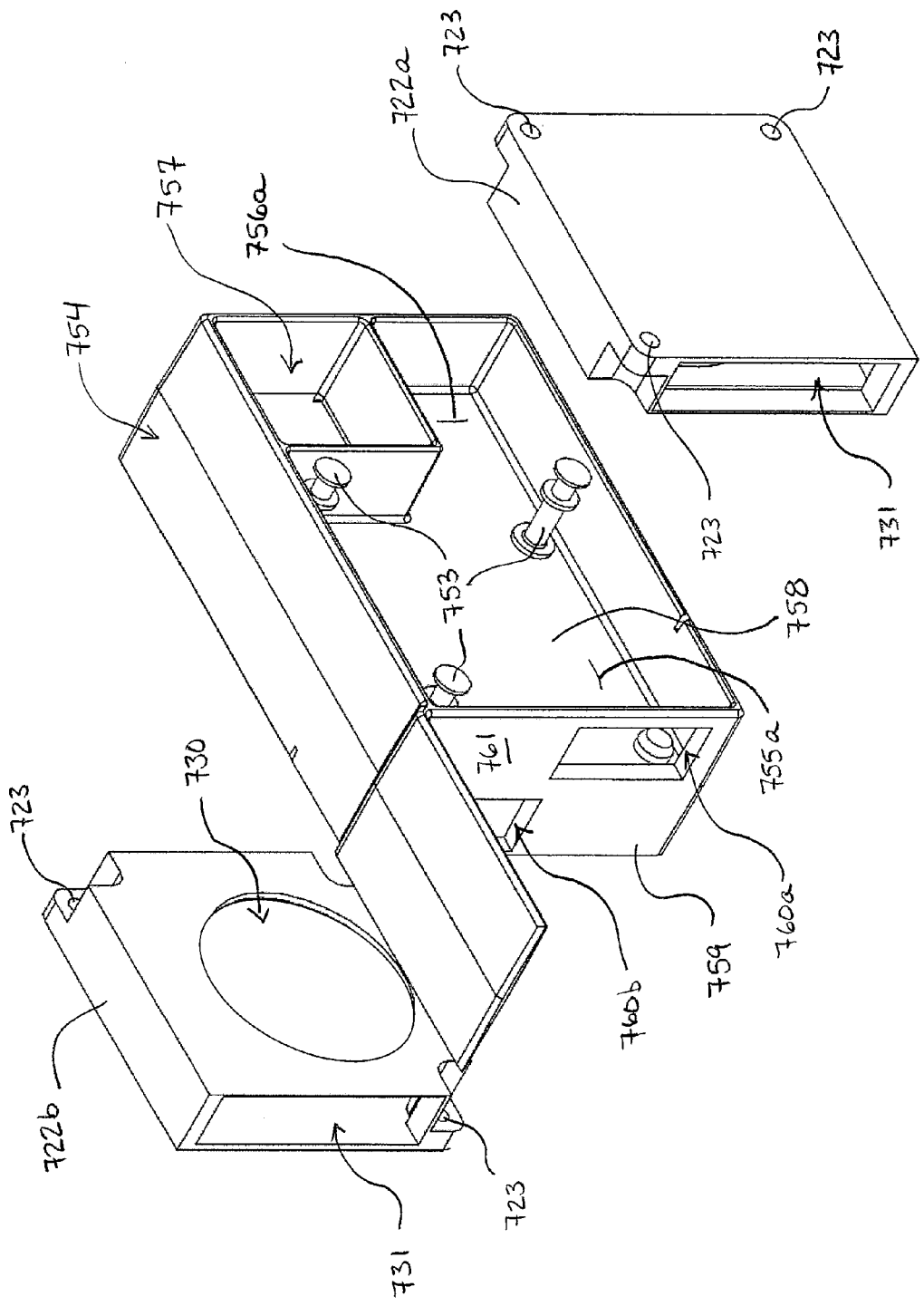
FIGS. 41A-41C are perspective views of an air mover assembly.
Figure 41B:
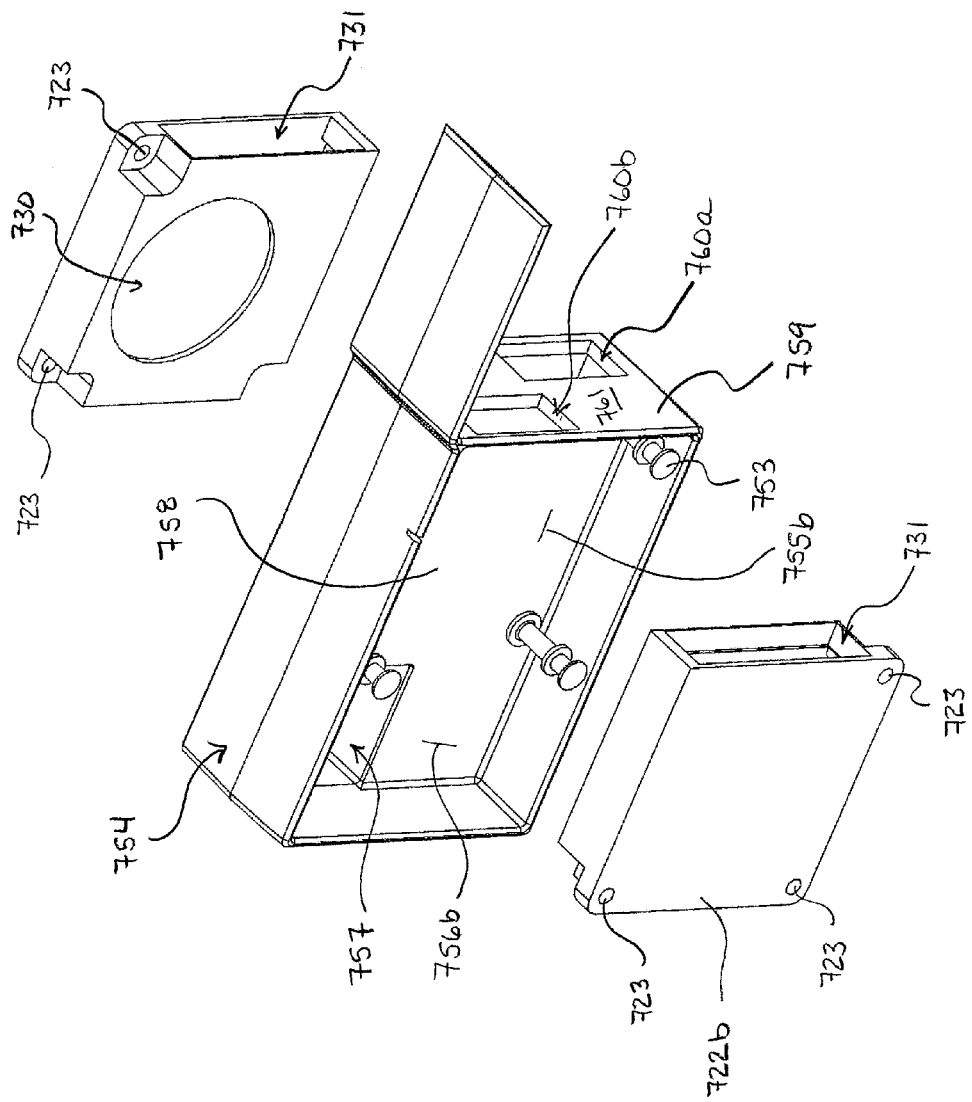
Figure 41C:
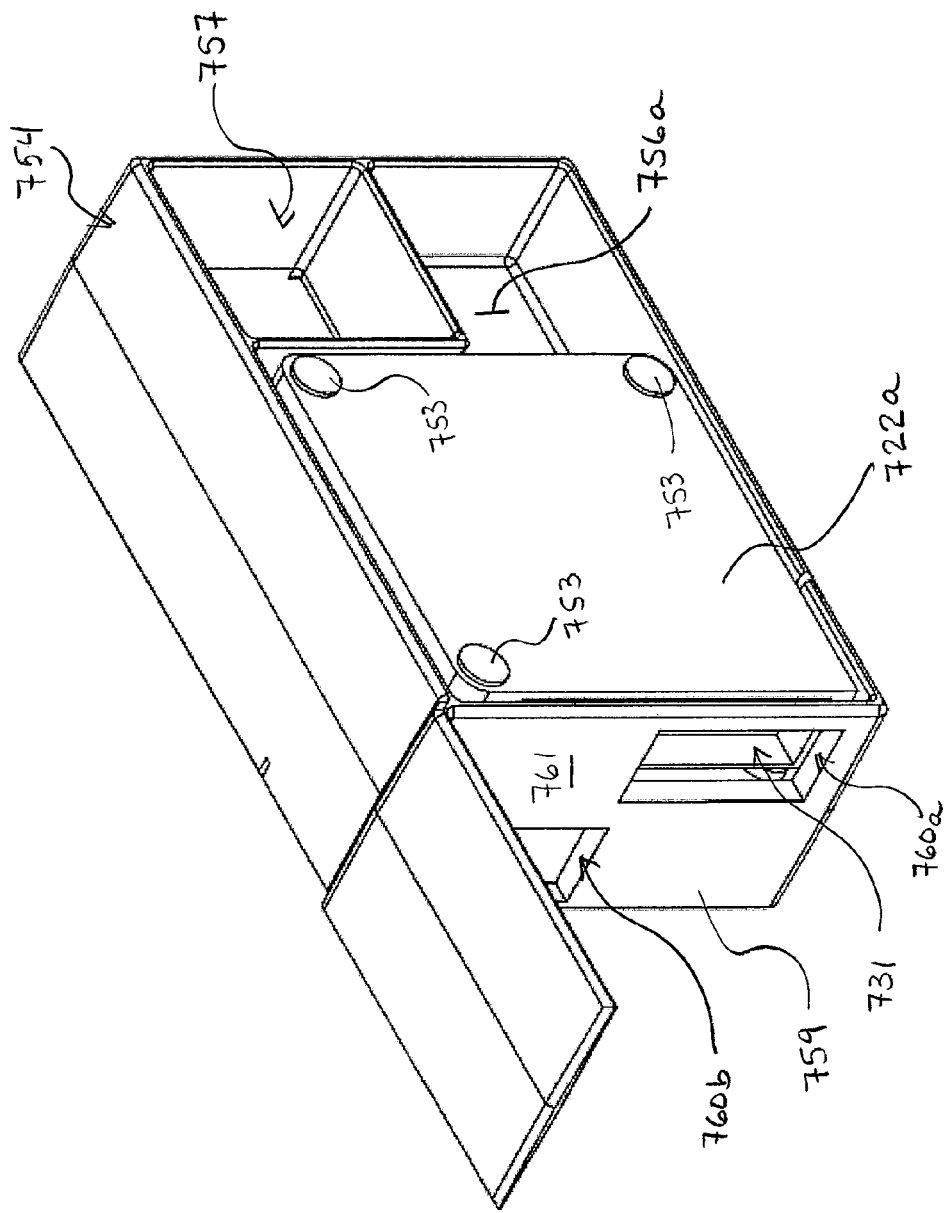

While the air mover assemblies described above include an air mover housing formed of a flexible, damping material for mounting the associated pair of blowers, the blowers need not be mounted in such a flexible air mover housing. For example, in another embodiment, illustrated in FIGS. 41A-41C, the first and second blowers 722a, 722b are mounted in a substantially rigid air mover housing 754 (e.g., a molded plastic part). A plurality of isolators 753 are connected to the air mover housing 754. The isolators 753 are configured to engage mounting holes 723 on the blowers 722a, 722b, thereby to mount the blowers 722a, 722b to the air mover housing 754. The isolators 753 are formed (e.g., molded) from a damping material, e.g., thermoplastics, thermosets, etc., which aids in isolating vibrations produced by the blowers 722a, 722b. Referring to FIGS. 41A and 41B, the air mover housing 754 defines a first pocket 755a (FIG. 41A) for receiving the first blower 722a and a second pocket 755b (FIG. 41B) for receiving the second blower 722b. The air mover housing 754 also defines a first ducting region 756a (FIG. 41A). Following assembly, the first ducting region 756a is substantially aligned with the outlet aperture 529 (FIG. 36A) of the first test slot 500a (FIG. 36A) and acts as a duct providing for the flow of air between the outlet aperture 529 of the first test slot 500a and the air inlet 730 of the first blower 722a. The air mover housing 754 also defines a second ducting region 756b (FIG. 41B) including a through-hole 757. Following assembly, the second ducting region 756b is substantially aligned with the outlet aperture 529 (FIG. 36A) of the second test slot 500b (FIG. 36A) and acts as a duct providing for the flow of air between the outlet aperture 529 of the second test slot 500b and the air inlet 730 (FIG. 41A) of the second blower 722b. Within the air mover housing 754, the first and second blowers 722 are mounted in face-to-face relation and are separated by a dividing wall 758 of the air mover housing 754. That is to say, the air inlets 730 of the blowers 722a, 722b face opposing sides of the dividing wall 758. The air mover housing 754 also includes a first sidewall 759 that defines first and second ducting apertures 760a, 760b. The first ducting aperture 760a extends from an outer surface 761 of the first sidewall 759 into the first pocket 755a, and the second ducting aperture 760b extends from the outer surface 761 of the first sidewall 759 into the second pocket 755b (FIG. 41B). FIG. 41C shows the first blower 722a mounted within the air mover housing 754, with the air outlet 731 of the first blower 722a substantially aligned with the first ducting aperture 760a of the air mover housing 754.

Figure 42:
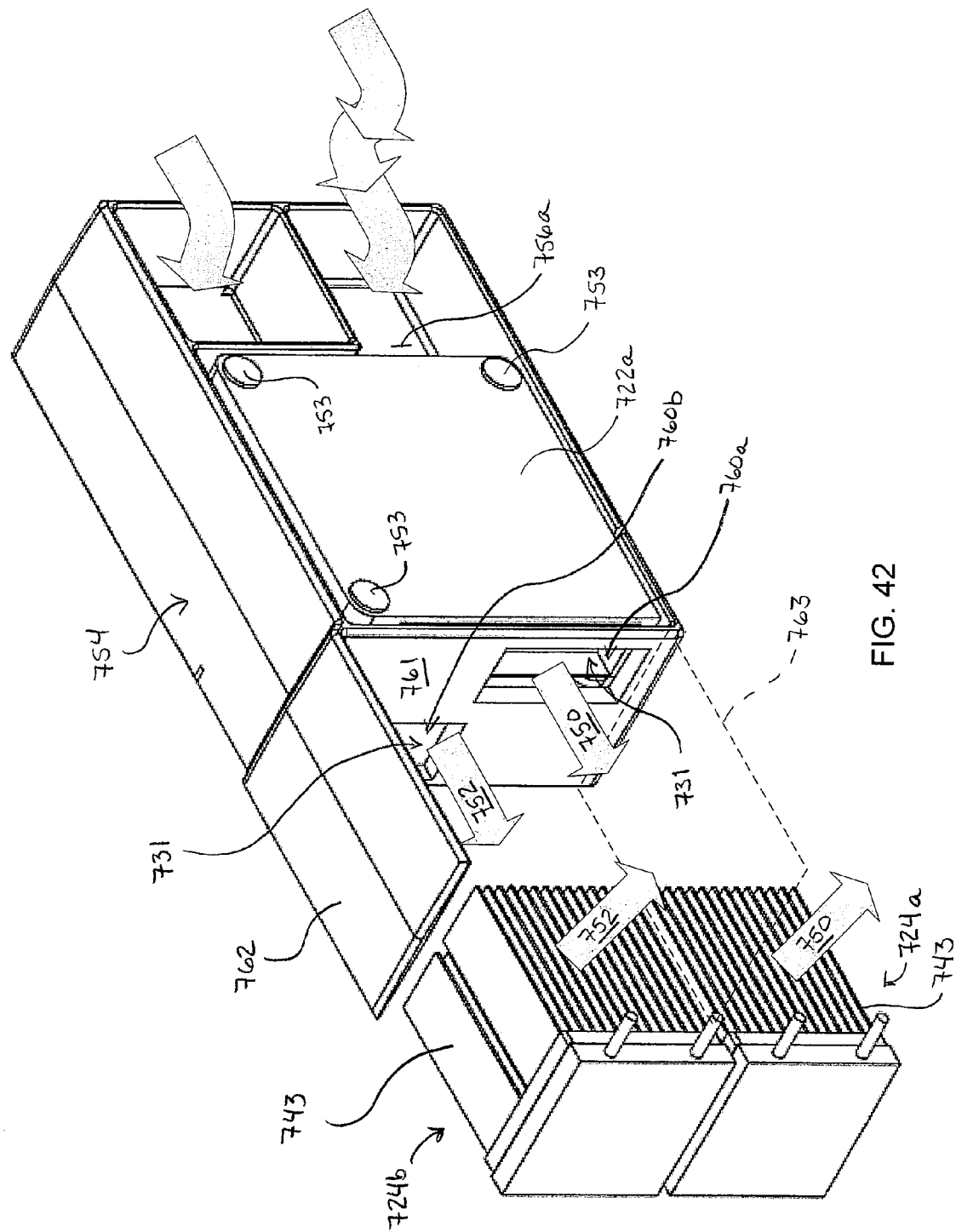
FIG. 42 is a perspective view of the air mover assembly of FIGS. 41A-41C and a pair of electric heatpump assemblies.

As illustrated in FIG. 42, following assembly, the first ducting aperture 760a operates as a duct to direct an air flow 750 exiting the air outlet 731 of the first blower 722a towards the first electric heatpump assembly 724a, and, similarly, the second ducting aperture 760b operates as a duct to direct an air flow 752 exiting the air outlet 731 of the second blower 722b towards the second electric heatpump assembly 724b. As shown in FIG. 42, additional ducting is provided in the form of a first deck 762 which extends outwardly from the first sidewall 759. The first deck 762 can be, for example, a separate piece that is mounted to the air mover housing 754, or can be integrally molded with the air mover housing 754. The first deck 762 helps to direct the air flow 752 exiting the air mover housing 754 toward the second electric heatpump assembly 724b. Alternatively or additionally, a second deck 763 (shown in hidden lines) can be provided to help direct the air flow 750 exiting the air mover housing 754 toward the first electric heatpump assembly 724a. This additional ducting can serve as a substitute for the first ducting features 115a described above with regard to FIG. 31. This additional ducting also aids in isolating the air flows passing between the test slots and the air mover assemblies and helps to inhibit the loss of the air flows to the surrounding environment within the test slot compartment 700 (see, e.g., FIG. 11B).

Figure 43:
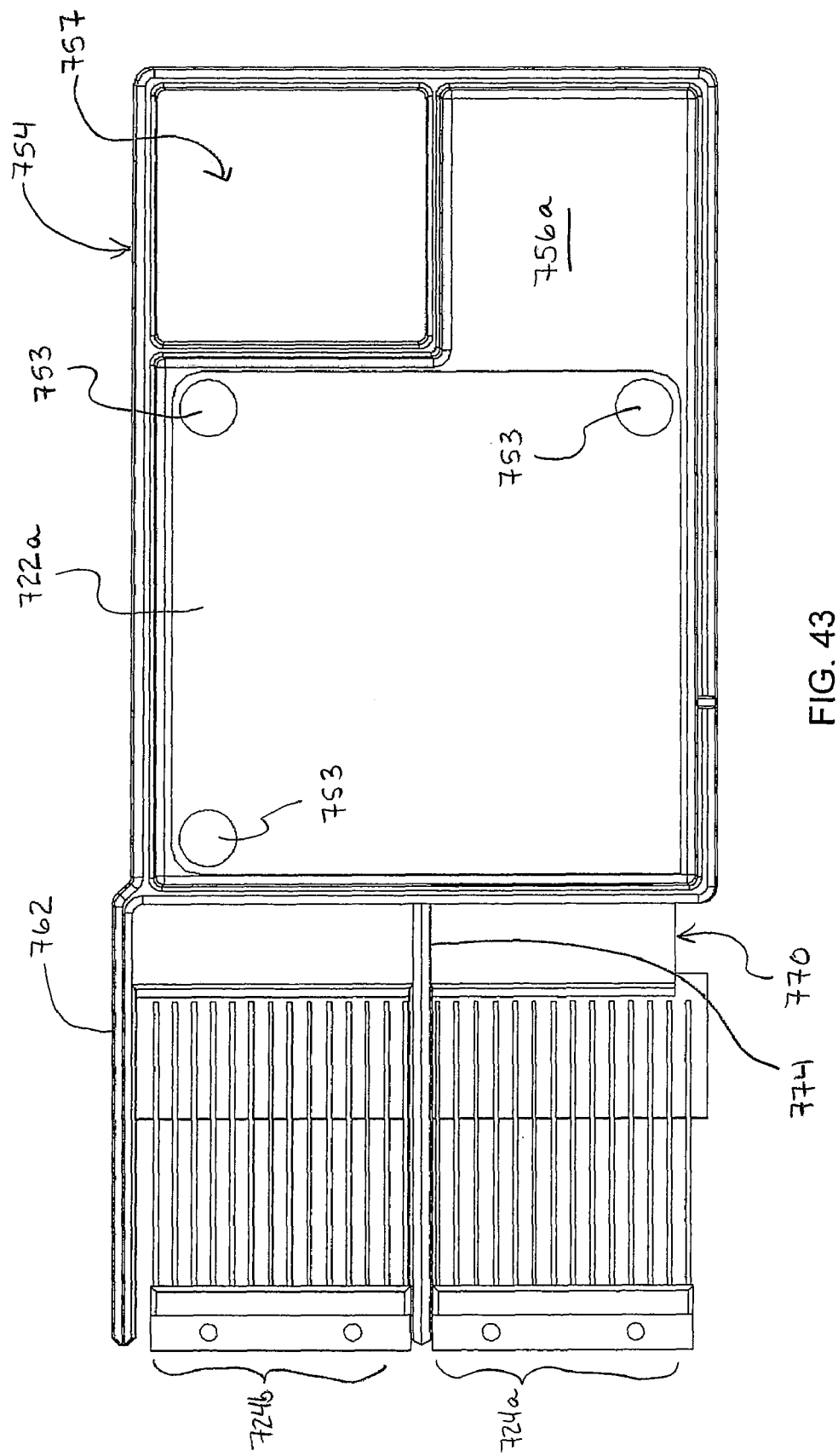
FIG. 43 is a side view of the air mover assembly and electric heatpump assemblies of FIG. 42.
Figure 44:
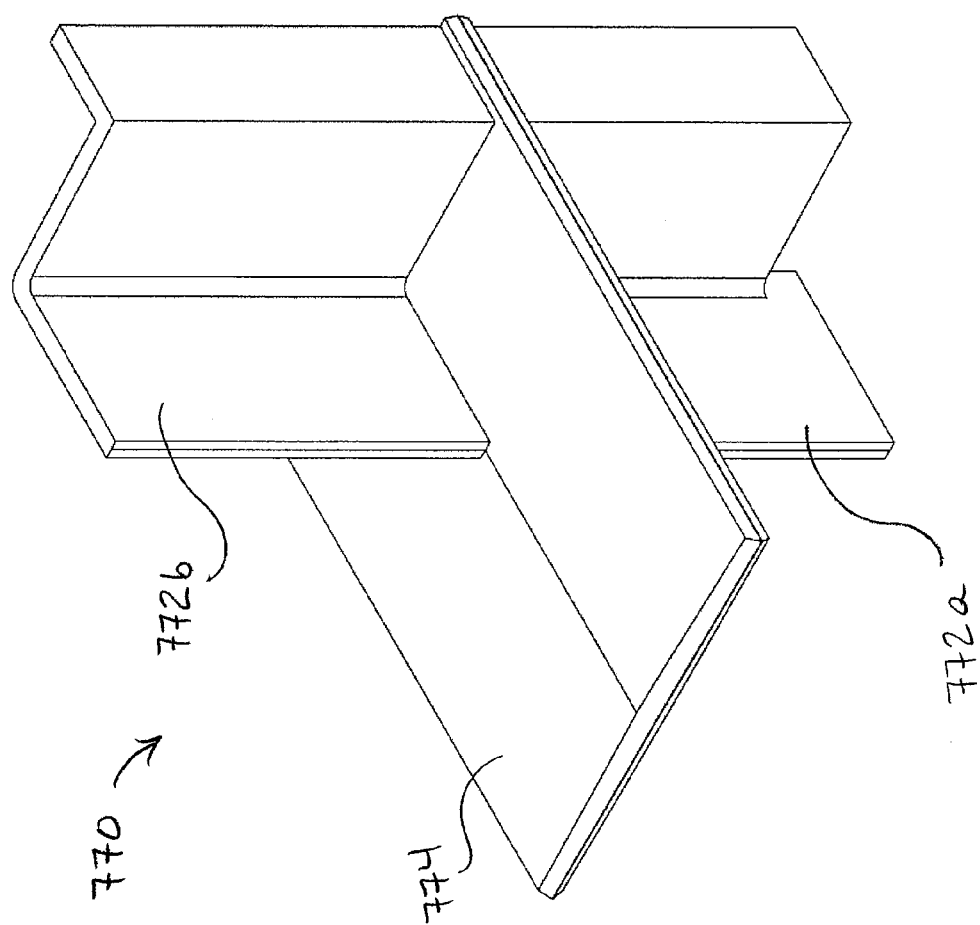
FIG. 44 is a perspective view of a baffle member.
Figure 45A:
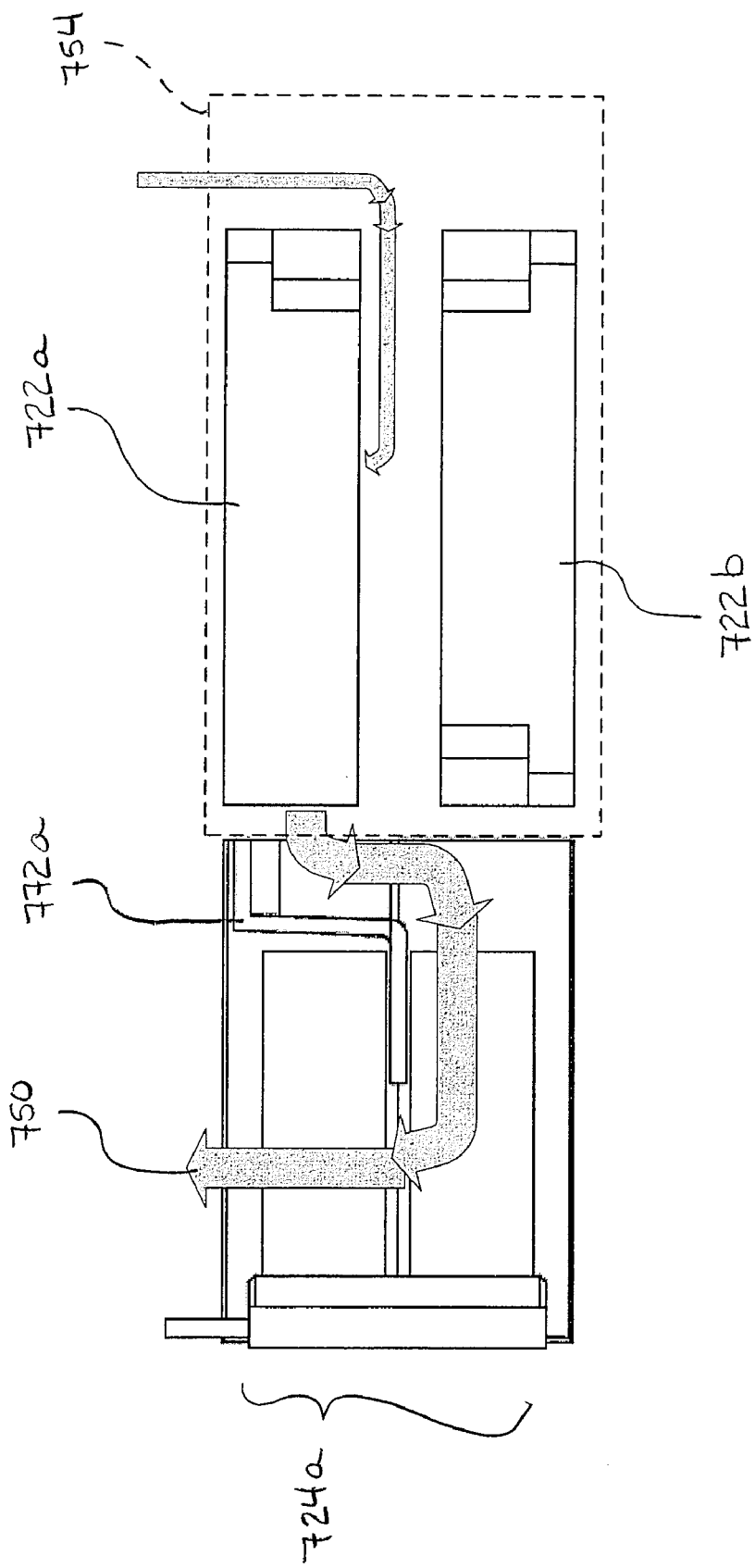
FIG. 45A is a bottom view of the air mover assembly and electric heatpump assemblies of FIG. 42 illustrating an air flow pattern.
Figure 45B:
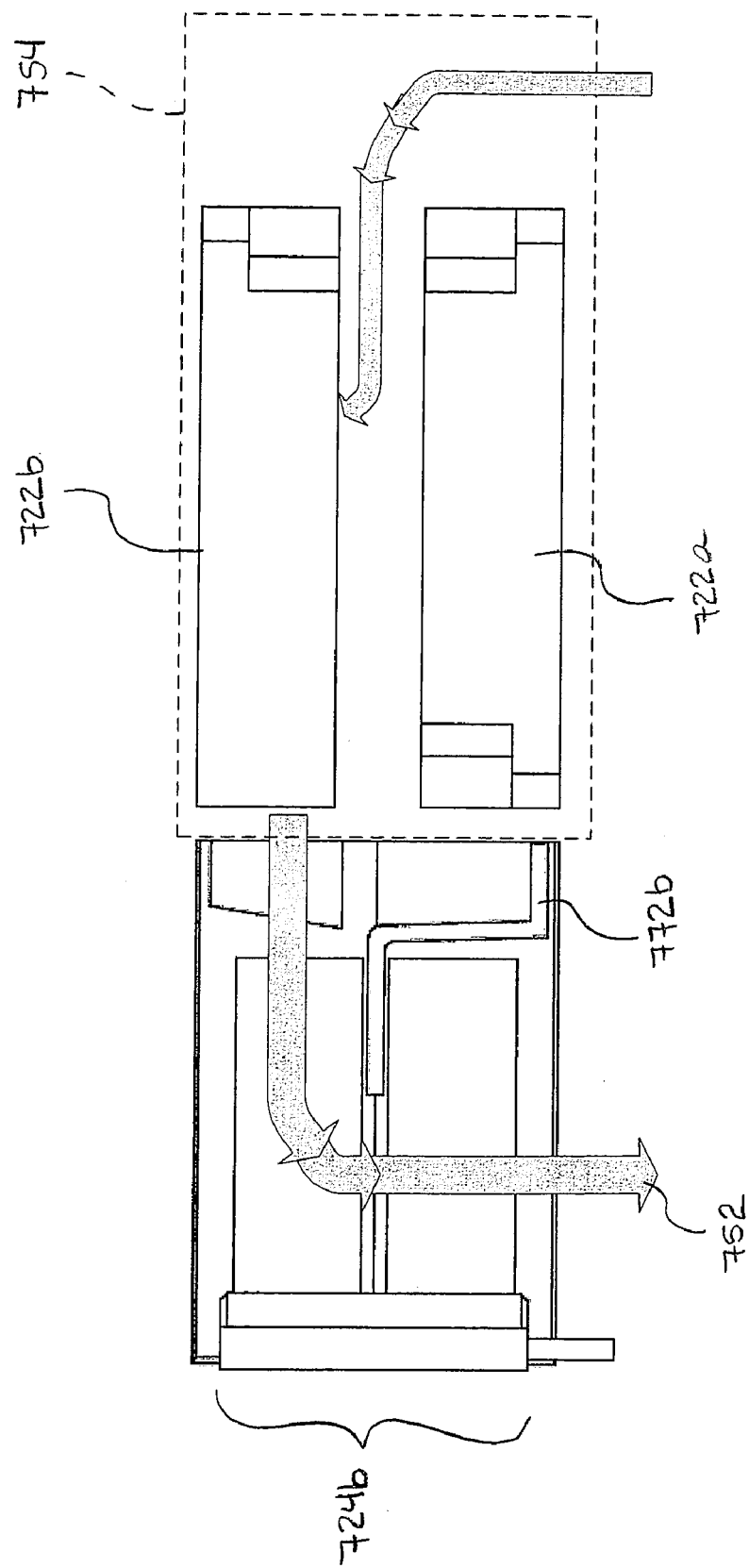
FIG. 45B is a top view of the air mover assembly and electric heatpump assemblies of FIG. 42 illustrating an air flow pattern.

As shown in FIG. 43 (partially exploded view), a baffling member 770 can also be provided for directing air flows 750, 752 (FIG. 42) from the air mover housing 754 toward the first and second electric heatpump assemblies 724a, 724b. Referring to FIG. 44, the baffle member 770 includes a first and second baffles 772a, 772b, and a short deck 774. When the baffle member 770 is assembled between the air mover housing 754 and the first and second electric heatpump assemblies 724a, 724b, the short deck 774 is disposed between the respective heat sinks 743 of the first and second electric heatpump assemblies 724a, 724b and operates to keep the air flows 750, 752 substantially isolated from one another. In this manner, the short deck 774 can be used as a substitute for the second ducting features 11 5b described above with regard to FIG. 31. As illustrated in FIG. 45A, the first baffle 772a operates to direct the air flow 750 exiting the air outlet 731 of the first blower 722a towards the first electric heatpump assembly 724a. Similarly, as illustrated in FIG. 45B, the second baffle 772b operates as a duct to direct the air flow 752 (FIG. 42) exiting the air outlet 731 of the second blower 722b towards the second electric heatpump assembly 724b. The baffling member 770 is also designed to ensure equal flow between the two associated ones of the test slots 500a, 500b.

Figure 46A:
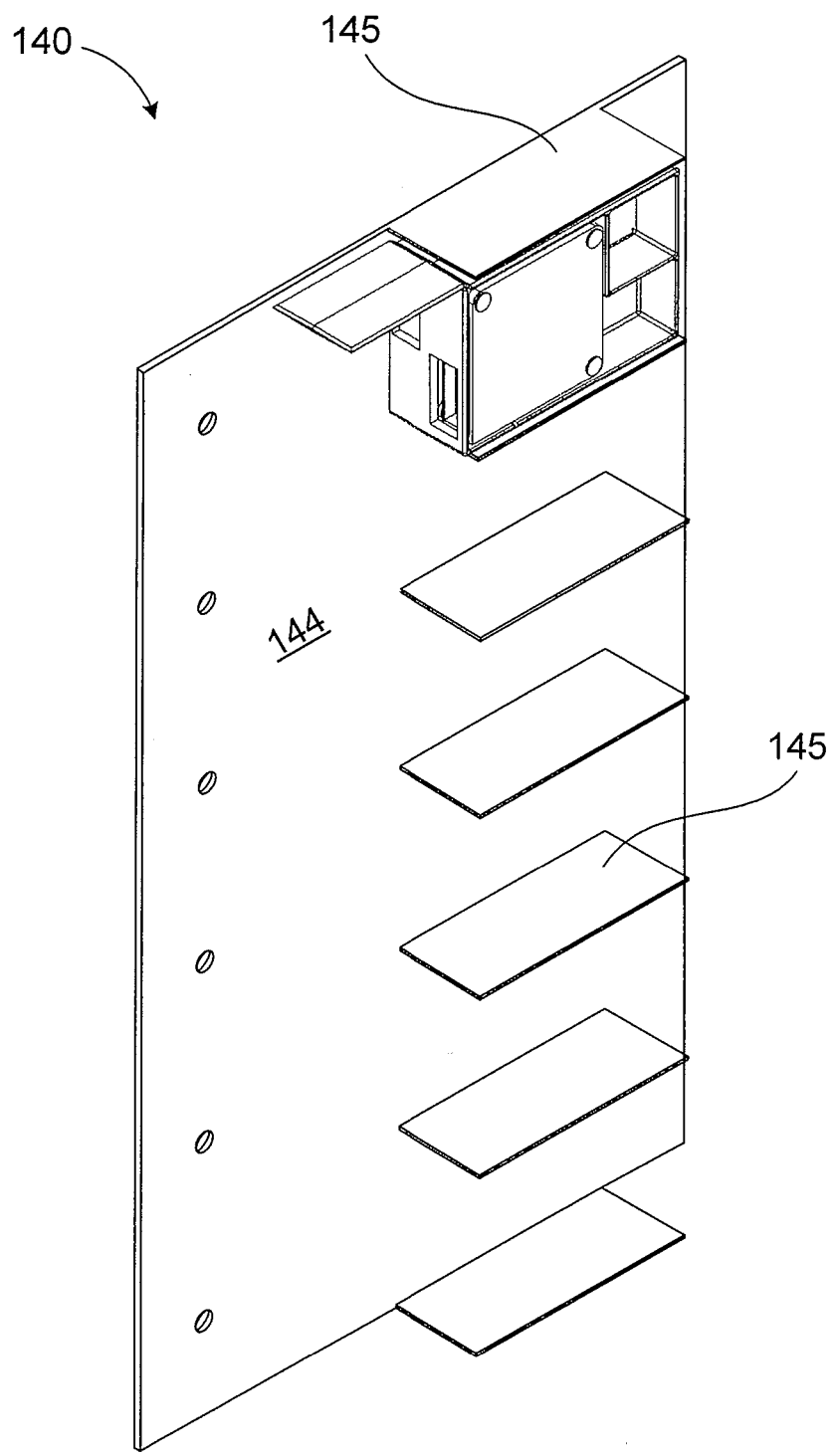
FIGS. 46A and 46B are perspective views of a first side wall from a slot bank.
Figure 46B:
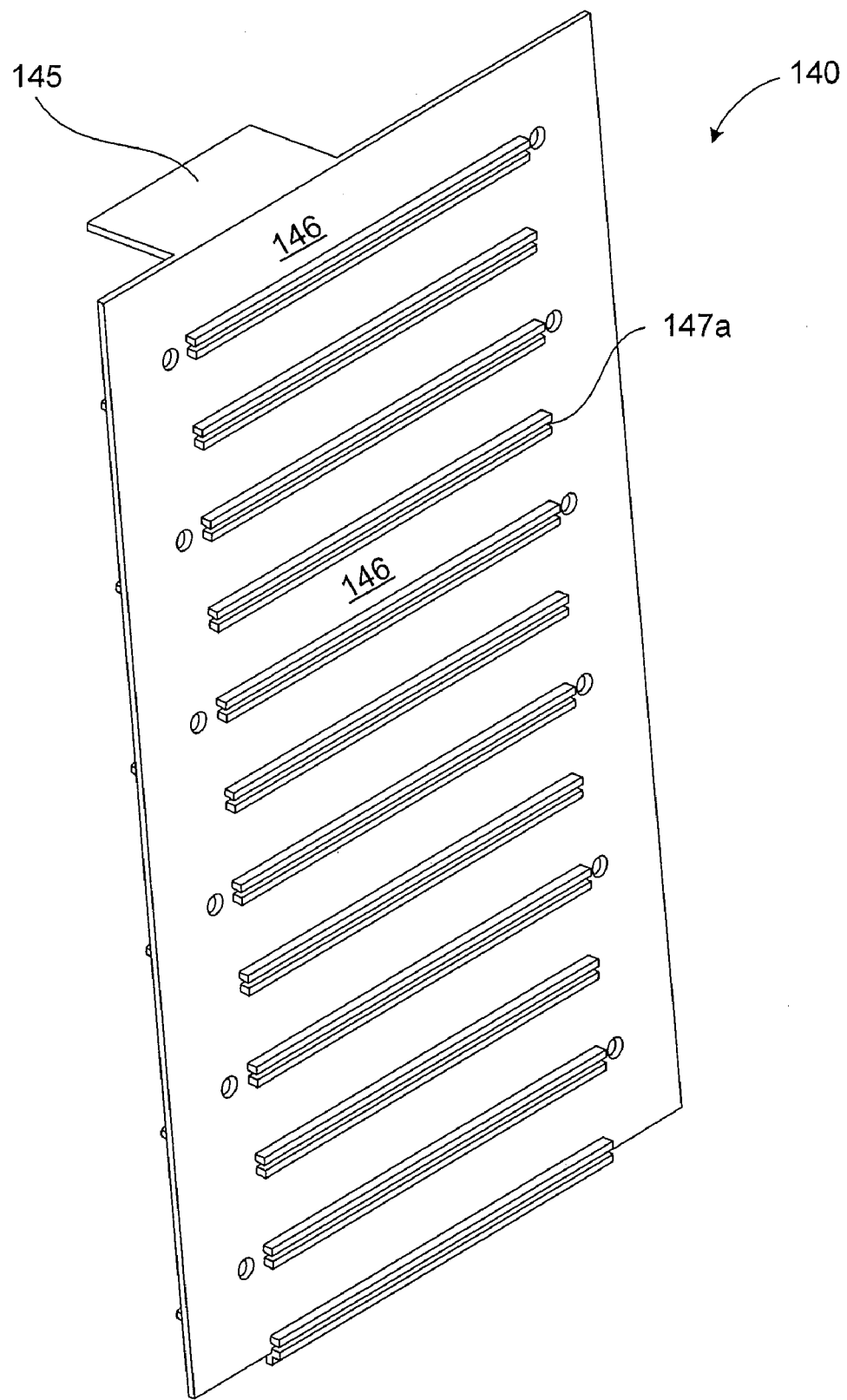

FIGS. 46A and 46B illustrate an embodiment of a first sidewall 140 that is configured to receive and support the air mover housing 754 of FIGS. 41A-41C. As shown in FIG. 46A, along a first surface 144 the first side wall 140 defines a plurality of mounting flanges 145 adapted to receive the air mover housings 754 therebetween. As mentioned above, the first sidewall 140 can be mounted between adjacent chassis members 104 (see, e.g., FIG. 32) opposite one of the second side walls 113 (FIG. 35) such that the air mover housing 754 is disposed between the first sidewall 104 and the second sidewall 112. As shown in FIG. 46B, along a second surface 146 the first side wall 140 includes a plurality of first card guide assemblies 147a each configured to receive and support a first side of one of the test slot mounting plates 513 (see, e.g., FIG. 15A).

While test slot thermal control systems have been described above in which an air flow enters the test slot through the inlet aperture, then is directed underneath a disk drive in the test compartment via the ducting conduit, and then is exhausted through the outlet aperture, in some cases, the air flow pattern can be different, e.g., the air flow pattern can be reversed. For example, in some cases, the blower can be arranged to direct an air flow into an associated one of the test slots through the outlet aperture, where it will then pass over a disk drive within the test compartment, and then be directed out of the inlet aperture via the ducting conduit.

While test slot thermal control systems have been described above in which the first and second blowers 722a, 722b (FIG. 22A) are maintained at a constant velocity to minimize vibrations associated with the rotation of the blades 732 (FIG. 22A), in some cases the speed of the first and/or second blowers 722a, 722b can be adjusted (e.g., to effect cooling). Accordingly, other implementations are within the scope of the following claims.

What is claimed is:

1. A disk drive testing system cooling circuit comprising:
   A) a plurality of test racks each comprising:
     i) a test slot compartment comprising
       a) multiple test slots; and
       b) one or more cooling conduits configured to convey a cooling liquid toward the test slots; and
     ii) a test electronics compartment comprising:
       a) test electronics configured to communicate with the test slots for executing a test algorithm; and b) a heat exchanger in fluid communication with the one or more cooling conduits and configured to cool an air flow directed toward the test electronics.

2. The disk drive testing system cooling circuit of claim 1, further comprising an inlet conduit disposed between the cooling conduits and a liquid supply line and configured to convey a liquid flow from the liquid supply line toward the cooling conduits.

3. The disk drive testing system cooling circuit of claim 2, wherein the inlet conduit includes a strainer configured to remove particulate from the liquid flow.

4. The disk drive testing system cooling circuit of claim 2, wherein the inlet conduit includes a forward-pressure regulator configured to control the inlet pressure of the liquid flow to the cooling conduits.

5. The disk drive testing system cooling circuit of claim 2, wherein the inlet conduit includes a distribution manifold comprising a plurality of tee connections each configured to portion the liquid flow to a corresponding one of test racks.

6. The disk drive testing system cooling circuit of claim 2, wherein the inlet conduit comprises a shut-off valve configured to isolate the test racks from the liquid supply line.

7. The disk drive testing system cooling circuit of claim 2, wherein the inlet conduit comprises a plurality of shut-off valves each configured to isolate a corresponding one of the test racks from the liquid supply line.

8. The disk drive testing system cooling circuit of claim 1, further comprising an outlet conduit disposed between the heat exchangers and a liquid return line and configured to convey a liquid flow from the heat exchangers toward the liquid return line.

9. The disk drive testing system cooling circuit of claim 8, wherein the outlet conduit comprises a return manifold comprising a plurality of tee connections each providing a fluid connection between a corresponding one of the heat exchangers and the return manifold.

10. The disk drive testing system cooling circuit of claim 8, wherein the outlet conduit includes a shut-off valve configured to isolate the test racks from the liquid return line.

11. The disk drive testing system cooling circuit of claim 8, wherein the outlet conduit comprises a plurality of shut-off valves each configured to isolate a corresponding one of the test racks from the liquid return line.

12. The disk drive testing system cooling circuit of claim 8, wherein at least one of the test racks further comprises an air mover disposed within the test electronics compartment and configured to direct an air flow across the heat exchanger and toward the test electronics for cooling the test electronics.

13. The disk drive testing system cooling circuit of claim 1, wherein the test electronics compartments are substantially isolated from the test slot compartments such that air flow between the test electronics compartments and the test slot compartments is substantially inhibited.

14. A disk drive testing system cooling circuit comprising:
A) a test rack comprising:
 i) a test slot compartment comprising:
  a) a test slot, and
 ii) a test electronics compartment comprising:
  a) test electronics configured to communicate with the test slot for executing a test algorithm;
B) an inlet conduit configured to convey a liquid to the test rack from an external source, and
C) an outlet conduit in fluid communication with the inlet conduit and configured to convey a liquid from the test rack to a location remote from the test rack; and
 i) a heat exchanger comprising:
  a) an inlet port in fluid communication with the inlet conduit, and
  b) an outlet port in fluid communication with the outlet conduit;
 ii) a first air mover configured to direct cooled air from the heat exchanger toward the test electronics for cooling the test electronics; and
D) a cooling conduit disposed within the test slot compartment configured to convey a cooling liquid towards the test slot, the cooling conduit comprising:
 i) an inlet opening in fluid communication with the inlet conduit, and
 ii) an outlet opening in fluid communication with the outlet conduit.

15. The disk drive testing system cooling circuit of claim 14, wherein the test slot comprises:
a housing comprising:
 an outer surface,
 an internal cavity defined by the housing and comprising a test compartment for receiving a disk drive for testing, and
 an inlet aperture extending from the outer surface of the housing to the internal cavity.

16. The disk drive testing system cooling circuit of claim 15, further comprising a second air mover disposed outside of the internal cavity and configured to direct an air flow towards the test compartment through the inlet aperture.

17. The disk drive testing system cooling circuit of claim 14, further comprising a thermoelectric device connected to the cooling conduit and configured to cool an air flow entering the test slot.

18. The disk drive testing system cooling circuit of claim 17, wherein the thermoelectric device is operable to heat an air flow entering the test slot.

19. The disk drive testing system cooling circuit of claim 17, wherein the thermoelectric device is in electrical communication with the test electronics, wherein the test electronics are configured to control operation of the thermoelectric device.

20. The disk drive testing system cooling circuit of claim 19, wherein the test slot includes a temperature sensor in electrical communication with the test electronics, wherein the test electronics are configured to control operation of the thermoelectric device based, at least in part, on signals received from the temperature sensor.

21. The disk drive testing system cooling circuit of claim 19, wherein the test electronics are configured to control operation of the thermoelectric device based, at least part, on a predetermined test algorithm.

* * * * *